United States Patent
Avrahamy

(10) Patent No.: US 10,448,586 B2
(45) Date of Patent: *Oct. 22, 2019

(54) METHOD AND APPARATUS FOR POWER EXTRACTION IN A PRE-EXISTING AC WIRING INFRASTRUCTURE

(71) Applicant: CMOO SYSTEMS LTD., Kochav-Yair (IL)

(72) Inventor: Avraham Avrahamy, Cochav-Yair (IL)

(73) Assignee: CMOO SYSTEMS LTD., Kochav-Yair (IL)

(*) Notice: Subject to any disclaimer, the term of this patent is extended or adjusted under 35 U.S.C. 154(b) by 146 days.

This patent is subject to a terminal disclaimer.

(21) Appl. No.: 15/832,789

(22) Filed: Dec. 6, 2017

(65) Prior Publication Data

US 2018/0092313 A1 Apr. 5, 2018

Related U.S. Application Data

(63) Continuation of application No. 15/600,719, filed on May 20, 2017, now Pat. No. 9,867,263, which is a
(Continued)

(51) Int. Cl.
*A01G 31/02* (2006.01)
*H05B 37/02* (2006.01)
(Continued)

(52) U.S. Cl.
CPC .............. *A01G 31/02* (2013.01); *A01G 7/045* (2013.01); *B01D 61/147* (2013.01); *C02F 1/42* (2013.01);
(Continued)

(58) Field of Classification Search
CPC .......... H05B 37/02; H05B 39/086; H02J 3/14
See application file for complete search history.

(56) References Cited

U.S. PATENT DOCUMENTS 4,276,486 A * 6/1981 Ahuja ................. H03K 17/136
327/459
4,954,768 A 4/1990 Luchaco
(Continued)

FOREIGN PATENT DOCUMENTS

DE 20116719 U1 12/2001
EP 1531533 A1 5/2005
(Continued)

OTHER PUBLICATIONS

International Search Report of PCT/IL2015/051172 dated Jul. 7, 2016.
(Continued)

*Primary Examiner* — Douglas W Owens
*Assistant Examiner* — Pedro C Fernandez
(74) *Attorney, Agent, or Firm* — May Patents Ltd.

(57) ABSTRACT

A method and apparatus for extracting power in a switch location, and in a load location for use in a pre-existing infrastructure of switching AC power to a lamp (or other load) via a two terminal switch device. The switch is replaced with a module including a first controlled switch (such as a triac or relay) and a first impedance (such as a capacitor) connected in parallel, and another module including a second controlled switch (such as a triac or relay) and a second impedance (such as a capacitor) connected in parallel, is installed at the load location. In an 'off' state where the two controlled switches are in 'open' state, current is flowing via the impedances, but not through the load, so that power extractor circuits in the modules, connected in series to the impedances, extract low power for DC powering logic and other loads in the modules.

63 Claims, 48 Drawing Sheets

Related U.S. Application Data continuation of application No. 15/359,797, filed on Nov. 23, 2016, now Pat. No. 9,839,103, which is a continuation of application No. PCT/IL2015/051172, filed on Dec. 2, 2015.

(60) Provisional application No. 62/100,078, filed on Jan. 6, 2015.

(51) Int. Cl.
| | |
|---|---|
| *H05B 39/08* | (2006.01) |
| *H02J 3/14* | (2006.01) |
| *A01G 7/04* | (2006.01) |
| *B01D 61/14* | (2006.01) |
| *C02F 1/42* | (2006.01) |
| *H02M 1/00* | (2006.01) |
| *F21V 23/04* | (2006.01) |
| *H04W 84/12* | (2009.01) |
| *A01G 9/02* | (2018.01) |
| *A01G 25/16* | (2006.01) |
| *A01G 27/00* | (2006.01) |
| *A01G 31/00* | (2018.01) |
| *G05B 15/02* | (2006.01) |

(52) U.S. Cl.
CPC ............ *H02J 3/14* (2013.01); *H05B 37/0227* (2013.01); *H05B 37/0272* (2013.01); *H05B 39/086* (2013.01); *H05B 39/088* (2013.01); *A01G 7/04* (2013.01); *A01G 9/02* (2013.01); *A01G 25/16* (2013.01); *A01G 27/005* (2013.01); *A01G 31/00* (2013.01); *A01G 2031/006* (2013.01); *F21V 23/04* (2013.01); *G05B 15/02* (2013.01); *H02M 2001/0006* (2013.01); *H04W 84/12* (2013.01)

(56) References Cited

U.S. PATENT DOCUMENTS

| | | | |
|---|---|---|---|
| 5,248,919 | A | 9/1993 | Hanna et al. |
| 5,832,218 | A | 11/1998 | Gibbs et al. |
| 5,948,965 | A | 9/1999 | Upchurch et al. |
| 6,081,832 | A | 6/2000 | Gilchrist et al. |
| 6,474,138 | B1 | 11/2002 | Chang et al. |
| 6,694,316 | B1 | 2/2004 | Langseth et al. |
| 6,967,565 | B2 | 11/2005 | Lingemann |
| 6,969,959 | B2 | 11/2005 | Black et al. |
| 7,129,850 | B1 | 10/2006 | Shih |
| 7,136,482 | B2 | 11/2006 | Wille |
| 7,136,901 | B2 | 11/2006 | Chung et al. |
| 7,334,001 | B2 | 2/2008 | Eichstaedt et al. |
| 7,557,689 | B2 | 7/2009 | Seddigh et al. |
| 7,649,727 | B2 | 1/2010 | Elberbaum |
| 7,653,573 | B2 | 1/2010 | Hayes, Jr. et al. |
| 7,687,940 | B2 | 3/2010 | Mosebrook et al. |
| 7,818,383 | B2 | 10/2010 | Kodama |
| 8,016,205 | B2 | 9/2011 | Drew |
| 8,269,376 | B1 | 9/2012 | Elberbaum |
| 8,471,687 | B2 | 6/2013 | Steiner et al. |
| 8,698,408 | B2 | 4/2014 | Newman, Jr. |
| 8,957,662 | B2 | 2/2015 | Newman, Jr. et al. |
| 2005/0213273 | A1* | 9/2005 | Wang ............... H02J 1/102 361/90 |
| 2007/0176788 | A1 | 8/2007 | Mor et al. |
| 2007/0214095 | A1 | 9/2007 | Adams et al. |
| 2008/0258913 | A1 | 10/2008 | Busey |
| 2009/0024759 | A1 | 1/2009 | McKibben et al. |
| 2010/0277306 | A1 | 11/2010 | Leinen et al. |
| 2010/0201531 | A1 | 12/2010 | Pakravan et al. |
| 2011/0199061 | A1* | 8/2011 | Shimada ............ G05F 1/445 323/237 |
| 2012/0286696 | A1* | 11/2012 | Ghanem ............ H05B 33/0815 315/291 |
| 2013/0320866 | A1 | 12/2013 | Chung |
| 2014/0070613 | A1 | 3/2014 | Garb et al. |
| 2014/0159877 | A1 | 6/2014 | Huang |

FOREIGN PATENT DOCUMENTS

| | | |
|---|---|---|
| WO | 2009/027962 | 3/2009 |
| WO | 2009/027963 | 3/2009 |
| WO | 2012/083380 | 6/2012 |
| WO | 2014/076695 | 5/2014 |
| WO | 2014/076697 | 5/2014 |
| WO | 2015/024779 | 2/2015 |
| WO | 2016110833 | 7/2016 |

OTHER PUBLICATIONS

Written Opinion of PCT/IL2015/051172 dated Jul. 7, 2016.
Cisco Validated Design document, "Building Automation System over IP (BAS/IP) Design and Implementation Guide" by Cisco Systems and Johnson Controls, Aug. 15, 2008 (107 pages).
Pan Jun, "SCR (Silicon-Controlled Rectifier) Dimming Technology in LED Lighting", (downloaded May 2015), Solomon Systech Limited (7 pages).
National Electrical Manufacturers Association (NEMA) Lighting Systems Division Document LSD 49-2010, "Solid State Lighting for Incandescent Replacement—Best Practices for Dimming", (dated 2010) (18 pages).
Agilent Technologies Application Note 90B (5925-4020), "DC Power Supply Handbook", dated Oct. 1, 2000 (126 pages).
Agilent Technologies Application Note 1554 (5989-2291EN), "Understanding Linear Power Supply Operation", dated Feb. 4, 2005 (8 pages).
On Semiconductor® Reference Manual entitled: "Switch-Mode Power Supply", Rev. 4 dated Apr. 2014 (SMPSRM/D) (73 pages).
IETF RFC 675 "Specification of Internet Transmission Control Program", Dec. 1974 (70 pages).
IETF RFC 793 "Protocol Specification", Sep. 1981 (90 pages).
IETF RFC 791 "Protocol Specification", Sep. 1981 (50 pages).
IETF RFC 1349 "Type of Service in the Internet Protocol Suite", Jul. 1992 (28 pages).
IETF RFC 2460 "Internet Protocol, Version 6 (IPv6)", Dec. 1998 (39 pages).
IETF RFC 1034 "Domain Names—Concepts and Facilities", Nov. 1987 (52 pages).
IETF RFC 1035 "Domain Names—Implementation and Specification", Nov. 1987 (52 pages).
IETF RFC 2131 "Dynamic Host Configuration Protocol", Mar. 1997 (45 pages).
IETF RFC 3315 "Dynamic Host Configuration Protocol for IPv6 (DHCPv6)", Jul. 2003 (101 pages).
Chapter 20: "Wireless Technologies" of the publication No. 1-587005-001-3 by Cisco Systems, Inc. (Jul. 1999) entitled: "Internetworking Technologies Handbook" (42 pages).
William Stallings [ISBN: 0-13-191835-4] entitled: "Wireless Communications and Networks—second Edition" book published 2005 by Pearson Education, Inc. (569 pages).
Publication entitled: "WiFi Technology" by Telecom Regulatory Authority, published on Jul. 2003.
W. Steven Conner, Intel Corp. et al., "IEEE 802.11s Tutorial" presented at the IEEE 802 Plenary, Dallas on Nov. 13, 2006 (93 pages).
Eugen Borcoci of University Politehnica Bucharest, "Wireless Mesh Networks Technologies: Architectures, Protocols, Resource Management and Applications", presented in INFOWARE Conference on Aug. 22-29, 2009 in Cannes, France (212 pages).
Joseph D. Camp and Edward W. Knightly of Electrical and Computer Engineering, Rice University, Houston, TX, USA, "The IEEE 802.11s Extended Service Set Mesh Networking Standard", IEEE Communication magazine paper (6 pages).
White paper "WiGig White Paper—Defining the Future of Multi-Gigabit Wireless Communications", published by WiGig Alliance, Jul. 2010 (5 pages).

(56) References Cited

OTHER PUBLICATIONS

WirelessHD consortium, "WirelessHD Specifications Version 1.1 Overview", May 2010, (95 pages).
Meir Feder, "Enabling Wireless uncompressed HDTV Connectivity with a Unique Video-Modem Approach", published by the AMIMON Ltd. (10 pages).
Carlos Cordeiro, Kiran Challapali, Dagnachew Birru, and Sai Shenker, "IEEE 802.22: An Introduction to the First Wireless Standard based on Cognitive Radios", published in the Journal of Communication, vol. 1. No. 1, Apr. 2006 (10 pages).
Apruva N. Mody and Gerald Chouinard. "IEEE 802.22 Wireless Regional Area Networks—Enabling Rural Broadband Wireless Access Using Cognitive Radio Technology", Doc. # IEEE 802.22-10/0073r03 Jun. 2010 (16 pages).
Dusit Niyato and Ekram Hossain, "Dynamic Spectrum Access in IEEE 802.22—Based Cognitive Wireless Networks: A Game Theoretic Model for Competitive Spectrum Bidding and Pricing", published IEEE Wireless Communication Apr. 2009.
ECMA International white paper Ecma/TC32-TG19/2005/012, "Near Field Communication—White paper" (12 pages).
Rohde&Schwarz White Paper 1MA182_4e entitled: "Near Field Communication (NFC) Technology and Measurements White Paper", Mar. 2011 (26 pages).
Jan Kremer Consulting Services (JKCS) white paper entitled: "NFC—Near Field Communication—White paper" (44 pages).
Book by Wikipedia "Electronics" downloaded from en.wikibooks.org dated Mar. 15, 2015 (401 pages).
Developer's Guide SLLA284A by Texas Instruments Incorporated, "Digital Isolator Design Guide" Revised Nov. 2014 (19 pages).
Data sheet KMP_1600C_B05 by Murata Power Solutions, Inc., entitled: "1600C & 1630C—Quad Data-Bus Isolators", published 2011 (2 pages).
Data sheet LT 0514 Rev. C by Linear Technology Corporation, "LTM2883—SPI/Digital or I2C μModule Isolator with Adjustable ±12.5V and 5V Regulated Power", (downloaded Jul. 2015) (36 pages).
iPhone 6 technical specification (retrieved Oct. 2015 from www.apple.com/iphone-6/specs/) 32 pages).
User Guide by Apple Inc., "iPhone User Guide for iOS 8.4 Software", dated 2015 (019-00155/2015-06) (196 pages).
User manual numbered English (EU), "SM-G925F SM-G925FQ SM-G925I User Manual" Mar. 2015 (Rev. 1.0) (145 pages).
"Galaxy S6 Edge—Technical Specification" (retrieved Oct. 2015 from www.samsung.com/us/explore/galaxy-s-6-features-and-specs) (1 page).
Guide (code 201-13061-05) "Universal WiFi Range Extender WN3000RP Installation Guide", by Netgear, Inc. dated Apr. 2012 (16 pages).
SmartRG Inc. User Manual, "WR100 300 Mbps Wireless-N Repeater User Manual", release 1.0 dated Nov. 29, 2012 (25 pages).
Tim van Lokven, "Review and Comparison of Instant Messaging Protocols", (Jan. 23, 2011) (52 pages).
3GPP Technical Specification 3GPP TS 22.011, "3rd Generation Partnership Project; Technical Specification Group Services and System Aspects; Service accessibility (Release 14)", (v143.0.0, Sep. 2015) (28 pages).
3GPP technical specification 3GPP TS 23.140, "3rd Generation Partnership Project; Technical Specification Group Core Network and Terminals; Multimedia Messaging Service (MMS); Functional description; Stage 2 (Release 6)", V6.16,0 (Mar. 2009) (244 pages).
Guide by American Majority organization entitled:"facebook—A Beginner's Guide", (retrieved Oct. 2015 from http://cmrw.org/) (28 pages).
Guide by Twitter, Inc., "Twitter for Small Business—A Guide to Get Started", (retrieved Oct. 2015 from https://g.twimg.com/business/pdfs/Twitter_Smallbiz_Guide.pdf) (22 pages).
Mobile HCI 2013—Collaboration and Communication by Karen Church and Rodrigo de Oliveira (both of Telefonica Research),
"What's up with WhatsApp? Comparing Mobile Instant—Messaging Behaviors with Traditional SMS", Aug. 30, 2013 (10 pages).
IEFT RFC 5598, "Internet Mail Architecture", Jul. 2009 (40 pages).
IETF RFC 5321, "Simple Mail Transfer Protocol", Oct. 2008 (95 pages).
IETF RFC 7504, "SMTP 521 and 556 Reply Codes", Jun. 2015 (7 pages).
Craig Partridge of BBN Technologies, "The technical Development of Internet Email", IEEE Computer Society [1058-6180/08], IEEE Annals of the History of Computing paper published 2008 (27 pages).
'Pocket Consultant' book [ISBN: 978-0-7356-8168-2], "Microsoft Exchange Server 2013—Configuration & Clients" published 2013 by Microsoft Press (384 pages).
IEIF RFC 1939, "Post Office Protocol—Version 3", May 1996 (23 pages).
IETF RFC 2449, "POP3 Extension Mechanism", Nov. 1998 (19 pages).
IETF RFC 1734, "POP3 AUTHentication command", Dec. 1994 (5 pages).
IETF RFC 3501, "Internet Message Access Protocol—Version 4rev1", Mar. 2003 (108 pages).
IETF RFC 4314, "IMAP4 Access Control List (ACL) Extension", Dec. 2005 (27 pages).
IETF RFC 6120, "Extensible Messaging and Presence Protocol (XMPP): Core", Mar. 2011 (211 pages).
IETF RFC 6121, "Extensible Messaging and Presence Protocol (XMPP): Instant Messaging and Presence", Mar. 2011 (114 pages).
IETF RFC 6122, "Extensible Messaging and Presence Protocol (XMPP): Address Format", Mar. 2011 (23 pages).
IETF RFC 6665, "SIP-Specific Event Notification" Jul. 2012 (53 pages).
IETF RFC 3903, "Session Initiation Protocol (SIP) Extension for Event State Publication" Oct. 2004 (32 pages).
IETF RFC 3428, "Session Initiation Protocol (SIP) Extension for Instant Messaging" Dec. 2002 (18 pages).
IETF RFC 3856, "A Presence Event Package for the Session Initiation Protocol (SIP)" Aug. 2004 (27 pages).
RFC 4975, "The Message Session Relay Protocol (MSRP)", Sep. 2007 (63 pages).
RFC 4976, "Relay Extensions for the Message Session Relay Protocol (MSRP)" Sep. 2007 (36 pages).
IETF RFC 6914, "SIMPLE Made Simple: An Overview of the IETF Specifications for Instant Messaging and Presence Using the Session Initiation Protocol (SIP)", Apr. 2013 (15 pages).
IXYS Integrated Circuits Division specification DS-CPC1965Y-R07 entitled: "CPC1965Y AC Solid State Relay" Oct. 18, 2013 (6 pages).
Data sheet "BTA06 T/D/S/A BTB06T/D/S/A—Sensitive Gate Triacs" published by SGS-Thomson Microelectronics Mar. 1995 (6 pages).
Philips Semiconductors "TrenchMOS™ transistor Standard level FET BUK7524-55" Rev 1.000 dated Jan. 1997 (8 pages).
Data sheet entitled: "Lightbulb Type LED Lamps" (dated May 9, 2011) (2 pages).
Thomas Research Products of Elgin, IL, U.S.A. entitled: "3W 120V AC 36mm Round LED Module—AC LED Technology by Lynk Labs", specifications Rev Apr. 9, 2015 (6 pages).
Data sheet entitled: "110V or 230V LED Strip light", DFx Technology Ltd. of Oxfordshire (downloaded May 2015) (1 page).
Vishay Intertechnology, Inc. Document No. 28193 "DC Film Capacitors MKT Radial Potted Type", Revision: Nov. 21, 2012 (18 pages).
Diodes Incorporated Data sheet DS28002 Rev. 8-2 entitled: "1N4001-1N4007 1.0A Rectifier" (3 pages).
Data sheet 1N5221B-1N5263B Rev. 1.2.0, "1N5221B-1N5263B Zener Diodes", Jul. 2013 (6 pages).
Diodes Incorporated Document No. DS33177 Rev. 8-2 entitled: "ZETEX FTZ857 300V NPN Medium Power Transistor in SOT223" (May 2015) (7 pages).
Diodes Incorporated Document No. DS21201 Rev. 15-2 entitled: "DF005M-DF10M 1.0A Glass Passivated Bridge Rectifiers" (3 pages).

(56) References Cited

OTHER PUBLICATIONS

Data sheet of Micro Commercial Components Corp, entitled: "SMBJ5338B Thru SMBJ5388B—5 Watt Surface Mount Silicon Zener Diode 5.1 to 200 Volts" Revision: J dated Sep. 9, 2014 (5 pages).
Technical document by Lutron Electronics Co., Inc. "Single-Pole Preset Dimmer type AY-600P" Sep. 2006 (2 pages).
Data sheet DocID022930 entitled: "SPBT2632C1A—Bluetooth® technology class-1 module", Rev. 6 dated Apr. 2015 (27 pages).
Zetex Semiconductors PLC application note "AN39—Current measurement application handbook" Issue 5, Jan. 2008 (42 pages).
Supplementary European Search Report of EP 15876754 dated Jul. 17, 2018.

* cited by examiner

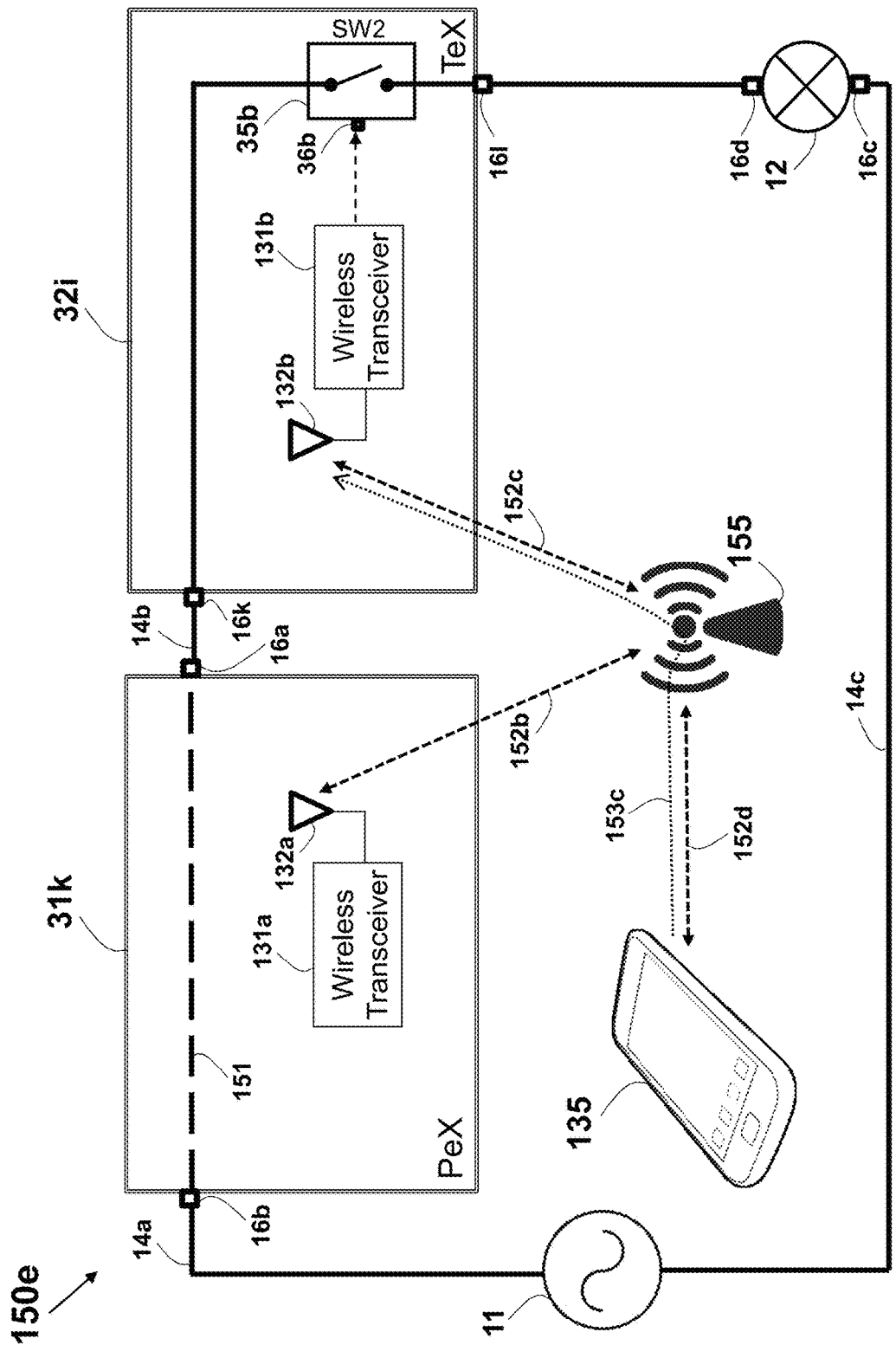

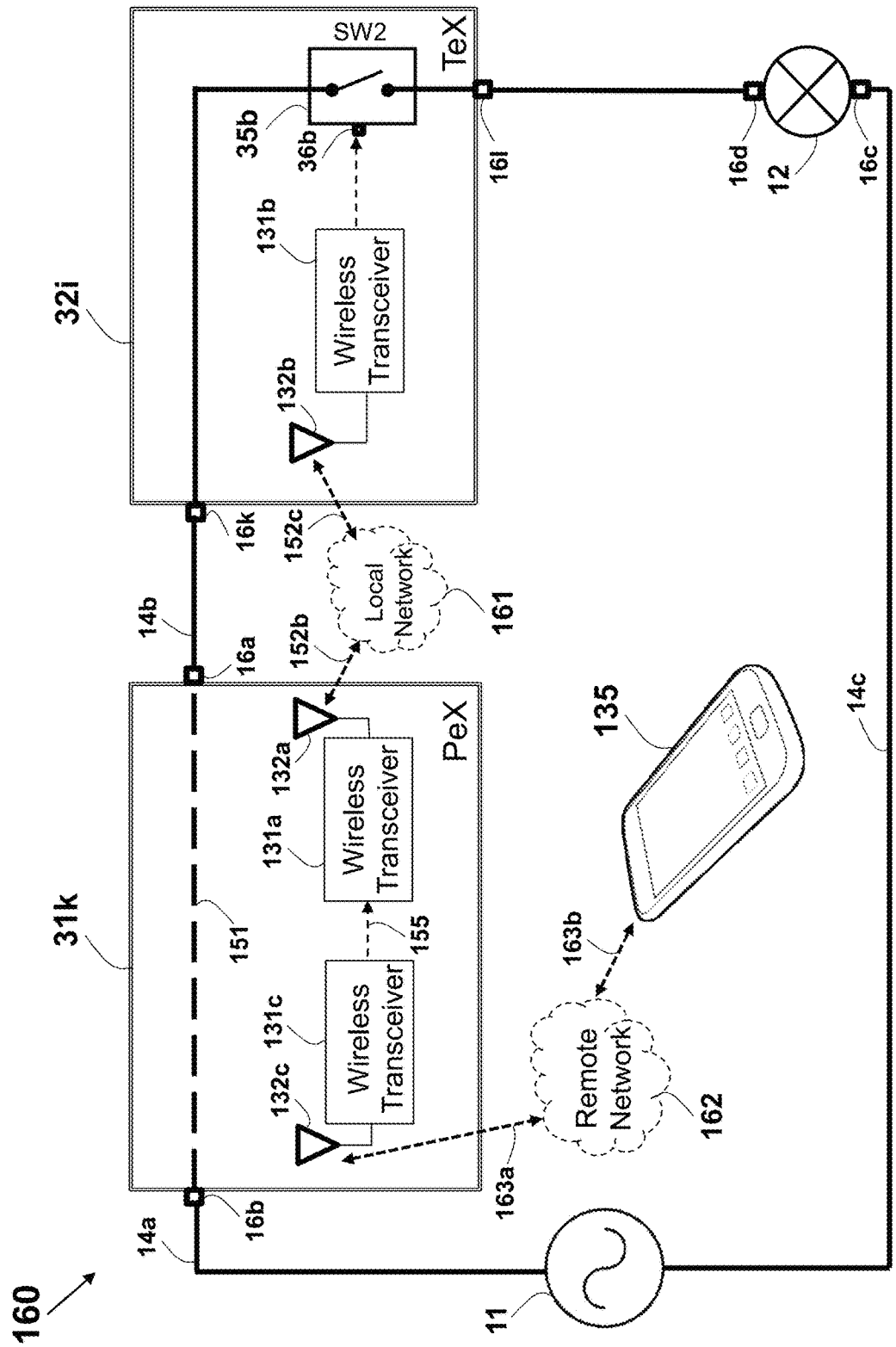

METHOD AND APPARATUS FOR POWER EXTRACTION IN A PRE-EXISTING AC WIRING INFRASTRUCTURE

RELATED APPLICATIONS

The present application is a continuation of U.S. patent application Ser. No. 15/600,719, filed on May 20, 2017, which is a continuation of U.S. patent application Ser. No. 15/359,797, filed on Nov. 23, 2016, now issued U.S. Pat. No. 9,839,103, issued on Dec. 5, 2017, and which is a continuation of International Application PCT/IL2015/051172, with an international filing date of Dec. 2, 2015, which claims priority from U.S. Provisional Patent Application No. 62/100,078 that was filed on Jan. 6, 2015, which is hereby incorporated herein by reference.

TECHNICAL FIELD

This disclosure relates generally to an apparatus and method for power extraction for controlling a power supplied to a load from a power source, and for being powered from the supplied power, and in particular to a two-terminal switch connected serially between the power source and the load, such as remotely-controlled two-terminal light control switch powered from the AC mains.

BACKGROUND

Unless otherwise indicated herein, the materials described in this section are not prior art to the claims in this application and are not admitted to be prior art by inclusion in this section.

FIG. 1 shows an electrical diagram 10 of a typical arrangement of light control in a building, such as in a domestic, commercial, or industrial environment. An AC power source 11 may be the mains grid, providing Alternating-Current (AC, a.k.a. Line power, AC power, grid power, and household electricity). Commonly, the AC power source 11 supplies 120 VAC/60 Hz in North America (or 115 VAC) and 230 VAC/50 Hz (or 220 VAC) in most of Europe. The AC power typically consists of a sine wave (or sinusoid) waveform, where the voltage relates to an RMS amplitude value (120 or 230), and having a frequency measured in Hertz, relating to the number of cycles (or oscillations) per second. Commonly single-phase infrastructure exists, and a wiring in the building commonly uses three wires, known as a line wire (also known as phase, hot, or active) that carry the alternating current, a neutral wire (also known as zero or return) which completes the electrical circuit by providing a return current path, and an earth or ground wire, typically connected to the chassis of any AC-powered equipment that serves as a safety means against electric shocks. As illustrated in the circuit diagram 10 shown in FIG. 1, a neutral line 14c is connected to a terminal (or connection) 16d of a lamp 12 that serves as a load. The lamp 12 connects via a terminal (or connection) 16c to a wire 14c to a terminal 16a of a lamp switch 13 that is commonly a Single-Pole, Single-Throw (SPST), which connects (via terminal 16b) via a phase wire 14a to the AC power source 11.

The light switch 13 is commonly a mechanically actuated switch 20 as depicted in FIG. 2, that is connected in series between the AC power 11 and the lamp 12, and is typically an on/off switch for turning the illumination of the lamp 12 'on' and 'off'. As shown in FIG. 2, the switch 13 may be wall-mounted into a standard wall cavity, commonly using a plastic light switch box. The switch in some scenarios is connected via two terminals designated as 16a and 16b, where the terminal 16b connects to the AC power 11 phase via the phase wire 14a, while the terminal 16a connects to the load 12 via the wire 14b.

The building wiring lighting circuit 10 shown in FIG. 1 allows for a control in one location via the light switch 13. In some places such as in a hallway, stairwell, or a large room, it is more convenient to control the lamp 12 from two (or more) locations. FIG. 1a shows an arrangement of a wiring circuit 15 allowing the control of the lamp 12 from two locations, via two separated switches 17a and 17b, known as multiway switching. The switches 17a and 17b are both Single-Pole, Double-Throw (SPDT) switches (a.k.a. two-way or three-way switches), each having three terminals. The light switch 17a comprises a single pole connected to a center terminal 16e, and can be in one of two states: designated as a state '1' and a state '2'. In the state '1' the switch 17a connects the terminal 16e to a terminal 16g, and in the state '2' the switch 17a connects the center terminal 16e to a terminal 16f. Similarly, the light switch 17b comprises a single pole connected to a terminal 16j, and can be in one of two states, designated as a state '1' and a state '2'. In state '1' the switch 17b connects the center terminal 16j to a terminal 16h, and in the state '2' the switch 17b connects the center terminal 16j to a terminal 16i. A wire 14d connects the terminal 16g of the light switch 17a to the terminal 16i of the light switch 17b, and a wire 14e connects the terminal 16f of the light switch 17a to terminal 16h of the light switch 17b. In the case where both switches 17a and 17b are in the same state '1' or '2', the circuit is open, and no current flows to the lamp 12. In all other cases, where the switches are in different states, the circuit is closed hence allowing current to flow to the lamp 12. Thus the lamp 12 may be turned 'on' or 'off' from any one of the switches 17a and 17b.

Using the light switch 20 requires a person to physically approach and mechanically activate the switch. In one scenario, it is preferred to remotely turn the lights on or off, without physical access to the switch. Such remote lighting control may be used for building automation, or may be part of, integrated with, or coupled to a building automation system, such as a building automation system described in U.S. Pat. No. 6,967,565 to Lingemann entitled: "Building Automation System", which is incorporated in its entirety for all purposes as if fully set forth herein. Such system may further support, be part of, or be integrated with, a Building Automation System (BAS) standard, and may further be in part or in full in accordance with Cisco Validated Design document entitled: "Building Automation System over IP (BAS/IP) Design and Implementation Guide" by Cisco Systems and Johnson Controls, which is incorporated in its entirety for all purposes as if fully set forth herein.

A system for remotely controlling the operation of wall-mounted switches is disclosed in U.S. Patent Application No. 2007/0176788 to Mor, entitled: "Remote Control System for Controlling Wall-Mounted Switches", which is incorporated in its entirety for all purposes as if fully set forth herein, describing a remote control system for controlling the operation of a wall-mounted switch that includes a remote control unit adapted to be located at a remote location with respect to the wall-mounted switch, and having a depressible switch button. Further, a light control system for two-wire installations is disclosed in U.S. Pat. No. 8,471,687 to Steiner et al., entitled: "Method and Apparatus for Communication Message Signals in a Load Control System", which is incorporated in its entirety for all purposes as if fully set forth herein, describing a system for independent control of electric motors and electric lights, where a plurality of two-wire installations are coupled in series via power wires between AC source and a light/motor control unit. Similarly, PCT International Publications Nos. WO 2009/027962 and WO 2009/027963 both to Ziv, both entitled: "Remote Controlled Electrical Switch Retrofit System", which are incorporated in their entirety for all purposes as if fully set forth herein, describe a wall mounted power switch retrofit. The retrofit includes a switch that connects to the existing wires of the retrofitted wall mounted power switch, and allows power to be provided to a load when turned on, and prevents power from being provided to the load when turned off, a control unit that controls the status of the switch, a circuit that draws power from the existing wires and provides it to the control unit, and wherein the control unit receives electrical power regardless of the status of the switch.

An automatically actuatable switch device is disclosed in U.S. Pat. No. 7,129,850 to Shih entitled: "Automatically Actuatable Switch Device", which is incorporated in its entirety for all purposes as if fully set forth herein, describing a switch device that includes a housing, where a circuit board is disposed in the housing for being coupled between an electric power source and an electric appliance, and a remote detecting device that includes a light emitting and receiving device for generating lights to detect whether users are going towards the housing on the switch device or not. Similarly, U.S. Patent Application No. 2010/0277306 to Leinen entitled: "Wireless Occupancy Sensing with Accessible Location Power Switching", which is incorporated in its entirety for all purposes as if fully set forth herein, describes a system that includes an accessible electrical box; a wireless receiver to receive a wireless signal from an occupancy sensor; a power switch to control power to a load; and a controller to control the power switch in response to the wireless signal. The wireless receiver, controller, and power switch are included in the accessible electrical box. Further, PCT International Publication No. WO 2014/076697 to Ziv entitled: "Device Kit and Method for Absorbing Leakage Current", which is incorporated in its entirety for all purposes as if fully set forth herein, describes a kit device, and method for absorbing leakage current in an electronic circuit including at least one switch and at least one load by using an absorbing device and an absorbing material or an absorbent marking device, wherein the absorbent marking device is configured to mark or attach an absorbing material on the circuit or on the load.

Dimmer. Dimmers are devices used to lower the brightness of a light by changing the voltage waveform applied to the lamp, allowing for lowering the intensity of the light output. Typically variable-voltage dimmer devices are used to control light output from resistive incandescent, halogen, Compact Fluorescent Lights (CFLs) and Light-Emitting Diodes (LEDs). Dimmers range in size from small units the size of a light switch used for domestic lighting to high power units used in large theatre or architectural lighting installations. Dimmers may be directly and manually controlled, or automatically via a control system. Due to their higher efficiency, modern dimmers are built from semiconductors instead of variable resistors, since a variable resistor would dissipate power as heat and acts as a voltage divider, while semiconductor or solid-state dimmers switch between a low resistance "on" state and a high resistance "off" state, they dissipate very little power compared with the controlled load. Semiconductor dimmers switch on at an adjustable time (phase angle) after the start of each alternating current half-cycle, thereby altering the voltage waveform applied to lamps and so changing its RMS effective value. Dimming can be almost instantaneous and is easily controlled by remote electronics. An example of Dimming LEDs using SCR based dimmer technology is described in a paper published by Solomon Systech Limited and authored by Pan Jun (downloaded May 2015) entitled: "*SCR (Silicon-Controlled Rectifier) Dimming Technology in LED Lighting*", and in a National Electrical Manufacturers Association (NEMA) Lighting Systems Division Document LSD 49-2010 (dated 2010) entitled: "*Solid State Lighting for Incandescent Replacement—Best Practices for Dimming*", which are both incorporated in their entirety for all purposes as if fully set forth herein.

Common two-wire dimmer switches are coupled in series electrical connection between an Alternating-Current (AC) power source and a lighting load for controlling the amount of power delivered from the AC power source to the lighting load. A two-wire wall-mounted dimmer switch is adapted to be mounted to a standard electrical wall-box and comprises two load terminals: a hot terminal adapted to be coupled to the hot side of the AC power source and a dimmed hot terminal adapted to be coupled to the lighting load. In other words, the two-wire dimmer switch does not require a connection to the neutral side of the AC power source (i.e., the load control device is a "two-wire" device). Similarly, "three-way" dimmer switches may be used in three-way lighting systems and comprise at least three load terminals, but do not require a connection to the neutral side of the AC power source.

A dimmer switch typically comprises a bidirectional semiconductor switch, e.g., a thryristor (such as a triac) or two Field-Effect Transistors (FETs) in anti-series connection. The bidirectional semiconductor switch is coupled in series between the AC power source and the load, and is controlled to be conductive and non-conductive for portions of a half cycle of the AC power source to thus controlling the amount of power delivered to the electrical load. Generally, dimmer switches use either a forward phase-control dimming technique or a reverse phase-control dimming technique in order to control, when the bidirectional semiconductor switch is rendered conductive and non-conductive to thus control the power delivered to the load. The dimmer switch may comprise a toggle actuator for turning the lighting load on and off and an intensity adjustment actuator for adjusting the intensity of the lighting load.

A two-wire load control device that may be coupled between an AC power source and a load regulation device for a high-efficiency light source, and is able to properly control the intensity of the high-efficiency light source is described in U.S. Pat. No. 4,954,768 to Luchaco et al. entitled: "Two-Wire Low-Voltage Dimmer", in U.S. Pat. No. 5,248,919 to Hanna et al. entitled: "Lighting Control Device", in U.S. Pat. No. 6,969,959 to Black et al. entitled: "Electronic Control Systems and Methods", in U.S. Pat. No. 7,687,940 to Morsebrook et al. entitled: "Dimmer Switch for Use with Lighting Circuits Having Three-Way Switches", in U.S. Pat. No. 8,957,662 to Newman, Jr. et al. entitled: "Load Control Device for High-Efficiency Loads", in U.S. Pat. No. 8,698,408 to Newman, Jr. entitled: "Two-Wire Dimmer Switch for Low Power Loads", which are all incorporated in their entirety for all purposes as if fully set forth herein.

AC/DC Power Supply. A power supply is an electronic device that supplies electric energy to an electrical load, where the primary function of a power supply is to convert one form of electrical energy to another and, as a result, power supplies are sometimes referred to as electric power converters. Some power supplies are discrete, stand-alone devices, whereas others are built into larger devices along with their loads. Examples of the latter include power supplies found in desktop computers and consumer electronics devices. Every power supply must obtain the energy it supplies to its load, as well as any energy it consumes while performing that task, from an energy source. Depending on its design, a power supply may obtain energy from various types of energy sources, including electrical energy transmission systems, energy storage devices such as a batteries and fuel cells, electromechanical systems such as generators and alternators, solar power converters, or another power supply. All power supplies have a power input, which receives energy from the energy source, and a power output that delivers energy to the load. In most power supplies, the power input and the power output consist of electrical connectors or hardwired circuit connections, though some power supplies employ wireless energy transfer in lieu of galvanic connections for the power input or output.

Some power supplies have other types of inputs and outputs as well, for functions such as external monitoring and control. Power supplies are categorized in various ways, including by functional features. For example, a regulated power supply is one that maintains constant output voltage or current despite variations in load current or input voltage. Conversely, the output of an unregulated power supply can change significantly when its input voltage or load current changes. Adjustable power supplies allow the output voltage or current to be programmed by mechanical controls (e.g., knobs on the power supply front panel), or by means of a control input, or both. An adjustable regulated power supply is one that is both adjustable and regulated. An isolated power supply has a power output that is electrically independent of its power input; this is in contrast to other power supplies that share a common connection between power input and output.

AC-to-DC (AC/DC) power supply uses AC mains electricity as an energy source, and typically employs a transformer to convert the input voltage to a higher, or commonly lower AC voltage. A rectifier is used to convert the transformer output voltage to a varying DC voltage, which in turn is passed through an electronic filter to convert it to an unregulated DC voltage. The filter removes most, but not all of the AC voltage variations; the remaining voltage variations are known as a ripple. The electric load tolerance of ripple dictates the minimum amount of filtering that must be provided by a power supply. In some applications, high ripple is tolerated and therefore no filtering is required. For example, in some battery charging applications, it is possible to implement a mains-powered DC power supply with nothing more than a transformer and a single rectifier diode, with a resistor in series with the output to limit charging current.

The function of a linear voltage regulator is to convert a varying AC or DC voltage to a constant, often specific, lower DC voltage. In addition, they often provide a current limiting function to protect the power supply and load from overcurrent (excessive, potentially destructive current). A constant output voltage is required in many power supply applications, but the voltage provided by many energy sources will vary with changes in load impedance. Furthermore, when an unregulated DC power supply is the energy source, its output voltage will also vary with changing input voltage. To circumvent this, some power supplies use a linear voltage regulator to maintain the output voltage at a steady value, independent of fluctuations in input voltage and load impedance. Linear regulators can also reduce the magnitude of ripple and noise present appearing on the output voltage.

In a Switched-Mode Power Supply (SMPS), the AC mains input is directly rectified and then filtered to obtain a DC voltage, which is then switched "on" and "off" at a high frequency by electronic switching circuitry, thus producing an AC current that will pass through a high-frequency transformer or inductor. Switching occurs at a very high frequency (typically 10 kHz-1 MHz), thereby enabling the use of transformers and filter capacitors that are much smaller, lighter, and less expensive than those found in linear power supplies operating at mains frequency. After the inductor or transformer secondary, the high frequency AC is rectified and filtered to produce the DC output voltage. If the SMPS uses an adequately insulated high-frequency transformer, the output will be electrically isolated from the mains; this feature is often essential for safety. Switched-mode power supplies are usually regulated, and to keep the output voltage constant, the power supply employs a feedback controller that monitors current drawn by the load. SMPSs often include safety features such as current limiting or a crowbar circuit to help protect the device and the user from harm. In the event that an abnormally high-current power draw is detected, the switched-mode supply can assume this is a direct short and will shut itself down before damage is done. PC power supplies often provide a power good signal to the motherboard; the absence of this signal prevents operation when abnormal supply voltages are present.

Power supplies are described in Agilent Technologies Application Note 90B dated Oct. 1, 2000 (5925-4020) entitled: "*DC Power Supply Handbook*" and in Application Note 1554 dated Feb. 4, 2005 (5989-2291EN) entitled: "*Understanding Linear Power Supply Operation*", and in On Semiconductor® Reference Manual Rev. 4 dated April 2014 (SMPSRM/D) entitled: "*Switch-Mode Power Supply*", which are all incorporated in their entirety for all purposes as if fully set forth herein.

Internet. The Internet is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers on the Internet. These data routers are hosted by commercial, government, academic, and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Transmission Control Protocol (TCP) is one of the core protocols of the Internet Protocol suite (IP) described in RFC 675 and RFC 793, and the entire suite is often referred to as TCP/IP. TCP provides reliable, ordered and error-checked delivery of a stream of octets between programs running on computers connected to a local area network, intranet or the public Internet. It resides at the transport layer. Web browsers typically use TCP when they connect to servers on the World Wide Web, and is used to deliver email and transfer files from one location to another. HTTP, HTTPS, SMTP, POP3, IMAP, SSH, FTP, Telnet and a variety of other protocols are encapsulated in TCP. As the transport layer of TCP/IP suite, the TCP provides a communication service at an intermediate level between an application program and the Internet Protocol (IP). Due to network congestion, traffic load balancing, or other unpredictable network behavior, IP packets may be lost, duplicated, or delivered out-of-order. TCP detects these problems, requests retransmission of lost data, rearranges out-of-order data, and even helps minimize network congestion to reduce the occurrence of the other problems. Once the TCP receiver has reassembled the sequence of octets originally transmitted, it passes them to the receiving application. Thus, TCP abstracts the application's communication from the underlying networking details. The TCP is utilized extensively by many of the Internet's most popular applications, including the World Wide Web (WWW), E-mail, File Transfer Protocol, Secure Shell, peer-to-peer file sharing, and some streaming media applications.

While IP layer handles actual delivery of the data, TCP keeps track of the individual units of data transmission, called segments, which are divided smaller pieces of a message, or data for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (Transport Layer) reassembles the individual segments and ensures they are correctly ordered and error-free as it streams them to an application.

The TCP protocol operations may be divided into three phases. First, the connections must be properly established in a multi-step handshake process (connection establishment) before entering the data transfer phase. After data transmission is completed, the connection termination closes established virtual circuits and releases all allocated resources. A TCP connection is typically managed by an operating system through a programming interface that represents the local end-point for communications, the Internet socket. The local end-point undergoes a series of state changes throughout the duration of a TCP connection.

The Internet Protocol (IP) is the principal communications protocol used for relaying datagrams (packets) across a network using the Internet Protocol Suite. It is considered as the primary protocol that establishes the Internet, and is responsible for routing packets across the network boundaries. IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3 \times 10^9$ addresses), while IPv6 uses 128-bit addresses (providing 340 undecillion or $3.4 \times 10^{31}$ addresses), as described in RFC 2460.

The Internet architecture employs a client-server model, among other arrangements. The terms 'server' or 'server computer' relates herein to a device or computer (or a plurality of computers) connected to the Internet, and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or a device, or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

Wireless. Some embodiments herein may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Any wireless network or wireless connection herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device that incorporates a wireless communication device, or a mobile/portable Global Positioning System (GPS) device. Further, a wireless communication may be based on wireless technologies that are described in Chapter 20: "*Wireless Technologies*" of the publication number 1-587005-001-3 by Cisco Systems, Inc. (July/1999) entitled: "*Internetworking Technologies Handbook*", which is incorporated in its entirety for all purposes as if fully set forth herein. Wireless technologies and networks are further described in a book published 2005 by Pearson Education, Inc. William Stallings [ISBN: 0-13-191835-4] entitled: "*Wireless Communications and Networks—second Edition*", which is incorporated in its entirety for all purposes as if fully set forth herein.

Wireless networking typically employs an antenna (a.k.a. aerial), which is an electrical device that converts electric power into radio waves, and vice versa, connected to a wireless radio transceiver. In transmission, a radio transmitter supplies an electric current oscillating at radio frequency to the antenna terminals, and the antenna radiates the energy from the current as electromagnetic waves (radio waves). In reception, an antenna intercepts some of the power of an electromagnetic wave in order to produce a low voltage at its terminals that is applied to a receiver to be amplified. Typically an antenna consists of an arrangement of metallic conductors (elements), electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. Antennas can be designed to transmit and receive radio waves in all horizontal directions equally (omnidirectional antennas), or preferentially in a particular direction (directional or high gain antennas). In the latter case, an antenna may also include additional elements or surfaces with no electrical connection to the transmitter or receiver, such as parasitic elements, parabolic reflectors or horns, which serve to direct the radio waves into a beam or other desired radiation pattern.

LPD433. LPD433 (Low Power Device 433 MHz) is a UHF band in which license-free communication devices are allowed to operate in Europe and other countries over the world. The frequencies correspond with the ITU region 1 ISM band of 433.050 MHz to 434.790 MHz, and operation is mainly limited to CEPT countries. The frequencies used are within the 70-centimeter band, which is traditionally reserved for higher power amateur radio operations in most nations worldwide. LPD hand-held radios are authorized for license-free voice communications used in most of Europe using analog frequency modulation (FM) as part of short-range device regulations, with 25 kHz channel spacing, for a total of 69 channels. In some countries, LPD devices may only be used with the integral and non-removable antenna with a maximum legal power output of 10 mW. LPD433 is also commonly used by wireless instruments and digital devices such as car keylocks.

Zigbee. ZigBee is a standard for a suite of high-level communication protocols using small, low-power digital radios based on an IEEE 802 standard for Personal Area Network (PAN). Applications include wireless light switches, electrical meters with in-home-displays, and other consumer and industrial equipment that require a short-range wireless transfer of data at relatively low rates. The technology defined by the ZigBee specification is intended to be simpler and less expensive than other WPANs, such as Bluetooth. ZigBee is targeted at Radio-Frequency (RF) applications that require a low data rate, long battery life, and secure networking. ZigBee has a defined rate of 250 kbps suited for periodic or intermittent data or a single signal transmission from a sensor or input device.

ZigBee builds upon the physical layer and medium access control defined in IEEE standard 802.15.4 (2003 version) for low-rate WPANs. The specification further discloses four main components: network layer, application layer, ZigBee Device Objects (ZDOs), and manufacturer-defined application objects, which allow for customization and favor total integration. The ZDOs are responsible for a number of tasks, which include keeping of device roles, management of requests to join a network, device discovery, and security. Because ZigBee nodes can go from a sleep to active mode in 30 ms or less, the latency can be low and devices can be responsive, particularly compared to Bluetooth wake-up delays, which are typically around three seconds. ZigBee nodes can sleep most of the time, thus an average power consumption can be lower, resulting in longer battery life.

There are three defined types of ZigBee devices: ZigBee Coordinator (ZC), ZigBee Router (ZR), and ZigBee End Device (ZED). ZigBee Coordinator (ZC) is the most capable device and forms the root of the network tree and might bridge to other networks. There is exactly one defined ZigBee coordinator in each network, since it is the device that started the network originally. It is able to store information about the network, including acting as the Trust Center & repository for security keys. ZigBee Router (ZR) may be running an application function as well as can acting as an intermediate router, passing on data from other devices. ZigBee End Device (ZED) contains functionality to talk to a parent node (either the coordinator or a router). This relationship allows the node to be asleep a significant amount of the time, thereby giving long battery life. A ZED requires the least amount of memory, and therefore can be less expensive to manufacture than a ZR or ZC.

The protocols build on recent algorithmic research (Ad-hoc On-demand Distance Vector, neuRFon) to automatically construct a low-speed ad-hoc network of nodes. In most large network instances, the network will be a cluster of clusters. It can also form a mesh or a single cluster. The current ZigBee protocols support beacon and non-beacon enabled networks. In non-beacon-enabled networks, an unslotted CSMA/CA channel access mechanism is used. In this type of network, ZigBee Routers typically have their receivers continuously active, requiring a more robust power supply. However, this allows for heterogeneous networks in which some devices receive continuously, while others only transmit when an external stimulus is detected.

In beacon-enabled networks, the special network nodes called ZigBee Routers transmit periodic beacons to confirm their presence to other network nodes. Nodes may sleep between the beacons, thus lowering their duty cycle and extending their battery life. Beacon intervals depend on the data rate; they may range from 15.36 milliseconds to 251.65824 seconds at 250 Kbit/s, from 24 milliseconds to 393.216 seconds at 40 Kbit/s, and from 48 milliseconds to 786.432 seconds at 20 Kbit/s. In general, the ZigBee protocols minimize the time the radio is on to reduce power consumption. In beaconing networks, nodes only need to be active while a beacon is being transmitted. In non-beacon-enabled networks, power consumption is decidedly asymmetrical: some devices are always active, while others spend most of their time sleeping.

Except for the Smart Energy Profile 2.0, current ZigBee devices conform to the IEEE 802.15.4-2003 Low-Rate Wireless Personal Area Network (LR-WPAN) standard. The standard specifies the lower protocol layers—the PHYsical layer (PHY), and the Media Access Control (MAC) portion of the Data Link Layer (DLL). The basic channel access mode is "Carrier Sense, Multiple Access/Collision Avoidance" (CSMA/CA), that is, the nodes talk in the same way that people converse; they briefly check to see that no one is talking before they start. There are three notable exceptions to the use of CSMA. Beacons are sent on a fixed time schedule, and do not use CSMA. Message acknowledgments also do not use CSMA. Finally, devices in Beacon Oriented networks that have low latency real-time requirements, may also use Guaranteed Time Slots (GTS), which by definition do not use CSMA.

Z-Wave. Z-Wave is a wireless communications protocol by the Z-Wave Alliance (http://www.z-wave.com) designed for home automation, specifically for remote control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed specifically for remote control applications. Z-Wave operates in the sub-gigahertz frequency range, around 900 MHz. This band competes with some cordless telephones and other consumer electronics devices, but avoids interference with WiFi and other systems that operate on the crowded 2.4 GHz band. Z-Wave is designed to be easily embedded in consumer electronics products, including battery-operated devices such as remote controls, smoke alarms and security sensors.

Z-Wave is a mesh networking technology where each node or device on the network is capable of sending and receiving control commands through walls or floors, and use intermediate nodes to route around household obstacles or radio dead spots that might occur in the home. Z-Wave devices can work individually or in groups, and can be programmed into scenes or events that trigger multiple devices, either automatically or via remote control. The Z-wave radio specifications include bandwidth of 9,600 bit/s or 40 Kbit/s, fully interoperable, GFSK modulation, and a range of approximately 100 feet (or 30 meters) assuming "open air" conditions, with reduced range indoors depending on building materials, etc. The Z-Wave radio uses the 900 MHz ISM band: 908.42 MHz (United States); 868.42 MHz (Europe); 919.82 MHz (Hong Kong); and 921.42 MHz (Australia/New Zealand).

Z-Wave uses a source-routed mesh network topology and has one or more master controllers that control routing and security. The devices can communicate to another by using intermediate nodes to actively route around, and circumvent household obstacles or radio dead spots that might occur. A message from node A to node C can be successfully delivered even if the two nodes are not within range, providing that a third node B can communicate with nodes A and C. If the preferred route is unavailable, the message originator will attempt other routes until a path is found to the "C" node. Therefore, a Z-Wave network can span much farther than the radio range of a single unit; however, with several of these hops, a delay may be introduced between the control command and the desired result. In order for Z-Wave units to be able to route unsolicited messages, they cannot be in sleep mode. Therefore, most battery-operated devices are not designed as repeater units. A Z-Wave network can consist of up to 232 devices with the option of bridging networks if more devices are required.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1xRTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP)

is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server, that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

BAN. A wireless network may be a Body Area Network (BAN) according to, or based on, IEEE 802.15.6 standard, and communicating devices may comprise a BAN interface that may include a BAN port and a BAN transceiver. The BAN may be a Wireless BAN (WBAN), and the BAN port may be an antenna and the BAN transceiver may be a WBAN modem.

Bluetooth. A Personal Area Network (PAN) may be according to, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

WMN. A Wireless Mesh Network (WMN) and Wireless Distribution Systems (WDS) are known in the art to be a communication network made up of clients, mesh routers and gateways organized in a mesh topology and connected using radio. Such wireless networks may be based on DSR as the routing protocol. WMNs are standardized in IEEE 802.11s and described in a slide-show by W. Steven Conner, Intel Corp. et al. entitled: "*IEEE 802.11s Tutorial*" presented at the IEEE 802 Plenary, Dallas on Nov. 13, 2006, in a slide-show by Eugen Borcoci of University Politehnica Bucharest, entitled: "*Wireless Mesh Networks Technologies: Architectures, Protocols, Resource Management and Applications*", presented in INFOWARE Conference on Aug. 22-29, 2009 in Cannes, France, and in an IEEE Communication magazine paper by Joseph D. Camp and Edward W. Knightly of Electrical and Computer Engineering, Rice University, Houston, Tex., USA, entitled: "*The IEEE 802.11s Extended Service Set Mesh Networking Standard*", which are incorporated in their entirety for all purposes as if fully set forth herein. The arrangement described herein can be equally applied to such wireless networks, wherein two clients exchange information using different paths by using mesh routers as intermediate and relay servers. Commonly in wireless networks, the routing is based on MAC addresses. Hence, the above discussion relating to IP addresses applies in such networks to using the MAC addresses for identifying the client originating the message, the mesh routers (or gateways) serving as the relay servers, and the client serving as the ultimate destination computer.

WiGig™. Any wireless communication herein may be partly or in full in accordance with, or based on, the WiGig™ technology developed by the Wireless Gigabit Alliance (wirelessgigabitalliance.org—preceded by http://), and standardized as IEEE 802.11ad, allowing multi-gigabit data rate and using the unlicensed 60 GHz frequency band. The WiGig tri-band enabled in-room devices, which operate in the 2.4, 5 and 60 GHz bands, supports data transmission rates up to 7 Gbit/s, and is based on, supplements and extends the 802.11 Media Access Control (MAC) layer and is thus backward compatible with the IEEE 802.11 standard. The specifications further supports protocol adaptation layers are being developed to support specific system interfaces including data buses for PC peripherals and display interfaces for HDTVs, monitors and projectors, and is based on phase array antenna beamforming, enabling robust communication at distances beyond 10 meters, while the beams can move within the coverage area through modification of the transmission phase of individual antenna elements. The WiGig technology is further described in the white paper entitled: "*WiGig White Paper Defining the Future of Multi-Gigabit Wireless Communications*", published by WiGig Alliance, July 2010, which is incorporated in its entirety for all purposes as if fully set forth herein.

WirelessHD™. Alternatively or in addition, an in-room wireless communication may be in accordance with, or based on, the WirelessHD™ technology developed by the WirelessHD™ Consortium (www.wirelesshd.org—preceded by http://)) and standardized as IEEE 802.15.3c-2009, which is based on a 7 GHz channel in the 60 GHz Extremely High Frequency radio band. It allows for either compressed (H.264) or uncompressed digital transmission of high-definition video and audio and data signals. The 1.1 version of the specification increases the maximum data rate to 28 Gbit/s, supports common 3D formats, 4K resolution, WPAN data, low-power mode for portable devices, and HDCP 2.0 content protection. The 60 GHz band usually requires line of sight between transmitter and receiver, and the WirelessHD specification ameliorates this limitation through the use of beam forming at the receiver and transmitter antennas to increase the signal's effective radiated power. The range obtained may be in-room, point-to-point, non line-of-sight (NLOS) at up to 10 meters. Further, The WirelessHD specification has provisions for content encryption via Digital Transmission Content Protection (DTCP) as well as provisions for network management. The WirelessHD™ technology is further described in the overview entitled: "WirelessHD Specifications Version 1.1 Overview", published by the WirelessHD consortium, May 2010, which is incorporated in its entirety for all purposes as if fully set forth herein.

WHDI. Any wireless communication herein may be in accordance with, or based on, the Wireless Home Digital Interface (WHDI™) technology developed by the WHDI™ Special Interest Group (http://www.whdi.org), and provides a high-quality, uncompressed wireless link which can support delivery of equivalent video data rates of up to 3 Gbps (including uncompressed 1080p) in a 40 MHz channel in the 5 GHz unlicensed band, conforming to FCC regulations. Equivalent video data rates of up to 1.5 Gbps (including uncompressed 1080i and 720p) can be delivered on a single 20 MHz channel in the 5 GHz unlicensed band, conforming to worldwide 5 GHz spectrum regulations. The range is beyond 100 feet, through walls, and latency is less than one millisecond. The WHDI™ technology is further described in the technical overview entitled: "Enabling Wireless uncompressed HDTV Connectivity with a Unique Video-Modem Approach" by Meir Feder, published by the AMIMON Ltd., which is incorporated in its entirety for all purposes as if fully set forth herein.

A wireless communication may use white spaces, which relates to the frequencies and frequency bands allocated between used or licensed radio frequency bands (or channels) to avoid interference or to serve as guard band. Further, white space refers to frequency bands between about 50 MHz and 700 MHz traditionally used for analog television broadcast, and were freed in the switchover to digital television. In the United States, full power analog television broadcasts, which operated between the 54 MHz and 806 MHz (54-72, 76-88, 174-216, 470-608, and 614-806) television frequencies (Channels 2-69), ceased operating on Jun. 12, 2009 per a United States digital switchover mandate. At that time, full power TV stations were required to switch to digital transmission, and operate only between 54 MHz and 698 MHz. The abandoned television frequencies are primarily covering TV channels 52 to 69 (698 to 806 MHz), as well as unused television frequencies between 54 MHz and 698 MHz (TV Channels 2-51). In the rest of the world, the abandoned television channels are VHF, and the resulting large VHF white spaces are being re-allocated for the worldwide (except the U.S.) digital radio standard DAB and DAB+, and DMB. A device intended to use these available channels is commonly referred to as a "White-Spaces Device" (WSD), and are typically designed to detect the presence of existing but unused areas of the airwaves, such as those reserved for analog television, and utilize these unused airwaves to transmit signals for communication application such as for Internet connectivity. The communication over white spaces may be partly or in full in accordance with, or based on, IEEE 802.11af or IEEE 802.22 standards (sometimes referred to as Super Wi-Fi standards).

The wireless communication over white spaces may be partly or in full in accordance with, or based on, Wireless Regional Area Network (WRAN) standard IEEE 802.22— "Standard for Wireless Regional Area Networks (WRAN)— Specific requirements—Part 22: Cognitive Wireless RAN Medium Access Control (MAC) and Physical Layer (PHY) Specifications: Policies and procedures for operation in the TV Bands", described in the article "IEEE 802.22: An Introduction to the First Wireless Standard based on Cognitive Radios", by Carlos Cordeiro, Kiran Challapali, Dagnachew Birru, and Sai Shankar, published in the Journal of Communication, Vol. 1, No. 1, April 2006, and in the presentation "IEEE 802.22 Wireless Regional Area Networks—Enabling Rural Broadband Wireless Access Using Cognitive Radio Technology", by Apruva N. Mody and Gerald Chouinard, Doc. # IEEE 802.22—10/0073r03 June 2010, which are both incorporated in their entirety for all purposes as if fully set forth herein.

Such communication may use Cognitive Radio (CR) techniques to allow sharing of geographically unused spectrum formerly allocated to the Television Broadcast Service, on a non-interfering basis. Cognitive-based dynamic spectrum access is described, for example, in the document entitled: "Dynamic Spectrum Access In IEEE 802.22— Based Cognitive Wireless Networks: A Game Theoretic Model for Competitive Spectrum Bidding and Pricing" by Dusit Niyato and Ekram Hossain, published IEEE Wireless Communication April 2009, which is incorporated in its entirety for all purposes as if fully set forth herein.

The communication may operate in a point to multipoint basis (P2MP), and the network may be formed by Base Stations (BS) and Customer-Premises Equipment (CPE), where the CPEs are communicating with a BS via a wireless link, while the BSs control the medium access for all the CPEs attached to it. The WRAN Base Stations may be capable of performing a distributed sensing, where the CPEs are sensing the spectrum, and are sending periodic reports to the BS informing it about what they sense, such that the BS, with the information gathered, may evaluate whether a change is necessary in the channel or channels used, or on the contrary, if it should stay transmitting and receiving in the same one. The PHY layer may use OFDMA as the modulation scheme and may use one TV channel (a TV channel typically has a bandwidth of 6 MHz; in some countries 7 or 8 MHz is used), and may use more than one channel using a Channel Bonding scheme.

NFC. Any wireless communication herein may be partly or in full in accordance with, or based on, short-range communication such as Near Field Communication (NFC), having a theoretical working distance of 20 centimeters and a practical working distance of about 4 centimeters, and commonly used with mobile devices, such as smartphones. The NFC typically operates at 13.56 MHz as defined in ISO/IEC 18000-3 air interface, and at data rates ranging from 106 Kbit/s to 424 Kbit/s. NFC commonly involves an initiator and a target; the initiator actively generates an RF field that may power a passive target. NFC peer-to-peer communication is possible, provided both devices are powered.

The NFC typically supports passive and active modes of operation. In passive communication mode, the initiator device provides a carrier field and the target device answers by modulating the existing field, and the target device may draw its operating power from the initiator-provided electromagnetic field, thus making the target device a transponder. In active communication mode, both devices typically have power supplies, and both initiator and target devices communicate by alternately generating their own fields, where a device deactivates its RF field while it is waiting for data. NFC typically uses Amplitude-Shift Keying (ASK), and employs two different schemes to transfer data. At the data transfer rate of 106 Kbit/s, a modified Miller coding with 100% modulation is used, while in all other cases Manchester coding is used with a modulation ratio of 10%.

The NFC communication may be partly or in full in accordance with, or based on, NFC standards ISO/IEC 18092 or ECMA-340 entitled: "Near Field Communication Interface and Protocol-1 (NFCIP-1)", and ISO/IEC 21481 or ECMA-352 standards entitled: "*Near Field Communication Interface and Protocol-2 (NFCIP-2)*". The NFC technology is described in ECMA International white paper Ecma/TC32-TG19/2005/012 entitled: "*Near Field Communication—White paper*", in Rohde&Schwarz White Paper 1MA182_4e entitled: "*Near Field Communication (NFC) Technology and Measurements White Paper*", and in Jan Kremer Consulting Services (JKCS) white paper entitled: "*NFC—Near Field Communication—White paper*", which are all incorporated in their entirety for all purposes as if fully set forth herein.

Cellular. Cellular telephone network may be according to, or may be based on, a Third Generation (3G) network that uses UMTS W-CDMA, UMTS HSPA, UMTS TDD, CDMA2000 1xRTT, CDMA2000 EV-DO, GSM EDGE-Evolution, the cellular telephone network may be a Fourth Generation (4G) network that uses HSPA+, Mobile WiMAX, LTE, LTE-Advanced, MBWA, or may be based on IEEE 802.20-2008.

Electronic circuits and components are described in a book by Wikipedia entitled: "Electronics" downloaded from en.wikibooks.org dated Mar. 15, 2015, which is incorporated in its entirety for all purposes as if fully set forth herein.

In an 'off' state of the circuit 10 shown in FIG. 1, where the AC power switch 13 is in 'open' state, no current is flowing in the circuit, and in particular, no AC power is flowing from the AC power source 11 to the load 12. In some cases, it may be beneficial to use low power circuits in the system, such as for remotely controlling the load 12, or for other uses of the pre-existing wiring environment shown in the arrangement 10. Since in the 'off' state no current is flowing through, no power is available at both the switch 13 location and the load 12 location.

Galvanic Isolation. Galvanic isolation is a principle of isolating functional sections of electrical systems to prevent current flow; no direct conduction path is permitted. Energy or information can still be exchanged between the sections by other means, such as capacitance, induction, or electromagnetic waves, or by optical, acoustic, or mechanical means. Galvanic isolation is used where two or more electrical circuits must communicate, but their grounds may be at different potentials. It is an effective method of breaking ground loops by preventing unwanted current from flowing between two units sharing a ground conductor. Galvanic isolation is also used for safety, preventing accidental current from reaching ground through a person's body.

Transformers couple by magnetic flux, where the primary and secondary windings of a transformer are not connected to each other (an autotransformer has a conductive connection between its windings and so does not provide isolation). The voltage difference that may safely be applied between windings without the risk of breakdown (the isolation voltage) is specified in kilovolts by an industry standard. While transformers are usually used to change voltages, isolation transformers with a 1:1 ratio are used in safety applications. Opto-isolators transmit information by light waves, where the sender (light source) and receiver (photosensitive device) are not electrically connected; typically, they are held in place within a matrix of opaque, insulating plastic. Isolation of digital signals is described in a Developer's Guide SLLA284A Revised November 2014 by Texas Instruments Incorporated entitled "*Digital Isolator Design Guide*", data-bus transformer-based isolators are described in a data sheet KMP_1600C_B05 published 2011 by Murata Power Solutions, Inc., entitled: "1600C & 1630C—*Quad Data-Bus Isolators*", and SPI isolator is described in a data sheet LT 0514 Rev. C by Linear Technology Corporation (downloaded July/2015) entitled: "*LTM2883—SPI/Digital or I²C μModule Isolator with Adjustable±12.5V and 5V Regulated Power*", which are all incorporated in their entirety for all purposes as if fully set forth herein.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touchscreens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

An example of a contemporary smartphone is model iPhone 6 available from Apple Inc., headquartered in Cupertino, Calif., U.S.A. and described in iPhone 6 technical specification (retrieved October/2015 from www.apple.com/iphone-6/specs/), and in a User Guide dated 2015 (019-00155/2015-06) by Apple Inc. entitled: "*iPhone User Guide For iOS 8.4 Software*", which are both incorporated in their entirety for all purposes as if fully set forth herein. Another example of a smartphone is Samsung Galaxy S6 available from Samsung Electronics headquartered in Suwon, South-Korea, described in the user manual numbered English (EU), March/2015 (Rev. 1.0) entitled: "*SM-G925F SM-G925FQ SM-G925I User Manual*" and having features and specification described in "*Galaxy S6 Edge—Technical Specification*" (retrieved October/2015 from www.samsung.com/us/explore/galaxy-s-6-features-and-specs), which are both incorporated in their entirety for all purposes as if fully set forth herein.

Wireless Repeater. A wireless repeater (also known as wireless range extender) receives an existing signal from a wireless router or wireless access point and rebroadcasts it to create a second network. When two or more hosts need to be connected over the IEEE 802.11 protocol, and the distance is too long for a direct connection to be established, a wireless repeater may be used to bridge the gap, so that wireless devices outside of the primary network will be able to connect through the new "repeated" network. However, from the point of view of the original router or access-point, only the repeater MAC is connected, making it necessary to enable safety features on the wireless repeater. Wireless repeaters are used to improve signal range and strength within homes and small offices, in an area with no wireless hotspots, or in an area with much interference.

Interference can be caused by many environmental factors such as microwaves (such as from a microwave oven), metal or metallic coated appliances, or an impeded line of sight. There are wireless range extending devices that conform to all 802.11 protocols. Most 802.11 compliant devices are backwards compatible. However, 802.11ac runs at 5 GHz and requires an access point capable of 5 GHz operation. 802.11ac is the most recent and third-generation Wi-Fi standard for wireless home networking. 802.11ac equipment is backward compatible with 802.11n, 802.11g or 802.11b equipment. Examples of AC-powered WiFi repeaters include the WiFi Range Extender WN3000RP available from Netgear, Inc. Headquartered in San Jose, Calif., U.S.A. and described in a Netgear, Inc. guide (code 201-13061-05) dated April 2012 entitled: "*Universal WiFi Range Extender WN3000RP Installation Guide*", which is incorporated in its entirety for all purposes as if fully set forth herein, and WR100 300 Mbps Wireless-N repeater available from SmartRG Inc. Headquartered in Vancouver, Wash., U.S.A., and described in a SmartRG Inc. user manual release 1.0 dated Nov. 29, 2012 entitled: "*WR100 300 Mbps Wireless-N Repeater User Manual*", which is incorporated in its entirety for all purposes as if fully set forth herein.

Instant Messaging. Instant Messaging (IM) is a type of online chat, which offers real-time text transmission over the Internet. Short messages are typically transmitted bi-directionally between two parties, when each user chooses to complete a thought and select "send". Some IM applications can use push technology to provide real-time text, which transmits messages character by character, as they are composed. More advanced instant messaging can add file transfer, clickable hyperlinks, Voice over IP, or video chat. Instant messaging systems typically facilitates connections between specified known users (often using a contact list also known as a "buddy list" or "friend list"). Depending on the IM protocol, the technical architecture can be peer-to-peer (direct point-to-point transmission) or client-server (a central server retransmits messages from the sender to the communication device).

Instant messaging is a set of communication technologies used for text-based communication between two or more participants over the Internet or other types of networks. IM-chat happens in real-time. Of importance is that online chat and instant messaging differ from other technologies such as email due to the perceived quasi-synchrony of the communications by the users. Some systems permit messages to be sent to users not then 'logged on' (offline messages), thus removing some differences between IM and email (often done by sending the message to the associated email account). Various IP technologies are described in a thesis by Tim van Lokven (Jan. 23, 2011) entitled: "*Review and Comparison of Instant Messaging Protocols*", which is incorporated in its entirety for all purposes as if fully set forth herein.

Text Messaging. Text messaging, or texting, is the act of composing and sending brief, electronic messages between two or more mobile phones, or fixed or portable devices over a phone network. The term commonly refers to messages sent using the Short Message Service (SMS), but may include messages containing image, video, and sound content (known as MMS messages). The sender of a text message is known as a texter, while the service itself has different colloquialisms depending on the region. Text messages can be used to interact with automated systems, for example, to order products or services, or to participate in contests. Advertisers and service providers use direct text marketing to message mobile phone users about promotions, payment due dates, et cetera instead of using mail, e-mail or voicemail. In a straight and concise definition for the purposes of this English language article, text messaging by phones or mobile phones should include all 26 letters of the alphabet and 10 numerals, i.e., alpha-numeric messages, or text, to be sent by texter or received by the textee. SMS messaging gateway providers can provide gateway-to-mobile (Mobile Terminated—MT) services. Some suppliers can also supply mobile-to-gateway (text-in or Mobile Originated/MO services).

SMS. Short Message Service (SMS) is a text messaging service component of phone, Web, or mobile communication systems. It uses standardized communications protocols to allow fixed line or mobile phone devices to exchange short text messages. SMS as used on modern handsets as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies, such as ANSI CDMA networks and Digital AMPS, as well as satellite and landline networks. The Short Message Service—Point to Point (SMS-PP) is standardized by the 3GPP as TS 23.040 and 3GPP TS 23.041, which define the Short Message Service-Cell Broadcast (SMS-CB), which allows messages (advertising, public information, etc.) to be broadcast to all mobile users in a specified geographical area.

Messages are sent to a Short Message Service Center (SMSC), which provides a "store and forward" mechanism. It attempts to send messages to the SMSC recipients, and if a recipient is not reachable, the SMSC queues the message for later retry. Some SMSCs also provide a "forward and forget" option where transmission is tried only once. Both Mobile Terminated (MT, for messages sent to a mobile handset) and Mobile Originating (MO, for those sent from the mobile handset) operations are supported, and the message delivery is "best effort" scheme, so there are no guarantees that a message will actually be delivered to its recipient, but delay or complete loss of a message is uncommon. SMS is a stateless communication protocol in which every SMS message is considered entirely independent of other messages. Enterprise applications using SMS as a communication channel for stateful dialogue (where an MO reply message is paired to a specific MT message) requires that session management be maintained external to the protocol through proprietary methods as Dynamic Dialogue Matrix (DDM).

The Short Message Service is realized by the use of the Mobile Application Part (MAP) of the SS#7 protocol, with Short Message protocol elements being transported across the network as fields within the MAP messages. These MAP messages may be transported using 'traditional' TDM based signaling, or over IP using SIGTRAN and an appropriate adaptation layer. The Short Message protocol itself is defined by 3GPP TS 23.040 for the Short Message Service-Point to Point (SMS-PP), and 3GPP TS 23.041 for the Cell Broadcast Service (CBS). SMS is further described in a 3GPP Technical Specification 3GPP TS 22.011 (v143.0.0, 2015-09) entitled: "*3rd Generation Partnership Project; Technical Specification Group Services and System Aspects; Service accessibility (Release 14)*", which is incorporated in its entirety for all purposes as if fully set forth herein.

MMS. Multimedia Messaging Service (MMS) is an Open Mobile Alliance (OMA) standard way to send messages that include multimedia content to and from mobile phones over a cellular network. It extends the core SMS (Short Message Service) capability that allowed exchange of text messages only up to 160 characters in length. The most popular use is to send photographs from camera-equipped handsets, and is also used on a commercial basis by media companies as a method of delivering news and entertainment content and by retail brands as a tool for delivering scannable coupon codes, product images, videos and other information. Unlike text only SMS, commercial MMS can deliver a variety of media including up to forty seconds of video, one image, multiple images via slideshow, or audio plus unlimited characters.

MMS messages are delivered differently from SMS. The first step is for the sending device to encode the multimedia content in a fashion similar to sending a MIME e-mail (MIME content formats are defined in the MMS Message Encapsulation specification). The message is then forwarded to the carrier MMS store and forward server, known as the MMSC (Multimedia Messaging Service Centre). If the receiver is on another carrier, then the MMSC acts as a relay, and forwards the message to the MMSC of the recipient's carrier using the Internet.

Once the recipient MMSC has received a message, it first determines whether the receiver's handset is "MMS capable", that it supports the standards for receiving MMS. If so, the content is extracted and sent to a temporary storage server with an HTTP front-end. An SMS "control message" (ping) containing the URL of the content is then sent to the recipient's handset to trigger the receiver's WAP browser to open and receive the content from the embedded URL. Several other messages are exchanged to indicate status of the delivery attempt. Before delivering content, some MMSCs also include a conversion service known as "content adaptation" that will attempt to modify the multimedia content into a format suitable for the receiver. E-mail and web-based gateways to the MMS (and SMS) system are common. On the reception side, the content servers can typically receive service requests from both WAPs and normal HTTP browsers, so delivery via the web is simple. For sending from external sources to handsets, most carriers allow MIME encoded message to be sent to the receiver's phone number with a special domain. MMS is described in a 3GPP technical specification 3GPP TS 23.140 V6.16.0 (2009-03) entitled: "3*rd Generation Partnership Project; Technical Specification Group Core Network and Terminals; Multimedia Messaging Service (MMS); Functional description; Stage 2 (Release 6)*", which is incorporated in its entirety for all purposes as if fully set forth herein.

Facebook. Facebook Messenger is an instant messaging service and software application which provides text and voice communication. Integrated with Facebook web-based Chat feature and built on the open MQTT protocol, Messenger lets Facebook users chat with friends both on mobile and on the main website. Facebook is described in a guide by American Majority organization (retrieved October/2015 from http://cmrw.org/) entitled: "*facebook—A Beginner's Guide*", which is incorporated in its entirety for all purposes as if fully set forth herein.

Twitter. Twitter is an online social networking service by Twitter Inc. (headquartered in San Francisco) that enables users to send and read short 140-character messages called "tweets". Registered users can read and post tweets, but unregistered users can only read them. Users access Twitter through the website interface, SMS, or mobile device applications. Tweets are publicly visible by default, but senders can restrict message delivery to just their followers. Users can tweet via the Twitter website, compatible external applications (such as for smartphones), or by Short Message Service (SMS) available in certain countries. Retweeting is when users forward a tweet via Twitter. Both tweets and retweets can be tracked to see which ones are most popular. Users may subscribe to other users tweets—this is known as "following" and subscribers are known as "followers" or "tweeps", a portmanteau of Twitter and peeps. Users can check the people who are unsubscribing them on Twitter ("unfollowing") via various services. In addition, users can block those who have followed them.

As a social network, Twitter revolves around the principle of followers. When you choose to follow another Twitter user, that user's tweets appear in reverse chronological order on your main Twitter page. Individual tweets are registered under unique IDs using software called snowflake, and geolocation data is added using 'Rockdove'. The URL t.co then checks for a spam link and shortens the URL. Next, the tweets are stored in a MySQL database using Gizzard, and the user receives acknowledgement that the tweets were sent. Tweets are then sent to search engines via the Firehose API. The process itself is managed by FlockDB and takes an average of 350 ms, and the service's Application Programming Interface (API) allows other web services and applications to integrate with Twitter. Twitter is described in a guide (retrieved October/2015 from https://g.twimg.com/business/pdfs/Twitter_Smallbiz_Guide.pdf) by Twitter, Inc., entitled: "*Twitter for Small Business—A GUIDE TO GET STARTED*", which is incorporated in its entirety for all purposes as if fully set forth herein.

WhatsApp. WhatsApp is an instant messaging app developed by WhatsApp Inc. (headquartered in Mountain View, Calif.) for smartphones that operates under a subscription business model. The proprietary, cross-platform app uses the Internet to send text messages, images, video, user location and audio media messages. WhatsApp uses a customized version of the open standard Extensible Messaging and Presence Protocol (XMPP). Upon installation, it creates a user account using one's phone number as the username (Jabber ID: [phone number]@s.whatsapp.net) WhatsApp software automatically compares all the phone numbers from the device's address book with its central database of WhatsApp users to automatically add contacts to the user's WhatsApp contact list.

Multimedia messages are sent by uploading the image, audio or video to be sent to an HTTP server and then sending a link to the content along with its Base64 encoded thumbnail (if applicable). WhatsApp follows a 'store and forward' mechanism for exchanging messages between two users. When a user sends a message, it first travels to the WhatsApp server where it is stored. Then the server repeatedly requests the receiver acknowledge receipt of the message. As soon as the message is acknowledged, the server drops the message; it is no longer available in database of server. The WhatsApp service is described in an article published (Aug. 30, 2013) on MOBILE HCI 2013—COLLABORATION AND COMMUNICATION by Karen Church and Rodrigo de Oliveira (both of Telefonica Research) entitled: "*What's up with WhatsApp? Comparing Mobile Instant— Messaging Behaviors with Traditional SMS*", which is incorporated in its entirety for all purposes as if fully set forth herein.

Viber. Viber is an instant messaging and Voice over IP (VoIP) app for smartphones developed by Viber Media, where in addition to instant messaging, users can exchange images, video and audio media messages. Viber works on both 3G/4G and Wi-Fi networks. Viber includes text, picture and video messaging across all platforms, with voice calling available only to iPhone, Android and Microsoft's Windows Phone. The application user interface includes tab bar on the bottom, giving access to messages, recent calls, contact, the keypad and a button for accessing more options. Upon installation, it creates a user account using one's phone number as username. Viber synchronizes with the phone's address book, so users do not need to add contacts in a separate book. Since all users are registered with their phone number, the software returns all Viber users among the user contacts.

Mail Server. Mail server (a.k.a. Email server, Electronic Mail server, Mail Exchanger—MX) refer to a server operating as an electronic post office for email exchanging across networks, commonly performing the server-side of an MTA function. A Message Transfer Agent (or Mail Transfer Agent—MTA), or mail relay is a software that transfers electronic mail messages from one computer to another using a client-server application architecture. An MTA typically implements both the client (sending) and server (receiving) portions of the Simple Mail Transfer Protocol (SMTP). The Internet mail architecture is described in IETF RFC 5598 entitled: "*Internet Mail Architecture*", and the SMTP protocol is described in IETF RFC 5321 entitled: "*Simple Mail Transfer Protocol*" and in IETF RFC 7504 entitled: "*SMTP 521 and 556 Reply Codes*", which are all incorporated in their entirety for all purposes as if fully set forth herein.

The Domain Name System (DNS) typically associates a mail server to a domain with mail exchanger (MX) resource records, containing the domain name of a host providing MTA services. A message transfer agent receives mail from either another MTA, a Mail Submission Agent (MSA), or a Mail User Agent (MUA). The transmission details are specified by the Simple Mail Transfer Protocol (SMTP). When a recipient mailbox of a message is not hosted locally, the message is relayed, that is, forwarded to another MTA. Every time an MTA receives an email message, it adds a 'Received' trace header field to the top of the header of the message, thereby building a sequential record of MTAs handling the message. The process of choosing a target MTA for the next hop is also described in SMTP, but can usually be overridden by configuring the MTA software with specific routes. Internet mail schemes are described in IEEE Annals of the History of Computing paper published 2008 by the IEEE Computer Society [1058-6180/08], authored by Craig Partridge of BBN Technologies entitled: "*The technical Development of Internet Mail*", which is incorporated in its entirety for all purposes as if fully set forth herein.

A mail server infrastructure consists of several components that work together to send, relay, receive, store, and deliver email, and typically uses various Internet standard protocols for sending and retrieving email, such as the Internet standard protocol Simple Mail Transfer Protocol (SMTP) for sending email, the Internet standard protocols for retrieving email Post Office Protocol (POP), and Internet Message Access Protocol version 4 (IMAPv4). An example of a mail server software is 'Microsoft Exchange Server 2013' (available from Microsoft Corporation, headquartered in Redmond, Wash., U.S.A.), described in 'Pocket Consultant' book [ISBN: 978-0-7356-8168-2] published 2013 by Microsoft Press and entitled: "*Microsoft Exchange Server 2013—Configuration & Clients*", which is incorporated in its entirety for all purposes as if fully set forth herein.

The POP is specified in IETF RFC 1939 entitled: "*Post Office Protocol*", and updated specification with an extension mechanism is described in IETF RFC 2449 entitled: "*POP3 Extension Mechanism*", and an authentication mechanism is described in IETF RFC 1734 entitled: "*POP3 AUTHentication command*", which are all incorporated in their entirety for all purposes as if fully set forth herein. IMAP4 clients can create, rename, and/or delete mailboxes (usually presented to the user as folders) on the mail server, and copy messages between mailboxes, and this multiple mailbox support also allows servers to access shared and public folders. IMAP4 is described in IETF RFC 3501 entitled: "*INTERNET MESSAGE ACCESS PROTOCOL—VERSION 4rev1*", and the IMAP4 Access Control List (ACL) Extension may be used to regulate access rights, and is described in IETF RFC 4314 entitled: "*IMAP4 Access Control List (ACL) Extension*", which are both incorporated in their entirety for all purposes as if fully set forth herein.

Mail servers may be operated, or used by mailbox providers, and mail servers are described in U.S. Pat. No. 5,832,218 to Gibbs et al. entitled: "Client/server Electronic Mail System for Providing Off-Line Client Utilization and Seamless Server Resynchronization", in U.S. Pat. No. 6,081,832 to Gilchrist et al. entitled: "Object Oriented Mail Server Framework Mechanism", in U.S. Pat. No. 7,136,901 to Chung et al. entitled: "Electronic Mail Server", and in U.S. Pat. No. 7,818,383 to Kodama entitled: "E-Mail Server", which are all incorporated in their entirety for all purposes as if fully set forth herein.

XMPP. Extensible Messaging and Presence Protocol (XMPP) is an open standard communications protocol for message-oriented middleware based on XML (Extensible Markup Language) that enables the near-real-time exchange of structured yet extensible data between any two or more network entities. Designed to be extensible, the protocol has also been used for publish-subscribe systems, signaling for VoIP, video, file transfer, gaming, Internet of Things (IoT) applications such as the smart grid, and social networking services. The XMPP network uses a client-server architecture where clients do not talk directly to one another. The model is decentralized and anyone can run a server. By design, there is no central authoritative. Every user on the network has a unique XMPP address, called JID (for historical reasons, XMPP addresses are often called Jabber IDs). The JID is structured like an email address with a username and a domain name (or IP address) for the server where that user resides, separated by an at sign (@), such as username@example.com. Since a user may wish to log in from multiple locations, they may specify a resource. A resource identifies a particular client belonging to the user (for example home, work, or mobile). This may be included in the JID by appending a slash followed by the name of the resource. For example, the full JID of a user's mobile account could be username@example.com/mobile. Each resource may have specified a numerical value called priority. Messages simply sent to username@example.com will go to the client with highest priority, but those sent to username@example.com/mobile will go only to the mobile client. The highest priority is the one with largest numerical value. JIDs without a username part are also valid, and may be used for system messages and control of special features on the server. A resource remains optional for these JIDs as well. XMPP is described in IETF RFC 6120 entitled: "*Extensible Messaging and Presence Protocol (XMPP): Core*", which describes client-server messaging using two open-ended XML streams, in IETF RFC 6121 entitled: "*Extensible Messaging and Presence Protocol (XMPP): Instant Messaging and Presence*", which describes instant messaging (IM), the most common application of XMPP, and in IETF RFC 6122 entitled: "*Extensible Messaging and Presence Protocol (XMPP): Address Format*", which describes the rules for XMPP addresses, also called JabberIDs or JIDs.

SIMPLE. The Session Initiation Protocol (SIP) for Instant Messaging and Presence Leveraging Extensions (SIMPLE) is an open standard Instant Messaging (IM) and presence protocol suite based on Session Initiation Protocol (SIP) managed by the Internet Engineering Task Force. The SIMPLE presence use the core protocol machinery that provides the actual SIP extensions for subscriptions, notifications, and publications. IETF RFC 6665 defines the SUBSCRIBE and NOTIFY methods, where SUBSCRIBE allows to subscribe to an event on a server, and the server responds with NOTIFY whenever the event come up. IETF RFC 3856 defines how to make use of SUBSCRIBE/NOTIFY for presence. Two models are defined: an end-to-end model in which each User Agent handles presence subscriptions itself, and a centralized model. The message PUBLISH (IETF RFC 3903) allows User Agents to inform the presence server about their subscription states.

SIP defines two modes of instant messaging: The Page Mode makes use of the SIP method MESSAGE, as defined in IETF RFC 3428. This mode establishes no sessions, and the Session Mode. The Message Session Relay Protocol (RFC 4975, RFC 4976) is a text-based protocol for exchanging arbitrarily-sized content between users, at any time. An MSRP session is set up by exchanging certain information, such as an MSRP URI, within SIP and SDP signaling. SIMPLE is described in IETF RFC 6914 entitled: "*SIMPLE Made Simple: An Overview of the IETF Specifications for Instant Messaging and Presence Using the Session Initiation Protocol (SIP)*", which is incorporated in its entirety for all purposes as if fully set forth herein.

A method and apparatus for switching AC appliances and lights of residences and other automation systems through SPDT or DPDT relays connected in electrical circuit with SPDT or DPDT switch including a current sensor and/or a status sensor is described in U.S. Pat. No. 8,269,376 to Elberbaum entitled: "Method and Apparatus for Switching On-Off a Group or all Lights or Appliances of Premises", which is incorporated in its entirety for all purposes as if fully set forth herein, The operating key of the relay and the key lever of the electric switch can each be used for operating a dedicated appliance or light, a group of appliance and lights and all appliance and/or lights including scenarios setup via the many well-known two way, three way or four way light switches, by operating the switch lever or key in multi steps. The SPDT or DPDT relays are operated via RF, IR, and fiber optic communicating two way signal for operating the lights and reporting statuses.

A method for adding and connecting a remotely operated SPDT relay to an electric power circuit of an AC appliance, connected to a manually actuated electrical SPDT switch for integrating said AC appliance into an home automation network is described in U.S. Pat. No. 7,649,727 to Elberbaum entitled: "Method and Apparatus for Remotely Operating AC Powered Appliances from Video Interphones or Shopping Terminals", which is incorporated in its entirety for all purposes as if fully set forth herein, Each said relay and said SPDT switch includes a pole terminal and dual traveler terminals and said relay is similar to a shape and a size of an AC switch fit for installation into a standard electrical box.

A lighting system with reduced standby power is described in U.S. Patent Application No. 2013/0320866 to CHUNG entitled: "Lighting System with Reduced Standby Power", which is incorporated in its entirety for all purposes as if fully set forth herein. The system includes a main control unit to control a lighting device; a driver to supply the control signal to the lighting device; and an AC-DC converting circuit to supply power to the driver. A method of reducing standby power according to the embodiment includes charging a standby power supply unit with power in a normal mode; checking whether a lighting off signal is transmitted and switching off a lighting, and simultaneously, shutting off the power supplied from the AC-DC converting circuit when the lighting off signal is transmitted; changing an operation mode of a lighting device from a normal mode to a standby mode; checking whether a voltage of the standby power supply unit is less than a predetermined level; and charging the standby power supply unit when the voltage is less than the predetermined level.

A hot plug module for an illuminating device is described in WIPO International Publication NO. WO 2015/024779 to ZHANG entitled: "Hot Plug Module and Driver for Illuminating Device and Illuminating Device", which is incorporated in its entirety for all purposes as if fully set forth herein. The module comprising: a detection unit for detecting a hot plug state to obtain a detecting state; and an impedance adjusting unit for adjusting an impedance state of the hot plug module in accordance with the detecting state, and the impedance adjusting unit comprises an impedance conversion unit whose impedance can be converted; and a conversion drive unit converting the impedance of the impedance conversion unit in accordance with the detecting state to adjust the impedance state. Further, the present invention relates to a driver for an illuminating device and an illuminating device In consideration of the foregoing, it would be an advancement in the art to provide a method or a system supporting a power extraction in a residential or commercial lighting power environment, providing controlled power to a load, or remotely controlling power to a load. Preferably, such methods or systems may be providing an improved diagnostics and security, monitoring proper operation, or detecting deterioration, and are simple, secure, cost-effective, reliable, easy to install, use or monitor, has a minimum part count, enclosed in a small housing, minimum hardware, and/or using existing and available components, protocols, programs and applications, that enable better control, monitoring, security (or additional functionalities), and providing a better user experience.

SUMMARY

A system for controlling the powering of an AC load connected via first and second terminals from an AC power source connected via third and fourth terminals, where the second terminal may be connected to the third terminal, may be used with a wire connecting fifth and sixth terminals. The system may be configured to be in distinct first and second states and may comprise first and second electrical circuits. The first circuit may comprise a first switch controlled to pass current in an 'open' state and to stop current flow in a 'closed' state; and a first impedance connected in parallel to the first switch, and the first circuit may be connected between the fourth and fifth terminals. The second circuit may comprise a second switch controlled to pass current in an 'open' state and to stop current in a 'closed' state; and a second impedance, the second switch may be connected between the sixth and first terminals, and the second impedance may be connected between the sixth and second terminals. In the first state the first and second switches may be controlled to be in the 'open' state so that a first AC current may be conducted from the AC power source via the first and second impedances, and in the second state the first and second switches may be controlled to be in the 'closed' state so that a second AC current may be conducted from the AC power source via the first and second switches and the AC load. The system may comprise the AC load and the wire.

The AC power may be a domestic mains (such as nominally 120 VAC/60 Hz or 230 VAC/50 Hz supply), the wire may be an AC power wire, the terminals may be AC power terminals, and the switches may be AC power switches. The AC load may be a light source, such as an electric light source converting electrical energy into light. The electric light source may emit visible or non-visible light for illumination or indication, and the non-visible light may be infrared, ultraviolet, X-rays, or gamma rays. The electric light source may consist of, or may comprise, a lamp, an incandescent lamp, a gas discharge lamp, a fluorescent lamp, a Solid-State Lighting (SSL), a Light Emitting Diode (LED), an Organic LED (OLED), a polymer LED (PLED), or a laser diode.

The first switch may be an AC power switch that may be part of a first electrically controlled switching component in the first circuit, and may be controlled by a first control signal from a first control terminal. Alternatively or in addition, the second switch may be an AC power switch that may be part of a second electrically controlled switching component in the second circuit, and may be controlled by a second control signal from a second control terminal. The first electrically controlled switching component, or the second electrically controlled switching component, may be based on, may be part of, or may consist of, a relay, that may be a solenoid-based electromagnetic relay or a reed relay, or may be a solid-state (such as an AC Solid State Relay (SSR)) or a semiconductor based relay. Alternatively or in addition, the first electrically controlled switching component or the second electrically controlled switching component may be based on, may comprise, or may consist of, an electrical circuit that comprises an open collector transistor, an open drain transistor, a thyristor, a TRIAC, or an opto-isolator. Alternatively or in addition, the first electrically controlled switching component, or the second electrically controlled switching component, may be based on, may comprise, or may consist of, an electrical circuit or a transistor, such as a field-effect power transistor (such as an N-channel or a P-channel field-effect power transistor), and the respective switch may be formed between a 'drain' and a 'source' pins, and the control terminal may be a 'gate' pin, The first control terminal may be galvanically isolated from the first switch, and the second control terminal may be galvanically isolated from the second switch.

The first AC current may be substantially less than the second AC current (such as below 10%, 5%, 3%, 1%, or 0.5% of the first AC current), and may be below 250 mA (milliamper), 100 mA, 50 mA, or 10 mA. The second AC current may be above 500 mA (milliamper), 1 A, 1.5 A, or 2 A, and the AC load may be rated to consume AC power in operation of at least 50 W (Watts), 100 W, 150 W, 200 W, 250 W, 300 W, 350 W, 400 W, 450 W, or 500 W. Alternatively or in addition, the second AC current may be below 500 mA (milliamper), 100 mA, 50 mA, 20 mA, 10 mA, 5 mA, or 1 mA, and the AC load may be rated to consume AC power in operation of no more than 50 W (Watts), 20 W, 10 W, 5 W, 3 W, 1 W, or 0.5 W.

A single enclosure may house the first circuit, and may be configured to substitute a domestic light switch, such as dimensioned and shaped to be installed in a light switch outlet cavity. Another single enclosure may house the second circuit, the AC load, or both. The single enclosure may be a wall-mounted enclosure that may be constructed to have a form substantially similar to that of a standard outlet; wall mounting elements substantially similar to those of a standard wall outlet; a shape allowing direct mounting in an outlet opening or cavity; or a form to at least in part substitute for a standard outlet.

The second circuit further may comprise an AC/DC converter that may be connected in parallel to the second impedance to be AC fed therefrom and to supply a DC voltage having a DC voltage value. The second switch may be controlled to be in an 'open' or 'closed' state in response to comparing the DC voltage value to the threshold voltage value. The system may further be used with a threshold voltage value, and the second switch may be controlled to be in an 'open' state in response to the DC voltage value being below the threshold voltage value, and the second switch may be controlled to be in a 'closed' state in response to the DC voltage value being above the threshold voltage value. The threshold voltage value may be above 50%, 60%, 70%, 80%, or 90% of the nominal AC power source voltage, or below 100%, 90%, 80%, 70%, or 60% of the nominal AC power source voltage.

The first circuit may further comprise a first power extractor circuit connected in series to the first switch which may be AC power fed from the first AC current in the first state and from the second AC current in the second state, and may be coupled for a DC powering a first DC load. The first power extractor circuit may comprise an AC/DC converter for converting the first or second AC currents to a DC voltage for the DC powering of the first DC load. The AC/DC converter may consist of, or may comprise, a diode bridge, and may supply regulated and stabilized DC voltage. The first circuit may further comprise, or may be integrated with, the first DC load. The DC voltage may be a nominal 3.3 VDC (such as +/−20%, 15%, 10%, or 5%), 5 VDC (such as +/−20%, 15%, 10%, or 5%), or 12 VDC (such as +/−20%, 15%, 10%, or 5%).

The first power extractor circuit may further comprise a two-port voltage limiter for limiting an AC voltage developed between the two ports in the first and second states, and the AC voltage developed between the two ports may be less than 15%, 10%, or 5%, of the AC power source nominal voltage. The two-port voltage limiter may consist of, or may comprise, two back-to-back connected Zener diodes. Alternatively or in addition, the two-port voltage limiter may further comprise two transistors, and each transistor may be connected in series to one of the Zener diodes. The first DC load may consist of, or may include, a logic circuit, that may be coupled to control the first switch state. The logic circuit may consist of, or may include, software and a processor for executing the software.

Alternatively or in addition, the second circuit may further comprise a second power extractor circuit connected in series to the second switch which may be AC power fed from the first AC current in the first state and from the second AC current in the second state, and may be coupled for a DC powering a second DC load. The second power extractor circuit may comprise an AC/DC converter for converting the first or second AC currents to a DC voltage for the DC powering of the second DC load. The AC/DC converter may consist of, or may comprise, a diode bridge, and may supply regulated and stabilized DC voltage. The second circuit may further comprise, or may be integrated with the first DC load. The DC voltage may be a nominal 3.3 VDC (such as +/−20%, 15%, 10%, or 5%), 5 VDC (such as +/−20%, 15%, 10%, or 5%), or 12 VDC (such as +/−20%, 15%, 10%, or 5%).

The second power extractor circuit may further comprise a two-port voltage limiter for limiting an AC voltage developed between the two ports in the first and second states, and the AC voltage developed between the two ports may be less than 15%, 10%, or 5%, of the AC power source nominal voltage. The two-port voltage limiter may consist of, or may comprise, two back-to-back connected Zener diodes. Alternatively or in addition, the two-port voltage limiter may further comprise two transistors, and each transistor may be connected in series to one of the Zener diodes. The first DC load may consist of, or may include, a logic circuit, that may be coupled to control the second switch state. The logic circuit may consist of, or may include, software and a processor for executing the software.

The system may be used with a logic circuit powered the first AC current in the first state and from the second AC current in the second state, and the first circuit or the second circuit may further comprise the logic circuit that may be respectively coupled to control the state of the first or the second switch. The system may further comprise a tactile sensor coupled to the logic circuit for shifting between the respective states in response to a human touch or a human mechanical activation. The logic circuit may consist of, or may include software and a processor for executing the software.

The system may be operative for shifting between the states of the system, or between the states of the first switch or of the second switch, in response to a remote command. The system may be used with a logic circuit (that may be comprised in the first circuit or in the second circuit) powered by the first AC current in the first state and by the second AC current in the second state, that may be respectively coupled to control the state of the first or the second switch. The logic circuit may further comprise an antenna for receiving signals over the air, and a wireless transceiver coupled to the antenna to receive a remote command from a wireless network, and the logic circuit may be coupled to the wireless transceiver to receive the remote command therefrom and in response to control the state of the first or the second switch, or the system state.

The wireless network may be a Wireless Personal Area Network (WPAN), the wireless transceiver may be a WPAN transceiver, and the antenna may be a WPAN antenna, and further the WPAN may be according to, or may be based on, Bluetooth™ or IEEE 802.15.1-2005 standards, or the WPAN may be a wireless control network that may be according to, or may be based on, Zigbee™, IEEE 802.15.4-2003 or Z-Wave™ standards. Alternatively or in addition, the wireless network may be a Wireless Local Area Network (WLAN), the wireless transceiver may be a WLAN transceiver, and the antenna may be a WLAN antenna, and further the WLAN may be according to, or base on, IEEE 802.11-2012, IEEE 802.11a, IEEE 802.11b, IEEE 802.11g, IEEE 802.11n, or IEEE 802.11ac. The wireless network may use a licensed or unlicensed radio frequency band, and the unlicensed radio frequency band may be an Industrial, Scientific and Medical (ISM) radio band. Alternatively or in addition, the wireless network may be a Wireless Wide Area Network (WWAN), the wireless transceiver may be a WWAN transceiver, and the antenna may be a WWAN antenna, and the WWAN may be a wireless broadband network or a WiMAX network, where the antenna may be a WiMAX antenna and the wireless transceiver may be a WiMAX modem, and the WiMAX network may be according to, or may be based on, IEEE 802.16-2009. Alternatively or in addition, the wireless network may be a cellular telephone network, the antenna may be a cellular antenna, and the wireless transceiver may be a cellular modem, and the cellular telephone network may be a Third Generation (3G) network that uses UMTS W-CDMA, UMTS HSPA, UMTS TDD, CDMA2000 1×RTT, CDMA2000 EV-DO, or GSM EDGE-Evolution. Alternatively or in addition, the cellular telephone network may be a Fourth Generation (4G) network that uses HSPA+, Mobile WiMAX, LTE, LTE-Advanced, MBWA, or may be based on IEEE 802.20-2008.

The system, the first circuit, or the second circuit, may further use, or may further include, a logic circuit powered by the first AC current in the first state and by the second AC current in the second state, and the logic circuit may comprise a sensor having an output coupled to the logic circuit and responsive to a physical phenomenon. The logic circuit may be coupled to control the state of the first or the second switch in response to the sensor output. The sensor may be an occupancy sensor for detecting occupancy of a space by a human body and coupled to the logic circuit for shifting between the states in response to detecting a presence of a human by using electric effect, inductive coupling, capacitive coupling, triboelectric effect, piezoelectric effect, fiber optic transmission, or radar intrusion sensing. The occupancy sensor may consist of, may comprise, or may be based on, an acoustic sensor, opacity, geomagnetism, magnetic sensors, magnetometer, reflection of transmitted energy, infrared laser radar, microwave radar, electromagnetic induction, or vibration, and may consist of, may comprise, or may be based on, a motion sensor. The motion sensor may be a mechanically actuated sensor, passive or active electronic sensor, ultrasonic sensor, microwave sensor, tomographic detector, passive infrared (PIR) sensor, laser optical detector, or acoustical detector. Alternatively or in addition, the sensor may be a photoelectric sensor that responds to a visible or an invisible light, the invisible light may be infrared, ultraviolet, X-rays, or gamma rays, may be based on the photoelectric or photovoltaic effect, and may consist of, or may comprise, a semiconductor component that consists of, or comprises, a photodiode, or a phototransistor, such as a Charge-Coupled Device (CCD) or a Complementary Metal-Oxide Semiconductor (CMOS) component.

The sensor may be an electrochemical sensor that responds to an object chemical structure, properties, composition, or reactions. The electrochemical sensor may be a pH meter or a gas sensor responding to a presence of radon, hydrogen, oxygen, or Carbon-Monoxide (CO), or the electrochemical sensor may be based on optical detection or on ionization and may be a smoke, a flame, or a fire detector, or may be responsive to combustible, flammable, or toxic gas.

Each of the first circuit or the second circuit may further comprise a logic circuit and an actuator that converts electrical energy to affect a phenomenon, the actuator may be coupled to the logic circuit to affect the phenomenon in response to the logic circuit, the logic circuit and the actuator may be coupled to be powered by the first AC current in the first state, and by the second AC current in the second state. The logic circuit may further be coupled to operate, control, or activate the actuator in response to the state of the first or the second switch.

The actuator may be a sounder for converting an electrical energy to omnidirectional, unidirectional, or bidirectional pattern emitted, audible or inaudible, sound waves. The sound may be audible, and the sounder may be an electromagnetic loudspeaker, a piezoelectric speaker, an electrostatic loudspeaker (ESL), a ribbon or a planar magnetic loudspeaker, or a bending wave loudspeaker. Alternatively or in addition, the actuator may be an electric thermoelectric actuator that may be a heater or a cooler, operative for affecting the temperature of a solid, a liquid, or a gas object, and may be coupled to the object by conduction, convection, force convention, thermal radiation, or by the transfer of energy by phase changes. The thermoelectric actuator may be a cooler based on a heat pump driving a refrigeration cycle using a compressor-based electric motor, or may be an electric heater that may be a resistance heater or a dielectric heater.

Alternatively or in addition, the actuator may be a display for visually presenting information. The display may be a monochrome, grayscale or color display and may consist of an array of light emitters or light reflectors, such as a video display supporting Standard-Definition (SD) or High-Definition (HD) standards, and may be capable of scrolling, static, bold or flashing the presented information.

Alternatively or in addition, the actuator may be a motion actuator that causes linear or rotary motion, and the system further may further comprise a conversion mechanism for respectfully converting to rotary or linear motion based on a screw, a wheel and axle, or a cam. The motion actuator may be a pneumatic, hydraulic, or electrical actuator that may be an AC or a DC electrical motor.

The AC load may consist of, may comprise, or may be part of, a water heater, HVAC system, air conditioner, heater, washing machine, clothes dryer, vacuum cleaner, microwave oven, electric mixer, stove, oven, refrigerator, freezer, food processor, dishwasher, food blender, beverage maker, coffeemaker, answering machine, telephone set, home cinema system, HiFi system, CD or DVD player, induction cooker, electric furnace, trash compactor, electric shutter, or dehumidifier.

The system may use a device connectable in series between the AC load and the AC power source for controlling the activating of the AC load by AC power from the AC power source. When connected between the AC load and the AC power source the device may be configured to be in distinct first and second states, and the device may comprise a switch controlled to pass current in an 'open' state and to stop current flow in a 'closed' state; an impedance connected to the switch (such as in parallel); and a single enclosure housing the switch and the impedance. In the first state the switch may be controlled to be in the 'open' state so that a first AC current may be conducted from the AC power source via the impedance, and in the second state the switch may be controlled to be in the 'closed' state so that a second AC current may be conducted from the AC power source via the first switch for activating the AC load by AC power from the AC power source. In the first state, no (or insignificant) AC current may be flowing through the AC load. The single enclosure may be a wall-mounted enclosure that may be constructed to have a form substantially similar to that of a standard outlet; wall mounting elements substantially similar to those of a standard wall outlet; a shape allowing direct mounting in an outlet opening or cavity; or a form to at least in part substitute for a standard outlet.

The system may include or be used with a DC load powered from the first AC current in the 'open' state and from the second AC current in the 'closed' state. The first circuit or the second circuit may further comprise the DC load that may consist of, or may include, a wireless repeater, such as a WPAN, WLAN, or a WWAN repeater.

A method may be used for retrofitting an installed wiring system including the AC load connected to be powered from the AC power source via the two-terminal AC switch connected in series to the AC load for connecting and disconnecting the AC power from the AC power source to the AC load. The method may comprise the steps of providing a first enclosure housing a two-terminal first electrical circuit; disconnecting the AC switch; connecting the first electrical circuit as a substitute to the AC switch; providing a second enclosure housing a second electrical circuit; disconnecting the AC load; connecting the second electrical circuit as a substitute to the AC load; and connecting the AC load to the second electrical circuit. The first circuit may comprise the first switch controlled to pass current in an 'open' state and to stop current flow in a 'closed' state; and the first impedance connected in parallel to the first switch, and the second circuit may comprise the second switch controlled to pass current in an 'open' state and to stop current in a 'closed' state; and the second impedance. The method may be used with distinct first and second states, and may further comprise the steps of controlling the system to be the first state by controlling the first and second switches to be in the 'open' state so that a first AC current may be conducted from the AC power source via the first and second impedances; and controlling the system to be the second state by controlling the first and second switches to be in the 'closed' state so that a second AC current may be conducted from the AC power source via the first and second switches and the AC load.

The method may further comprise the steps of dismounting the AC switch from a wall cavity, and mounting the first enclosure into the wall cavity. The first or the second enclosure may be configured to substitute a domestic light switch. The first enclosure may be dimensioned and shaped to be installed in a light switch outlet cavity, and the method may further comprise the step of enclosing the AC load in the second enclosure. Each of the first or second enclosure may be a wall-mounted enclosure that may be constructed to have a form substantially similar to that of a standard outlet; wall mounting elements substantially similar to those of a standard wall outlet; a shape allowing direct mounting in an outlet opening or cavity; or a form to at least in part substitute for a standard outlet.

The sensor may be an electrical sensor used to measure electrical quantities or electrical properties. The electrical sensor may be conductively connected to the measured element. Alternatively or in addition, the electrical sensor may use non-conductive or non-contact coupling to the measured element, such as measuring a phenomenon associated with the measured quantity or property. The electric sensor may be a current sensor or an ampmeter (a.k.a. ampermeter) for measuring DC or AC (or any other waveform) electric current passing through a conductor or wire. The current sensor may be connected such that part or all of the measured electric current may be passing through the ampermeter, such as a galvanometer or a hot-wire ampermeter. An ampermeter may be a current clamp or current probe, and may use the 'Hall effect' or a current transformer concept for non-contact or non-conductive current measurement. The electrical sensor may be a voltmeter for measuring the DC or AC (or any other waveform) voltage, or any potential difference between two points. The voltmeter may be based on the current passing a resistor using the Ohm's law, may be based on a potentiometer, or may be based on a bridge circuit.

The sensor may be a wattmeter measuring the magnitude of the active AC or DC power (or the supply rate of electrical energy). The wattmeter may be a bolometer, used for measuring the power of incident electromagnetic radiation via the heating of a material with a temperature-dependent electrical resistance. The sensor may be an electricity AC (single or multi-phase) or DC type meter (or electrical energy meter), that measures the amount of electrical energy consumed by a load. The electricity meter may be based on a wattmeter, which accumulates or takes the average readings, may be based on induction, or may be based on multiplying measured voltage and current.

The electrical sensor may be an ohmmeter for measuring the electrical resistance (or conductance), and may be a megohmmeter or a microohmeter. The ohmmeter may use the Ohm's law to derive the resistance from voltage and current measurements, or may use a bridge such as a Wheatstone bridge. The sensor may be a capacitance meter for measuring capacitance. A sensor may be an inductance meter for measuring inductance. A sensor may be an impedance meter for measuring an impedance of a device or a circuit. A sensor may be an LCR meter, used to measure inductance (L), capacitance (C), and resistance (R). A meter may use sourcing a DC or an AC voltage, and use the ratio of the measured voltage and current (and their phase difference) through the tested device according to Ohm's law to calculate the resistance, the capacitance, the inductance, or the impedance (R=V/I). Alternatively or in addition, a meter may use a bridge circuit (such as Wheatstone bridge), where variable calibrated elements may be adjusted to detect a null. The measurement may be using DC with a single frequency or a range of frequencies.

The sensor may be a scalar or a vector magnetometer for measuring an H or B magnetic fields. The magnetometer may be based on a Hall effect sensor, magneto-diode, magneto-transistor, AMR magnetometer, GMR magnetometer, magnetic tunnel junction magnetometer, magneto-optical sensor, Lorentz force based MEMS sensor, Electron Tunneling based MEMS sensor, MEMS compass, Nuclear precession magnetic field sensor (a.k.a. Nuclear Magnetic Resonance—NMR), optically pumped magnetic field sensor, fluxgate magnetometer, search coil magnetic field sensor, or Superconducting Quantum Interference Device (SQUID) magnetometer.

A system may be used for controlling a powering of an AC load connected via first and second terminals from an AC power source connected via third and fourth terminals, for use with an AC power wire connecting fifth and sixth terminals. The second terminal may be connected to the third terminal, and the system may be configured to be in distinct first and second states, and may comprise a first device connected to the fourth and fifth terminals and a second device connected to the first, second, and sixth terminals. The first device may comprise a first power extractor connected between the fourth and fifth terminals for being powered from the AC power source and for supplying a first DC power signal; a first firmware and a first processor for executing the first firmware, the first processor connected to be powered by the first DC power signal from the first power extractor; a first antenna for transmitting and receiving Radio-Frequency (RF) signals over the air; a first wireless transceiver coupled to the first antenna for wirelessly transmitting a first command over the air, the first wireless transceiver connected to be powered by the first DC power signal from the first power extractor and coupled to be controlled by the first processor; and a first enclosure housing the first power extractor, the first wireless transceiver, and the first processor. The second device may comprise a second power extractor connected to the sixth terminal for being powered from the AC power source and for supplying a second DC power signal; a second antenna for transmitting and receiving Radio-Frequency (RF) signals over the air; a second wireless transceiver coupled to the second antenna for wirelessly receiving a second command over the air, the second wireless transceiver connected to be powered by the second DC power signal from the second power extractor, and may be wirelessly coupled with the first wireless transceiver via the first and second antennas; a second firmware and a second processor for executing the second firmware, the second processor connected to be powered by the second DC power signal from the second power extractor; a controlled switch for passing AC current in an 'close' state and for stopping AC current in an 'open' state, the switch may be connected between the sixth and first terminals for conducting AC power to the AC load in the 'close' state and to substantially stop AC power to the AC load in the 'open' state; and a second enclosure housing the second power extractor, the second wireless transceiver, the controlled switch, and the second processor. The second processor may be coupled to the second wireless transceiver and to the controlled switch for controlling the switch state in response to the second command.

The second command may consist of, may comprise, or may be based on the first command. The first and second wireless transceivers may communicate bi-directionally and wirelessly using an ad-hok scheme. Alternatively or in addition, the first and second wireless transceivers may communicate bi-directionally and wirelessly using an infrastructure scheme, and the system may further comprise a wireless intermediary device configured to receive the first command from the first wireless transceiver, and to transmit the second command to the second wireless transceiver. The intermediary device may be a Wireless Access Point (WAP), a wireless switch, or a wireless router. The second wireless transceiver may be operative to receive the first command from the first wireless transceiver, and to transmit an acknowledgement of the received first command to the first wireless transceiver. The controlled switch may be controlled or toggled to be in the 'open' or 'close' state in response to the received second command. The system may further comprise a hand-held or portable wireless third device operative to wirelessly transmit the second command to the second wireless transceiver. The third device may consist of, or may comprise, a Personal Digital Assistant (PDA), a tablet computer, or a smartphone.

The first and second wireless transceivers may be communicating over an unlicensed radio frequency band that may be an Industrial, Scientific and Medical (ISM) radio band, such as ITU region 1 ISM band of 433.050 MHz to 434.790 MHz, and the communication between the first and second wireless transceivers may be according to, may be based on, or may use, the LPD433 (Low Power Device 433 MHz) standard. Alternatively or in addition, the first and second wireless transceivers may be communicating over a Wireless Personal Area Network (WPAN), each of the first and second wireless transceivers may be a WPAN transceiver, and each of the first and second antennas may be a WPAN antenna. The WPAN may be according to, or may be based on Bluetooth™ or IEEE 802.15.1-2005 standard. Alternatively or in addition, the WPAN may be a wireless control network that may be according to, or based on Zigbee™, IEEE 802.15.4-2003 or Z-Wave™ standards. Alternatively or in addition, the first and second wireless transceivers may be communicating over a Wireless Local Area Network (WLAN), each of the first and second wireless transceivers may be a WLAN transceiver, and each of the first and second antennas may be a WLAN antenna, and the WLAN may be according to, or may be based on IEEE 802.11-2012, IEEE 802.11a, IEEE 802.11b, IEEE 802.11g, IEEE 802.11n, or IEEE 802.11ac standard. Alternatively or in addition, the first and second wireless transceivers may be communicating over a Wireless Wide Area Network (WWAN), each of the first and second wireless transceivers may be a WWAN transceiver, and each of the first and second antennas may be a WWAN antenna.

The system may further be used for controlling a powering of an additional AC load connected via seventh and eighth terminals, the eighth terminal may be connected to the second terminal and the second device may further be operative to connect to the seventh terminal for conducting AC power from the AC power source to the additional AC load in the 'close' state and to substantially stop AC power to the additional AC load in the 'open' state. Alternatively or in addition, the system may further be used for controlling a powering of an additional AC load connected via seventh and eighth terminals, the eighth terminal may be connected to the second terminal, the second device may further comprise an additional controlled switch for passing AC current in an additional 'open' state and for stopping AC current in an additional 'close' state, and the additional switch may be connected between the sixth and eighth terminals for conducting AC power to the additional AC load in the additional 'close' state and to substantially stop AC power to the additional AC load in the additional 'open' state. The second wireless transceiver may be coupled to the second antenna for wirelessly receiving a third command over the air, and the second processor may be coupled between the second wireless transceiver and the additional controlled switch for controlling the additional switch state in response to the third command. Alternatively or in addition, the first wireless transceiver may be coupled to the first antenna for wirelessly transmitting a fourth command over the air, and the third command may consist of, may comprise, or may be based on, the first command.

The system may further be used for controlling a powering of an additional AC load connected via seventh and eighth terminals, the eighth terminal connected to the second terminal, and the system may further comprise a third device that may comprise a third power extractor connected to the sixth terminal for being powered from the AC power source and for supplying a third DC power signal; a third antenna for transmitting and receiving Radio-Frequency (RF) signals over the air; a third wireless transceiver coupled to the third antenna for wirelessly receiving a third command over the air, the third wireless transceiver connected to be powered by the third DC power signal from the third power extractor; a third firmware and a third processor for executing the third firmware, the third processor connected to be powered by the third DC power signal from the third power extractor; an additional controlled switch for passing AC current in an 'open' state and for stopping AC current in a 'closed' state, the additional switch may be connected between the sixth and eighth terminals for conducting AC power to the additional AC load in the 'close' state and to substantially stop AC power to the additional AC load in the 'open' state; and a third enclosure housing the third power extractor, the third wireless transceiver, the additional controlled switch, and the third processor. The third processor may be coupled between the third wireless transceiver and the additional controlled switch for controlling the additional switch state in response to the third command. The third command may consist of, may comprise, or may be based on, the first command, and the first wireless transceiver may be coupled to the first antenna for wirelessly transmitting a fourth command over the air, and the third command may consist of, may comprise, or may be based on, the fourth command.

A device connectable in series between an AC load and an AC power source. The device may comprise a first AC power terminal for connecting to the AC power source; a second AC power terminal for coupling to the AC load; a power extractor connected to be powered from an AC current flowing between the first and second AC power terminals and for supplying a DC power signal; a firmware and a processor for executing the firmware, the processor connected to be powered by the DC power signal; a first antenna for transmitting and receiving first Radio-Frequency (RF) signals over the air; a first wireless transceiver coupled to the first antenna for wirelessly transmitting and receiving first data over a first wireless network, the first wireless transceiver connected to be powered by the DC power signal and coupled to be controlled by the processor; a second antenna for transmitting and receiving second Radio-Frequency (RF) signals over the air; a second wireless transceiver coupled to the second antenna for wirelessly transmitting and receiving second data over a second wireless network, the second wireless transceiver connected to be powered by the DC power signal and coupled to be controlled by the processor; and a single enclosure housing the first and second AC power terminals, the power extractor, the first and second wireless transceivers, and the processor. The first and second wireless transceiver may be configured by the processor for the second data to be transmitted by the second wireless transceiver via the second antenna in response to the first data that may be received by the first wireless transceiver via the first antenna.

The first or second wireless transceiver may be operative to communicate in an ad-hok scheme. Alternatively or in addition, the device may be used with an intermediary device, such as a Wireless Access Point (WAP), a wireless switch, or a wireless router, configured to communicate the first data with the first wireless transceiver or to communicate the second data with the second wireless transceiver, and the respective first or second wireless transceiver may be operative to communicate with the intermediary device using an infrastructure scheme. A system may comprise the device a hand-held or portable wireless device operative to wirelessly transmit or receive with the first or second wireless transceiver respectively via the first or second antenna. The wireless device may consist of, or may comprise, a Personal Digital Assistant (PDA), a tablet computer, or a smartphone.

The device may further comprise an AC switch coupled between the first and second AC terminals and may be controlled by the processor to pass AC current in an 'open' state and to stop AC current in a 'close' state, and the switch state may be responsive to the first or second data. The device may further comprise an impedance coupled for passing an AC current between the first and second AC terminals.

The first wireless network may be a Wireless Wide Area Network (WWAN), the first wireless transceiver may be a WWAN transceiver, and the first antenna may be a WWAN antenna, and the second wireless network may be a Wireless Local Area Network (WLAN), the second wireless transceiver may be a WLAN transceiver, and the second antenna may be a WLAN antenna.

Alternatively or in addition, the second wireless network may be a Wireless Personal Area Network (WPAN), the second wireless transceiver may be a WPAN transceiver, and the second antenna may be a WPAN antenna. The WPAN may be according to, or may be based on, Bluetooth™ or IEEE 802.15.1-2005 standards, or the WPAN may be a wireless control network that may be according to, or may be based on, Zigbee™, IEEE 802.15.4-2003, or Z-Wave™ standards.

Any electrically controlled switching component herein may comprise an isolation barrier that may be may be based on capacitance, induction, electromagnetic waves, or optical means, and the electrically controlled switching component may comprise or may use an optocoupler or an isolation transformer.

Any system, device, module, or circuit herein may further be operative for transmitting the first command in response to a human touch or a human mechanical activation, and may further comprise a tactile sensor coupled to the respective processor for sensing the human touch or the human mechanical activation.

Any enclosure herein may be configured to substitute a standard domestic light switch, may be dimensioned and shaped to be installed in a standard light switch outlet cavity, and may further house the AC load. Alternatively or in addition, any enclosure herein be a wall-mounted enclosure that may be constructed to have a form substantially similar to a standard outlet; wall mounting elements substantially similar to a standard wall outlet; a shape allowing direct mounting into an outlet opening or cavity; or a form to at least in part substitute for a standard outlet.

Any power extractor herein may be AC power fed from an AC current carried over the AC power wire, and may comprise an AC/DC converter for respectively supplying the first or second DC power signal respectively having a first or second DC voltage. The AC/DC converter may consist of, or may comprise, a diode bridge, and may supply regulated and stabilized DC voltage such as nominally 3.3 VDC, 5 VDC, or 12 VDC. The first or second power extractor may comprise a two-port voltage limiter for limiting an AC voltage developed between the two ports, so that the AC voltage developed between the two ports may be less than 15%, 10%, or 5%, of the AC power source nominal voltage. The two-port voltage limiter may consist of, or may comprise, two opposite polarity connected Zener diodes, and two transistors connected in series to the Zener diodes.

The first or second wireless network may be a Wireless Local Area Network (WLAN), the respective first or second wireless transceiver may be a WLAN transceiver, and the respective first or second antenna may be a WLAN antenna, and the WLAN may be according to, may be substantially according to, or may be based on, IEEE 802.11-2012, IEEE 802.11a, IEEE 802.11b, IEEE 802.11g, IEEE 802.11n, or IEEE 802.11ac. The second wireless network may be over a licensed or unlicensed radio frequency band that may be an Industrial, Scientific and Medical (ISM) radio band. The device may further comprise an actuator coupled to the processor for converting the DC power to affects or produce a physical phenomenon, and the actuator may be coupled to be based on, or be responsive to, the received first or second data.

Any WWAN herein may be a wireless broadband network. The wireless broadband network may be a WiMAX network, each of the antennas may be a WiMAX antenna, each of the wireless transceivers may be a WiMAX modem, and the WiMAX network may be according to, or may be based on IEEE 802.16-2009. Alternatively or in addition, the wireless broadband network may be a cellular telephone network, each of the antennas may be a cellular antenna, and each of the wireless transceivers may be a cellular modem, and the cellular telephone network may be a Third Generation (3G) network that may use UMTS W-CDMA, UMTS HSPA, UMTS TDD, CDMA2000 1×RTT, CDMA2000 EV-DO, or GSM EDGE-Evolution, or a Fourth Generation (4G) network that may use HSPA+, Mobile WiMAX, LTE, LTE-Advanced, or MBWA, or the cellular telephone network may be based on IEEE 802.20-2008.

Any system, device, module, or circuit herein, may further comprise a sensor having an output coupled to the respective processor and responsive to a physical phenomenon, and the state of the switch may be responsive to the sensor output. The sensor may be an occupancy sensor for detecting occupancy of a space by a human body, and the sensor output may be responsive to detecting a presence of a human by using electric effect, inductive coupling, capacitive coupling, triboelectric effect, piezoelectric effect, fiber optic transmission, or radar intrusion sensing. The occupancy sensor may consist of, may comprise, or may be based on, an acoustic sensor, opacity, geomagnetism, magnetic sensors, magnetometer, reflection of transmitted energy, infrared laser radar, microwave radar, electromagnetic induction, or vibration. Alternatively or in addition, the occupancy sensor may consist of, may comprises, or may be based on, a motion sensor that may be a mechanically actuated sensor, passive or active electronic sensor, ultrasonic sensor, microwave sensor, tomographic detector, Passive Infra-Red (PIR) sensor, laser optical detector, or acoustical detector. Alternatively or in addition, the sensor may be a photoelectric sensor that may respond to a visible or an invisible light, the invisible light may be infrared, ultraviolet, X-rays, or gamma rays, and the photoelectric sensor may be based on the photoelectric or photovoltaic effect, and may consist of, or may comprise, a semiconductor component that may consist of, or may comprise, a photodiode, or a phototransistor that may be based on Charge-Coupled Device (CCD) or a Complementary Metal-Oxide Semiconductor (CMOS) component. Alternatively or in addition, the sensor may be an electrochemical sensor that may respond to an object chemical structure, properties, composition, or reactions, the electrochemical sensor may be a pH meter or a gas sensor responding to a presence of radon, hydrogen, oxygen, or Carbon-Monoxide (CO), may be based on optical detection or on ionization and may be a smoke, a flame, or a fire detector, or may be responsive to combustible, flammable, or toxic gas. The first command may be affected or produced in response to the sensor output. Alternatively or in addition, the sensor may be an electrical sensor that may respond to an electrical characteristics or an electrical phenomenon quantity in an electrical circuit, and may be conductively coupled to the electrical circuit, or may be a non-contact sensor that may be non-conductively coupled to the electrical circuit. The electrical sensor may be responsive to an Alternating Current (AC) or a Direct Current (DC) electric signal.

The electrical sensor may be an ampermeter that responds to electrical current passing through a conductor or wire, and may consist of, or may comprise, a galvanometer, a hot-wire ampermeter, a current clamp, or a current probe. The electrical sensor may be an AC ampermeter connected to measure an AC current from the AC power source or an AC current via the AC load. Alternatively or in addition, the electrical sensor may be a voltmeter that may respond to an electrical voltage, and may consist of, or may comprise, an electrometer, a resistor, a potentiometer, or a bridge circuit. Alternatively or in addition, the electrical sensor may be a wattmeter that may respond to active electrical power. Alternatively or in addition, the electrical sensor may be an AC power wattmeter that may be based on induction, or may be based on multiplying measured voltage and measured current, and may be connected to measure the AC power source supplied power or the AC load consumed power. Alternatively or in addition, the electrical sensor may be an electricity meter that responds to electrical energy, and may be connected to measure the AC power source supplied electrical energy or the AC load consumed electrical energy.

Any system, device, module, or circuit herein device may comprise an actuator that may convert electrical energy to affects a phenomenon, the actuator may be coupled to the respective processor for affecting the phenomenon in response to a respective processor control, and may be connected to be powered by the respective DC power signal. The respective processor may be further coupled to operate, control, or activate the actuator in response to the state of the switch. The actuator may be a sounder for converting an electrical energy to omnidirectional, unidirectional, or bidirectional pattern emitted, audible or inaudible, sound waves, the sound may be audible, and the sounder may be an electromagnetic loudspeaker, a piezoelectric speaker, an electrostatic loudspeaker (ESL), a ribbon or a planar magnetic loudspeaker, or a bending wave loudspeaker. Alternatively or in addition, the actuator may be an electric thermoelectric actuator that may be a heater or a cooler, operative for affecting a temperature of a solid, a liquid, or a gas object, and may be coupled to the object by conduction, convection, force convention, thermal radiation, or by a transfer of energy by phase changes. The thermoelectric actuator may be a cooler based on a heat pump driving a refrigeration cycle using a compressor-based electric motor, or may be an electric heater that may be a resistance heater or a dielectric heater. Alternatively or in addition, the actuator may be a display for visually presenting information, and may be a monochrome, grayscale or color display, and may consist of an array of light emitters or light reflectors. The display may be a video display supporting Standard-Definition (SD) or High-Definition (HD) standard, and may be capable of scrolling, static, bold or flashing a presented information. Alternatively or in addition, the actuator may be a motion actuator that may cause linear or rotary motion, and the system may further comprise a conversion mechanism for respectfully converting to rotary or linear motion based on a screw, a wheel and axle, or a cam. The motion actuator may be a pneumatic, hydraulic, or electrical actuator, and may be an AC or a DC electrical motor.

Any switch herein may be an AC power switch that may be part of an electrically controlled switching component that may be coupled to the second processor to be controlled by a first control signal therefrom via a first control terminal. The electrically controlled switching component may be based on, may be part of, or may consist of, a relay that may be a solenoid-based electromagnetic relay, a reed relay, a solid-state (such as an AC Solid State Relay (SSR)), or a semiconductor-based relay. The electrically controlled switching component may be based on, may comprise, or may consist of, an electrical circuit that may comprise an open collector transistor, an open drain transistor, a thyristor, a TRIAC, an opto-isolator, an electrical circuit, or a transistor that may be an N-channel or a P-channel field-effect power transistor, and the switch may be formed between 'drain' and 'source' pins of the transistor, and the control terminal may be a 'gate' pin of the transistor. The first control terminal may be galvanically isolated from the switch, and the electrically controlled switching component may comprise an isolation barrier that may be based on capacitance, induction, electromagnetic waves, or optical means, and may comprise, may consist of, or may use an optocoupler or an isolation transformer.

Any AC power source herein may be a domestic mains, such as nominally 120 VAC/60 Hz or 230 VAC/50 Hz, any terminals may be AC power terminals, and any switch may be an AC power switch. Any AC load herein may be a light source that may be an electric light source that converts electrical energy into light, and the electric light source may be configured to emit visible or non-visible light such as infrared, ultraviolet, X-rays, or gamma rays, for illumination or indication. Alternatively or in addition, the electric light source may consist of, or may comprises, a lamp, an incandescent lamp, a gas discharge lamp, a fluorescent lamp, a Solid-State Lighting (SSL), a Light Emitting Diode (LED), an Organic LED (OLED), a polymer LED (PLED), or a laser diode. The system may further comprise the AC load and the AC power wire.

Any AC load herein, any system herein, and any module, device, or circuit herein, may comprise, or may be part of, a water heater, HVAC system, air conditioner, heater, washing machine, clothes dryer, vacuum cleaner, microwave oven, electric mixer, stove, oven, refrigerator, freezer, food processor, dishwasher, food blender, beverage maker, coffeemaker, answering machine, telephone set, home cinema system, HiFi system, CD or DVD player, induction cooker, electric furnace, trash compactor, electric shutter, or dehumidifier.

Any system, device, module, or circuit herein may be addressable in a wireless network (such as the Internet) using a digital address that may be a MAC layer address that may be MAC-48, EUI-48, or EUI-64 address type, or may be a layer 3 address and may be static or dynamic IP address that may be IPv4 or IPv6 type address. Any system, device, or module herein may be further configured as a wireless repeater, such as a WPAN, WLAN, or a WWAN repeater.

Any system, device, module, or circuit herein may further be operative to send a notification message over a wireless network using the first or second transceiver via the respective first or second antenna. The system may be operative to periodically sending multiple notification messages, such as substantially every 1, 2, 5, or 10 seconds, every 1, 2, 5, or 10 minutes, every 1, 2, 5, or 10 hours, or every 1, 2, 5, or 10 days. Alternatively or in addition, any system, device, module, or circuit herein may further comprise a sensor having an output and responsive to a physical phenomenon, and the message may be sent in response to the sensor output. The system may be use with a minimum or maximum threshold, and the message may be sent in response to the sensor output value respectively below the minimum threshold or above the maximum threshold. The sent message may comprise a time when the threshold was exceeded, and the value of the sensor output. The message may be sent by the first device using the first wireless transceiver and via the first antenna, or by the second device using the second wireless transceiver and via the second antenna.

Any message herein may comprise the time of the message and the controlled switch status, and may be sent over the Internet via the wireless network to a client device using a peer-to-peer scheme. Alternatively or in addition, any message herein may be sent over the Internet via the wireless network to an Instant Messaging (IM) server for being sent to a client device as part of an IM service. The message or the communication with the IM server may use, or may be based on, SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), or Hypertext Transfer Protocol (HTTP). The message may be a text-based message and the IM service may be a text messaging service, and may be according to, or may be based on, a Short Message Service (SMS) message and the IM service may be a SMS service, the message may be according to, or based on, an electronic-mail (e-mail) message and the IM service may be an e-mail service, the message may be according to, or based on, WhatsApp message and the IM service may be a WhatsApp service, the message may be according to, or based on, an Twitter message and the IM service may be a Twitter service, or the message may be according to, or based on, a Viber message and the IM service may be a Viber service. Alternatively or in addition, the message may be a Multimedia Messaging Service (MMS) or an Enhanced Messaging Service (EMS) message that includes an audio or video data, and the IM service may respectively be a MMS or EMS service.

Any impedance herein substantially be a reactance, that may consist of, may comprise, or may be based on, a capacitor (or inductor), such as a DC Film MKT Radial Potted Type capacitor. Any two impedances herein may be of the same nominal value, and may use, or may be based on identical components.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below, and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 15e illustrates an exemplary schematic electrical block diagram of a general power extraction system using a smartphone controlling a wireless load-side module using a WAP;

FIG. 16 illustrates an exemplary schematic electrical block diagram of a general power extraction system using wireless load-side and switch-side modules communicating over a local network, and a smartphone communicating with a switch-side module over a remote network;

DETAILED DESCRIPTION

Figure 1:
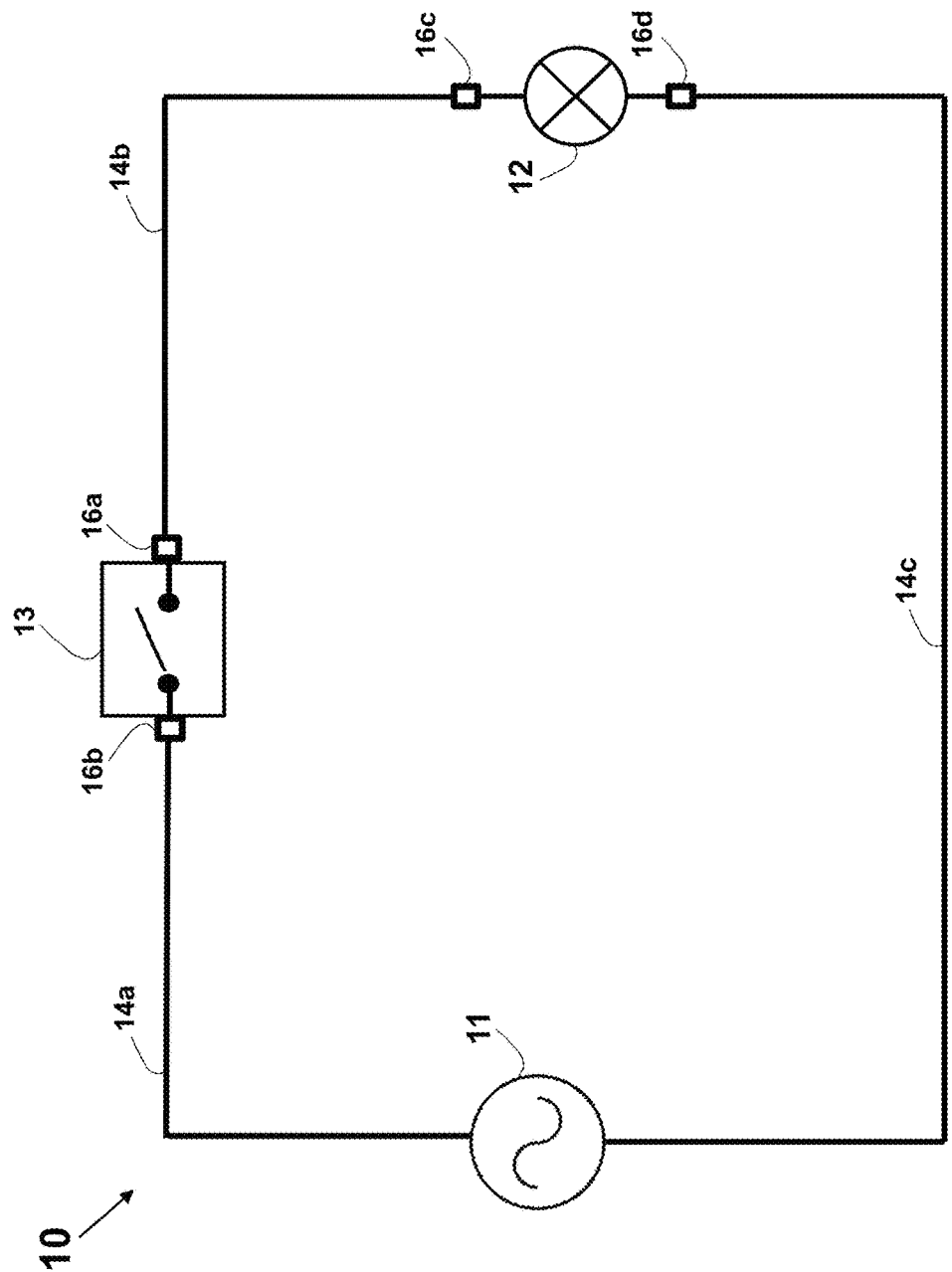
FIG. 1 illustrates a schematic electrical diagram of a prior-art wiring of a typical lighting system in a building.
Figure 1A:
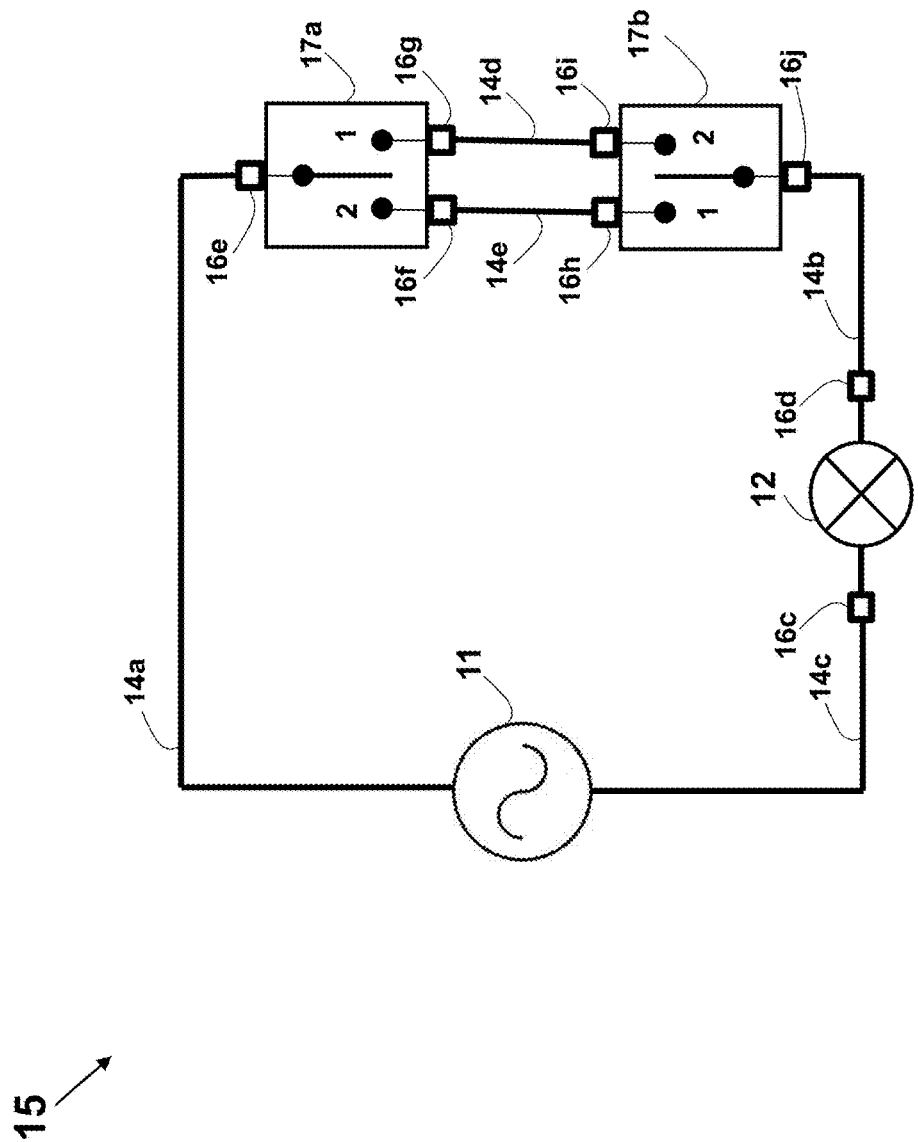
FIG. 1a illustrates a schematic electrical diagram of a prior-art wiring of a multiway switching lighting system in a building.
Figure 2:
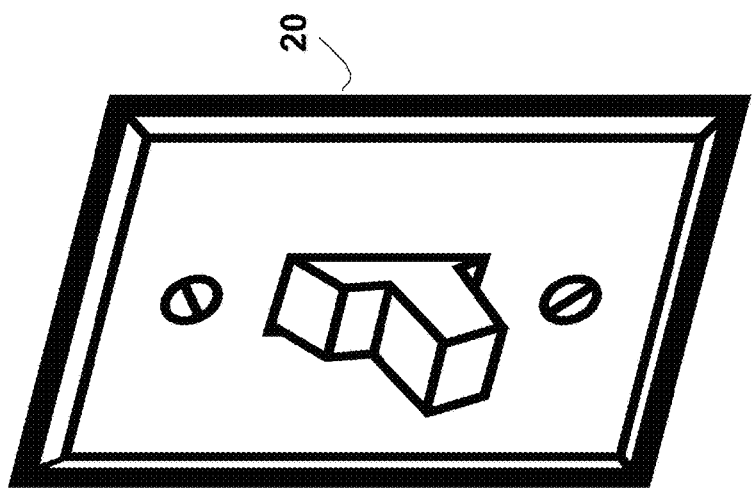
FIG. 2 depicts schematically a mechanical light switch.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely the representative embodiments of the invention. It is to be understood that the singular forms "a," "an," and "the" herein include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 3:
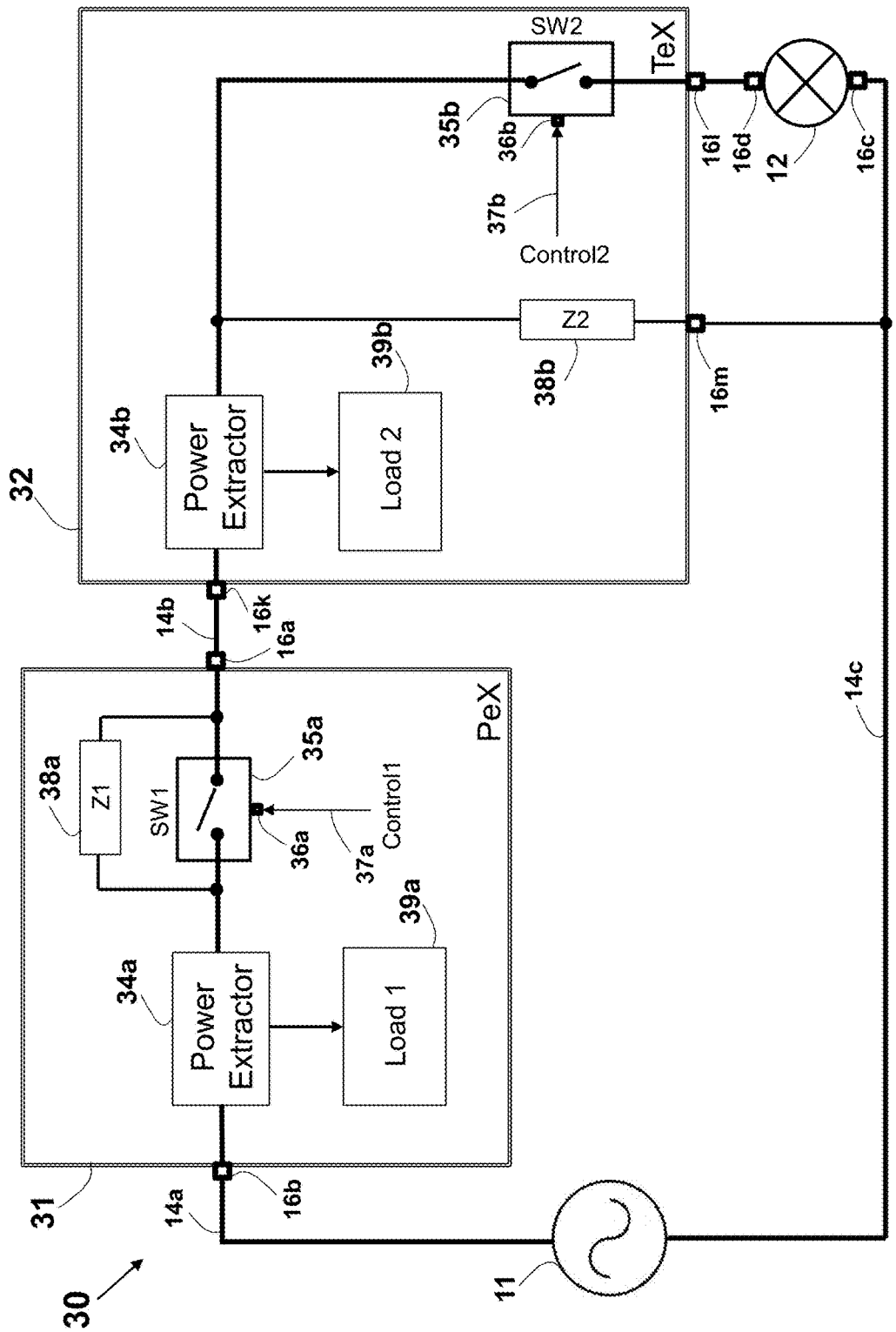
FIG. 3 illustrates a schematic electrical block diagram of a general power extraction system using controlled switches and impedances connected across the switches.
Figure 5:
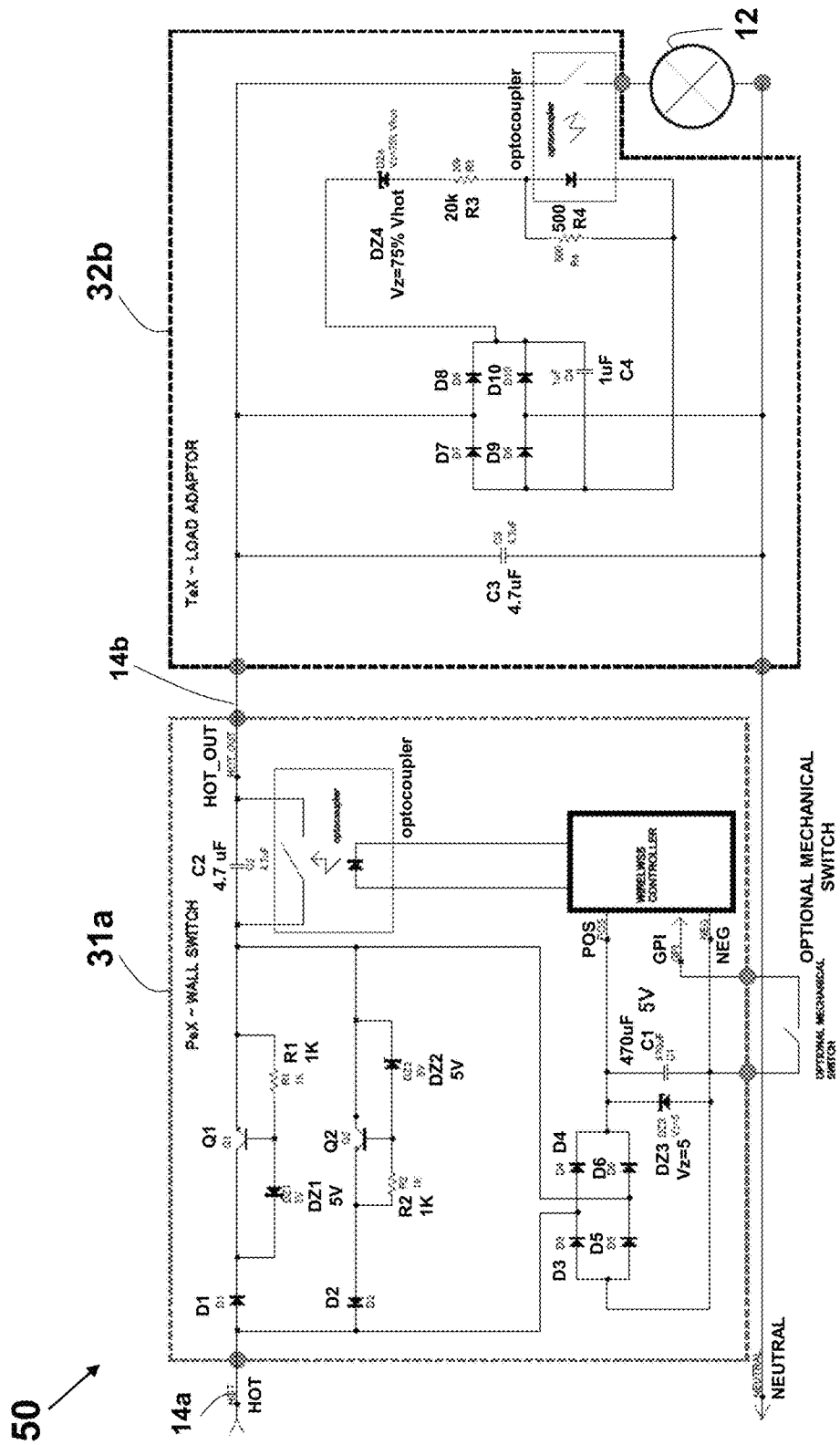
FIG. 5 illustrates a detailed exemplary schematic electrical block diagram of a general power extraction system using a switch-side only power extraction.

In one example, shown as an electrical schematic diagram 30 shown in FIG. 3, a module PeX 31 is substituting (or added to) the switch 13 shown in FIG. 1, connecting to the terminals 16b and 16a used to connect to the switch 13. Further, a module TeX 32 is used at the lamp 12 location, connected to the AC wire 14b via a terminal 16k and to the AC return wire 14c via a terminal 16m. The module TeX 32 further connects to the load 12 via terminal 16l that connects to the load 12 terminal 16d, while the other terminal 16c of the load 12 connects to the return line 14c. A low power load Load1 39a in the PeX module 31, which may comprise logic circuits, is powered by a power extractor block or circuit 34a, and a low power load Load2 39b in the TeX module 32, which may comprise logic circuits, is powered by a power extractor block or circuit 34b. An implementation example of a PeX module 31a (corresponding to a general PeX module 31) is shown as part of an arrangement 50 in FIG. 5, and detailed in an arrangement 60 shown in FIG. 6. An implementation example of a TeX module 32b (corresponding to a general TeX module 32) is shown as part of an arrangement 50 in FIG. 5, and detailed in an arrangement 70 shown in FIG. 7.

The AC power flow via the load 12 is controlled by two controlled switches, a controlled switch SW1 35a in the PeX module 31, having a control port 36a that is controlled by a Control1 signal connected via a connection 37a, and a controlled switch SW2 35b in the TeX module 32, having a control port 36b that is controlled by a Control2 signal connected via a connection 37b. In the system 'off' state, both controlled switches SW1 35a and SW2 35b are controlled by the respective control signals Control1 and Control2 to be in an 'open' state, thus no current is flowing from the power source 11 to the load 12. The system may be switched to the 'on' state by the two control signals Control1 and Control2 controlling the switches SW1 35a and SW2 35b to be in a 'close' state, allowing AC power to flow from the AC power source 11 to the load 12, thus the load 12 is AC powered similarly to the 'on' state in arrangement 10 resulted upon the switch 13 being in the 'closed' state. In general, when the two switches SW1 35a and SW2 35b are 'closed' or conductive, a current is flowing to the load 12, and in the case of a lamp, the lamp 12 illuminates. If one of the switches is 'open' or non-conductive, no current is flowing to the load 12 rendering the load 12 non-operative.

Any component that is designed to open (breaking, interrupting), close (making), or change one or more electrical circuits may serve as, or replace, the switch SW1 35a or the switch SW2 35b, typically under some type of an electrical control, respectively shown as control signals Control 1 and Control2. The switches may consist of, or may be based on, an identical or similar design, or use identical or similar components. Alternatively, the switches may be distinct from each other. Preferably, a galvanic isolation is provided between the control port (such as the control port 36a of switch SW1 35a), typically a low current and/or a low voltage signal (such as a logic level signal), and the switch itself used for switching a high voltage and/or a high current signal.

In one example, the switch is an electromechanical device with one or more sets of electrical contacts having two or more states. The switch may be a 'normally open' type, requiring actuation for closing the contacts, may be 'normally closed' type, where actuation affects breaking the circuit, or may be a changeover switch, having both types of contacts arrangements. A changeover switch may be either a 'make-before-break' or a 'break-before-make' type. The switch contacts may have one or more poles and one or more throws. Common switch contacts arrangements include Single-Pole-Single-Throw (SPST), Single-Pole-Double-Throw (SPDT), Double-Pole-Double-Throw (DPDT), Double-Pole-Single-Throw (DPST), and Single-Pole-Changeover (SPCO). A switch may be electrically or mechanically actuated.

A relay is a non-limiting example of an electrically operated switch. A relay may be a latching relay, that has two relaxed states (bi-stable), and when the current is switched off, the relay remains in its last state. This is achieved with a solenoid operating a ratchet and cam mechanism, or by having two opposing coils with an over-center spring or permanent magnet to hold the armature and contacts in position while the coil is relaxed, or with a permanent core. A relay may be an electromagnetic relay, that typically consists of a coil of wire wrapped around a soft iron core, an iron yoke which provides a low reluctance path for magnetic flux, a movable iron armature, and one or more sets of contacts. The armature is hinged to the yoke and mechanically linked to one or more sets of moving contacts. It is held in place by a spring so that when the relay is de-energized there is an air gap in the magnetic circuit. In this condition, one of the two sets of contacts in the relay pictured is closed, and the other set is open. A reed relay is a reed switch enclosed in a solenoid, and the switch has a set of contacts inside an evacuated or inert gas-filled glass tube, which protects the contacts against atmospheric corrosion.

Alternatively or in addition, a relay may be a Solid State Relay (SSR), where a solid-state based component functioning as a relay, without having any moving parts. In one example, the SSR may be controlled by an optocoupler, such as a CPC1965Y AC Solid State Relay, available from IXYS Integrated Circuits Division (Headquartered in Milpitas, Calif., U.S.A.) which is an AC Solid State Relay (SSR) using waveguide coupling with dual power SCR outputs to produce an alternative to optocoupler and Triac circuits. The switches are robust enough to provide a blocking voltage of up to 600VP, and are tightly controlled zero-cross circuitry ensures switching of AC loads without the generation of transients. The input and output circuits are optically coupled to provide 3750 Vrms of isolation and noise immunity between control and load circuits. The CPC1965Y AC Solid State Relay is described in an IXYS Integrated Circuits Division specification DS-CPC1965Y-R07 entitled: "*CPC*1965*Y AC Solid State Relay*", which is incorporated in its entirety for all purposes as if fully set forth herein. Using an optocoupler (or a combination of optocoupler and SSD) is shown as optocoupler 35c (corresponding to the switch SW1 35a) in the exemplary arrangement 60 of a PeX module 31a (corresponding to the PeX module 31) shown in FIG. 6, and using an optocoupler (or a combination of optocoupler and SSD) is shown as SSD-based optocoupler 35d (corresponding to the switch SW2 35b) in an exemplary arrangement 70 of a TeX module 32b (corresponding to the TeX module 32) shown in FIG. 7.

Alternatively or in addition, a switch may be implemented using an electrical circuit or component. For example, an open collector (or open drain) based circuit may be used. Further, an opto-isolator (a.k.a. optocoupler, photocoupler, or optical isolator) may be used to provide isolated power transfer. Further, a thyristor such as a Triode for Alternating Current (TRIAC) may be used for triggering the power. In one example, a switch such as the switch SW1 35a or the switch SW2 35b may be based on, or consists of, a TRIAC Part Number BTA06 available from SGS-Thomson Microelectronics is used, described in the data sheet "*BTA06 T/D/S/A BTB06 T/D/S/A—Sensitive Gate Triacs*" published by SGS-Thomson Microelectronics march 1995, which is incorporated in its entirety for all purposes as if fully set forth herein.

In addition, the switch unit may be based on a transistor. The transistor may be a Metal-Oxide-Semiconductor Field-Effect Transistor (MOSFET, MOS-FET, or MOS FET), commonly used for amplifying or switching electronic signals. The MOSFET transistor is a four-terminal component with source (S), gate (G), drain (D), and body (B) terminals, where the body (or substrate) of the MOSFET is often connected to the source terminal, making it a three-terminal component like other field-effect transistors. In an enhancement mode MOSFETs, a voltage drop across the oxide induces a conducting channel between the source and drain contacts via the field effect. The term "enhancement mode" refers to the increase of conductivity with an increase in oxide field that adds carriers to the channel, also referred to as the inversion layer. The channel can contain electrons (called an nMOSFET or nMOS), or holes (called a pMOSFET or pMOS), opposite in type to the substrate, so nMOS is made with a p-type substrate, and pMOS with an n-type substrate. In one example, a switch such as SW1 35a or SW2 35b may be based on an N-channel enhancement mode standard level field-effect transistor that features very low on-state resistance. Such a transistor may be based on, or consists of, TrenchMOS transistor Part Number BUK7524-55 from Philips Semiconductors, described in the Product Specifications from Philips Semiconductors "*TrenchMOS™ transistor Standard level FET BUK7524-55*" Rev 1.000 dated January 1997, which is incorporated in its entirety for all purposes as if fully set forth herein.

Figure 3A:
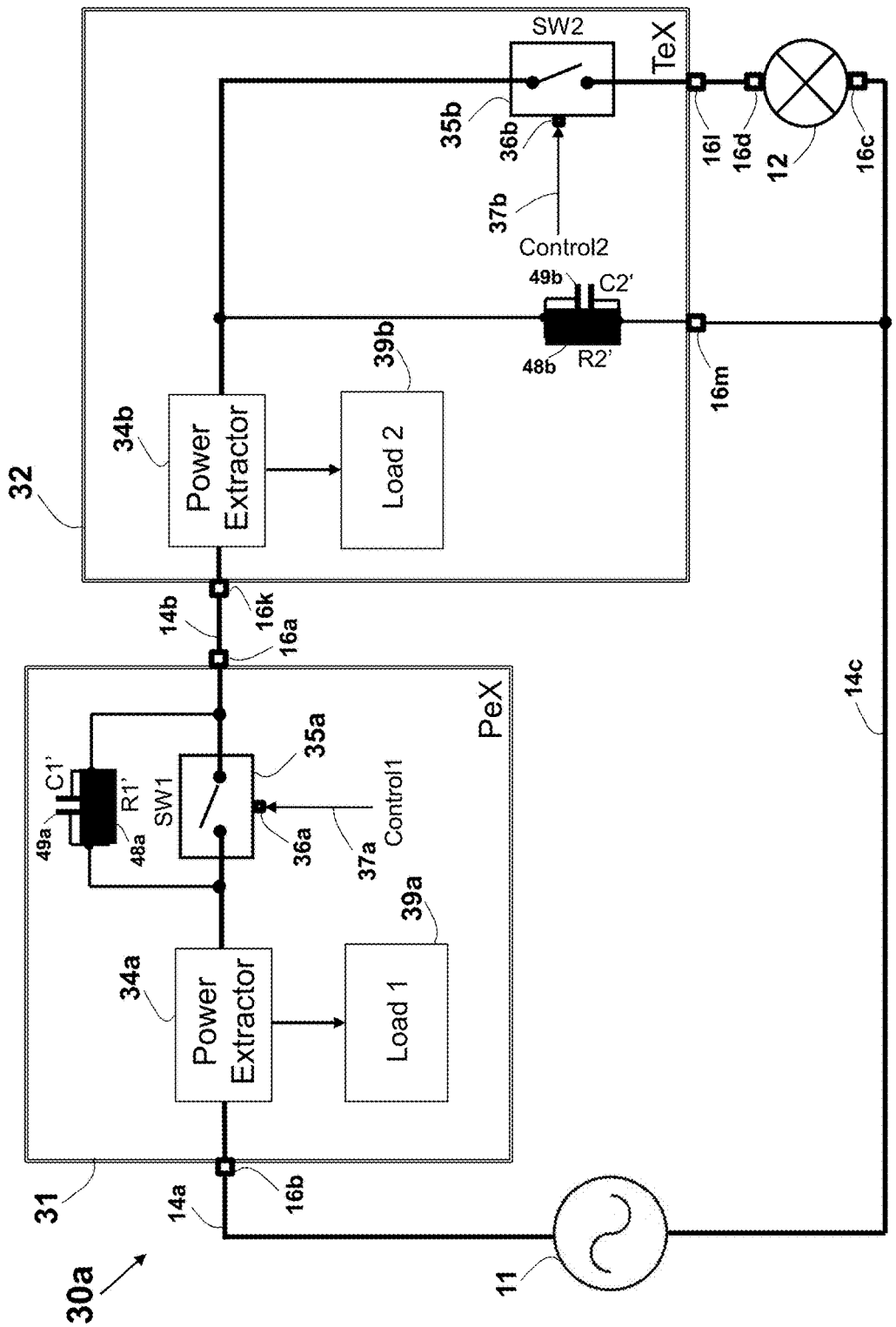
FIG. 3a illustrates a schematic electrical block diagram of a general power extraction system based on capacitors based impedances.
Figure 3B:
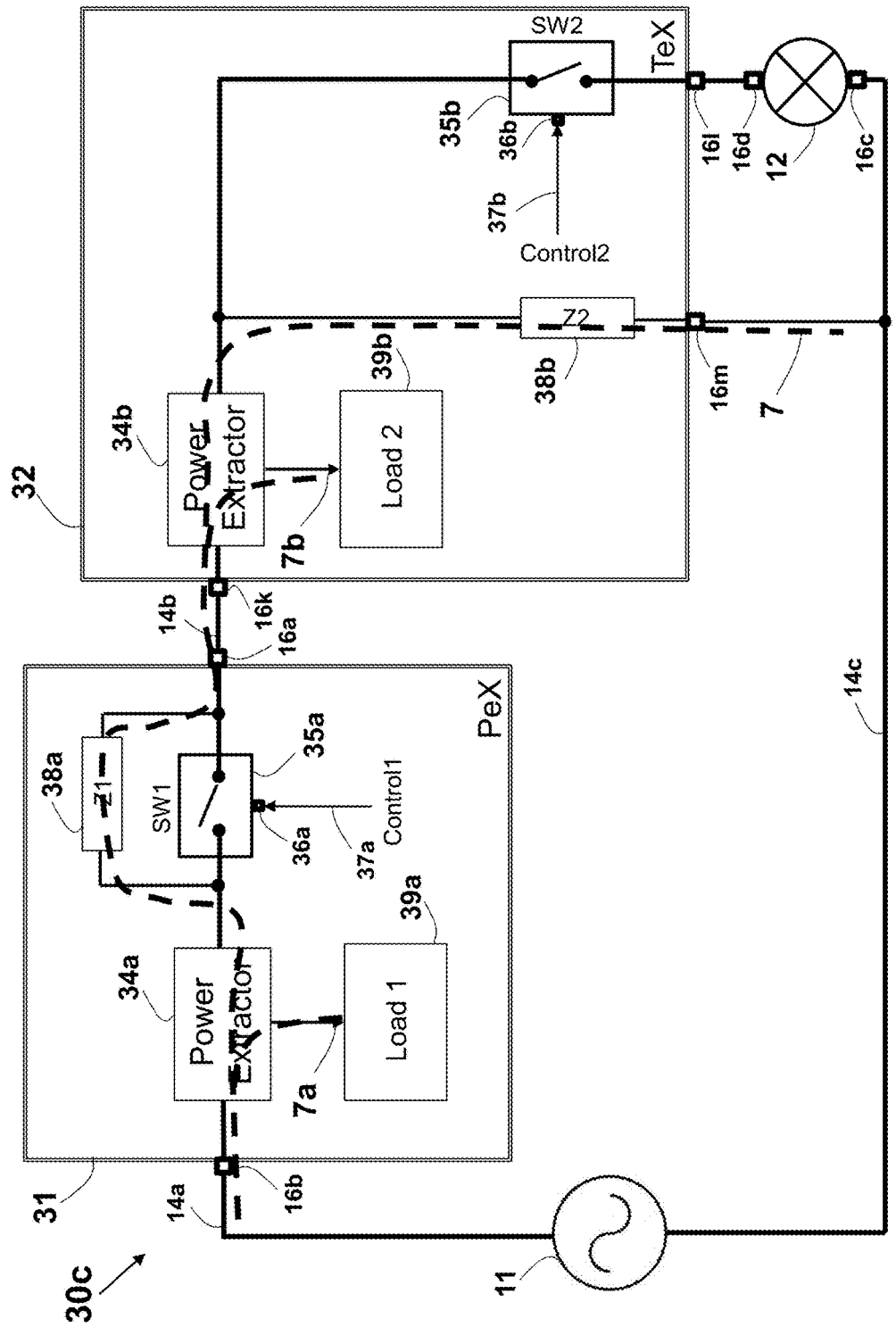
FIG. 3b illustrates schematically the power extraction related current flow in a general power extraction system in an 'off' state.
Figure 3C:
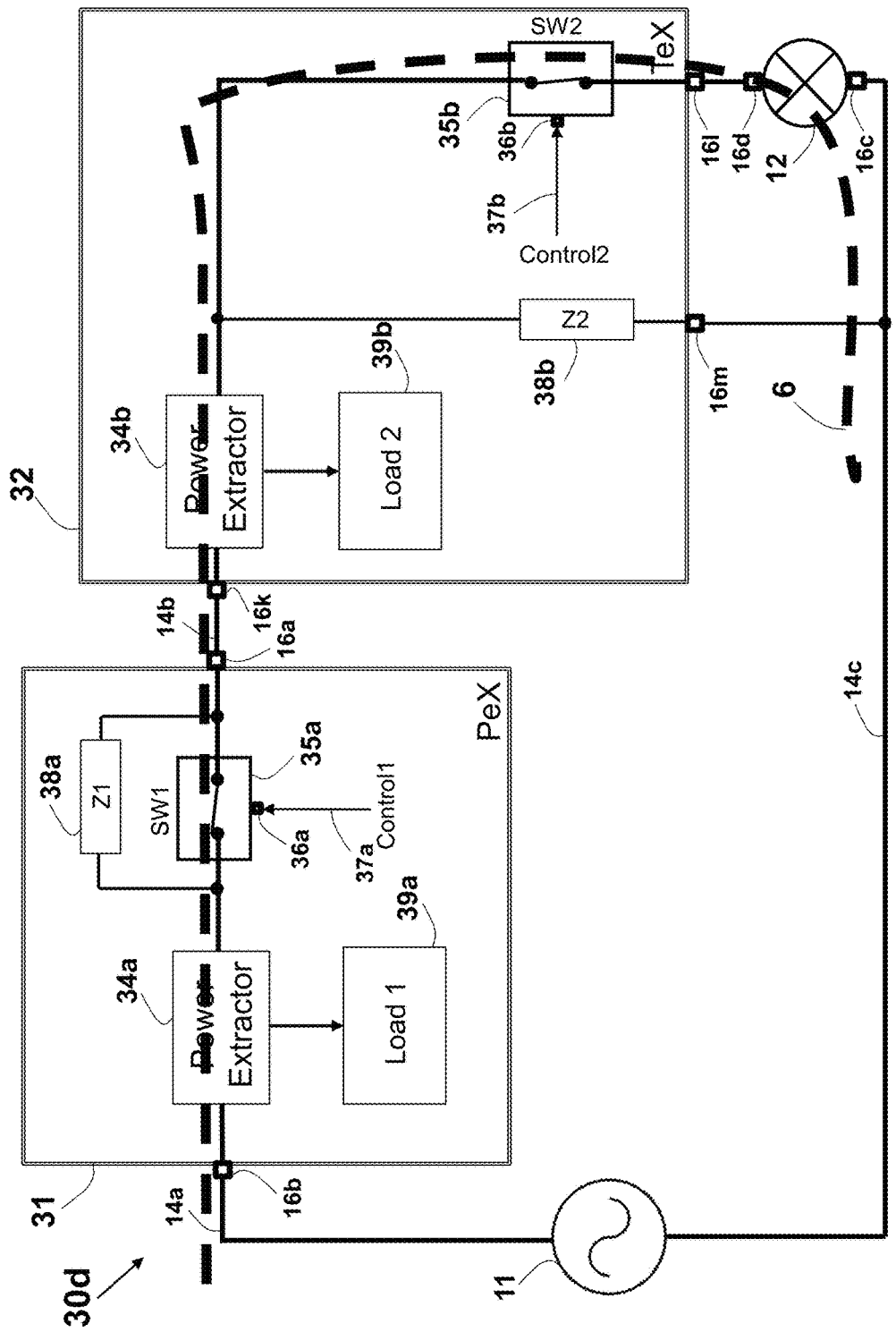
FIG. 3c illustrates schematically the major current flow in a general power extraction system in an 'on' state.

An arrangement 30d shown in FIG. 3c illustrates the load current flow in the 'on' state, where both switch SW1 35a and switch SW2 35b are in a 'closed' state, allowing an AC current (shown as a thick dashed-line 6) to flow from the AC power source 11 to the load 12. In one example, the load 12 may be a 230 W lamp and the power source may be 230 VAC, resulting in a current 6 flow of 1 A (Amper). Preferably, the current flow during the 'on' state is nearly identical to the operation of the traditional arrangement 10 shown in FIG. 1, so that the load 12 when powered or activated functions in a similar or identical way, and the changes associated with the operation of load 12 may not be apparent to a user. For example, the light intensity of a lamp 12 serving as the load 12 is substantially the same as the pre-retrofit configuration. Similarly, the AC current 6 may be at or above 500 mA (milliamper), 1 A, 1.5 A, or 2 A. Similarly, the load 12 may be rated to operate and consume AC power such as at least 50 W (Watts), 100 W, 150 W, 200 W, 250 W, 300 W, 350 W, 400 W, 450 W, or 500 W.

Alternatively or in addition, the system may support low-level power consuming loads, such as loads rated below 50 W or 10 W. For example, the load 12 may be a LED lamp, such as a 6 W Lightbulb Type LED Lamp R-B10L1 available from ROHM Co. Ltd. and described in a data sheet entitled: "*Lightbulb Type LED Lamps*" (dated May 9, 2011), which is incorporated in its entirety for all purposes as if fully set forth herein, 3 W 120 VAC 36 mm Round LED module available from Thomas Research Products of Elgin, Ill., U.S.A. described in a specifications Rev 4-9-15 entitled: "*3 W 120V AC 36 mm Round LED Module—AC LED Technology by Lynk Labs*", which is incorporated in its entirety for all purposes as if fully set forth herein, or a PLANETSAVER® LED Strip light available from DFx Technology Ltd. of Oxfordshire, U.K. described in a data sheet (downloaded May/2015) entitled: "*110 V or 230V LED Strip light*", which is incorporated in its entirety for all purposes as if fully set forth herein. In general, the load 12 may be rated to operate and consume AC power such as maximum 50 W (Watts), 20 W, 10 W, 5 W, 3 W, 1 W, 0.5 W, and the AC current 6 may be at or below 500 mA (milliamper), 100 mA, 50 mA, 20 mA, 10 mA, 5 mA, or 1 mA.

The power extractor block or circuit 34a (in the PeX module 31) and the power extractor block or circuit 34b (in the TeX module 32) are connected in series between the power source 11 and the load 12, thus transfer the high load current 6, resulting a voltage drop across the power extractor circuits 34a and 34b. Preferably, the voltage developed across each of the power extractor circuits 34a and 34b is minimal, in order to provide the maximum voltage across the load 12, as similar as possible to the closed switch 13 in the arrangement 10 (prior to using the PeX 31 and TeX 32 modules). Further, lower developed voltage results in less power to dissipate from these modules. However, the developed voltage is preferably not too small to allow sufficient extraction of power for the internal loads such as the Load1 39a (in the PeX module 31) and the Load2 39b (in the TeX module 32). For example, the voltage drop on each of the modules may be less than 3%, 5%, 7%, 10%, or 15% of the nominal voltage supplied by the AC power source 11, corresponding to a respective nominal voltage drop of less than 6.9, 11.5, 16.1, or 34.5 volts in case of a nominal supply voltage of 230 VAC, and corresponding to a respective nominal voltage drop of less than 3.45, 5.75, 8.05, or 17.25 volts in case of a nominal supply voltage of 115 VAC. For example, assuming a load current 6 of 1 A (Amper), results in a power dissipation of 3.45 W (Watts), 5.75 W, 8.05 W, or 17.25 W for a respective voltage drop of 3.45, 5.75, 8.05, or 17.25 volts, and respectively 1.725 W, 2.875 W, 4.025 W, or 8.625 W for a case of a load current 6 of 0.5 A.

In order to allow powering of the Load1 39a and the Load2 39b from the respective power extractor 34a and 34b, a low current is flowing via the system 30 even in the case of the 'off' state, where both the switch SW1 35a and switch SW2 35b are in the 'open' state, as shown in FIG. 3. Such current flow is obtained by connecting an impedance Z1 38a across the switch part of the controlled switch SW1 35a, and by connecting an impedance Z2 38b in parallel to the series connection of the load 12 and the switch part of the controlled switch SW2 35b, so that a current may flow via the impedance Z2 38b without flowing via the load 12 or the switch SW2 35b (such as when the switch SW2 35b is in 'open' state or the load 12 is not connected). The impedance Z1 38a and the impedance Z2 38b may have the same nominal value, or may be associated with different and distinct impedance values. Thus an 'off' current flow from the power source 11 is obtained via the serially connected power extractor 34a, the impedance Z1 38a, the power extractor 34b, and the impedance Z2 38b, the current flow is shown as a dashed line 7 in arrangement 30c in FIG. 3b. The current consumed by the Load 1 39a is illustrated as a dashed line 7a, and the current consumed by the Load 2 39b is illustrated as a dashed line 7b. Preferably, each of the impedances Z1 38a and Z2 38b exhibits substantially a reactance (the imaginary part of complex impedance), and is associated with minimum or none resistance (the imaginary part of complex impedance) value, such as may be obtained by using capacitors or inductors, the power dissipated by these components is minimal or negligible, allowing the use of smaller size components, and requiring to dissipate minimum heat from the respective enclosures.

As described in the arrangement 30c in FIG. 3b, in the system 'off' state no current is flowing through the load 12 since the switch SW2 35b is in the 'open' state and thus not conductive. Hence, the functionality of the traditional arrangement 10 shown in FIG. 1 relating to no power that is flowing via, or consumed by, the load 12 in the 'off' state until the switch 13 is operated to shift the system to 'on' state, is retained.

Figure 3D:
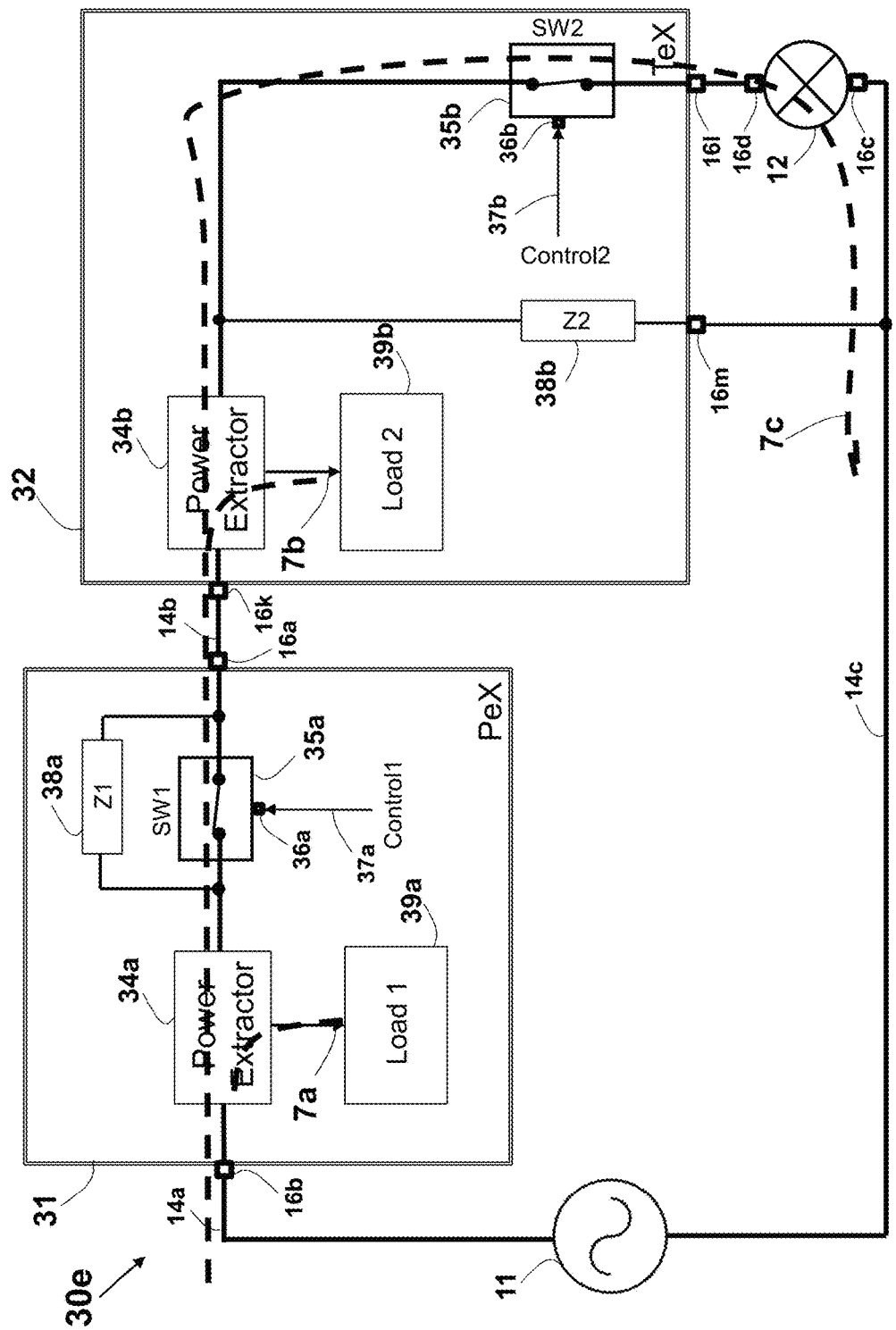
FIG. 3d illustrates schematically the power extraction related current flow in a general power extraction system in an 'on' state.
Figure 3E:
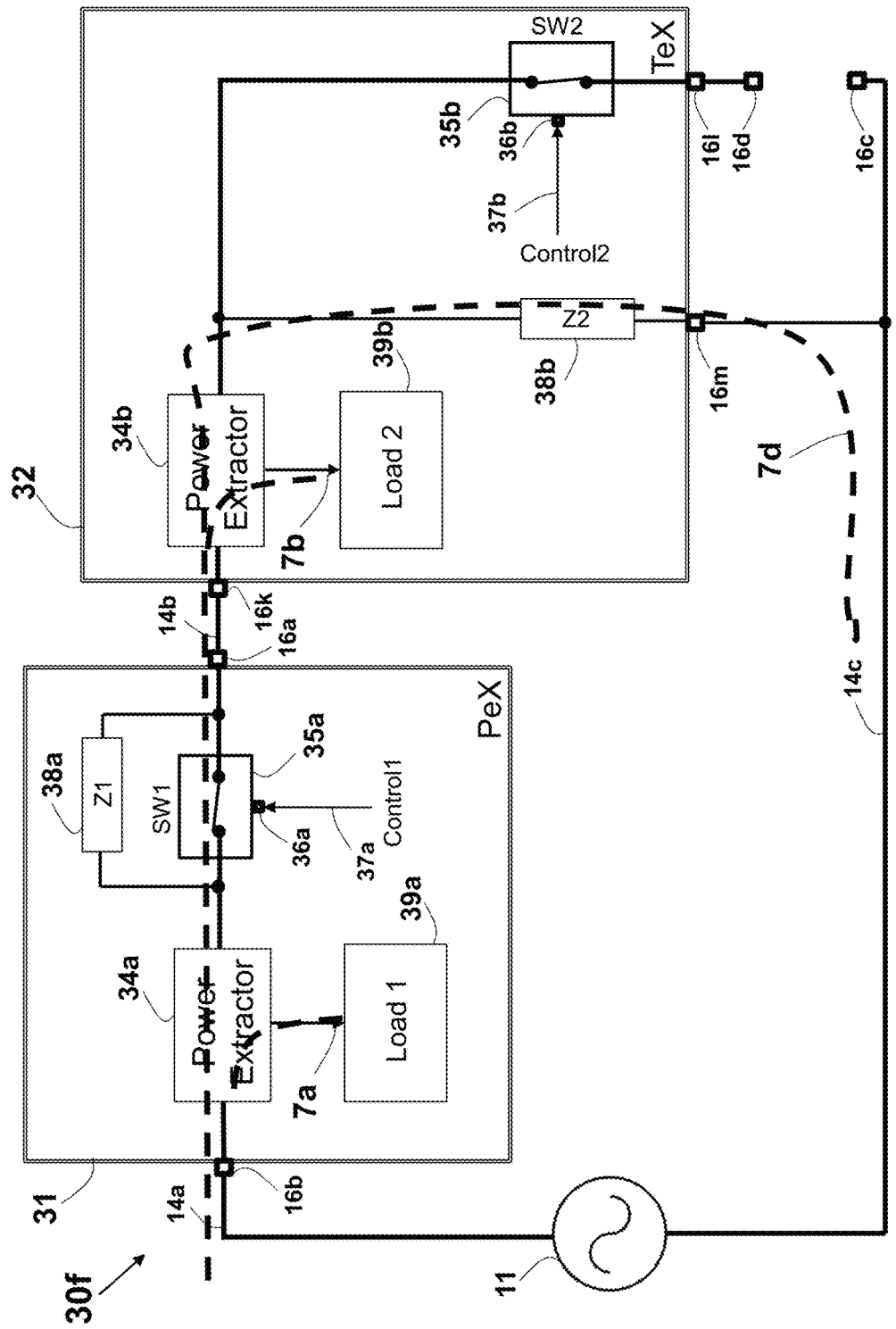
FIG. 3e illustrates schematically the power extraction related current flow in a general power extraction system in an 'on' state with no load.

The powering of the Load1 39a and the Load2 39b from the respective power extractor 34a and 34b continues even in the case of the 'on' state, where both the switch SW1 35a and switch SW2 35b are in the 'closed' state, as illustrated in an arrangement 30e shown in FIG. 3d. In general, the load current (shown as a dashed line 7c) is flowing with the load current 6 shown in the arrangement 30d in FIG. 3c. Since the impedances Z1 38a and Z2 38b are effectively shorted due to the low impedance (or developed low voltage) of the switching part of the controlled switch SW1 35a, no current effectively flow through the impedance Z1 38a. The current flowing through the controlled switch SW2 35b is substantially the same as the 'off' state AC current 7. The 'on' state current via the load 12 may be calculated as Ion=(Vsupply−V1drop−V2drop)/(ZL), where the load 12 impedance is ZL. In the above example where Vsupply=230V, V1drop=10V, V2drop=5V, and, the 'on' state current may be calculated to be Ion=(230V−10V−5V)/(ZL)=215V/ZL, regardless of the impedances Z1 38a and Z2 38b values. Practically, the Ion is substantially higher than the current 7a consumed by the Load1 39*a* or the current 7*b* consumed by the Load2 39*b*. In one example, the load 12 may not be connected, or may be not power consuming due to being faulty. For example, the load 12 may be an incandescent light bulb, incandescent lamp or incandescent light globe that produces light with a wire filament heated to a high temperature by an electric current passing through it, until it glows. The hot filament is protected from oxidation with a glass or quartz bulb that is filled with inert gas or evacuated. In a halogen lamp, filament evaporation is prevented by a chemical process that redeposits metal vapor onto the filament, extending its life. In the case of using an incandescent light bulb, the wire filament may be broken, thus disconnected for any current flow. Such a case where no load 12 is connected (or is connected but is faulty) is shown as an arrangement 30*f* in FIG. 3*e*, where the current 7*d* in the 'on' state is flowing through impedance Z2 38*b* in the TeX module 32, thus allowing power extraction in both modules.

Each of the impedances Z1 38*a* and Z2 38*b* may consists of, or may be based on, passive or active components, and may consist of a single component or a circuit comprising connected multiple components (that may be passive, active, or both). In one example, a single two terminal component is used. A passive component may be either a component that consumes (but does not produce) electrical power, or a component that is incapable of electrical power gain. In case of a two-terminal single passive component, each of the impedances Z1 38*a* and Z2 38*b* (or both) may be a resistor, a capacitor, or an inductor, all having two terminals. Alternatively or in addition, each of these impedances may be a combination of one or more resistors, one or more capacitors, and/or one or more inductors. For example, each of these impedances may be a single component, such as a capacitor, a resistor, or an inductor. Alternatively or in addition, two components are used (connected in parallel or in series) a resistor and a capacitor (connected in series, or preferably connected in parallel), a resistor and an inductor (connected in parallel, or preferably connected in series), or a capacitor and an inductor (connected in parallel or in series). Alternatively or in addition, any number or passive components may be used, connected in any connection scheme or topology. Further, a combination of passive and active components may be used. Preferably, the components are selected to allow the required heat dissipation (particularly during the 'off' state) yet having a small physical size or being a low cost component. For example, each of the impedances Z1 38*a* and Z2 38*b* (or both) may be a pure (or substantially pure) reactance, and having a low (or zero) pure resistance, such as a high-Q capacitor or inductor, so that the losses due to the resistance (converted into dissipated heat) are minimal.

In one example, one or each of the impedances Z1 38*a* and Z2 38*b* consists of, using, or is based on, a capacitor. The impedances may be using capacitors that may be identical, having the same value, material, and structure, or may be different having distinct values, materials, or structures. A capacitor (originally known as a condenser) is a passive two-terminal electrical component used to store energy electrostatically in an electric field. The typical forms of practical capacitors contain at least two electrical conductors (plates) separated by a dielectric (i.e. insulator). The conductors can be thin films, foils or sintered beads of metal or conductive electrolyte. The non-conducting dielectric acts to increase the capacitor charge capacity, and the dielectric can be glass, ceramic, plastic film, air, vacuum, paper, mica, or oxide layer. An ideal capacitor does not dissipate energy, but instead, a capacitor stores energy in the form of an electrostatic field between its plates.

In an AC environment, the capacitor used for impedances Z1 38*a* or Z2 38*b* is preferably not a polarized capacitor, such as an electrolytic capacitor or tantalum capacitor. In a DC environment, such as when the AC power source 11 is replaced with a DC power source, a polarized capacitor may be used. An electrolytic capacitor is a capacitor that uses an electrolyte (an ionic conducting liquid) as one of its plates to achieve a larger capacitance per unit volume than other types. The large capacitance of electrolytic capacitors makes them particularly suitable for passing or bypassing low-frequency signals and storing large amounts of energy. A tantalum capacitor is a type of electrolytic capacitor, a component of electronic circuits. It typically consists of a pallet of tantalum metal as an anode, covered by an insulating oxide layer that forms the dielectric, surrounded by conductive material as a cathode. The tantalum capacitor distinguishes itself from other capacitors in having a high capacitance per volume and weight. Tantalum capacitors have lower equivalent series resistance (ESR), lower leakage, and higher operating temperature than other electrolytic capacitors.

In one example shown as an arrangement 30*a* in FIG. 3*a*, the impedance Z1 38*a* is implemented by a capacitor C1' 49*a*, and the impedance Z2 38*b* is implemented by a capacitor C2' 49*b*, and the Ioff current 7 is flowing through these capacitors. A resistor R1' 48*a* may be connected in parallel to the capacitor C1' 49*a* and a resistor R2' 48*b* may be connected in parallel to the capacitor C2' 49*b*, in order to support a capacitors discharge route and in order to allow for limited voltage drop across the capacitors on startup and intermediary situations. In one example, the C1' 49*a* capacitor in the PeX module 31 may be a 4.7 µF (microfarad), shown as a capacitor C2 63*b* in the PeX module 31*a*, which is an example of a PeX module 31, and the C2' 49*b* capacitor in the TeX module 32 may also be a 4.7 µF (microfarad), shown as a capacitor C3 63*c* in the TeX module 32*b*, which is an example of a TeX module 32. It is noted that non identical capacitance values may equally be used. Such a capacitor of 4.7 µF exhibit reactance of 677Ω in 50 Hz and 564Ω in 60 Hz, hence for two such capacitors connected in series, the effective reactance is 1354Ω in 50 Hz and 1128Ω in 60 Hz. Each of the capacitors C2 63*b* and C3 63*c* may consist of, or may be based on, a DC film capacitor. MKT Radial Potted type available from Vishay BCcomponents, that may be according to Vishay Intertechnology, Inc. Document Number 28193 Revision: 21-November-12 entitled: "*DC Film Capacitors MKT Radial Potted Type*", which is incorporated in its entirety for all purposes as if fully set forth herein.

Figure 4:
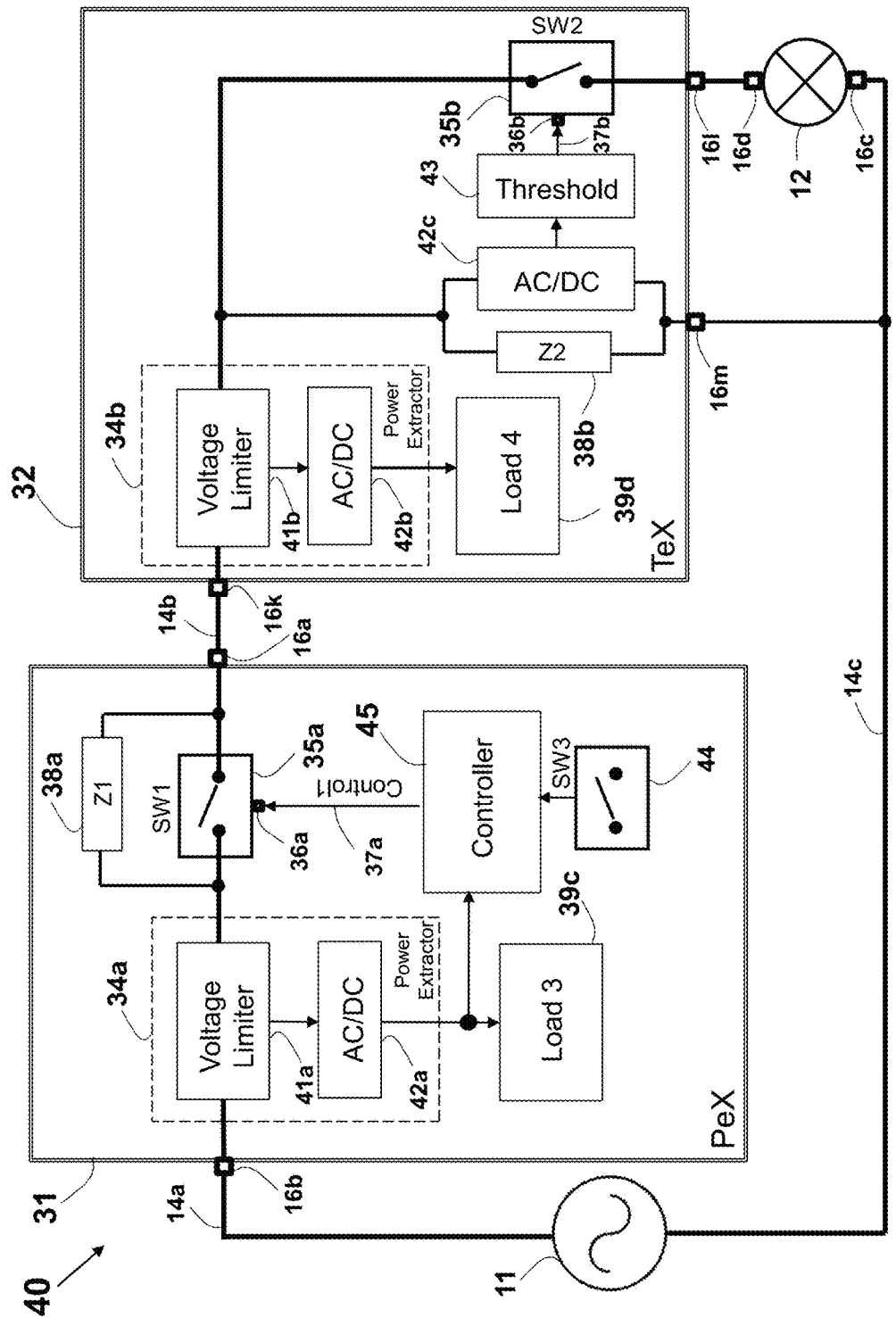
FIG. 4 illustrates an exemplary schematic electrical block diagram of a general power extraction system using controlled switches and impedances connected across the switches.

A detailed block diagram of the power extractor 34*a* is shown as part of an arrangement 40 in FIG. 4. The power extractor 34*a* serves to provide a low DC power to power the Load1 39*a*, while minimally interfering with the traditional operation of powering the load 12 from the AC power source 11. The power extractor 34*a* may typically include a voltage limited block 41*a*, and an AC/DC power supply 42*a*. The voltage limiter 41*a* functions to limit the voltage drop over its terminals in the 'off' state where the lamp 12 is 'off' and only low current 7 is flowing in the system, as well as in the 'on' state where the load 12 in 'on' and is fully powered from the AC power source 11 and high current 6 is flowing via the voltage limiter 41*a*. While the voltage across the voltage limiter 41*a* terminals is relatively low in order not to dissipate too much power and not to interfere with the load 12 normal or nominal operating voltage level, the voltage drop should suffice for extracting the required power to power the load 3 39*c*, corresponding to the Load1 39*a*.

Typically electronic circuits (such as digital logic circuits), such as those forming the Load 3 39*c* and a Controller 45 in the PeX module 31 require a low DC voltage for operation, such as 5 VDC or 3.3 VDC. The required DC voltage is provided by an AC/DC power supply block 42*a* shown in FIG. 4 as part of an electronic schematic diagram 40. The DC power supply block 42*a* provides an unregulated, or preferably regulated, DC voltage designated as Vc (for example 5 VDC or 3.3 VDC). Any conventional AC/DC circuit may be used for converting the voltage developed over the voltage limiter 41*a* to a regulated and stabilized DC power. The AC/DC converter 42*a* is used for converting the AC voltage developed on the voltage limiter 41*a* terminals into the required low-level stabilized DC voltage or voltages, commonly suitable for power the digital circuits, such as 3.3 VDC, 5 VDC, or 12 VDC. Power supplies commonly include voltage stabilizers for ensuring that the output remains within certain limits under various load conditions, and typically employ a silicon diode bridge rectifier, reservoir capacitor, and voltage regulator IC. Switched mode regulator supplies may also typically include an inductor. The converter 42*a* may include a boost converter, such as a buck boost converter, charge pump, inverter, and regulators as known in the art, as required for conversion of one form of electrical power to another desired form and voltage.

In order to power a Load 4 39*d* (corresponding to the Load2 39*b* above) in the TeX module 32, the power extractor 34*b* is used. Similar to the power extractor 34*a* of the PeX module 31, the power extractor 34*b* may consist of, or include, a voltage limiter 41*b* and an AC/DC converter or power supply 42*b*. The voltage limiter 41*b* may be identical, similar, or different from the voltage limiter 41*a* of the power extractor 34*a*. Further, the AC/DC power supply 42*b* may be identical, similar, or different from the AC/DC power supply 42*a* of the power extractor 34*a*.

Figure 6:
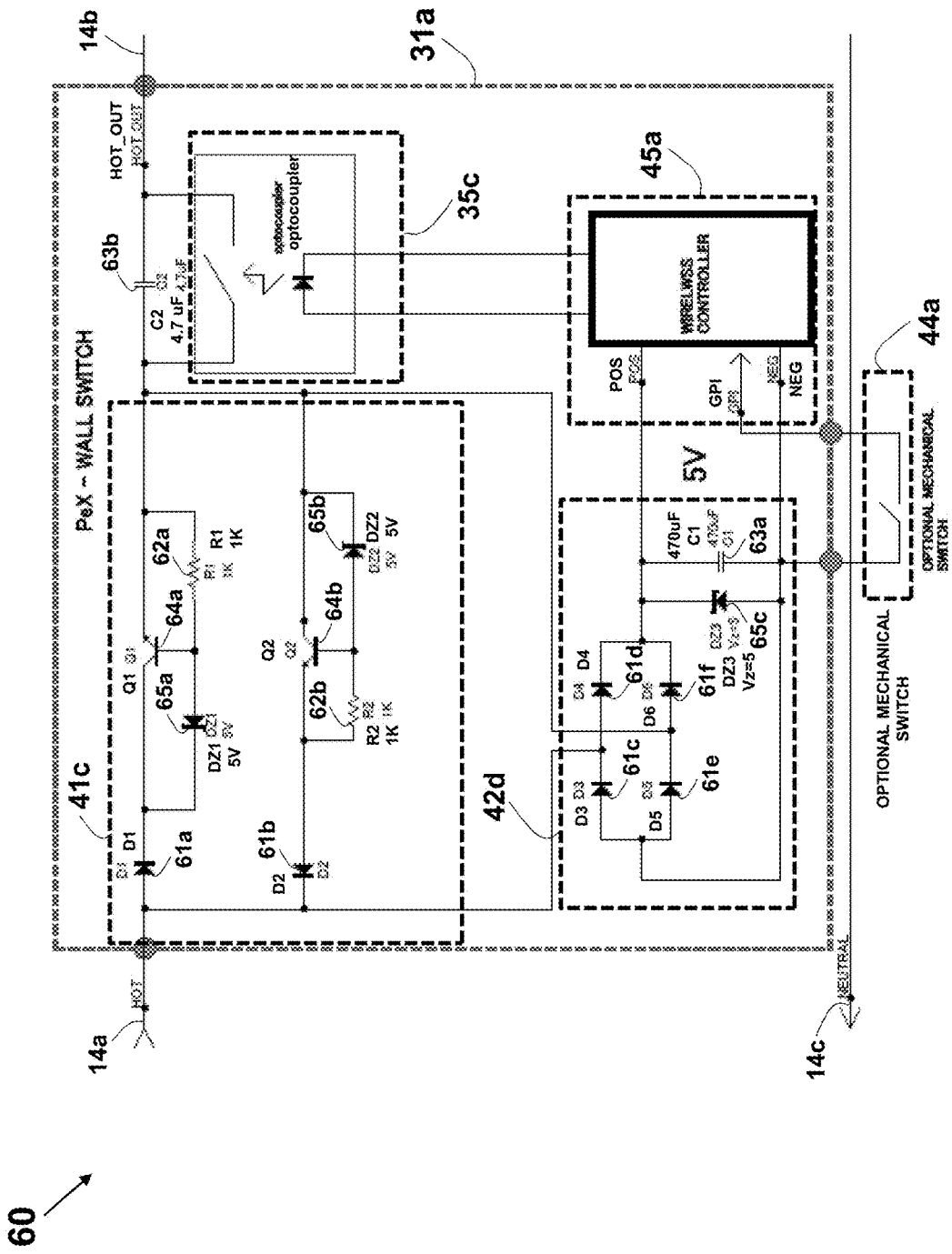
FIG. 6 illustrates a detailed exemplary schematic electrical block diagram of a switch-side module.

An exemplary implementation of the voltage limiter 41*a* is shown as a voltage limiter 41*c* as part of an exemplary PeX module 60 shown in FIG. 6. Limiting the voltage is performed by two circuits, each handling half-cycle of the AC power signal. During the positive half-cycle of the AC power signal from the AC power source 11, referring to the time where the voltage on the hot line 14*a* is higher than the neutral line 14*c*, the voltage is limited by a circuit including a diode D1 61*a* connected to a collector of the transistor Q1 64*a*, which emitter is connected to the capacitor C2 63*b*. A resistor R1 62*a* is connected between a base and the emitter of the transistor Q1 64*a*, and a Zener diode DZ1 65*a* is connected between the collector and the base of the transistor Q1 64*a*. Assuming the forward voltage drop on the diode D1 61*a* and the base-emitted forward voltage on the transistor Q1 64*a* are both about 0.7 V, and using a Zener diode DZ1 65*a* having a VZ voltage of 5V, the total voltage drop on the voltage limiter 41*c* may be calculated to be limited to a maximum of 5+0.7+0.7=6.4 VDC, during the positive half-cycle. During the negative half-cycle of the AC power signal from the AC power source 11, referring to the time where the voltage on the hot line 14*a* is lower than the neutral line 14*c*, the voltage is limited by a circuit including a diode D2 61*b* connected to an emitter of the transistor Q2 64*b*, which collector is connected to the capacitor C2 63*b*. A resistor R2 62*b* is connected between a base and the collector of the transistor Q2 64*b*, and a Zener diode DZ2 65*b* is connected between the collector and the base of the transistor Q2 64*b*. Similar to the above, the total voltage drop on the voltage limiter 41*c* during the negative half-cycle is limited to only 6.4 VDC. Hence, regardless of the current flowing through the voltage limiter 41*c*, the voltage drop is limited to +/−6.4 Volts. Assuming that the current in the 'on' state is 1 A, the power dissipated by a power extractor such as the power extractor 34*a* (including the respective load such as Load 1 39*a*) is less than 6.4V*1 A=6.4 Watts.

Each of the diodes D1 61*a* and D2 61*b* may be, or may be based on, 1N4004 type, that may be according to Diodes Incorporated© data sheet DS28002 Rev. 8-2 entitled: "1*N*4001-1*N*4007 1.0*A Rectifier*", which is incorporated in its entirety for all purposes as if fully set forth herein. Each of the Zener diodes DZ1 65*a*, DZ2 65*b*, and DZ3 65*c* may be, or may be based on, 1N5235BTR type, that may be according to Fairchild Semiconductor Corporation© data sheet 1N5221B-1N5263B Rev. 1.2.0 entitled: "1*N*5221*B*-1*N*5263*B Zener Diodes*", which is incorporated in its entirety for all purposes as if fully set forth herein. Each of the transistors Q1 64*a* and Q2 64*b* may be, or may be based on, 300V NPN Medium Power Transistor, that may be FZT857 type according to Diodes Incorporated© Document Number DS33177 Rev. 8-2 entitled: "*ZETEX FTZ857 300V NPN MEDIUM POWER TRANSISTOR IN SOT223*", which is incorporated in its entirety for all purposes as if fully set forth herein.

An exemplary implementation of the AC/DC power supply 41*a* is shown as an AC/DC converter 41*d* as part of an exemplary PeX module 60 shown in FIG. 6. The AC voltage across the voltage limiter 41*c* is rectified using a diode bridge consisting of a diode D3 61*c*, diode D4 61*d*, diode D5 61*e*, and diode D6 61*f*, connected to rectify the AC power signal as known in the art. A DC output-rectified voltage is further stabilized by a Zener diode DZ3 65*c* (for filtering voltage spikes and avoiding over-voltage and transients) and a capacitor C1 63*a* used for better regulation and ripple filtering. In the example shown in the arrangement 60, a regulated and stabilized 5 VDC is output from the AC/DC converter 42*d*, feeding a wireless controller 45*a* that corresponds to the controller 45 in the PeX module 31 shown in FIG. 4.

Each of the diodes D3 61*c*, D4 61*d*, D5 61*e*, and D6 61*f* may be of the 1N4004 type. Alternatively, the diode bridge consisting of the diodes D3 61*c*, D4 61*d*, D5 61*e*, and D6 61*f*, may be, or may be based on, 1.0 A Glass Passivated diode bridge rectifier such as a DF04M type, that may be according to Diodes Incorporated© Document Number DS21201 Rev. 15-2 entitled: "*DF005M-DF10M 1.0A GLASS PASSIVATED BRIDGE RECTIFIERS*", which is incorporated in its entirety for all purposes as if fully set forth herein.

The capacitor C1 63*a* may be a polarized capacitor, such as an electrolytic capacitor or tantalum capacitor. An electrolytic capacitor is a capacitor that uses an electrolyte (an ionic conducting liquid) as one of its plates to achieve a larger capacitance per unit volume than other types. The large capacitance of electrolytic capacitors makes them particularly suitable for passing or bypassing low-frequency signals and storing large amounts of energy. A tantalum capacitor is a type of electrolytic capacitor, a component of electronic circuits. It typically consists of a pallet of tantalum metal as an anode, covered by an insulating oxide layer that forms the dielectric, surrounded by conductive material as a cathode. The tantalum capacitor distinguishes itself from other capacitors in having a high capacitance per volume and weight. Tantalum capacitors have lower equivalent series resistance (ESR), lower leakage, and higher operating temperature than other electrolytic capacitors. In one example, the capacitor C1 63a is a tantalum capacitor having a value of 100 or 470 microfarad (µF).

A detailed block diagram of the TeX module 32 is shown as part of the arrangement 40 in FIG. 4, where the power extractor 34b is included in the TeX module 32, for powering the internal Load4 39d, corresponding to the Load2 39b. In some scenarios, no additional power consuming circuits are required or used in the location of the load 12, and thus there is no need for power extraction in that location. Such an arrangement 40a is shown in FIG. 4a, where a TeX module 32a is used (replacing the TeX module 32 shown in arrangement 40), where no power extractor functionality (such as the power extractor 34b) and no load4 39d are available.

Figure 4A:
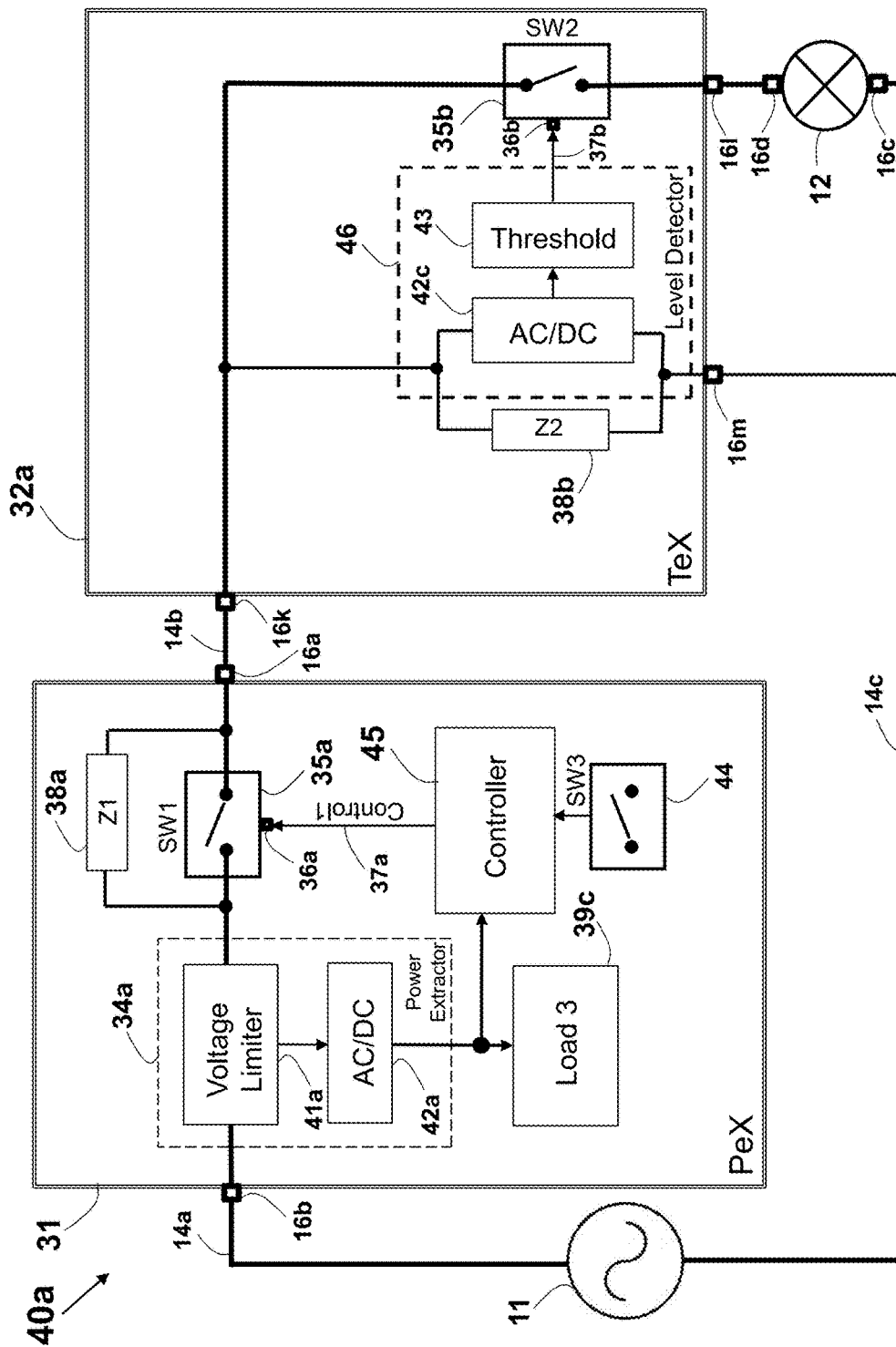
FIG. 4a illustrates an exemplary schematic electrical block diagram of a general power extraction system using a switch-side only power extraction and level detection.

The AC/DC converter 42c and the threshold detector 43 in the arrangement 40a shown in FIG. 4a cooperatively form a level detector 46, which serves to sense the voltage level across the impedance Z2 38b, and accordingly controlling the load 12 using the switching of the switch SW2 35b, by providing a control signal over connection 37b to the switch SW2 35b control port 36b. Other level detection mechanisms may be used to form or implement the level detector 46, as known in the art. Alternatively or in addition to level detection, an edge detection may be used in the 46a may be used in the TeX module 32d, and the control signal from the PeX module 31 involves abrupt voltage change that is sensed in the TeX module 32d. An example of such an edge detection is shown as an arrangement 40b in FIG. 4b. The level detector 46 is replaced with (or added to) an edge detector 46a. In this example, the edge detector 46a comprises a High Pass Filter (HPF) 47 that connects in parallel to the impedance Z2 38b. A HPF is a circuit or component that passes signals with a frequency higher than a certain cutoff frequency and attenuates signals with frequencies lower than the cutoff frequency, where the amount of attenuation for each frequency depends on the filter design. A HPF may be a simple first-order electronic high-pass filter that typically includes a series combination of a capacitor and a resistor and using the voltage across the resistor as an output. Alternatively or in addition, the HPF may use an active electronic implementation of a first-order high-pass filter by using an operational amplifier. In the example shown in the arrangement 40b, the HPF 47 exhibits a substantially high impedance to the AC voltage signal having a relatively low frequency (such as 50 Hz or 60 Hz), while passing substantially higher frequencies, which are produced due to the abrupt voltage change over the impedance Z2 38b, due to the switching operation of the switch SW1 35a. The resulted HPF 47 output is compared to a voltage level threshold (Vref) by a comparator 48 circuit or component, and the output is used to control the switch SW2 35b via the output port 37b. For example, the comparator 48, the switch SW2 35b are of toggle latched type, such that the switch SW2 35b changes its state upon sensing a signal (resulting from the edge sensed) from the HPF 47. Alternatively or in addition, a toggled latch mechanism may be added between the comparator 48 and the control port 37b. Other edge detection schemes may be used as known in the art. In the arrangement 40b, the switch SW1 35a is controlled via the control port 36a by the controller 45 to normally be in a closed state, and upon locally or remotely sensing a user control, such as by the switch SW3 44, momentarily open the switch SW1 contacts, causing an abrupt change in the voltage level developed over the impedance Z2 38b from the AC voltage level supplied by the AC source 11, to a lower voltage formed over the impedance Z2 38b through a voltage divider formed by the impedance Z1 38a and the impedance Z2 38b. This voltage change is sensed by the edge detector 46a and used to control the switch SW2 35b for switching power to the load 12. In such a scheme, the momentary activating the switch SW1 35a may be used to toggle the TeX module 32d state, between 'ON' and 'OFF' states. For example, the switch SW1 35a may be controlled to be in an 'open' state for a short time such as a time period of 10, 50, 100, 200, 300 or 500 microseconds, or for a time period of 1, 2, 5, 10, 50, 100, 200, 300, or 500 milliseconds. The edge detector 46a may comprise a latch mechanism to lock the switch SW2 35b state until the next edge is sensed and the state is toggled.

Figure 4B:
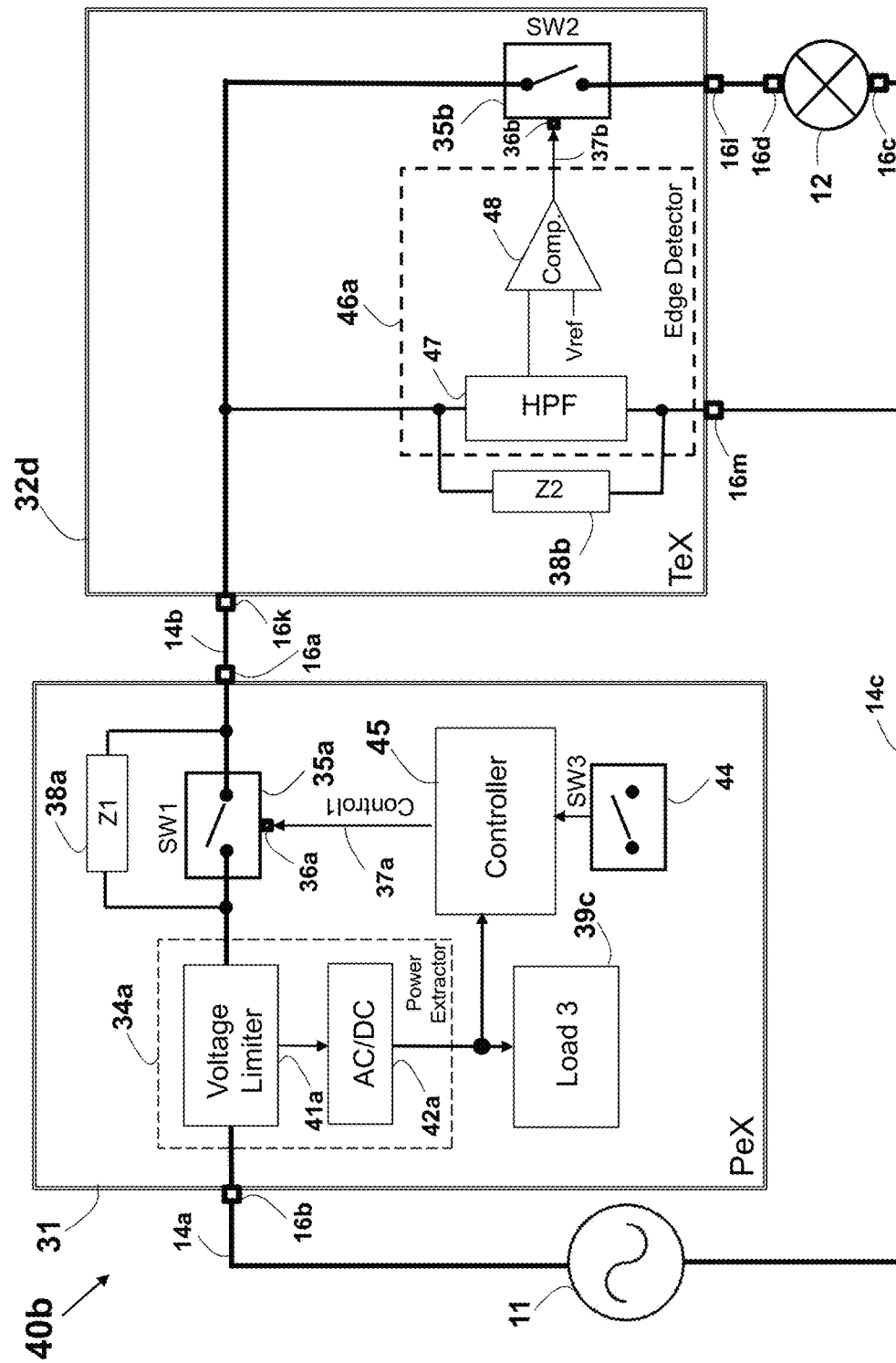
FIG. 4b illustrates an exemplary schematic electrical block diagram of a general power extraction system using a switch-side only power extraction and edge detection.
Figure 4C:
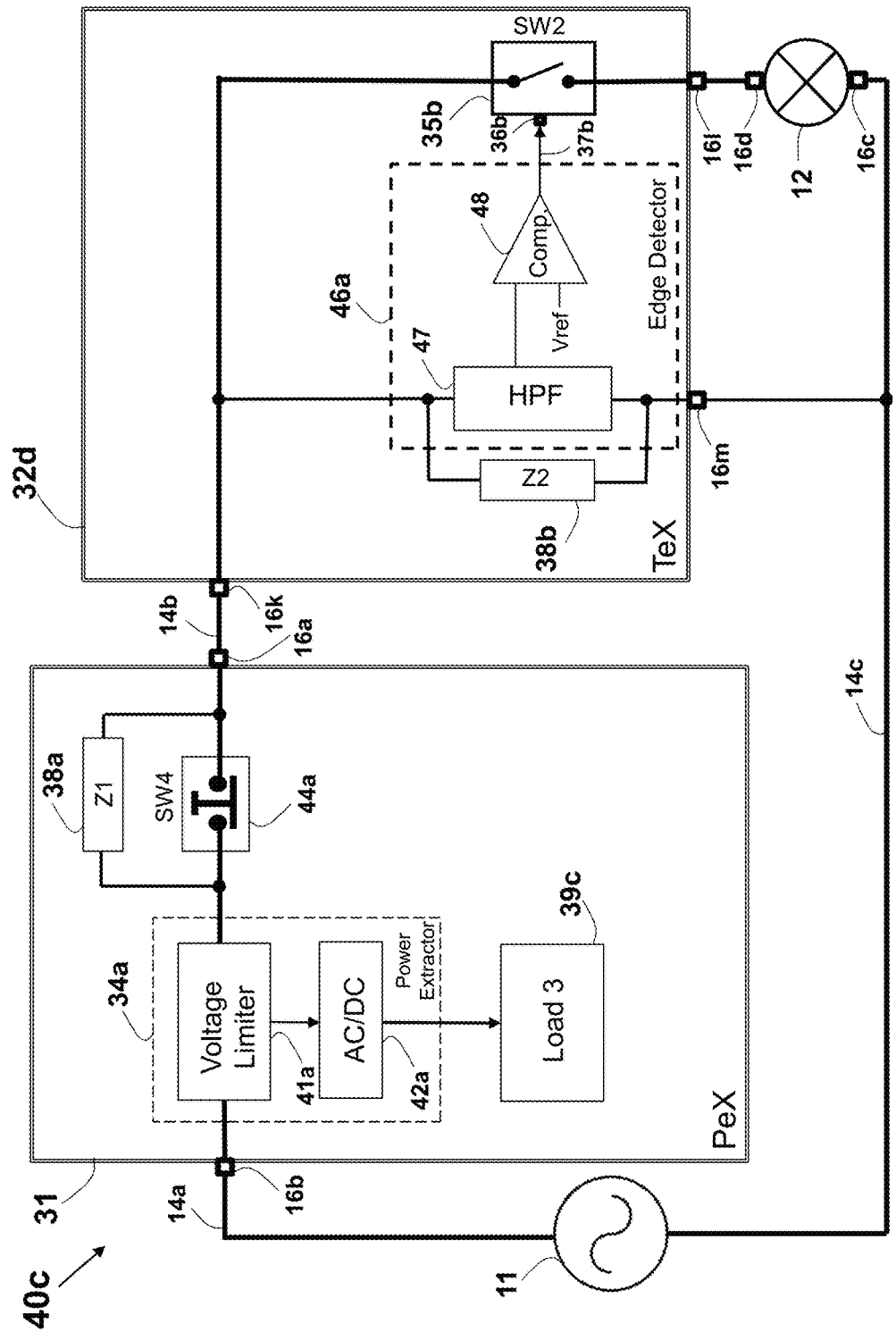
FIG. 4c illustrates an exemplary schematic electrical block diagram of a general power extraction system using a switch-side only power extraction and edge detection and a push-button control.

Alternatively or in addition, the load 12 controlled is using a local mechanical control by mechanically activating a switch by a human user. Such an arrangement 40c is shown in FIG. 4c, where the electrically controlled switch SW1 35a is substituted with a push-button switch SW4 44a as part of the PeX module 31c. A push-button switch (also known as pushbutton or any other momentary switch type), or simply button is a simple switch mechanism, having usually a flat or shaped surface to accommodate the human finger or hand, so as to be easily depressed or pushed. Some buttons require a spring to return to their un-pushed state. The push-button switch SW4 44a used is typically a normally closed type, and when operated switches to an 'open' state for a short time such as a time period of 10, 50, 100, 200, 300 or 500 microseconds, or for a time period of 1, 2, 5, 10, 50, 100, 200, 300 or 500 milliseconds. Further, the impedance Z1 38a may be omitted as shown in an arrangement 40d shown in FIG. 4d. In such configuration, the momentary 'open' state of the push-button switch may cause a momentary abruption in the current flowing the power extractor 34a. An energy storing component such as a capacitor or a battery may be used (such as a part of the power extractor 34a) to provide the required electrical power during the current abruption time period, allowing the system to continue to be fully operative and not to be affected by the current abruption. Similarly, the impedance Z1 38a may be omitted in the arrangement 40b, as shown in the arrangement 40e shown in FIG. 4e.

Figure 7:
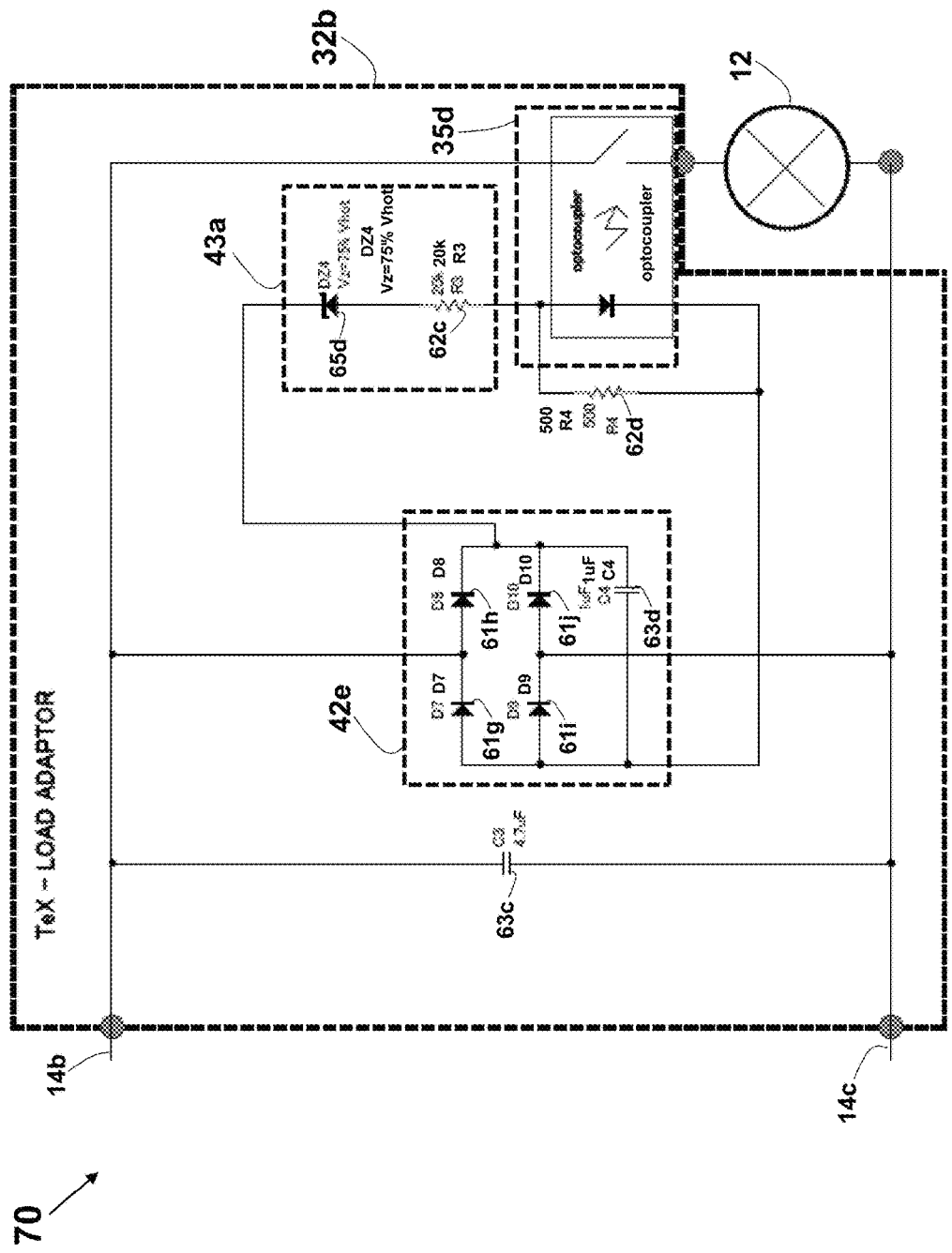
FIG. 7 illustrates a detailed exemplary schematic electrical block diagram of a load-side module.

The Tex module 32 includes an AC/DC converter 42c in parallel to the impedance Z1 38b, for converting the AC voltage developed across the impedance Z1 38b to a DC voltage. The AC/DC converter 42c may be identical to, similar to, or different from the AC/DC converter 42a of the PeX module 31 or the AC/DC converter 42b of the TeX module 32. A detailed block diagram 70 of the TeX module 32b is shown in FIG. 7, including an exemplary AC/DC converter 42e, using a diode bridge consisting of a diode D7 61g, diode D8 61h, diode D9 61i, and diode D10 61j, connected to rectify the AC power signal as known in the art. Each of the diodes D7 61g, D8 61h, D9 61i, and D10 61j may be of the 1N4004 type. Alternatively, the diode bridge consisting of the diodes D7 61g, D8 61h, D9 61i, and D10 61j, may be, or may be based on, 1.0 A Glass Passivated diode bridge rectifier such as a DF04M type, that may be according to Diodes Incorporated© Document Number DS21201 Rev. 15-2 entitled: "*DF005M-DF10M 1.0A GLASS PASSIVATED BRIDGE RECTIFIERS*", which is incorporated in its entirety for all purposes as if fully set forth herein. A capacitor C4 63d is connected across the DC output of the diode bridge to further rectify and stabilize the output DC voltage. In one example, the capacitor C4 63d is a film or tantalum capacitor having a value of 1 or 4.7 microfarad (µF).

In the 'off' state, where both the switch SW1 35a and the switch SW2 35b are in 'open' state, the voltage across the impedance Z1 38b is substantially resulted, neglecting the voltage developed over the power extractor 34a (in the PeX module 31) and the power extractor 34b (in the TeX module 32), is according to the voltage divider formed by the two impedances Z1 38a and Z2 38b. For example, in the case of both impedances have substantially equal values, the voltage is split equally between the two impedances. Thus in the case of a nominal voltage of 230 VAC of the AC power source 11, in the 'off' state the voltages across the impedance Z1 38a and the impedance Z2 38b are each half of the nominal voltage 230 VAC, namely 115 VAC each. However, in case of the controlled switch SW1 35a being controlled to be in the 'close' state, the voltage across the switch terminals of the switch SW1 35a is reduced nearly to zero, and the whole AC power source 11 supply voltage is transferred to the TeX module 32 terminals, namely between terminals 16k and 16m. In the example of the nominal voltage 230 VAC, nearly the whole 230 VAC are provided to the TeX module 32, and may be used as an indication to the TeX module 32 to shift to the 'on' state, thereby signaling to the controlled switch SW2 35b, via the terminal 36b, to close and allow the current to flow and to operate the load 12.

The mechanism to control the switch SW2 35b is based on the Threshold block 43. Upon sensing by the threshold block 43 that the DC voltage output from the AC/DC converter 42c is above a pre-defined value, a control signal is provided via a connection 37b to the control port 36b, directing it to shift to 'close' state. In the example where the value of the impedances Z1 38a and Z2 38b are substantially equal, the output from the AC/DC converter will be approximately 50% of the nominal voltage level supplied by the AC power source 11 when the switch SW1 35a being in 'open' state, and about 100% of the nominal voltage level supplied by the AC power source 11 when the switch SW1 35a being in 'close' state. In the example of an AC power supply of nominal 115 VAC, the threshold circuit 43 senses 115/2=57.5 VDC after rectification when the switch SW1 35a being in 'open' state, and about the full 115 VDC when the switch SW1 35a being in 'close' state. The voltage drops on the power extractors are neglected being a low values relative to the nominal AC power value.

In one example, the threshold level used by the threshold block (in the case of equal values for the two impedances) may be set to 75% of the nominal AC power supply voltage level, namely 230*75%=172.5 VDC for 230V supply and 115*75%=86.25 VDC for 115V supply. In the case where the impedances are not substantially equal, the threshold may be set to the middle point between the two measured, expected, or designed voltages (derived from the two states of the switch SW1 35a) at the AC/DC converter 42c output. Upon opening of the switch SW1 35a (for example by a control1 signal over connection 37a from the controller 45), the output voltage from the AC/DC converter 42c reverts to a low level voltage (approximately 50% of the nominal power source 11 nominal value), which is then sensed by the threshold block 43, causing it to provide a control signal over connection 37b to the control port 36b, to open the switch SW2 35b, thus shifting to 'off' state of the system. Hence, the controller 45, by providing a control signal (such as a '0' or '1' logic signal) over the connection 37a to the control port 36a of the SW1 switch 35a may control the whole system by shifting it from 'on' to 'off' and from 'off' to 'on'.

An exemplary implementation of the threshold circuit 43 is shown as a threshold circuit 43a as part of an exemplary TeX module 32a shown as part of the arrangement 70 in FIG. 7. The threshold circuit 43a comprises a Zener diode DZ4 65d connected in series to a resistor R3 62c. Preferably, the Zener diode voltage (VZ) is set to 75% of the nominal AC power supply voltage level. For example, when using a supply of nominal 230 VAC, the Zener breakdown voltage is preferably 230*75%=172.5 VDC. For example, a Zener of 170V may be used, such as Zener diode of SMBJ5385B-TP type available from Micro Commercial Components Corp. Headquartered in Chatsworth, Calif., U.S.A., described in data sheet Revision: J dated 2014 Sep. 9 entitled: "*SMBJ5338B THRU SMBJ5388B—5 Watt Surface Mount Silicon Zener Diode 5.1 to 200 Volts*", which is incorporated in its entirety for all purposes as if fully set forth herein.

When an output voltage of the AC/DC converter 42e is below the Zener diode DZ4 65d VZ voltage, no current is flowing there through, and the switch 35d (corresponding to the switch SW2 35b) is not activated and is in a 'open' state. Upon sensing an output voltage from the AC/DC converter 42e that is above the Zener diode DZ4 65d VZ voltage, typically the whole AC power source 11 voltage (deducted by the voltage developed on the power extractor 41c), the Zener diode DZ4 65d starts to conduct (turned on), and current is flowing via the resistor R3 62c to the switch 35d, exampled in the arrangement 70 as a SSD—controlled optocoupler 35d, causing it to shift to 'close' state, so current flows to the load 12. A resistor R4 62d may be connected in parallel to the optocouplers part of the controlled switch 35d, in order to avoid access current through the optocoupler 35d, and in order to retain the switch 35d in a "close" state when the Zener diode DZ4 65d is not activated, yet a small leakage current may be flowing through it.

By properly installing the PeX module 31 and the TeX module 32, the system allows for power extraction at either the switch 13 location, at the load 12 location, or both, without any other change to the existing infrastructure, namely the AC power source 11, the phase wire 14a, the wire 14b connecting the switch 13 to the load 12 location, the return wire 14c, and the load 12 itself. Further, local power is available by the power extraction functionality in both the 'off' state when power is not flowing via the load 12, and in the 'on' state when the AC power source 11 is powering the load 12, and even in the case when a load 12 is not connected or is faulty, such as being internally disconnected. Further, the power extractions are derived from serial connections, where AC current is flowing through only two terminals in the switch 13, where no return or ground wiring is available, or is not used. Further, power extraction may be used at the load 12 location even when the load 12 is not connected or faulty. The TeX module 32 may be integrated with the load 12, such as using the same enclosure or the same connections for both the TeX module 32 functionalities (in whole or in part) and the load 12. For example, in case when the load 12 is a bulb, the TeX module 32 (in whole or in part) may be housed within the bulb enclosure.

Figure 8:
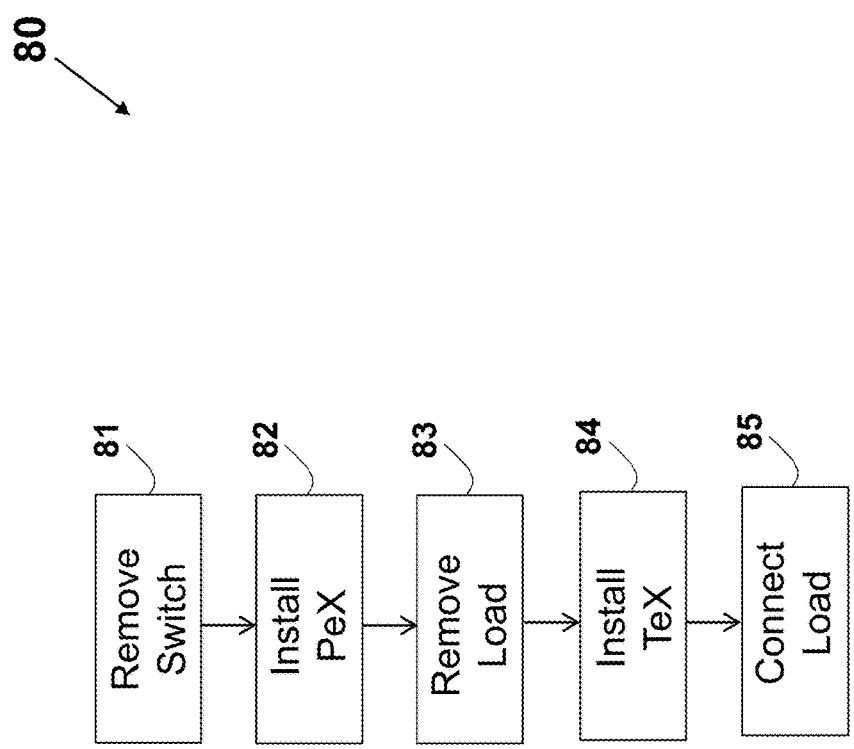
FIG. 8 illustrates schematically a simplified flowchart of a method for installation of a general power extraction system using controlled switches and impedances connected across the switches.

A general flow chart 80 for an installation of the system as part of a retrofit of an existing pre-installed lighting system, such as in a domestic environment, is shown in FIG. 8. At a "Remove Switch" step 81, the existing mechanical light switch, such as the switch 20, is removed from its wall cavity, and electrically disconnected from the wiring by the terminals 16a and 16b. Next, as part of an "Install PeX" step 82, a PeX module 31 is electrically connected to terminals 16a and 16b, and mechanically installed as a substitute to the switch 13. In one example, the PeX module 31 is added to, and connected to, the mechanical light switch 13. The load 12 is electrically disconnected from the wiring by the terminals 16c and 16d, and may be further mechanically or physically removed from the load 12 location, as part of a "Remove Load" step 83. The disconnection and removal of the pre-retrofit switch in the "Remove Switch" step 81 and the installation of the PeX module in the "Install PeX" step 82 may be based on, or according to, the replacement of an AC lighting switch with a dimmer switch, for example as described in a technical document by Lutron Electronics Co., Inc. (2006) describing the replacement of an AC switch with a Single-Pole Preset Dimmer type AY-600P, which is incorporated in its entirety for all purposes as if fully set forth herein.

The PeX module 31 may include a single enclosure housing a local mechanical switch or other tactile interface (such as a touch screen or touch panel) allowing the user to locally control the system. Alternatively or in addition, the local switch (or any other tactile component) may be external to the PeX module 31 enclosure, as exampled in the arrangement 60 describing a mechanical local switch 44a external to the PeX module 31 enclosure. In such a case, the "Install PeX" step 83 includes, after (or before) mechanically installing and electrically connecting the PeX module 31, electrically connecting the external switch (such as the switch 44a) to the PeX module 31, such as by using two terminals of the external switch, and mechanically installing or mounting the external switch to the PeX module enclosure. A module TeX 32 is then connected to the wiring, such as to wire 14b, wire 14c, and the load via the terminal 16l, as part of an "Install TeX" step 84. In a "Connect Load" step 85 the load 12 is connected to the system, to complete the electrical connections and the physical assemblies.

The controller 45, the controller 93a, or the controller 93b (or any combination thereof) may consist of, or comprise, a processor or any logic circuitry, and upon being directed (by a person or a device), controls the system states to be in 'on' or 'off' state. In one example, the load 12 state (such as 'on' or 'off' states) may be locally controlled by a locally operated switch SW3 44 shown in arrangement 40 coupled to the controller 45. The controller 45 senses the switch SW3 44 and accordingly provides the Control1 signal over the connection 37a to the controlled switch SW1 35a control terminal 36a, thus affecting the system to be in 'on' or 'off' states. The switch SW3 44 may be integrated with the PeX module 31, such as using the same enclosure or the same connections, or may be external to the PeX module 31 and connected thereto via two terminals, as exampled by a switch 44a shown connected to the PeX module 31a in the arrangement 60. The control of the optocoupler controlled SSR 35c shown as part of the Pex Module 31a (corresponding to the control1 signal over the connection 37a) is based on both the wireless controller 45a (allowing for remote control) and the local switch 44a, which is external to the enclosure of the PeX module 31a, and connected to it via the switch 45a terminals.

In one example, the switch 44a is an AC power mechanical switch such as the switch 20, thus allowing for retaining the same 'look and feel' as traditionally used to control AC lighting in a domestic environment. Further, in a retrofit scenario, where the PeX module 31 is used as a substitute to a traditional pre-existing mechanical AC power switch, the pre-retrofit mechanical switch (such as the switch 20) may be retained and used as the switch 44a by disconnecting the standard mechanical AC power switch from the AC wiring, and reconnecting it to the PeX module 31a, so it may control the switch 35c operation (individually or in cooperation with the remote control provided by the wireless controller 45a. In one example, the wall cavity used by the mechanical AC switch 20 is used to house both the pre-retrofit AC power mechanical switch and the PeX module 31 connected to it. The switch SW3 44 may be a mechanical switch such as the switch 20, for example for retaining the traditional 'look and feel' of switching on the lamp 12. Alternatively or in addition, the switch SW3 44 may be a tactile sensor, being sensitive to force or pressure, or being sensitive to a touch by an object, typically a human touch. A tactile sensor is commonly based on piezoresistive, piezoelectric, capacitive, or elastoresistive sensor. Further, a tactile sensor may be based on a conductive rubber, a lead zirconate titanate (PZT) material, a polyvinylidene fluoride (PVDF) material, or a metallic capacitive element. A sensor may include an array of tactile sensor elements, and may provide an 'image' of a contact surface, distribution of pressures, or pattern of forces. A tactile sensor may be a tactile switch where the touch sensing is used to trigger a switch, which may be a capacitance touch switch, where the human body capacitance increases a sensed capacitance, or may be a resistance touch switch, where the human body part such as a finger (or any other conductive object) conductivity is sensed between two conductors (e.g., two pieces of metal). Examples of touch switches are disclosed in PCT International Publication No. WO 2014/076695 to Ziv, entitled: "*Modular Touch Switch*", and in PCT International Publication No. WO 2012/083380 to Juhasz et al., entitled: "*Touch Switch*", which are both incorporated in their entirety for all purposes as if fully set forth herein.

Alternatively or in addition, the controller 45 may be remotely controlled for shifting the system to 'on' or 'off' states. For example, the controller 45 may consist of, or may comprise, the wireless controller 45a shown as part of the PeX module 31a in FIG. 6, for non-wired communication over a network (e.g., by using an antenna), for receiving 'on' and 'off' commands over the air via a network. The network may be any wireless network, and may be a control network (such as ZigBee or Z-Wave), a home network, a WPAN (Wireless Personal Area Network), a WLAN (wireless Local Area Network), a WWAN (Wireless Wide Area Network), or a cellular network. An example of a Bluetooth-based wireless controller that may be included in the wireless controller 45a is SPBT2632C1A Bluetooth module available from STMicroelectronics NV and described in the data sheet Doc1D022930 Rev. 6 dated April 2015 entitled: "*SPBT2632C1A—Bluetooth® technology class-1 module*", which is incorporated in its entirety for all purposes as if fully set forth herein.

Similarly, other network may be used to cover another geographical scale or coverage, such as NFC, PAN, LAN, MAN, or WAN type. The network may use any type of modulation, such as Amplitude Modulation (AM), a Frequency Modulation (FM), or a Phase Modulation (PM).

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Further, a wireless communication may be based on wireless technologies that are described in Chapter 20: "Wireless Technologies" of the publication number 1-587005-001-3 by Cisco Systems, Inc. (July/99) entitled: "*Internetworking Technologies Handbook*", which is incorporated in its entirety for all purposes as if fully set forth herein.

In one example, the power extraction functionality in the PeX module or in the TeX module is used for powering a wireless repeater. For example, any AC-powered wireless repeater may be used, DC powered from the power extractor 34a in the PeX module 31 or from the power extractor in the TeX module. Further, the wireless repeater may be integrated with the respective PeX module 31 or the TeX module, such as being housed with the same enclosure. In such a case, the wireless repeater may consists of, or be part of, the Load 1 39a, the Load 2 39b, the Load 3 39c, or the Load 4 39d. The wireless repeater may be a WPAN, WLAN, or WLAN repeater, or any other wireless technology.

Alternatively or in addition, the controller 45 (or the switch SW3 44) may comprise a motion detector or an occupancy sensor. A motion detector is a device for motion detection, that contains a physical mechanism or electronic sensor that quantifies motion commonly in order alert the user of the presence of a moving object within the field of view, or in general confirming a change in the position of an object relative to its surroundings, or the change in the surroundings relative to an object. This detection can be achieved by both mechanical and electronic methods. In addition to discrete, 'on' or 'off' motion detection, it can also consist of magnitude detection that can measure and quantify the strength or speed of this motion or the object that created it. Motion can be typically detected by sound (acoustic sensors), opacity (optical and infrared sensors and video image processors), geomagnetism (magnetic sensors, magnetometers), a reflection of the transmitted energy (infrared laser radar, ultrasonic sensors, and microwave radar sensors), electromagnetic induction (inductive-loop detectors), and vibration (triboelectric, seismic, and inertia-switch sensors). Acoustic sensors are based on Electret effect, inductive coupling, capacitive coupling, triboelectric effect, piezoelectric effect, and fiber optic transmission. Radar intrusion sensors usually have the lowest rate of false alarms. In one example, an electronic motion detector contains a motion sensor that transforms the detection of motion into an electrical signal. This can be achieved by measuring optical or acoustical changes in the field of view. Most motion detectors can detect up to 15-25 meters (50-80 ft). An occupancy sensor is typically a motion detector that is integrated with hardware or software-based timing device. For example, it can be used for preventing illumination of unoccupied spaces, by sensing when motion has stopped for a specified time period, in order to trigger a light extinguishing signal.

One basic form of mechanical motion detection is in the form of a mechanically-actuated switch or trigger. For electronic motion detection, passive or active sensors may be used, where four types of sensors commonly used in motion detectors spectrum: Passive infrared sensors (passive) which looks for body heat, while no energy is emitted from the sensor, ultrasonic (active) sensors that send out pulses of ultrasonic waves and measures the reflection off a moving object, microwave (active) sensor that sends out microwave pulses and measures the reflection off a moving object, and tomographic detector (active) which senses disturbances to radio waves as they travel through an area surrounded by mesh network nodes. Alternatively or in addition, motion can be electronically identified using optical detection or acoustical detection. Infrared light or laser technology may be used for optical detection. Motion detection devices, such as PIR (Passive Infrared Sensor) motion detectors, have a sensor that detects a disturbance in the infrared spectrum, such as a person or an animal.

Many motion detectors use a combination of different technologies. These dual-technology detectors benefit with each type of sensor, and false alarms are reduced. Placement of the sensors can be strategically mounted to lessen the chance of pets activating alarms. Often, PIR technology will be paired with another model to maximize accuracy and reduce energy usage. PIR draws less energy than microwave detection, and so many sensors are calibrated so that when the PIR sensor is tripped, it activates a microwave sensor. If the latter also picks up an intruder, then the alarm is sounded. Since interior motion detectors do not 'see' through windows or walls, motion-sensitive outdoor lighting is often recommended to enhance comprehensive efforts to protect a property. Some application for motion detection are: (a) detection of unauthorized entry, (b) detection of cessation of occupancy of an area to extinguish lights, and (c) detection of a moving object which triggers a camera to record subsequent events.

The lamp 12 may be any electrical sources of illumination commonly uses a gas, a plasma (such as in an arc and fluorescent lamps), an electrical filament, or Solid-State Lighting (SSL), where semiconductors are used. An SSL may be a Light-Emitting Diode (LED), an Organic LED (OLED), or Polymer LED (PLED). Further, an SSL may be a laser diode, which is a laser whose active medium is a semiconductor, commonly based on a diode formed from a p-n junction and powered by the injected electric current. The lamp 12 may be a common light source, sometimes referred to as 'bulb', and may be an arc lamp, a Fluorescent lamp, a gas-discharge lamp, or an incandescent light. An arc lamp (a.k.a. arc light) is the general term for a class of lamps that produce light by an electric arc (also called a voltaic arc). Such a lamp consists of two electrodes, first made from carbon but typically made today of tungsten, which are separated by a gas. The type of lamp is often named by the gas contained in the bulb, including Neon, Argon, Xenon, Krypton, Sodium, metal Halide, and Mercury, or by the type of electrode as in carbon-arc lamps. The common fluorescent lamp may be regarded as a low-pressure mercury arc lamp.

Gas-discharge lamps are a family of artificial light sources that generate light by sending an electrical discharge through an ionized gas (plasma). Typically, such lamps use a noble gas (argon, neon, krypton and xenon) or a mixture of these gases and most lamps are filled with additional materials, like mercury, sodium, and metal halides. In operation, the gas is ionized, and free electrons, accelerated by the electrical field in the tube, collide with gas and metal atoms. Some electrons in the atomic orbitals of these atoms are excited by these collisions to a higher energy state. When the excited atom falls back to a lower energy state, it emits a photon of a characteristic energy, resulting in infrared, visible light, or ultraviolet radiation. Some lamps convert the ultraviolet radiation to visible light with a fluorescent coating on the inside of the lamp's glass surface. The fluorescent lamp is perhaps the best-known gas-discharge lamp.

A fluorescent lamp (a.k.a. fluorescent tube) is a gas-discharge lamp that uses electricity to excite mercury vapor, and is commonly constructed as a tube coated with phosphor containing low pressure mercury vapor that produces white light. The excited mercury atoms produce short-wave ultraviolet light that then causes a phosphor to fluoresce, producing visible light. A fluorescent lamp converts electrical power into useful light more efficiently than an incandescent lamp. Lower energy cost typically offsets the higher initial cost of the lamp. A neon lamp (a.k.a. Neon glow lamp) is a gas discharge lamp that typically contains neon gas at a low pressure in a glass capsule. Only a thin region adjacent to the electrodes glows in these lamps, which distinguishes them from the much longer and brighter neon tubes used for public signage.

An incandescent light bulb (a.k.a. incandescent lamp or incandescent light globe) produces light by heating a filament wire to a high temperature until it glows. The hot filament is protected from oxidation in the air commonly with a glass enclosure that is filled with inert gas or evacuated. In a halogen lamp, filament evaporation is prevented by a chemical process that redeposits metal vapor onto the filament, extending its life. The light bulb is supplied with electrical current by feed-through terminals or wires embedded in the glass. Most bulbs are used in a socket, which provides mechanical support and electrical connections. A halogen lamp (a.k.a. Tungsten halogen lamp or quartz iodine lamp) is an incandescent lamp that has a small amount of a halogen such as iodine or bromine added. The combination of the halogen gas and the tungsten filament produces a halogen cycle chemical reaction, which redeposits evaporated tungsten back to the filament, increasing its life and maintaining the clarity of the envelope. Because of this, a halogen lamp can be operated at a higher temperature than a standard gas-filled lamp of similar power and operating life, producing light of a higher luminous efficacy and color temperature. The small size of halogen lamps permits their use in compact optical systems for projectors and illumination.

A Light-Emitting Diode (LED) is a semiconductor light source, based on the principle that when a diode is forward-biased (switched on), electrons are able to recombine with electron holes within the device, releasing energy in the form of photons. This effect is called electroluminescence and the color of the light (corresponding to the energy of the photon) is determined by the energy gap of the semiconductor. Conventional LEDs are made from a variety of inorganic semiconductor materials, such as Aluminum Gallium Arsenide (AlGaAs), Gallium Arsenide Phosphide (GaAsP), Aluminum gallium indium phosphide (AlGaInP), Gallium (III) Phosphide (GaP), Zinc Selenide (ZnSe), Indium Gallium Nitride (InGaN), and Silicon Carbide (SiC) as substrate.

In an Organic Light-Emitting Diodes (OLEDs), the electroluminescent material comprising the emissive layer of the diode is an organic compound. The organic material is electrically conductive due to the delocalization of pi electrons caused by conjugation over all or part of the molecule, and the material therefore functions as an organic semiconductor. The organic materials can be small organic molecules in a crystalline phase, or polymers. High-power LEDs (HPLED) can be driven at currents from hundreds of mAs to more than an Amper, compared with the tens of mAs for other LEDs. Some can emit over a thousand Lumens. Since overheating is destructive, the HPLEDs are commonly mounted on a heat sink to allow for heat dissipation.

LEDs are efficient, and emit more light per watt than incandescent light bulbs. They can emit light of an intended color without using any color filters as traditional lighting methods need. LEDs can be very small (smaller than 2 mm$^2$) and are easily populated onto printed circuit boards. LEDs light up very quickly. A typical red indicator LED will achieve full brightness in under a microsecond. LEDs are ideal for uses subject to frequent on-off cycling, unlike fluorescent lamps that fail faster when cycled often, or HID lamps that require a long time before restarting and can very easily be dimmed either by pulse-width modulation or lowering the forward current. Further, in contrast to most light sources, LEDs radiate very little heat in the form of IR that can cause damage to sensitive objects or fabrics, and typically have a relatively long useful life.

While exampled above regarding switching power to the load 12 that may be a lamp, any other electrical load may be equally applicable. For example, the load 12 may consists of, or include, an electrical outlet, fans, pumps, heaters, electrical motors, or any other electrically powered home, commercial, or industrial appliance. The home appliance may be major or small appliance, and its main function may be food storage or preparation, cleaning (such as clothes cleaning), or temperature control (environmental, food or water) such as heating or cooling. Examples of appliances are water heaters, HVAC systems, air conditioner, heaters, washing machines, clothes dryers, electrical motors, vacuum cleaner, microwave oven, electric mixers, stoves, ovens, refrigerators, freezers, food processors, dishwashers, food blenders, beverage makers such as coffeemakers and iced-tea makers, answering machines, telephone sets, home cinema systems, HiFi systems, CD and DVD players, induction cookers, electric furnaces, trash compactors, and dehumidifiers.

While exampled above regarding switching common domestic AC power such as 115 VAC or 220 VAC power (to the load 12), any other electrical power may be equally switched. For example, lower voltage AC power may be used such as 5 VAC, 12 VAC, and 24 VAC. Similarly, while exampled above regarding switching common domestic AC power using a frequency of 50 or 60 Hz, other electrical power having different frequencies may be equally switched, such as 400 Hz. Further, the system above may be used to switch DC voltages.

The availability of an electrical power at the switch and load locations may be used for powering electrical circuits that provides additional functionalities, that may be related to, or may be independent of, the original lighting functionality. For example, the PeX module 31b shown in an arrangement 90 in FIG. 9 may include a ControlP module 91a, and the TeX module 32c may include a ControlT module 91b. The ControlP module 91a is DC power fed from the power extractor 34a via a DC line connection 92a, and may include a controller 93a (that may correspond, or include, the controller 45), a sensor 94a, and an actuator 95a. The activation of the actuator 95a and the activation of the switch SW1 35a (via the control line 37a) may be based on, or dependent upon, the sensor 94a output. The ControlT module 91b is DC power fed from the power extractor 34b via a DC line connection 92b, and may include a controller 93b (that may correspond, or include, the controller 45), a sensor 94b, and an actuator 95b. The activation of the actuator 95b and the activation of the switch SW2 35b (via the control line 37b) may be based on, or dependent upon, the sensor 94b output.

Alternatively or in addition, the sensor 94b output may be transmitted to a device external to the system. Alternatively or in addition, the actuator 95b may be controlled by a device external to the system. A system may include only ControlP module 91a, only ControlT module 91b, or both. The PeX sensor 94a and the TeX sensor 94b may be identical, similar, or different is function or structure. The PeX controller 93a and the TeX controller 93b may be identical, similar, or different is function or structure, and may include part or all of the functionalities of the controller

45. The PeX actuator 95*a* and the TeX actuator 95*b* may be identical, similar, or different is function or structure. While a single sensor 94*a* is shown in the PeX module 31*b*, and a single sensor 94*b* is shown in the TeX module 32*c*, any number of sensors may be used in each of the modules, and the sensors' outputs may be used individually or cooperatively by the respective controller. While a single actuator 95*a* is shown in the PeX module 31*b*, and a single actuator 95*b* is shown in the TeX module 32*c*, any number of actuators may be used in each of the modules, and the actuators may be activated individually or cooperatively by the respective controller.

Any element capable of measuring or responding to a physical phenomenon may be used as a sensor. An appropriate sensor may be adapted for a specific physical phenomenon, such as a sensor responsive to temperature, humidity, pressure, audio, vibration, light, motion, sound, proximity, flow rate, electrical voltage, and electrical current.

The PeX sensor 94*a*, or the TeX sensor 94*b* (or both), may be an image sensor, for capturing an image (still or video). The respective controller 93*a* or 93*b* may respond to characteristics or events extracted by image processing of the captured image or video. For example, the image processing may be face detection, face recognition, gesture recognition, compression or de-compression, or motion sensing. In another aspect, one of the sensors may be a microphone for capturing a human voice. The controller responds to characteristics or events extracted by voice processing of the captured audio. The voice processing functionality may include compression or de-compression.

The PeX sensor 94*a*, or the TeX sensor 94*b* (or both) may be an analog sensor having an analog signal output such as analog voltage or current, or may have continuously variable impedance. Alternatively on in addition, the sensor may have a digital signal output. The sensor may serve as a detector, notifying only the presence of a phenomenon, such as by a switch, and may use a fixed or settable threshold level. The sensor may measure time-dependent or space-dependent parameters of a phenomenon. The sensor may measure time-dependencies or a phenomenon such as the rate of change, time-integrated or time-average, duty-cycle, frequency or time period between events. The sensor may be a passive sensor, or an active sensor requiring an external source of excitation. The sensor may be semiconductor-based, and may be based on MEMS technology.

The sensor may measure the amount of a property or of a physical quantity, or the magnitude relating to a physical phenomenon, body, or substance. Alternatively or in addition, a sensor may be used to measure the time derivative thereof, such as the rate of change of the amount, the quantity or the magnitude. In the case of space related quantity or magnitude, a sensor may measure the linear density, surface density, or volume density, relating to the amount of property per volume. Alternatively or in addition, a sensor may measure the flux (or flow) of a property through a cross-section or surface boundary, the flux density, or the current. In the case of a scalar field, a sensor may measure the quantity gradient. A sensor may measure the amount of property per unit mass or per mole of substance. A single sensor may be used to measure two or more phenomena.

The PeX sensor 94*a*, or the TeX sensor 94*b* (or both) may be an electrochemical sensor that is used to measure, sense or detect a matter structure, properties, composition, and reactions. In one example, the sensor is a pH meter for measuring the pH (acidity or alkalinity) of a liquid. Commonly such pH meter comprises a pH probe, which measures pH as the activity of the hydrogen cations at the tip of a thin-walled glass bulb. In one example, the electrochemical sensor is a gas detector, which detects the presence or various gases within an area, usually as part of a safety system, such as for detecting gas leak. Normally gas detectors are used to detect combustible, flammable, or toxic gases, as well as oxygen depletion, using semiconductors, oxidation, catalytic, infrared or other detection mechanisms, and capable to detect a single gas or several gases. Further, an electrochemical sensor may be an electrochemical gas sensor, used to measure the concentration of a target gas, typically by oxidation or reducing the target gas at an electrode, and measuring the resulting current. The gas sensor may be a hydrogen sensor for measuring or detecting the presence of hydrogen, commonly based on palladium-based electrodes, or a Carbon-Monoxide detector (CO Detector) used to detect the presence of carbon-monoxide, commonly in order to prevent carbon monoxide poisoning. A Carbon-Monoxide detector may be according to, or based on, the sensor described in U.S. Pat. No. 8,016,205 to Drew, entitled: "Thermostat with Replaceable Carbon Monoxide Sensor Module", in U.S. Patent Application Publication No. 2010/0201531 to Pakravan et al., entitled: "Carbon Monoxide Detector", in U.S. Pat. No. 6,474,138 to Chang et al., entitled: "Adsorption Based Carbon Monoxide sensor and Method", or in U.S. Pat. No. 5,948,965 to Upchurch, entitled: "Solid State Carbon Monoxide Sensor", which are all incorporated in their entirety for all purposes as if fully set forth herein. The gas sensor may be an oxygen sensor (a.k.a. lambda sensor) for measuring the proportion of oxygen ($O_2$) in a gas or liquid.

In one example, The PeX sensor 94*a*, or the TeX sensor 94*b* (or both) may be a smoke detector, for detecting smoke, which is typically an indication of fire. The smoke detectors work either by optical detection (photoelectric) or by physical process (ionization), while some use both detection methods to increase sensitivity to smoke. An optical based smoke detector is based on a light sensor, and includes a light source (incandescent bulb or infrared LED), a lens to collimate the light into a beam, and a photodiode or other photoelectric sensor at an angle to the beam as a light detector. In the absence of smoke, the light passes in front of the detector in a straight line. When smoke enters the optical chamber across the path of the light beam, some light is scattered by the smoke particles, directing it at the sensor and thus triggering the alarm. An ionization type smoke detector can detect particles of smoke that are too small to be visible, and use a radioactive element such as americium-241 (241Am). The radiation passes through an ionization chamber, an air-filled space between two electrodes, and permits a small, constant current between the electrodes. Any smoke that enters the chamber absorbs the alpha particles, which reduces the ionization and interrupts this current, setting off the alarm. Some smoke alarms use a carbon-dioxide sensor or carbon-monoxide sensor to detect extremely dangerous products of combustion. In one example, the TeX module 32 may be integrated with a smoke detector assembly, which is typically housed in a disk-shaped plastic enclosure, which may be about 150 millimeters (6 inch) in diameter and 25 millimeters (1 inch) thick, and is commonly mounted on a ceiling or on a wall.

The PeX sensor 94*a*, or the TeX sensor 94*b* (or both) may be thermoelectric sensor, for measuring, sensing or detecting the temperature (or the temperature gradient) of an object, which may be solid, liquid, or gas. Such sensor may be a thermistor (either PTC or NTC), a thermocouple, a quartz thermometer, or an RTD. The sensor may be based on a Geiger counter for detecting and measuring radioactivity or any other nuclear radiation. Light, photons, or other optical phenomena may be measured or detected by a photosensor or photodetector, used for measuring the intensity of visible or invisible light (such as infrared, ultraviolet, X-ray or gamma rays). A photosensor may be based on the photoelectric or the photovoltaic effect, such as a photodiode, a phototransistor, solar cell or a photomultiplier tube. A photosensor may be a photoresistor based on photoconductivity, or a CCD where a charge is affected by the light. The sensor may be an electrochemical sensor used to measure, sense or detect a matter structure, properties, composition, and reactions, such as pH meters, gas detector, or gas sensor. Using semiconductors, oxidation, catalytic, infrared or other sensing or detection mechanisms, gas detector may be used to detect the presence of a gas (or gases) such as hydrogen, oxygen or CO. The sensor may be a smoke detector for detecting smoke or fire, typically by an optical detection (photoelectric) or by a physical process (ionization).

The PeX sensor 94*a*, or the TeX sensor 94*b* (or both) may be a physiological sensor for measuring, sensing or detecting parameters of a live body, such as animal or human body. Such a sensor may involve measuring of body electrical signals such as an EEG or ECG sensor, a gas saturation sensor such as oxygen saturation sensor, mechanical or physical parameter sensors such as a blood pressure meter. The sensor (or sensors) may be external to the sensed body, implanted inside the body, or may be wearable. The sensor may be an electracoustic sensor for measuring, sensing or detecting sound, such as a microphone. Typically microphones are based on converting audible or inaudible (or both) incident sound to an electrical signal by measuring the vibration of a diaphragm or a ribbon. The microphone may be a condenser microphone, an electret microphone, a dynamic microphone, a ribbon microphone, a carbon microphone, or a piezoelectric microphone.

The PeX sensor 94*a*, or the TeX sensor 94*b* (or both) may be an image sensor for providing digital camera functionality, allowing an image (either as still images or as a video) to be captured, stored, manipulated and displayed. The image capturing hardware integrated with the sensor unit may contain a photographic lens (through a lens opening) focusing the required image onto a photosensitive image sensor array disposed approximately at an image focal point plane of the optical lens, for capturing the image and producing electronic image information representing the image. The image sensor may be based on Charge-Coupled Devices (CCD) or Complementary Metal-Oxide-Semiconductor (CMOS). The image may be converted into a digital format by an image sensor AFE (Analog Front End) and an image processor, commonly including an analog to digital (A/D) converter coupled to the image sensor for generating a digital data representation of the image. The unit may contain a video compressor, coupled between the analog to digital (A/D) converter and the transmitter for compressing the digital data video before transmission to the communication medium. The compressor may be used for lossy or non-lossy compression of the image information, for reducing the memory size and reducing the data rate required for the transmission over the communication medium. The compression may be based on a standard compression algorithm such as JPEG (Joint Photographic Experts Group) and MPEG (Moving Picture Experts Group), ITU-T H.261, ITU-T H.263, ITU-T H.264, or ITU-T CCIR 601.

The digital data video signal carrying a digital data video according to a digital video format, and a transmitter coupled between the port and the image processor for transmitting the digital data video signal to the communication medium. The digital video format may be based on one out of: TIFF (Tagged Image File Format), RAW format, AVI (Audio Video Interleaved), DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards.

The PeX sensor 94*a*, or the TeX sensor 94*b* (or both) may be a strain gauge, used to measure the strain, or any other deformation, of an object. The sensor may be based on deforming a metallic foil, semiconductor strain gauge (such as piezoresistors), measuring the strain along an optical fiber, capacitive strain gauge, and vibrating or resonating of a tensioned wire. A sensor may be a tactile sensor, being sensitive to force or pressure, or being sensitive to a touch by an object, typically a human touch. A tactile sensor may be based on a conductive rubber, a lead zirconate titanate (PZT) material, a Polyvinylidene Fluoride (PVDF) material, a metallic capacitive element, or any combination thereof. A tactile sensor may be a tactile switch, which may be based on the human body conductance, using measurement of conductance or capacitance.

The PeX sensor 94*a*, or the TeX sensor 94*b* (or both) may be a piezoelectric sensor, where the piezoelectric effect is used to measure pressure, acceleration, strain or force, and may use transverse, longitudinal, or shear effect mode. A thin membrane may be used to transfer and measure pressure, while mass may be used for acceleration measurement. A piezoelectric sensor element material may be a piezoelectric ceramics (such as PZT ceramic) or a single crystal material. A single crystal material may be gallium phosphate, quartz, tourmaline, or Lead Magnesium Niobate-Lead Titanate (PMN-PT).

The sensor may be a motion sensor, and may include one or more accelerometers, which measure the absolute acceleration or the acceleration relative to freefall. The accelerometer may be piezoelectric, piezoresistive, capacitive, MEMS, or electromechanical switch accelerometer, measuring the magnitude and the direction the device acceleration in a single-axis, 2-axis or 3-axis (omnidirectional). Alternatively or in addition, the motion sensor may be based on electrical tilt and vibration switch or any other electromechanical switch.

The PeX sensor 94*a*, or the TeX sensor 94*b* (or both) may be a force sensor, a load cell, or a force gauge (a.k.a. force gage), used to measure a force magnitude and/or direction, and may be based on a spring extension, a strain gauge deformation, a piezoelectric effect, or a vibrating wire. A sensor may be a driving or passive dynamometer, used to measure torque or any moment of force.

The PeX sensor 94*a*, or the TeX sensor 94*b* (or both) may be a pressure sensor (a.k.a. pressure transducer or pressure transmitter/sender) for measuring a pressure of gases or liquids, and for indirectly measuring other parameters such as fluid/gas flow, speed, water-level, and altitude. A pressure sensor may be a pressure switch. A pressure sensor may be an absolute pressure sensor, a gauge pressure sensor, a vacuum pressure sensor, a differential pressure sensor, or a sealed pressure sensor. The changes in pressure relative to altitude may be used for an altimeter, and the Venturi effect may be used to measure flow by a pressure sensor. Similarly, the depth of a submerged body or the fluid level on contents in a tank may be measured by a pressure sensor.

A pressure sensor may be of a force collector type, where a force collector (such as a diaphragm, piston, bourdon tube, or bellows) is used to measure strain (or deflection) due to applied force (pressure) over an area. Such sensor may be based on the piezoelectric effect (a piezoresistive strain gauge), may be of a capacitive, or of an electromagnetic type. A pressure sensor may be based on a potentiometer, or may be based on using the changes in resonant frequency or the thermal conductivity of a gas, or may use the changes in the flow of charged gas particles (ions).

The PeX sensor 94a, or the TeX sensor 94b (or both) may be a position sensor for measuring linear or angular position (or motion). A position sensor may be an absolute position sensor, or may be a displacement (relative or incremental) sensor, measuring a relative position, and may be an electromechanical sensor. A position sensor may be mechanically attached to the measured object, or alternatively may use a non-contact measurement.

A position sensor may be an angular position sensor, for measuring involving an angular position (or the rotation or motion) of a shaft, an axle, or a disk. Absolute angular position sensor output indicates the current position (angle) of the shaft, while incremental or displacement sensor provides information about the change, the angular speed, or the motion of the shaft. An angular position sensor may be of optical type, using reflective or interruption schemes, or may be of magnetic type, such as based on variable-reluctance (VR), Eddy-current killed oscillator (ECKO), Wiegand sensing, or Hall-effect sensing, or may be based on a rotary potentiometer. An angular position sensor may be transformer based such as a RVDT, a resolver or a synchro. An angular position sensor may be based on an absolute or incremental rotary encoder, and may be a mechanical or optical rotary encoder, using binary or gray encoding schemes.

The PeX sensor 94a, or the TeX sensor 94b (or both) may be an angular rate sensor, used to measure the angular rate, or the rotation speed, of a shaft, an axle or a disc, and may be electromechanical (such as centrifugal switch), MEMS based, laser based (such as Ring Laser Gyroscope—RLG), or a gyroscope (such as fiber-optic gyro) based. Some gyroscopes use the measurement of the Coriolis acceleration to determine the angular rate. An angular rate sensor may be a tachometer, which may be based on measuring the centrifugal force, or based on optical, electric, or magnetic sensing a slotted disk.

A position sensor may be a linear position sensor, for measuring a linear displacement or position typically in a straight line, and may use a transformer principle such as LVDT, or may be based on a resistive element such as linear potentiometer. A linear position sensor may be an incremental or absolute linear encoder, and may employ optical, magnetic, capacitive, inductive, or eddy-current principles.

The PeX sensor 94a, or the TeX sensor 94b (or both) may be a mechanical or electrical motion detector (or an occupancy sensor), for discrete (on/off) or magnitude-based motion detection. A motion detector may be based on sound (acoustic sensors), opacity (optical and infrared sensors and video image processors), geomagnetism (magnetic sensors, magnetometers), reflection of transmitted energy (infrared laser radar, ultrasonic sensors, and microwave radar sensors), electromagnetic induction (inductive-loop detectors), or vibration (triboelectric, seismic, and inertia-switch sensors). Acoustic sensors may use electric effect, inductive coupling, capacitive coupling, triboelectric effect, piezoelectric effect, fiber optic transmission, or radar intrusion sensing. An occupancy sensor is typically a motion detector that may be integrated with hardware or software-based timing device.

A motion sensor may be a mechanically-actuated switch or trigger, or may use passive or active electronic sensors, such as passive infrared sensors, ultrasonic sensors, microwave sensor or tomographic detector. Alternatively or in addition, motion can be electronically identified using infrared (PIR) or laser optical detection or acoustical detection, or may use a combination of the technologies disclosed herein.

The PeX sensor 94a, or the TeX sensor 94b (or both) may be a humidity sensor, such as a hygrometer or a humidistat, and may respond to an absolute, relative, or specific humidity. The measurement may be based on optically detecting condensation, or may be based on changing the capacitance, resistance, or thermal conductivity of materials subjected to the measured humidity.

The PeX sensor 94a, or the TeX sensor 94b (or both) may be a clinometer for measuring angle (such as pitch or roll) of an object, typically with respect to a plane such as the earth ground plane. A clinometer may be based on an accelerometer, a pendulum, or on a gas bubble in liquid, or may be a tilt switch such as a mercury tilt switch for detecting inclination or declination with respect to a determined tilt angle.

The PeX sensor 94a, or the TeX sensor 94b (or both) may be a gas or liquid flow sensor, for measuring the volumetric or mass flow rate via a defined area or a surface. A liquid flow sensor typically involves measuring the flow in a pipe or in an open conduit. A flow measurement may be based on a mechanical flow meter, such as a turbine flow meter, a Woltmann meter, a single jet meter, or a paddle wheel meter. Pressure-based meters may be based on measuring a pressure or a pressure differential based on Bernoulli's principle, such as a Venturi meter. The sensor may be an optical flow meter or be based on the Doppler-effect.

A flow sensor may be an air-flow sensor, for measuring the air or gas flow, such as through a surface (e.g., through a tube) or a volume, by actually measuring the air volume passing, or by measuring the actual speed of air flow. In some cases, a pressure, typically differential pressure, may be measured as an indicator for the air flow measurements. An anemometer is an air-flow sensor primarily for measuring wind speed, and may be cup anemometer, a windmill anemometer, hot-wire anemometer such as CCA (Constant-Current Anemometer), CVA (Constant-Voltage Anemometer) and CTA (Constant-Temperature Anemometer). Sonic anemometers use ultrasonic sound waves to measure wind velocity. An air-flow may be measured by a pressure anemometer that may be a plate or tube class.

Any sensor herein may include one or more sensors, each providing an electrical output signal (such as voltage or current), or changing a characteristic (such as resistance or impedance) in response to a measured or detected phenomenon. The sensors may be identical, similar or different from each other, and may measure or detect the same or different phenomena. Two or more sensors may be connected in series or in parallel. In the case of a changing characteristic sensor or in the case of an active sensor, the unit may include an excitation or measuring circuits (such as a bridge) to generate the sensor electrical signal. The sensor output signal may be conditioned by a signal conditioning circuit. The signal conditioner may involve time, frequency, or magnitude related manipulations. The signal conditioner may be linear or non-linear, and may include an operation or an instrument amplifier, a multiplexer, a frequency converter, a frequency-to-voltage converter, a voltage-to-frequency converter, a current-to-voltage converter, a current loop converter, a charge converter, an attenuator, a sampleand-hold circuit, a peak-detector, a voltage or current limiter, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog sensor, an analog to digital (A/D) converter may be used to convert the conditioned sensor output signal to a digital sensor data. The unit may include a computer for controlling and managing the unit operation, processing the digital sensor data and handling the unit communication. The unit may include a modem or transceiver coupled to a network port (such as a connector or antenna), for interfacing and communicating over a network.

Any element designed for, or capable of directly or indirectly affecting, changing, producing, or creating a physical phenomenon under an electric signal control may be used as an actuator. An appropriate actuator may be adapted for a specific physical phenomenon, such as an actuator responsive to temperature, humidity, pressure, audio, vibration, light, motion, sound, proximity, flow rate, electrical voltage, and electrical current. Typically, a sensor may be used to measure a phenomenon affected by an actuator.

An actuator may affect the amount of a property, or of a physical quantity or the magnitude relating to a physical phenomenon, body or substance. Alternatively or in addition, an actuator may be used to affect the time derivative thereof, such as the rate of change of the amount, the quantity or the magnitude. In the case of space related quantity or magnitude, an actuator may affect the linear density, surface density, or volume density, relating to the amount of property per volume. Alternatively or in addition, an actuator may affect the flux (or flow) of a property through a cross-section or surface boundary, the flux density, or the current. In the case of a scalar field, an actuator may affect the quantity gradient. An actuator may affect the amount of property per unit mass or per mole of substance. A single actuator may be used to measure two or more phenomena.

The PeX actuator 95*a*, or the TeX actuator 95*b* (or both) may be an analog actuator having an analog signal input such as analog voltage or current, or may have continuously variable impedance. Alternatively or in addition, an actuator may have a digital signal input. An actuator may affect time-dependent or space-dependent parameters of a phenomenon. An actuator may affect time-dependencies or a phenomenon such as the rate of change, time-integrated or time-average, duty-cycle, frequency or time period between events. The actuator may be semiconductor-based, and may be based on MEMS technology.

The PeX actuator 95*a*, or the TeX actuator 95*b* (or both) may be a light source (in addition to the lamp 12) used to emit light by converting electrical energy into light, and where the luminous intensity may be fixed or may be controlled, commonly for illumination or indication purposes. An actuator may be used to activate or control the light emitted by a light source, being based on converting electrical energy or another energy to a light. The light emitted may be a visible light, or invisible light such as infrared, ultraviolet, X-ray or gamma rays. A shade, reflector, enclosing globe, housing, lens, and other accessories may be used, typically as part of a light fixture, in order to control the illumination intensity, shape or direction. Electrical sources of illumination commonly use a gas, a plasma (such as in arc and fluorescent lamps), an electrical filament, or Solid-State Lighting (SSL), where semiconductors are used. An SSL may be a Light-Emitting Diode (LED), an Organic LED (OLED), Polymer LED (PLED), or a laser diode.

A light source may consist of, or comprises, a lamp which may be an arc lamp, a fluorescent lamp, a gas-discharge lamp (such as a fluorescent lamp), or an incandescent light (such as a halogen lamp). An arc lamp is the general term for a class of lamps that produce light by an electric arc voltaic arc. Such a lamp consists of two electrodes, first made from carbon but typically made today of tungsten, which are separated by a noble gas.

The PeX actuator 95*a*, or the TeX actuator 95*b* (or both) may be a motion actuator that may be a rotary actuator that produces a rotary motion or torque, commonly to a shaft or axle. The motion produced by a rotary motion actuator may be either continuous rotation, such as in common electric motors, or movement to a fixed angular position as for servos and stepper motors. A motion actuator may be a linear actuator that creates motion in a straight line. A linear actuator may be based on an intrinsically rotary actuator, by converting from a rotary motion created by a rotary actuator, using a screw, a wheel and axle, or a cam. A screw actuator may be a leadscrew, a screw jack, a ball screw or roller screw. A wheel-and-axle actuator operates on the principle of the wheel and axle, and may be hoist, winch, rack and pinion, chain drive, belt drive, rigid chain, or rigid belt actuator. Similarly, a rotary actuator may be based on an intrinsically linear actuator, by converting from a linear motion to a rotary motion, using the above or other mechanisms. Motion actuators may include a wide variety of mechanical elements and/or prime movers to change the nature of the motion such as provided by the actuating/transducing elements, such as levers, ramps, screws, cams, crankshafts, gears, pulleys, constant-velocity joints, or ratchets. A motion actuator may be part of a servomotor system.

A motion actuator may be a pneumatic actuator that converts compressed air into rotary or linear motion, and may comprise a piston, a cylinder, valves or ports. Motion actuators are commonly controlled by an input pressure to a control valve, and may be based on moving a piston in a cylinder. A motion actuator may be a hydraulic actuator using a pressure of the liquid in a hydraulic cylinder to provide force or motion. A hydraulic actuator may be a hydraulic pump, such as a vane pump, a gear pump, or a piston pump. A motion actuator may be an electric actuator where electrical energy may be converted into motion, such as an electric motor. A motion actuator may be a vacuum actuator producing a motion based on vacuum pressure.

An electric motor may be a DC motor, which may be a brushed, brushless, or uncommutated type. An electric motor may be a stepper motor, and may be a Permanent Magnet (PM) motor, a Variable reluctance (VR) motor, or a hybrid synchronous stepper. An electric motor may be an AC motor, which may be an induction motor, a synchronous motor, or an eddy current motor. An AC motor may be a two-phase AC servo motor, a three-phase AC synchronous motor, or a single-phase AC induction motor, such as a split-phase motor, a capacitor start motor, or a Permanent-Split Capacitor (PSC) motor. Alternatively or in addition, an electric motor may be an electrostatic motor, and may be MEMS based.

A rotary actuator may be a fluid power actuator, and a linear actuator may be a linear hydraulic actuator or a pneumatic actuator. A linear actuator may be a piezoelectric actuator, based on the piezoelectric effect, may be a wax motor, or may be a linear electrical motor, which may be a DC brush, a DC brushless, a stepper, or an induction motor type. A linear actuator may be a telescoping linear actuator. A linear actuator may be a linear electric motor, such as a linear induction motor (LIM), or a Linear Synchronous Motor (LSM).

A motion actuator may be a linear or rotary piezoelectric motor based on acoustic or ultrasonic vibrations. A piezoelectric motor may use piezoelectric ceramics such as Inchworm or PiezoWalk motors, may use Surface Acoustic Waves (SAW) to generate the linear or the rotary motion, or may be a Squiggle motor. Alternatively or in addition, an electric motor may be an ultrasonic motor. A linear actuator may be a micro- or nanometer comb-drive capacitive actuator. Alternatively or in addition, a motion actuator may be a Dielectric or Ionic based Electroactive Polymers (EAPs) actuator. A motion actuator may also be a solenoid, thermal bimorph, or a piezoelectric unimorph actuator.

The PeX actuator 95a, or the TeX actuator 95b (or both) may be a pump, typically used to move (or compress) fluids or liquids, gasses, or slurries, commonly by pressure or suction actions, and the activating mechanism is often reciprocating or rotary. A pump may be a direct lift, impulse, displacement, valveless, velocity, centrifugal, vacuum pump, or gravity pump. A pump may be a positive displacement pump, such as a rotary-type positive displacement type such as internal gear, screw, shuttle block, flexible vane or sliding vane, circumferential piston, helical twisted roots or liquid ring vacuum pumps, a reciprocating-type positive displacement type, such as piston or diaphragm pumps, and a linear-type positive displacement type, such as rope pumps and chain pumps, a rotary lobe pump, a progressive cavity pump, a rotary gear pump, a piston pump, a diaphragm pump, a screw pump, a gear pump, a hydraulic pump, and a vane pump. A rotary positive displacement pumps may be a gear pump, a screw pump, or a rotary vane pumps. Reciprocating positive displacement pumps may be plunger pumps type, diaphragm pumps type, diaphragm valves type, or radial piston pumps type.

A pump may be an impulse pump such as hydraulic ram pumps type, pulser pumps type, or airlift pumps type. A pump may be a rotodynamic pump such as a velocity pump or a centrifugal pump. A centrifugal pump may be a radial flow pump type, an axial flow pump type, or a mixed flow pump.

The PeX actuator 95a, or the TeX actuator 95b (or both) may be an electrochemical or chemical actuator, used to produce, change, or otherwise affect a matter structure, properties, composition, process, or reactions, such as oxidation/reduction or an electrolysis process.

The PeX actuator 95a, or the TeX actuator 95b (or both) may be a sounder that converts electrical energy to sound waves transmitted through the air, an elastic solid material, or a liquid, usually by means of a vibrating or moving ribbon or diaphragm. The sound may be audible or inaudible (or both), and may be omnidirectional, unidirectional, bidirectional, or provide other directionality or polar patterns. A sounder may be an electromagnetic loudspeaker, a piezoelectric speaker, an electrostatic loudspeaker (ESL), a ribbon or planar magnetic loudspeaker, or a bending wave loudspeaker.

A sounder may be an electromechanical type, such as an electric bell, a buzzer (or beeper), a chime, a whistle or a ringer and may be either electromechanical or ceramic-based piezoelectric sounders. The sounder may emit a single or multiple tones, and can be in continuous or intermittent operation.

The system may use the sounder to play digital audio content, either stored in, or received by, the sounder, the actuator unit, the router, the control server, or any combination thereof. The audio content stored may be either pre-recorded or using a synthesizer. Few digital audio files may be stored, selected by the control logic. Alternatively or in addition, the source of the digital audio may be a microphone serving as a sensor. In another example, the system uses the sounder for simulating the voice of a human being or generates music. The music produced can emulate the sounds of a conventional acoustical music instrument, such as a piano, tuba, harp, violin, flute, guitar and so forth. A talking human voice may be played by the sounder, either pre-recorded or using human voice synthesizer, and the sound may be a syllable, a word, a phrase, a sentence, a short story or a long story, and can be based on speech synthesis or pre-recorded, using male or female voice.

A human speech may be produced using a hardware, software (or both) speech synthesizer, which may be Text-To-Speech (TTS) based. The speech synthesizer may be a concatenative type, using unit selection, diphone synthesis, or domain-specific synthesis. Alternatively or in addition, the speech synthesizer may be a formant type, and may be based on articulatory synthesis or hidden Markov models (HMM) based.

The PeX actuator 95a, or the TeX actuator 95b (or both) may be used to generate an electric or magnetic field, and may be an electromagnetic coil or an electromagnet.

The PeX actuator 95a, or the TeX actuator 95b (or both) may be a display for presentation of visual data or information, commonly on a screen, may consist of an array (e.g., matrix) of light emitters or light reflectors, and may present text, graphics, image or video. A display may be a monochrome, gray-scale, or color type, and may be a video display. The display may be a projector (commonly by using multiple reflectors), or alternatively (or in addition) have the screen integrated. A projector may be based on an Eidophor, Liquid Crystal on Silicon (LCoS or LCOS), or LCD, or may use Digital Light Processing (DLP™) technology, and may be MEMS based or be a virtual retinal display. A video display may support Standard-Definition (SD) or High-Definition (HD) standards, and may support 3D. The display may present the information as scrolling, static, bold or flashing. The display may be an analog display, such as having NTSC, PAL or SECAM formats. Similarly, analog RGB, VGA (Video Graphics Array), SVGA (Super Video Graphics Array), SCART or S-video interface, or may be a digital display, such as having IEEE1394 interface (a.k.a. FireWire™), may be used. Other digital interfaces that can be used are USB, SDI (Serial Digital Interface), HDMI (High-Definition Multimedia Interface), DVI (Digital Visual Interface), UDI (Unified Display Interface), DisplayPort, Digital Component Video or DVB (Digital Video Broadcast) interface. Various user controls may include an on/off switch, a reset button and others. Other exemplary controls involve display-associated settings such as contrast, brightness and zoom.

A display may be a Cathode-Ray Tube (CRT) display, or a Liquid Crystal Display (LCD) display. The LCD display may be passive (such as CSTN or DSTN based) or active matrix, and may be Thin Film Transistor (TFT) or LED-backlit LCD display. A display may be a Field Emission Display (FED), Electroluminescent Display (ELD), Vacuum Fluorescent Display (VFD), or may be an Organic Light- Emitting Diode (OLED) display, based on passive-matrix (PMOLED) or active-matrix OLEDs (AMOLED).

A display may be based on an Electronic Paper Display (EPD), and be based on Gyricon technology, Electro-Wetting Display (EWD), or Electrofluidic display technology. A display may be a laser video display or a laser video projector, and may be based on a Vertical-External-Cavity Surface-Emitting-Laser (VECSEL) or a Vertical-Cavity Surface-Emitting Laser (VCSEL).

A display may be a segment display, such as a numerical or an alphanumerical display that can show only digits or alphanumeric characters, words, characters, arrows, symbols, ASCII and non-ASCII characters. Examples are Seven-segment display (digits only), Fourteen-segment display, and Sixteen-segment display, and a dot matrix display.

The PeX actuator 95a, or the TeX actuator 95b (or both) may be a thermoelectric actuator such as a cooler or a heater for changing the temperature of a solid, liquid or gas object, and may use conduction, convection, thermal radiation, or by the transfer of energy by phase changes. A heater may be a radiator using radiative heating, a convector using convection, or a forced convection heater. A thermoelectric actuator may be a heating or cooling heat pump, and may be electrically powered, compression-based cooler using an electric motor to drive a refrigeration cycle. A thermoelectric actuator may be an electric heater, converting electrical energy into heat, using resistance, or a dielectric heater. A thermoelectric actuator may be a solid-state active heat pump device based on the Peltier effect. A thermoelectric actuator may be an air cooler, using a compressor-based refrigeration cycle of a heat pump. An electric heater may be an induction heater.

The PeX actuator 95a, or the TeX actuator 95b (or both) may include a signal generator serving as an actuator for providing an electrical signal (such as a voltage or current), or may be coupled between the processor and the actuator for controlling the actuator. A signal generator an analog or digital signal generator, and may be based on software (or firmware) or may be a separated circuit or component. A signal may generate repeating or non-repeating electronic signals, and may include a digital to analog converter (DAC) to produce an analog output. Common waveforms are a sine wave, a saw-tooth, a step (pulse), a square, and a triangular waveforms. The generator may include some sort of modulation functionality such as Amplitude Modulation (AM), Frequency Modulation (FM), or Phase Modulation (PM). A signal generator may be an Arbitrary Waveform Generators (AWGs) or a logic signal generator.

An actuator herein may include one or more actuators, each affecting or generating a physical phenomenon in response to an electrical command, which can be an electrical signal (such as voltage or current), or by changing a characteristic (such as resistance or impedance) of a device. The actuators may be identical, similar or different from each other, and may affect or generate the same or different phenomena. Two or more actuators may be connected in series or in parallel. The actuator command signal may be conditioned by a signal conditioning circuit. The signal conditioner may involve time, frequency, or magnitude related manipulations. The signal conditioner may be linear or non-linear, and may include an amplifier, a voltage or current limiter, an attenuator, a delay line or circuit, a level translator, a galvanic isolator, an impedance transformer, a linearization circuit, a calibrator, a passive or active (or adaptive) filter, an integrator, a deviator, an equalizer, a spectrum analyzer, a compressor or a de-compressor, a coder (or decoder), a modulator (or demodulator), a pattern recognizer, a smoother, a noise remover, an average or RMS circuit, or any combination thereof. In the case of analog actuator, a digital to analog (D/A) converter may be used to convert the digital command data to analog signals for controlling the actuators.

While exampled above where the AC current 6 flowing during the system 'on' state is substantially higher than the current 7 flowing during the system 'off' state, any currents ratio may be equally used. For example, the current 7 flowing during the system 'off' state may be higher than, similar to or the same as, substantially or nominally the same as, or in the same order of magnitude of, the AC current 6 flowing during the system 'on' state.

Figure 10:
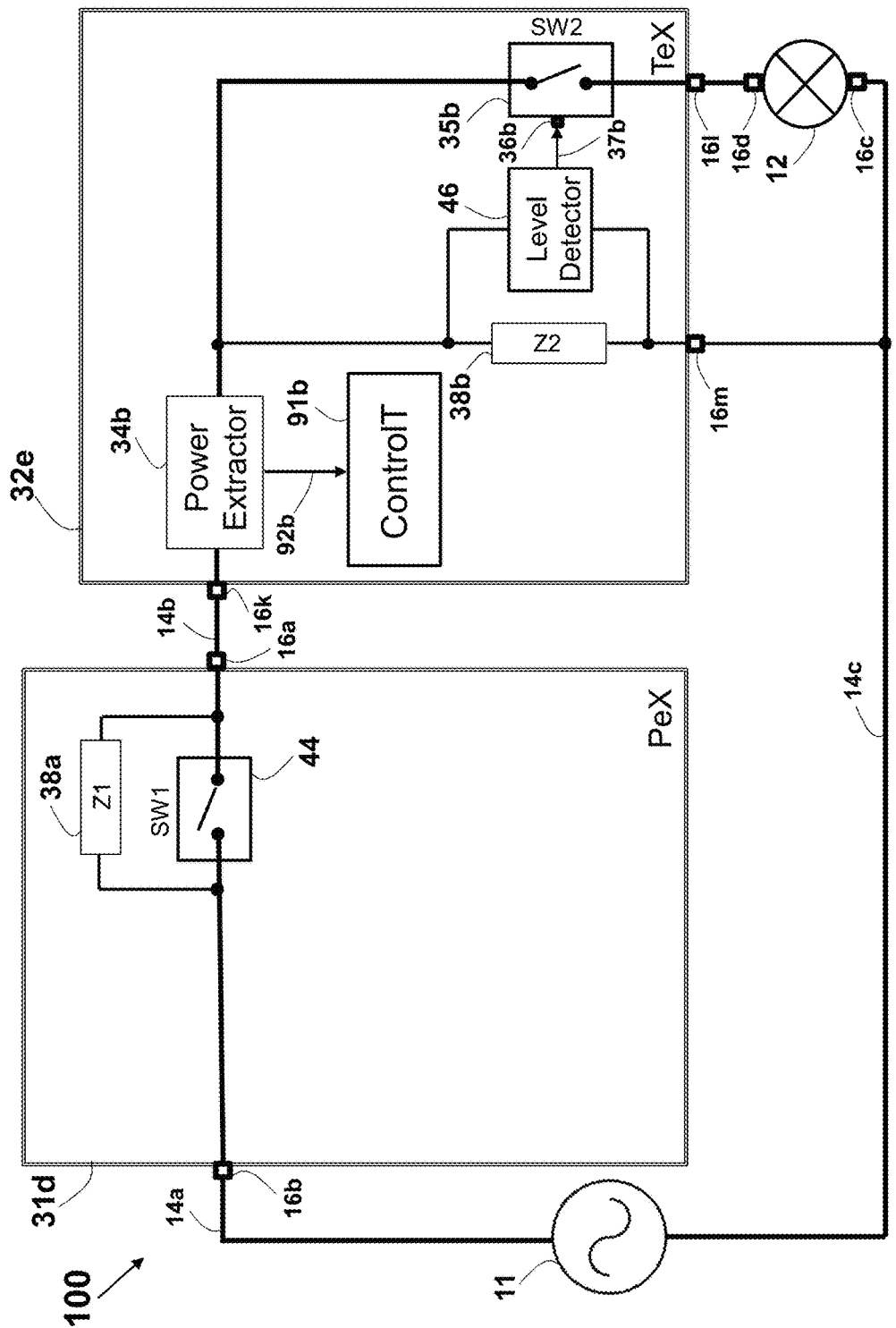
FIG. 10 illustrates an exemplary schematic electrical block diagram of a general power extraction system using a load-side only power extraction and level detection activation.

While exampled above regarding power extraction at only the switch-side in the PeX module as well as in both the switch-side PeX module 31 and the load-side TeX module 32, a power extraction may equally be employed only at the load-side, in the TeX module 32. Such an arrangement 100 is shown in FIG. 10, comprising a PeX module 31d that may not include any power extraction functionality, such as the power extractor 34a described above. The PeX module 31d includes the mechanical switch 44 that is manually user operated, and the impedance Z1 38a for allowing current flow when the switch SW1 44 is open, thus enabling the power extraction at the load-side in the TeX module 32e by the power extractor 34b. The power extractor 34b in the load-side TeX module 32e powers the ControlT circuitry 91b via a power connection 92b, as well as other loads that may reside, or be collocated at the load-side location, integrated, either as part of, or external to the TeX module 32e. The switch SW1 44 closing is sensed by the level detector 46 at the TeX module 32e, operating as described in the arrangement 40a in FIG. 4a. Since no active components are included in the PeX module 31d, such a module is simple and low-cost.

Figure 9:
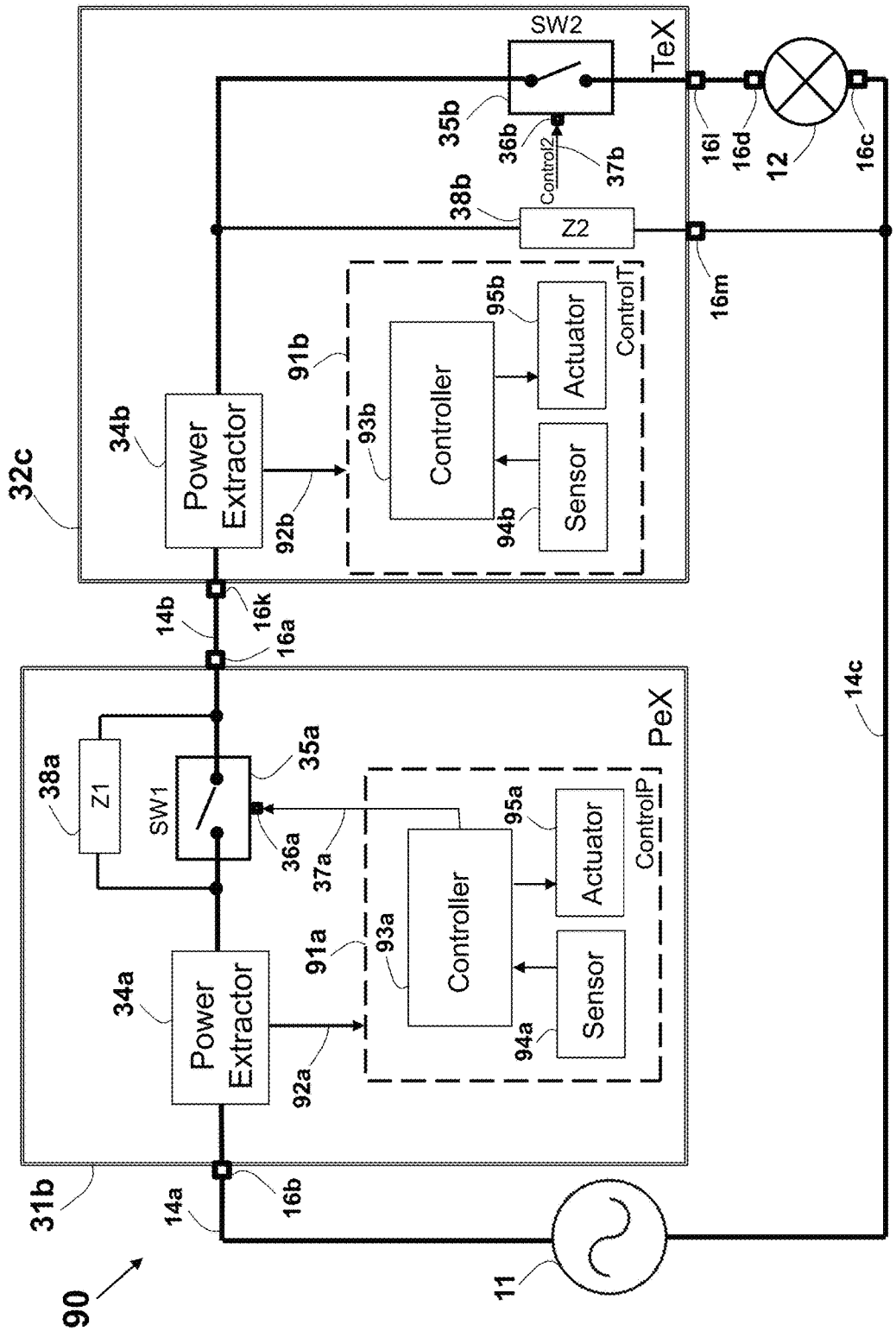
FIG. 9 illustrates an exemplary schematic electrical block diagram of a general power extraction system and using the extracted power to control actuators based on sensors outputs.

The Control2 signal is carried over the control connection 37b to control the switch SW2 35b as shown in the arrangement 90 in FIG. 9. The control connection 37b in the TeX module 32e in the arrangement 100 in FIG. 10 is directly coupled, or directly connected, to the level detector 46 for activating the load 12 via the switch SW2 35b in response to the detected level. Alternatively or in addition, the level detector 46 output may be connected to serve as an input to a controller, such as the controller 93b that is part of the ControlT block 91b. Such an arrangement 100a is shown in FIG. 10, where the level detector 46 output is connected via connection 37c to the ControlT block 91b, to be used by the controller 93b therein. Based on the detected level signal received over the connection 37c, as well as other sensors and inputs, and according to a pre-determined logic, the controller 93b in the ControlT block 91b sets the TeX module 32e that configure the system and load 12 state, and accordingly control and activate the switch SW2 35b over the connection 37b.

Figure 4D:
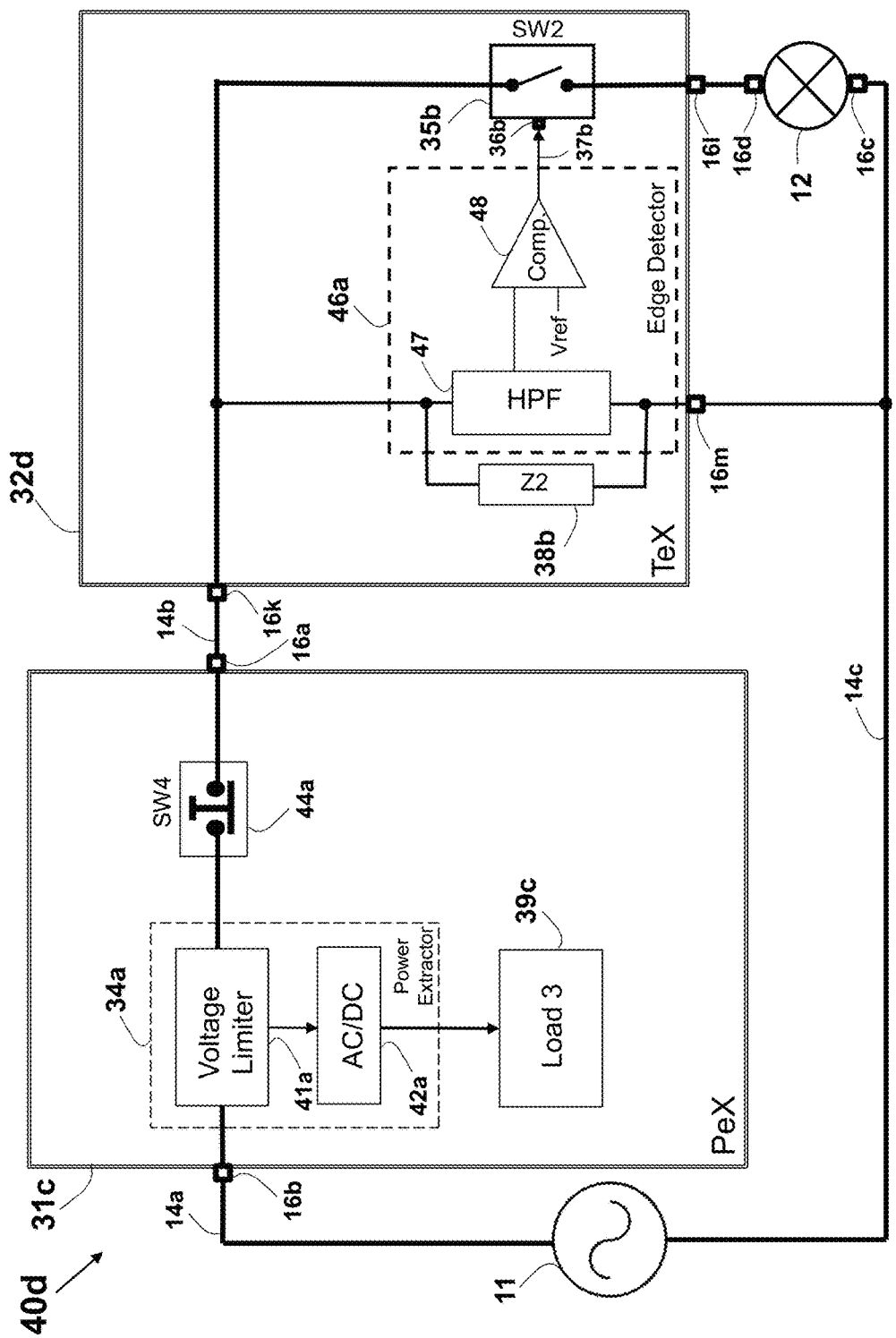
FIG. 4d illustrates an exemplary schematic electrical block diagram of a general power extraction system using a switch-side only power extraction and edge detection and a push-button control without a switch-side impedance.
Figure 4E:
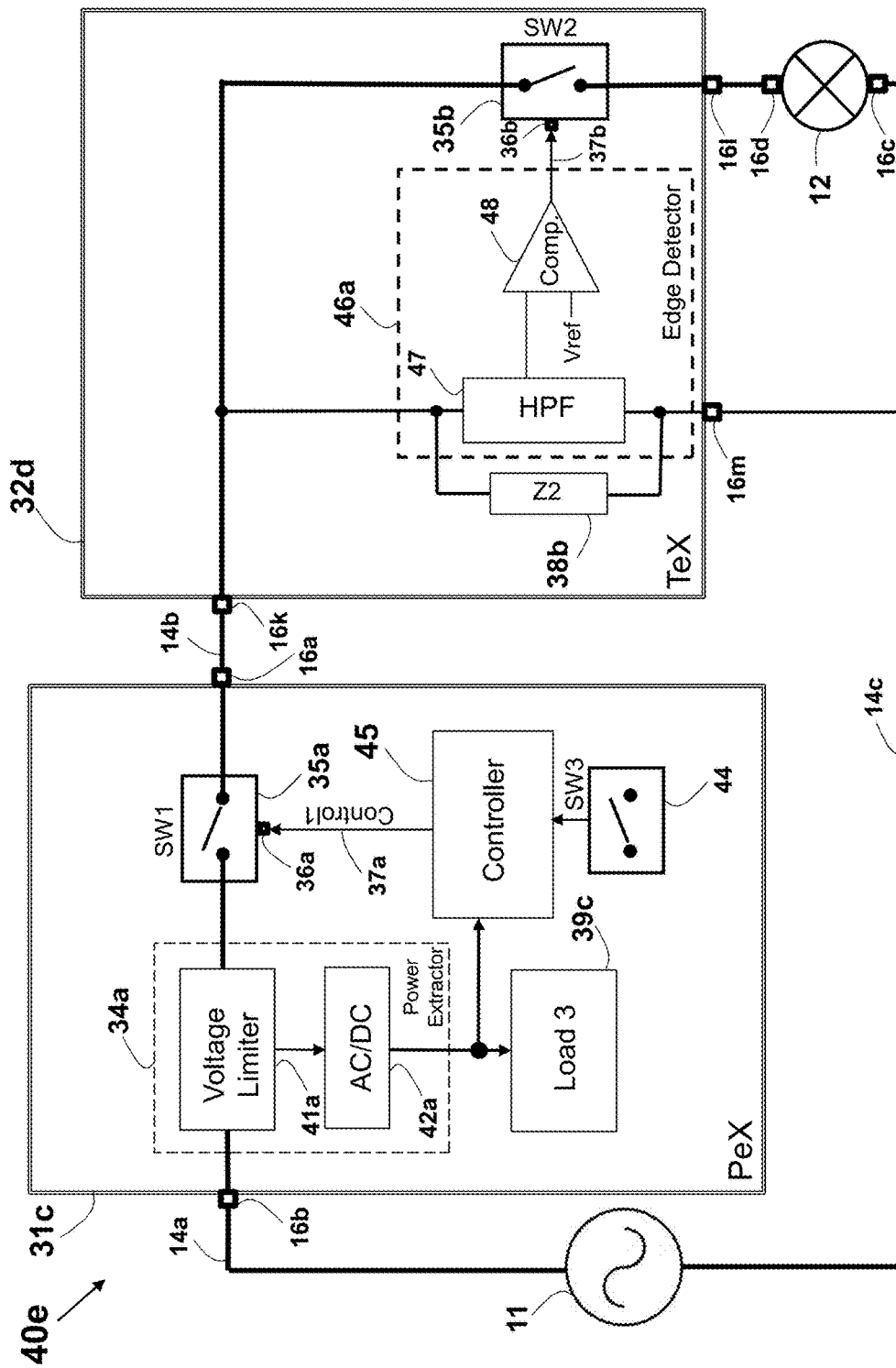
FIG. 4e illustrates an exemplary schematic electrical block diagram of a general power extraction system using a switch-side only power extraction and edge detection without a switch-side impedance.
Figure 10A:
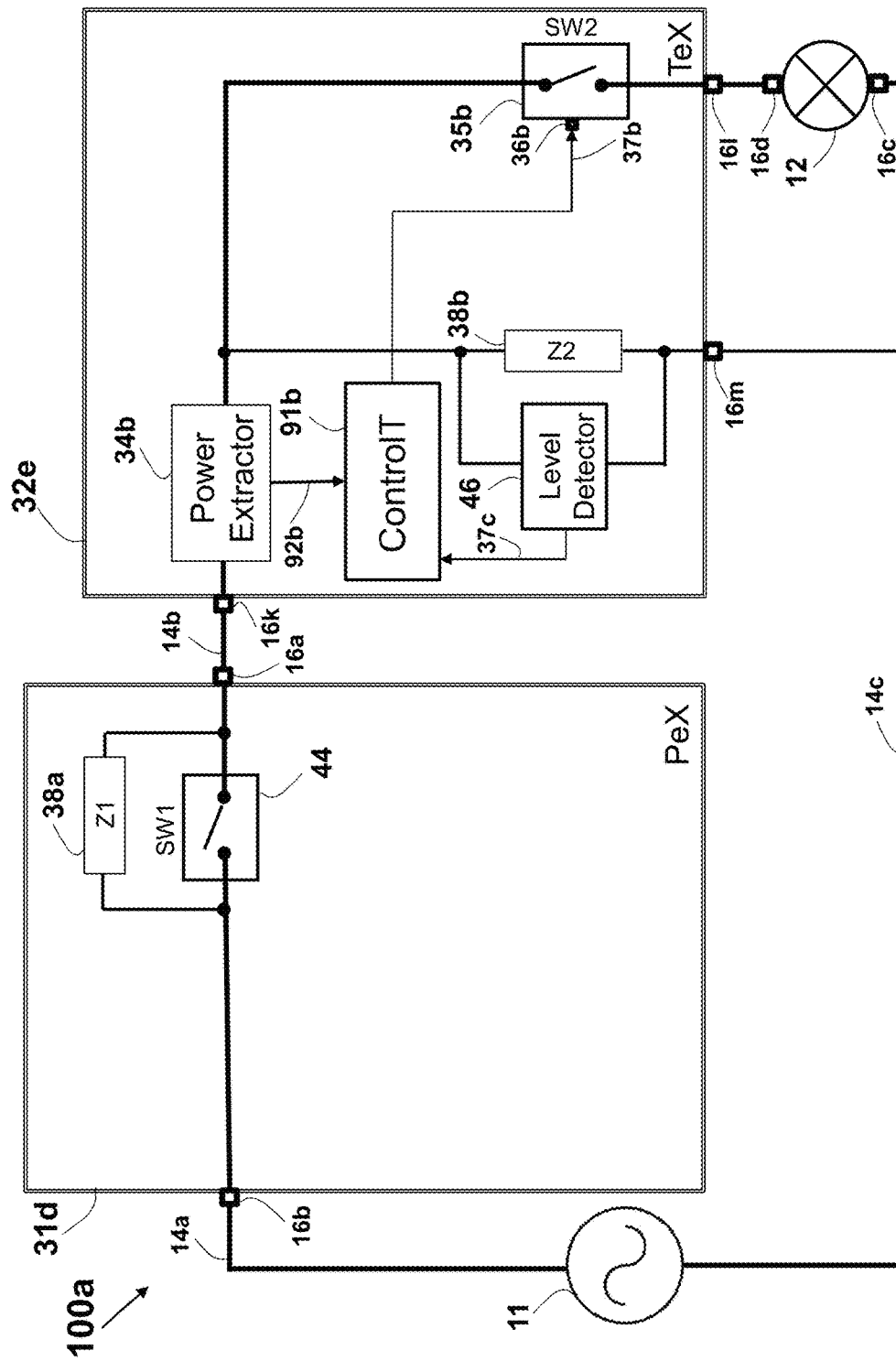
FIG. 10a illustrates an exemplary schematic electrical block diagram of a general power extraction system using a load-side only power extraction and level detection as controller input.
Figure 10B:
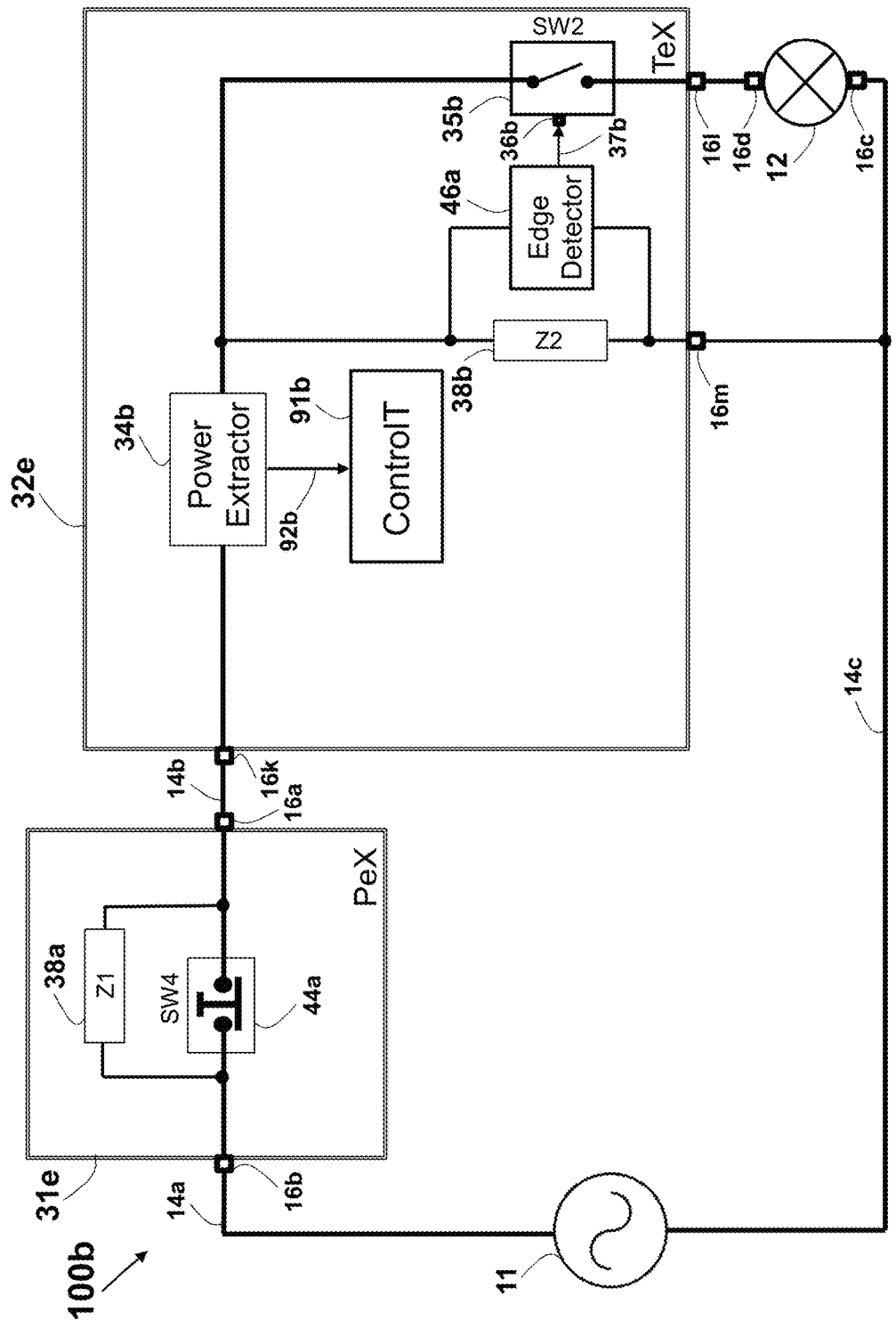
FIG. 10b illustrates an exemplary schematic electrical block diagram of a general power extraction system using a load-side only power extraction and edge detection activation.
Figure 10C:
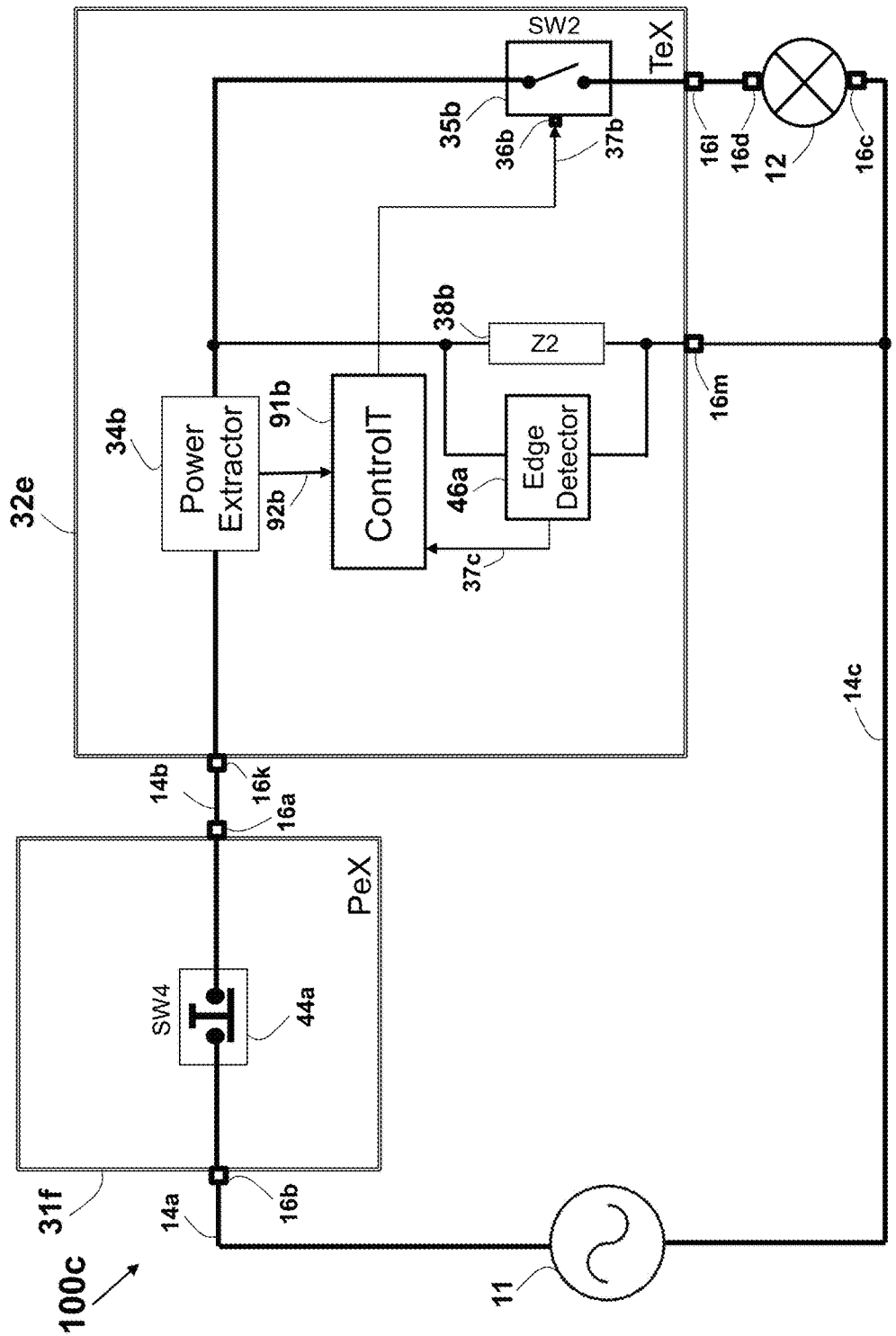
FIG. 10c illustrates an exemplary schematic electrical block diagram of a general power extraction system using a load-side only power extraction and edge detection as controller input.

Alternatively or in addition to the level-based control of the TeX module 32e by the switch SW1 44 in the PeX module 31d shown in the arrangement 100a in FIG. 10a, an edge-detecting scheme may be used, as described in the arrangement 40d shown in FIG. 4d above. Such an arrangement 100b in shown in FIG. 10b, and comprise a PeX module 31e that is based on the PeX module 31d, where the switch SW1 44 is substituted with the push-button switch SW4 44a described above. The pressing of the push-button switch SW4 44a is sensed by the edge detector 46a, as described herein. The Control2 signal is carried over the control connection 37b to control the switch SW2 35b as shown in the arrangement 100b in FIG. 10b. The control connection 37*b* in the TeX module 32*e* in the arrangement 100*b* in FIG. 10*b* is directly coupled, or directly connected, to the edge detector 46*a* for activating the load 12 via the switch SW2 35*b* in response to the detected edge (such as by using a toggle or a latching mechanism) in the voltage developed over the impedance Z2 38*b*. Alternatively or in addition, the edge detector 46*a* output may be connected to serve as an input to a controller, such as the controller 93*b* that is part of the ControlT block 91*b*. Such an arrangement 100*c* is shown in FIG. 10*c*, where the edge detector 46*a* output is connected via connection 37*c* to the ControlT block 91*b*, to be used by the controller 93*b* therein. Based on the detected edge signal received over the connection 37*c*, as well as other sensors and inputs, and according to a predetermined logic, the controller 93*b* in the ControlT block 91*b* sets the TeX module 32*e* that configure the system and load 12 state, and accordingly control and activate the switch SW2 35*b* over the connection 37*b*.

Figure 11:
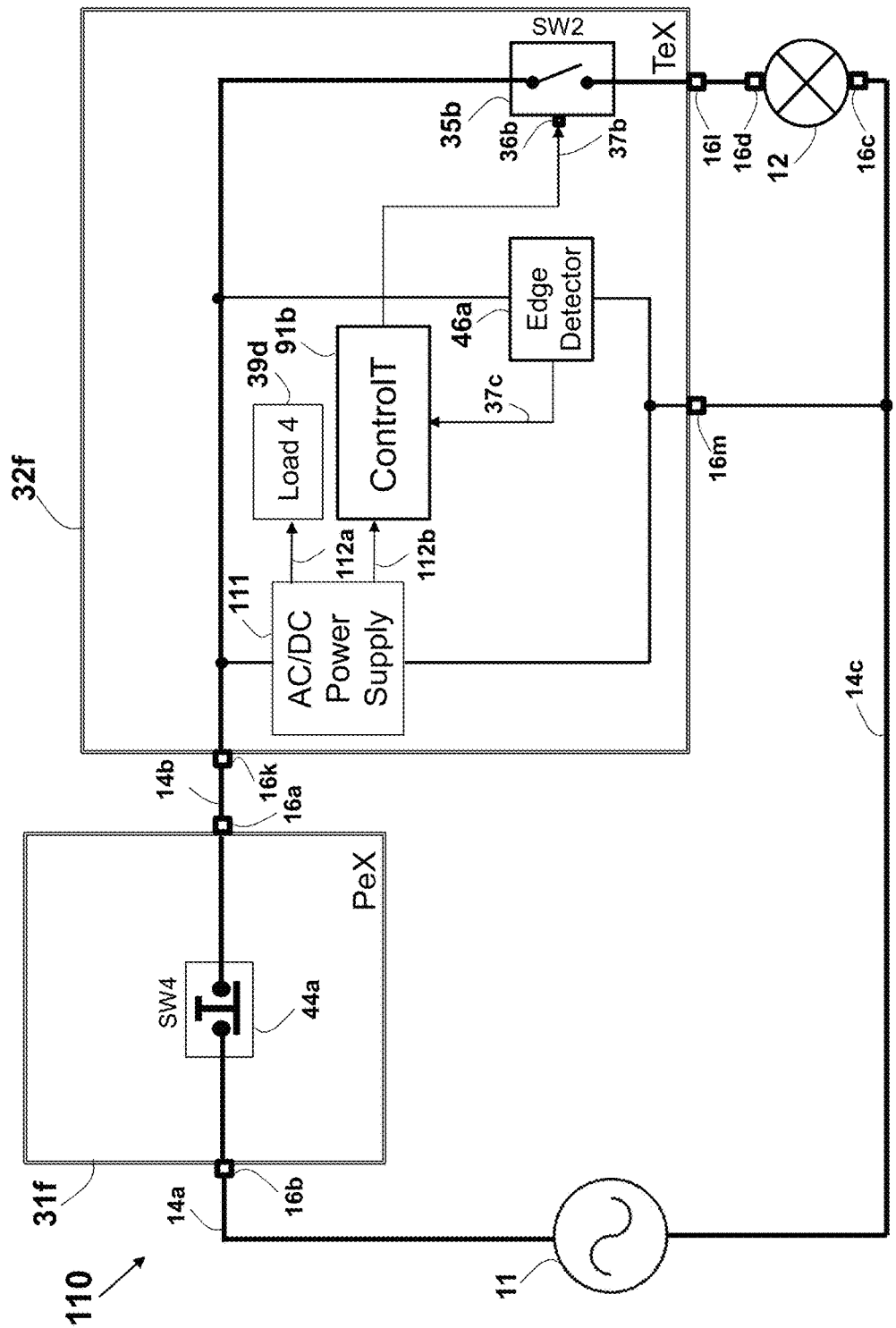
FIG. 11 illustrates an exemplary schematic electrical block diagram of a general power extraction system using a conventional power supply at the load-side.

The power extraction scheme described above involved using power extractors, such as the power extractor 34*a* in the PeX module 31 or the power extractor 34*b* in the TeX module 32, that are serially connected to be powered from the current flowing therein. However, in the case where a PeX module, such as the PeX module 31*f* shown as part of the arrangement 100*c* in FIG. 10*c*, does not employ a switch that normally stop the current therein, the AC voltage by the AC power source 11 is normally available at the TeX module 32, hence a conventional voltage-powered power supply may be used. Such an arrangement 110 is shown in FIG. 11, employing an AC/DC power supply 111 in a TeX module 32*f*. The AC/DC power supply 111 is voltage powered from the AC power source 11 via the push-button 44*a* in the PeX module 31*f* that is normally closed thus allowing the AC current to transparently flow through connection 16*k* of the TeX module 32*f*, and the circuit is closed via the connection 16*m* of the TeX module 32*f*, connected via the wire 14*c* to the power source 11. Any conventional AC to DC power supply may be used, such as linear voltage regulated, or a Switched-Mode Power Supply (SMPS). The power supply commonly provides low-voltage DC that is commonly used for logic circuits, such as 5 VDC or 3.3 VDC, that may be used to power the ControlT block 91*b* via a power connection 112*b*, and any other load in the TeX module 32*f* via ca power connection 112*a*, as exampled by a Load 4 block 39*d*. Similar to the arrangement of the TeX module 32*e* in the arrangement 100*c*, the pressing or otherwise activation of the push-button switch SW4 44*a* is sensed by the edge detector 46*a*, and notified via the connection 37*c* to the ControlT block 91*b*, which uses this input for changing the state of the load 12 by controlling the switch SW2 35*b*. Preferably, the push-button switch SW4 44*a* disconnect the AC current for a short time that is not long enough to interfere with the AC/DC power supply 111.

Figure 12:
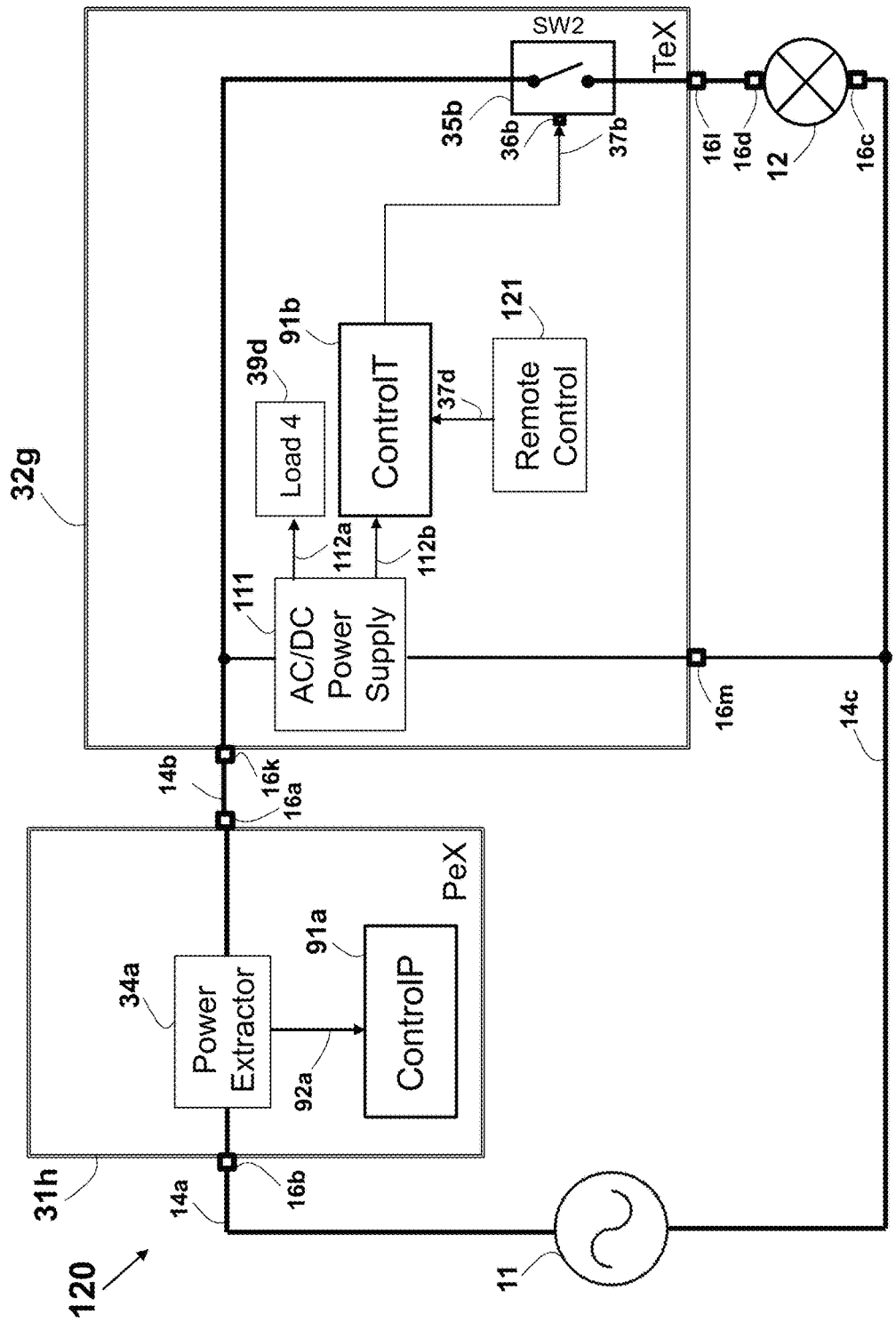
FIG. 12 illustrates an exemplary schematic electrical block diagram of a general power extraction system in both the switch and load sides, and using a remote control powered by a conventional power supply at the load-side.
Figure 12A:
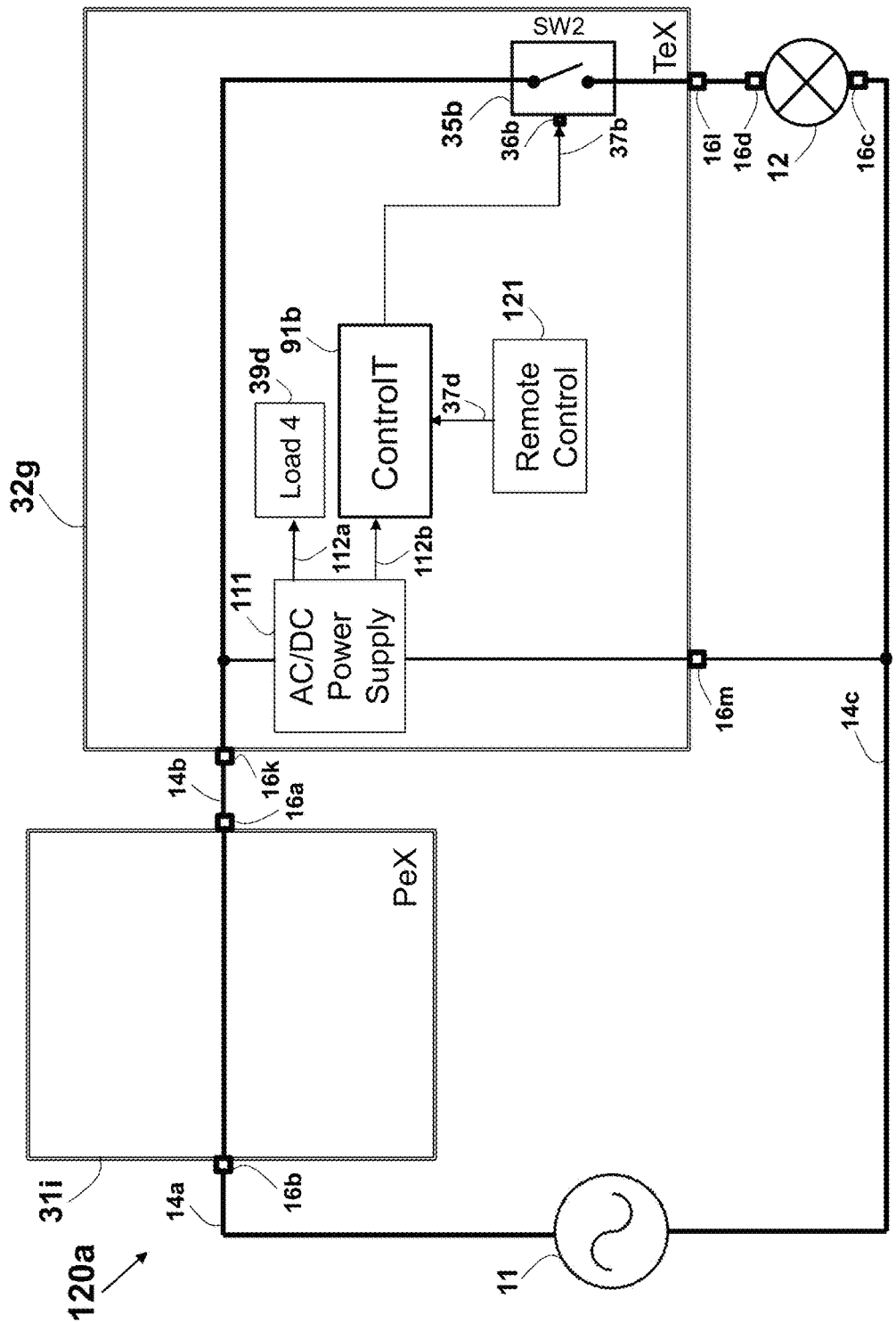
FIG. 12a illustrates an exemplary schematic electrical block diagram of a general power extraction system only in the load side, and using a remote control at the load-side.

While exampled above where the load 12 state (such as 'ON' or 'OFF') is determined at the switch side by the PeX module 31 and notified to the load 12 side to be sensed by the TeX module 32, such as by using level or edge notifying or sensing, the system state may equally be determined (and locally executed) at the load-side by the TeX module 32. Such an arrangement 120 is shown in FIG. 12, where a load-side TeX module 32*g* comprises a remote control block 121, which obtains a command or a request, such as from a user over a wireless network, for activating or deactivating the load 12. The obtained command or request is sent to the controller 93*b* in the ControlT block 91*b* over a connection 37*b*, which employs a pre-determined logic to use the sensed command and to activate or deactivate the load 12 by controlling the switch SW2 35*b* via the control connection 37*b*. The PeX module 31*h* at the switch-side comprises the power extractor 34*a*, which may power any load in the PeX module 31*h*, such as the ControlP block 91*a* via the power connection 92*a*. In this example, no user activated switch (such as the user operated switch SW1 44 or the controlled switch SW1 35*a*) are employed at the switch-side as part of the PeX module 31*h*, since the control is only at the load-side by the TeX module 32*g*. In one example, no local functionality such as a load, a sensor, an actuator, or any processing is required at the switch side, hence there may be no need for power extraction functionality at the PeX module. Such an arrangement 120*a* is shown in FIG. 12*a*, where the PeX module 31*i* does not include any electronic circuits, and in particular no power consuming circuits, and only comprises a wire (or any other conductor) connecting its terminals 16*b* and 16*a*.

Figure 12B:
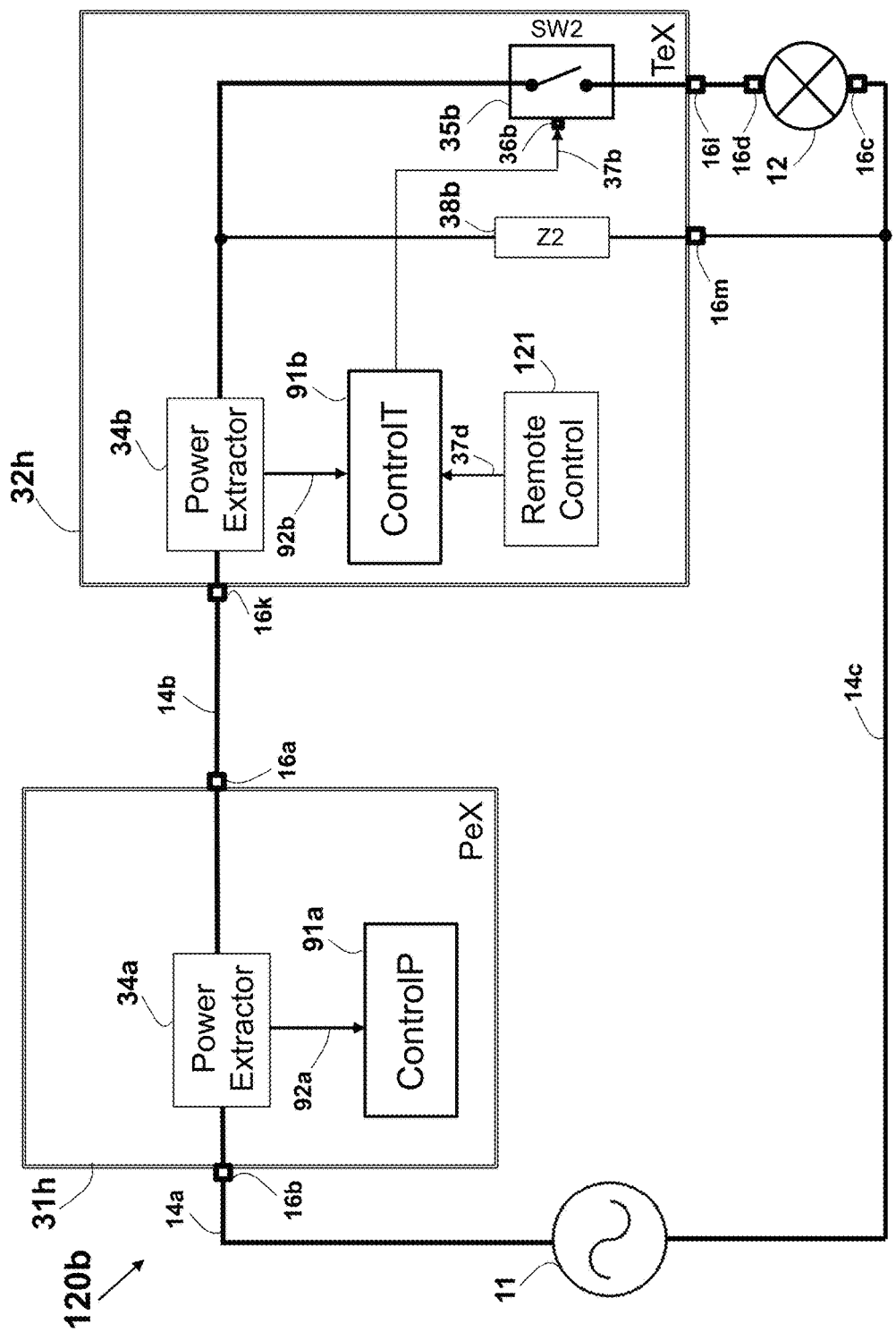
FIG. 12b illustrates an exemplary schematic electrical block diagram of a general power extraction system in both the switch and load sides, and using a remote control powered by a serial power extractor at the load-side.
Figure 12C:
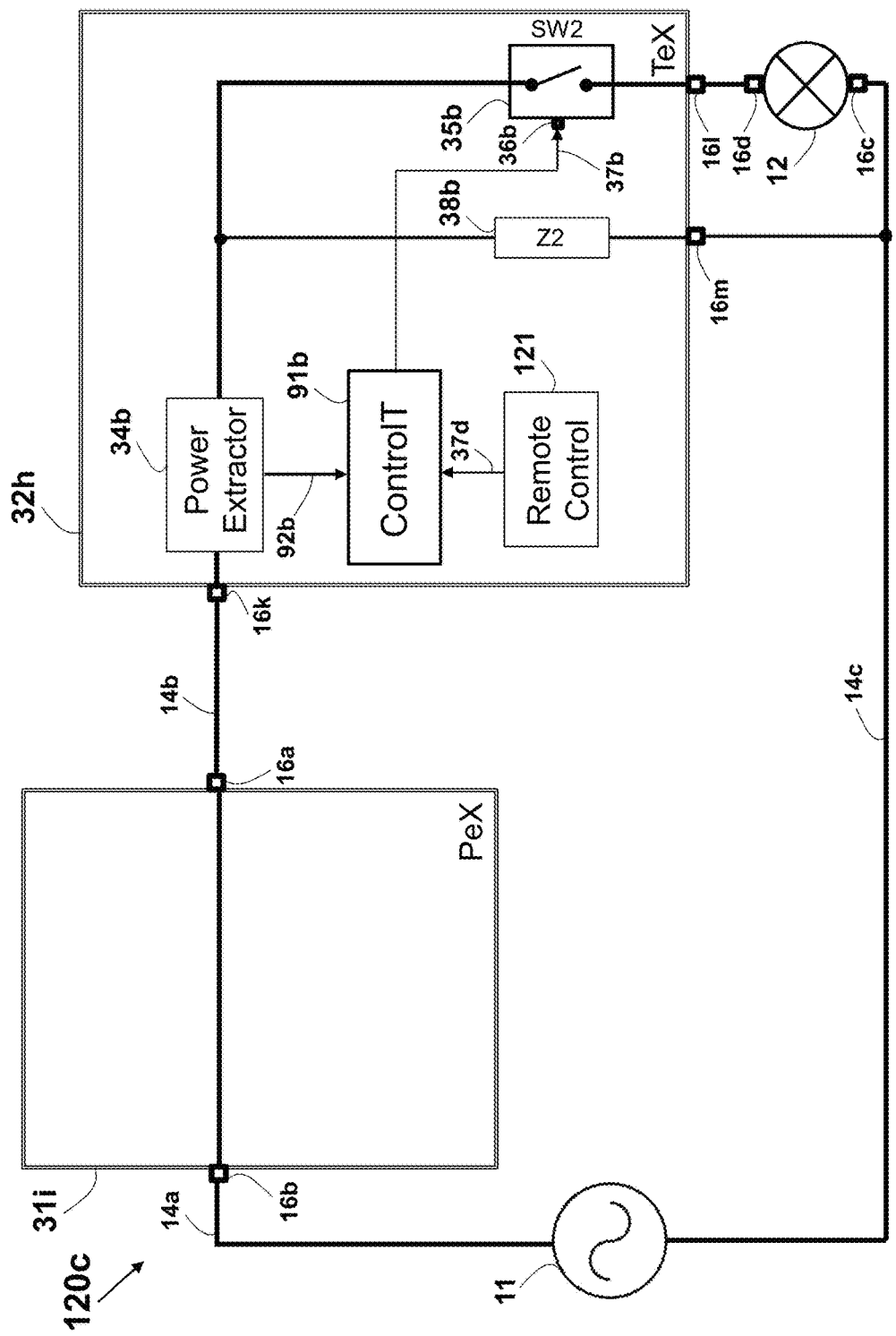
FIG. 12c illustrates an exemplary schematic electrical block diagram of a general power extraction system only in the load sides, and using a remote control powered by a serial power extractor at the load-side.

While using the AC/DC power supply 111 in the TeX module 32*g* was exampled in the arrangements 120 and 120*a*, the serially connected power extractor 34*b* may equally be used, as described in an arrangement 120*b* shown in FIG. 12*b*. The TeX module 32*g* shown to use the AC/DC power supply 111 is replaced with a TeX module 32*h* employing the power extractor 34*b*, as described above. Similar to the arrangement 120*a* shown in FIG. 12*a*, the PeX module 31*h* may be substituted with a connection-only PeX module 31*i*, shown as an arrangement 120*c* in FIG. 12*c*. It is noted that while the TeX module 32*h*, or any other TeX module employing a serially connected power extractor 34*b*, may be used and cooperate with multiple type of PeX modules, such as PeX modules employing switching such as the PeX module 31*b* and with PeX modules without switching such as the PeX module 31*h* or 31*i*, the TeX modules using a parallel connection AC/DC power supply 111 (such as the TeX module 32*g* or 32*f*) may only be used with TeX modules that have no switching functionality, where power is transparently and continuously available, regardless of the system state, to the TeX module.

The load 12 state (such as 'ON' or 'OFF') may be determined at the switch side by the PeX module 31 and notified to the load 12 side via the TeX module 32, such as by using level or edge notifying or sensing, such as the level detecting scheme described for example in the arrangement 40*a* shown in FIG. 4*a*, or the edge detecting scheme described for example in the arrangement 40*b* shown in FIG. 4*b*. The load 12 state (such as 'ON' or 'OFF') may be determined locally at the switch side by the user activating a manual switch 44, that may be integrated with the PeX module 31 or external and connected thereto. Alternatively or in addition, the load 12 state may be remotely commanded, such as a state command received over a wireless network.

Figure 13:
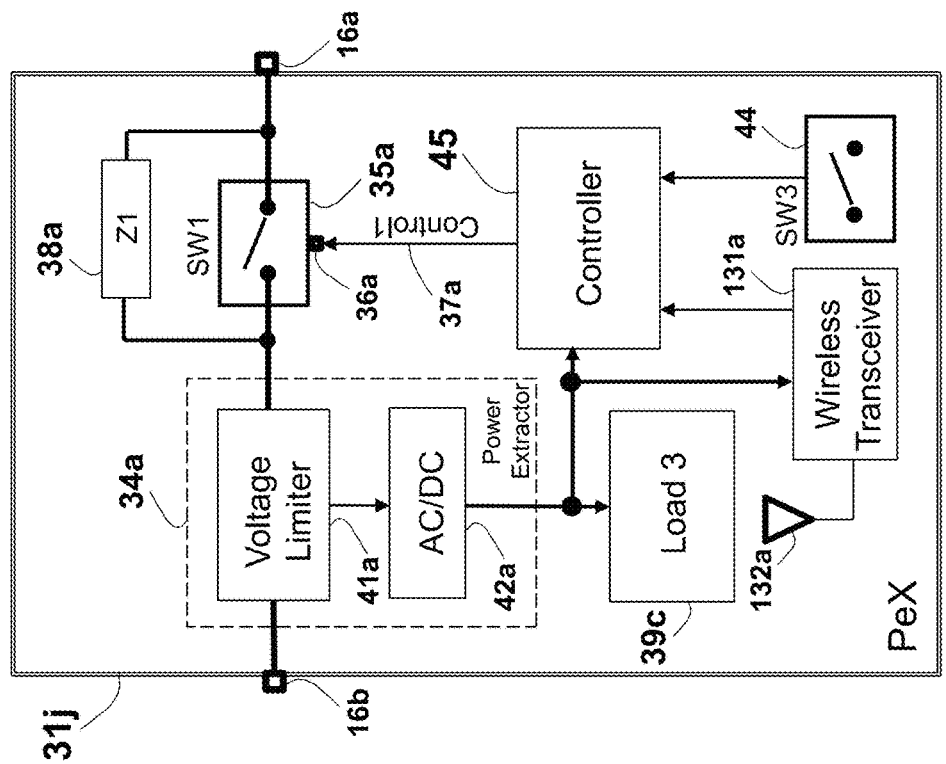
FIG. 13 illustrates an exemplary schematic electrical block diagram of a wirelessly controlled switch-side module.
Figure 13A:
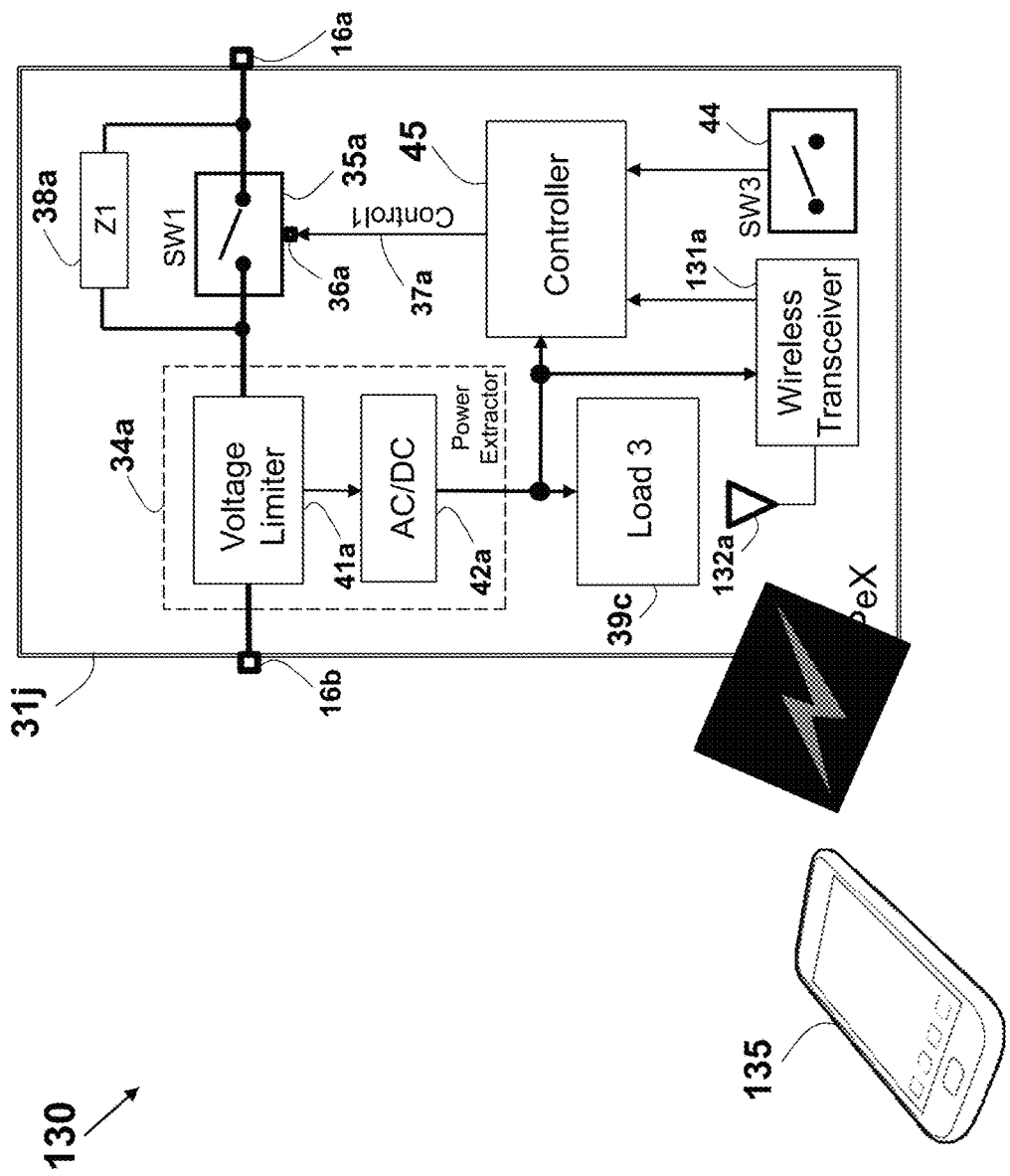
FIG. 13a illustrates an exemplary schematic electrical block diagram of a switch-side module wirelessly controlled by a smartphone.
Figure 13B:
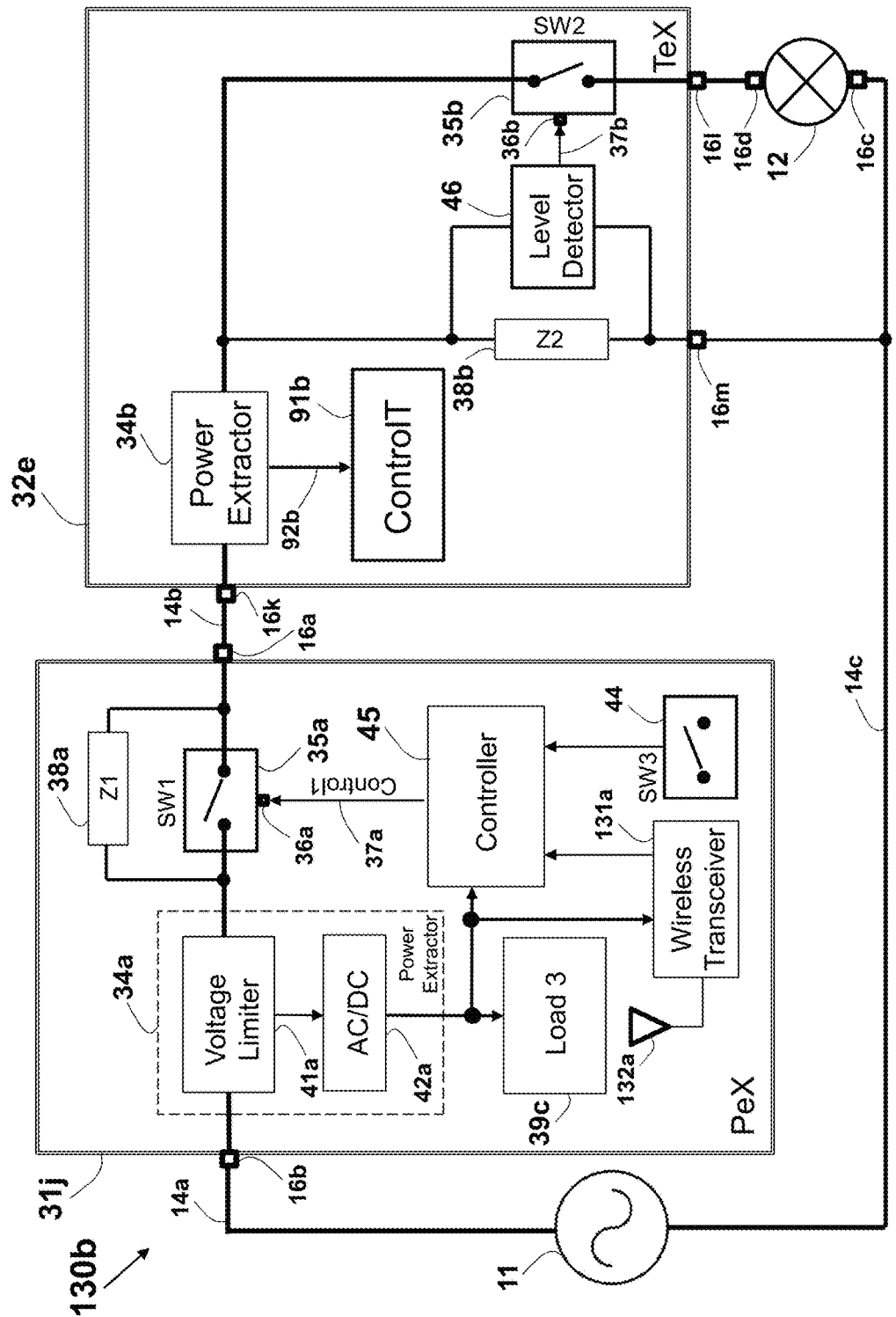
FIG. 13b illustrates an exemplary schematic electrical block diagram of a general power extraction system using a wirelessly controlled switch-side module.

A wirelessly controlled PeX module 31*j* is described in FIG. 13, and comprises a wireless transceiver 131*a*, which is typically a wireless modem, connected to an antenna 132*a* and powered from the power extractor 34*a*. The antenna 132*a* is used for transmitting and receiving over-the-air Radio-Frequency (RF) based communication signals. Commands received over the air are received by the antenna 132*a*, processed by the wireless transceiver 131*a*, and transmitted to the controller 45. Based on the wirelessly received commands, and on the sensed switch SW3 44 state, the controlled switch SW1 35*a* is controlled via the connection 37*a* carrying the Control1 signal. The switch SW1 35*a* activation is sensed at the TeX module by level or edge detection, as described herein. An example of an arrangement 130*b* using the wirelessly commanded PeX module 31*j* in cooperation with a level detection based TeX module 32e is shown in FIG. 13b. While using the mechanically activated switch SW3 44 requires the user to be in the vicinity of a PeX module 31 and may require to physically touch the switch, the wireless functionality of the PeX module 31j allows a user to be remotely located from the system, and to send the command wirelessly. For example, the user may use a wireless hand-held device such as a smartphone 135 to remotely command the load 12 state, as shown in an arrangement 130 in FIG. 13a.

The smartphone 135 may be replaced with any device having wireless functionality, and such device may consist of, be part of, or include, a Personal Computer (PC), a desktop computer, a mobile computer, a laptop computer, a notebook computer, a tablet computer, a server computer, a handheld computer, a handheld device, a Personal Digital Assistant (PDA) device, or a cellular handset. Alternatively or in addition, such a device may consist of, be part of, or include, a handheld PDA device, an on-board device, an off-board device, a hybrid device, a vehicular device, a non-vehicular device, a mobile device, or a portable device.

In one example, the system state is controlled by both the manually user activated switch SW3 44 and the wirelessly received commands obtained via the antenna 132a and the wireless transceiver 131a. For example, each of the manual switch SW3 44 and the wireless commands may cause the load 12 to one of the 'ON' and the 'OFF' state. Alternatively or in addition, each wireless command or switch SW3 44 state change toggle the load 12 state. Alternatively or in addition, the latter received command affects the system. For example, if the system is in the 'ON' state, an 'OFF' state command, either from the manually operated switch SW3 44 or wirelessly received command affects the 'OFF' state. Similarly, if the system is in the 'OFF' state, an 'ON' state command, either from the manually operated switch SW3 44 or wirelessly received command affects the 'ON' state.

Alternatively or in addition, the system state may be determined at the load-side, such as by using the remote control block 121 in the arrangements 120-120c. In one example, the remote control block 121 may use wireless communication, as shown relating to the TeX module 32i illustrated in FIG. 14. The remote control block 121 may consist of, comprise, or use a wireless transceiver 131b connected to an antenna 132b, and powered from the AC/DC power supply 111 via the power connection 112c. Similar to the use in the PeX module 31j described above, wirelessly sent commands are received by the antenna 132b and the wireless transceiver 131b, which is typically a wireless modem, and sent via the connection 37d to the ControlT block 91b, to be processed by the controller 93b therein. Based on a pre-determined logic, the controller 93b connects via the connection 37b to activate the controlled switch SW2 35b via the control port 36b, for setting the load 12 in the required state, being 'ON' or 'OFF', according to the wirelessly received command and the pre-set logic. The wireless functionality of the TeX module 32i allows a user to be remotely located from the system, and to send the command wirelessly. For example, the user may use a wireless hand-held device such as the smartphone 135 to remotely command the load 12 state, as shown in an arrangement 140 in FIG. 14a.

Figure 14:
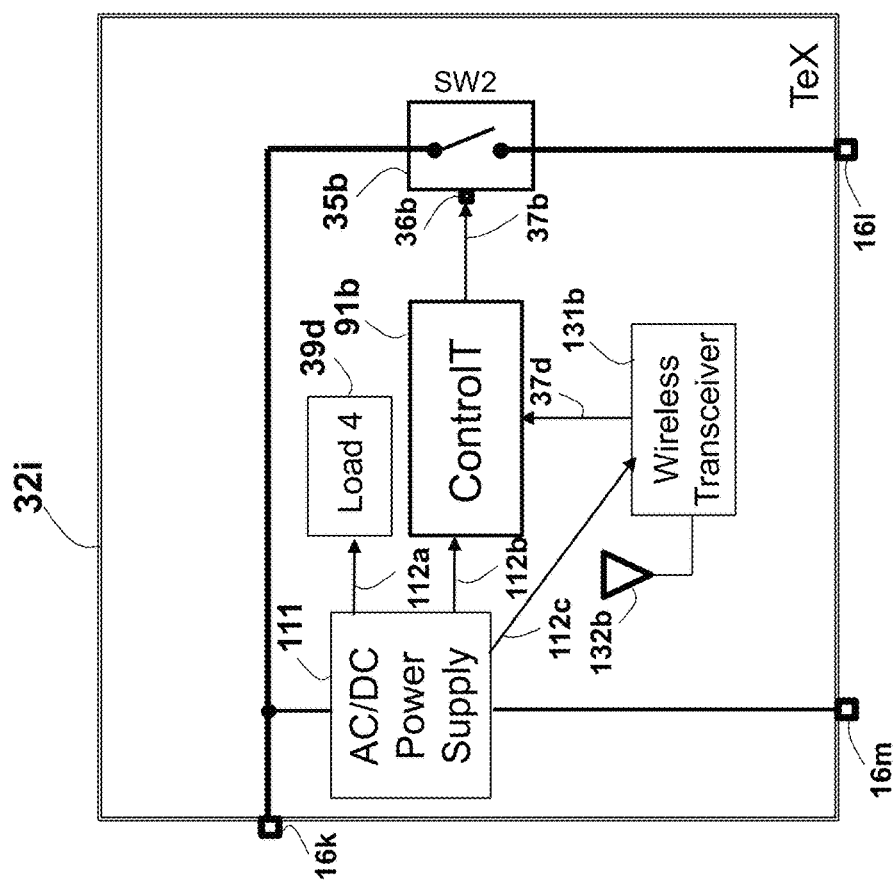
FIG. 14 illustrates an exemplary schematic electrical block diagram of a wirelessly controlled load-side module using a conventional power supply.
Figure 14A:
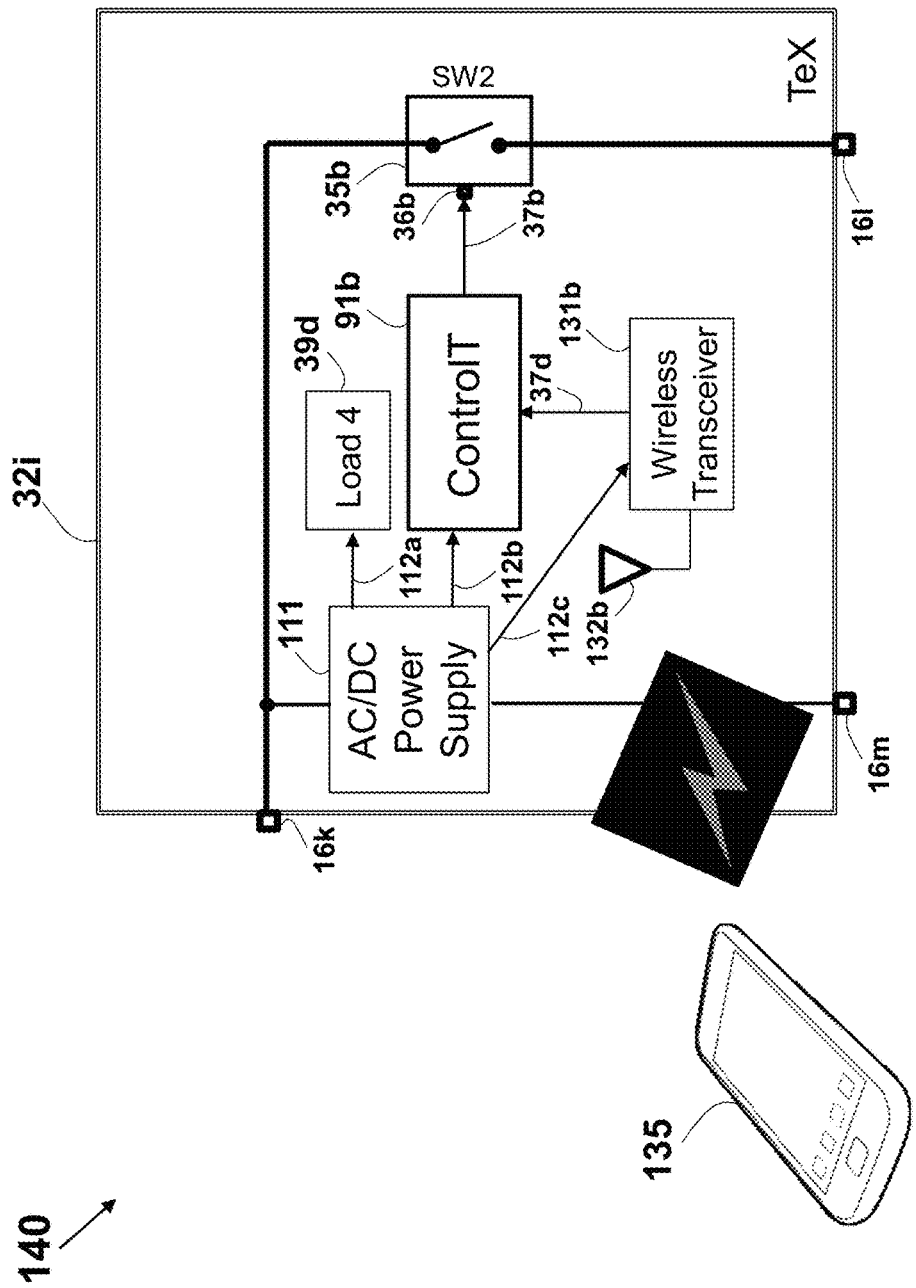
FIG. 14a illustrates an exemplary schematic electrical block diagram of a load-side module wirelessly controlled by a smartphone.
Figure 14B:
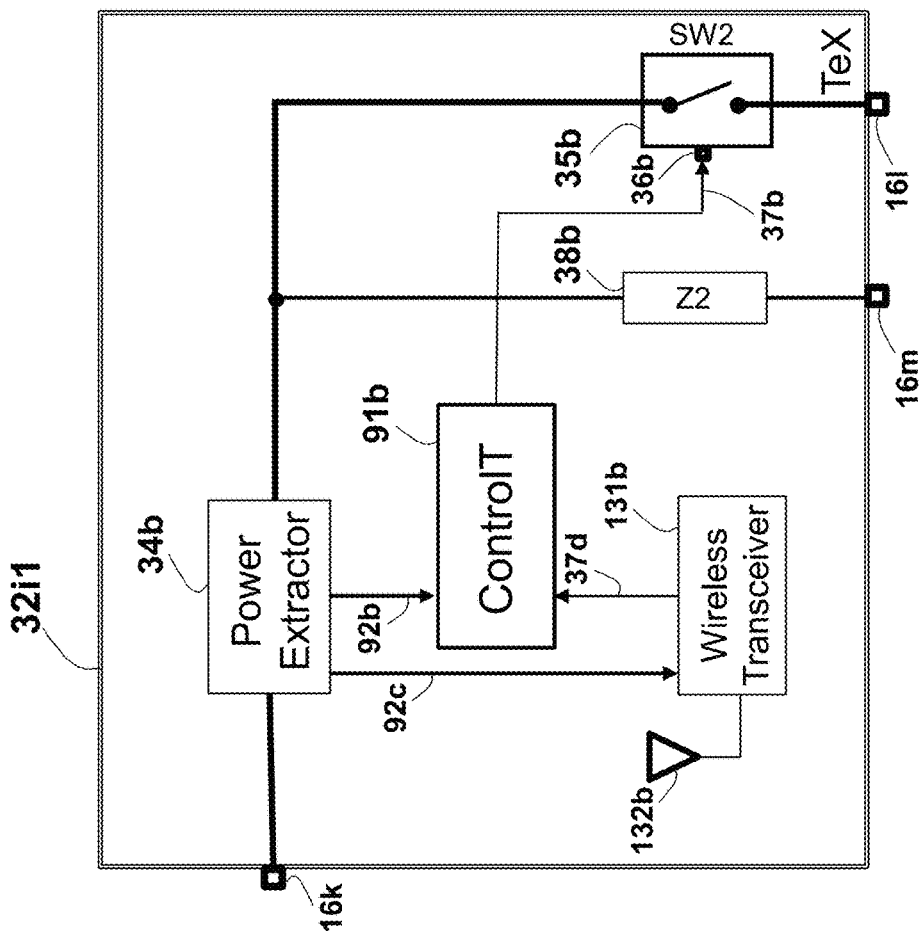
FIG. 14b illustrates an exemplary schematic electrical block diagram of a wirelessly controlled load-side module using a serially connected power extraction.
Figure 14C:
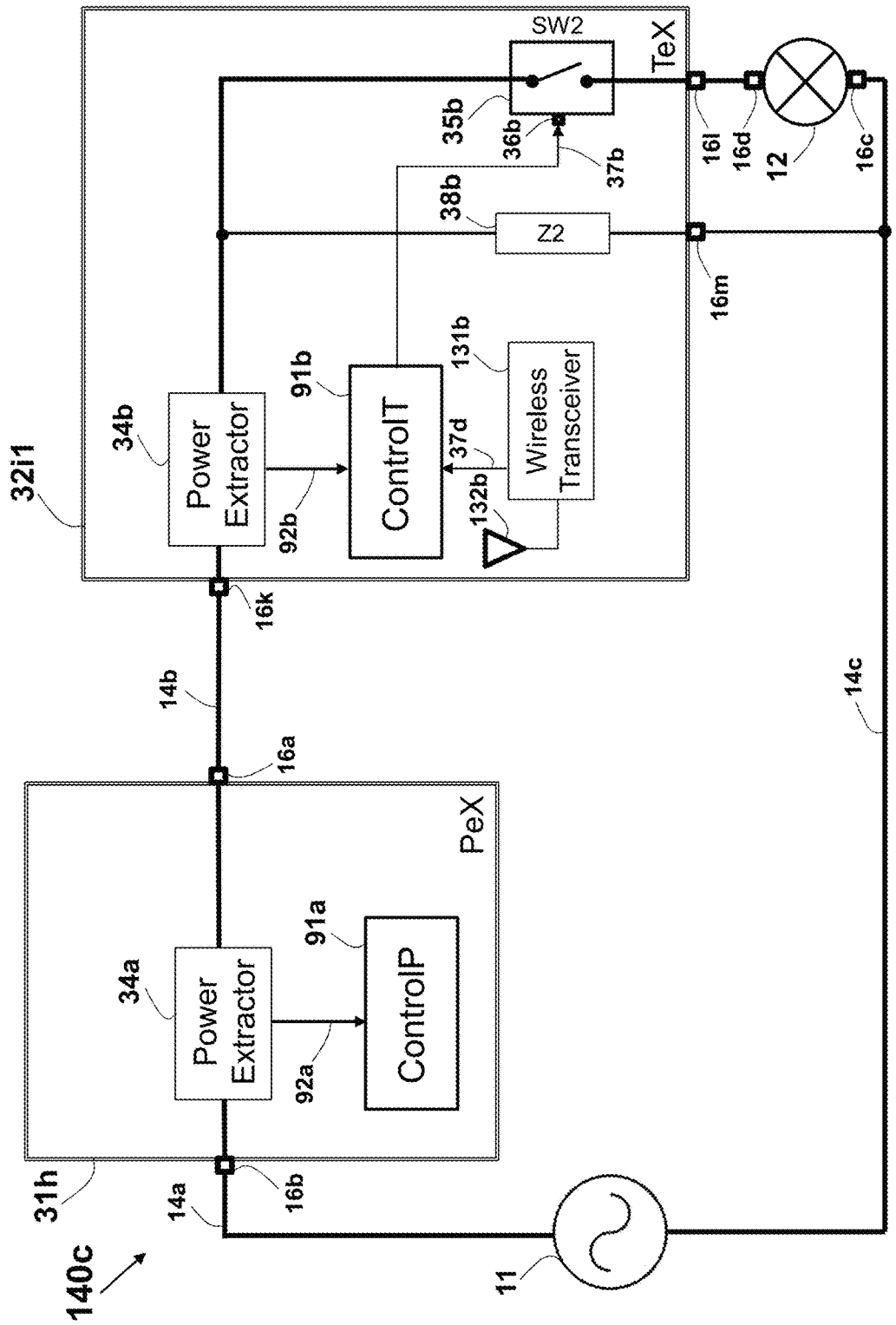
FIG. 14c illustrates an exemplary schematic electrical block diagram of a general power extraction system using a wirelessly controlled load-side module.

The TeX module 32i was described in FIG. 14 to supply DC power to the load 4 39d, the ControlT block 91b, and the wireless transceiver 131b using the AC/DC power supply 111. Hence, the TeX module 32i may be used only in cooperation with non-switching PeX modules such as the PeX modules 31f, 31h, or 31i. A serial power extraction may equally be used, as exampled by a TeX 32i1 shown in FIG. 14b, where the ControlT block 91b is powered from the power extractor 34b via the power connection 92b, and the wireless transceiver 131b is powered from the power extractor 34b via a power connection 92c. The TeX module 32i1 may be used in cooperation with both non-switching PeX modules such as the PeX modules 31f, 31h, or 31i, as well as with switching PeX modules such as the PeX modules 31b or 31d. An arrangement 140c illustrating the using of the PeX module 31h and the TeX module 32i1 is shown in FIG. 14c.

The arrangement 40a in FIG. 4a illustrates sensing by the TeX module 32a the switch SW1 35a state at the PeX module 31 using level detection, such as by using the level detector 46, and the arrangement 40b in FIG. 4b illustrates sensing at the TeX module 32d the switch SW1 35a state at the PeX module 31 using edge detection, such as by using the edge detector 46a. Alternatively or in addition, a state command or any other information may be transmitted from a PeX module 31 to a TeX module 32 using wireless communication, as exampled in an arrangement 150 shown in FIG. 15. A PeX module 31k is used at the switch side, which is based on the PeX module 31j shown in FIG. 13 having a wireless connectivity by using the wireless transceiver 131a and the antenna 132a, however not including a switching component such as the switch SW1 35a. Hence, the AC power is continuously available to the TeX module 32i, allowing the use of the AC/DC power supply 111. The AC/DC power supply 111 may be equally substituted with the serial power extractor 34b. As described above, the TeX module 32i includes a wireless functionality by using the wireless transceiver 131b and the antenna 132b. The wireless functionalities available at both the PeX module 31k and the TeX module 32i may be used for determining the state at the PeX module 31k, wirelessly sending the required state command to the TeX module 32i, and shifting to the determined state therein. In one example, the controller 45 detects the state of manual switch SW3 44 that may be set by the user to indicate the required state, and transmit the required state command wirelessly over the air by the antenna 132a and the wireless transceiver 131a. The transmitted signal is received by the wireless transceiver 131b at the TeX module 32i via the antenna 132b, and the command is output to the control block 91b, to be used for activating the controlled switch SW2 35b, thereby setting the load 12 state to 'ON' or 'OFF' as per the wirelessly received command.

A wireless ad-hoc network, also known as Independent Basic Service Set (IBSS), is a computer network in which the communication links are wireless. The network is ad-hoc because each node is willing to forward data for other nodes, and so the determination of which nodes forward data is made dynamically based on the network connectivity. In one configuration, the wireless communication between the commanding PeX module 31k and the commanded TeX module 32i is based on ad-hok (decentralized) networking, where messages are directly communicated between the wireless transceiver 131a in the PeX module 31k and the wireless transceiver 131b in the TeX module 32i, without using or relying on any pre-existing infrastructure such as a router or an access-point. Such an ad-hoc networking scheme is shown as an arrangement 150a in FIG. 15a, illustrating a wireless link (as a dashed line 151) serving as a direct communication between the modules. The dashed line 151 represents the non-switching AC current route through the PeX module that allows the use of the AC/DC power supply 111 as shown in the detailed scheme of the TeX module 32*i* in the arrangement 150 in FIG. 15.

Alternatively or in addition, the wireless communication may use an infrastructure supporting centralized management or routing, where a router, access-point, switch, hub, or firewall performs the task of central management, and the routing or forwarding of the data. Such an arrangement 150*b* is shown in FIG. 15*b*, employing a Wireless Access Point (WAP) 155 that communicates with the PeX module 31*k* over a wireless link 152*b*, with the TeX module 32*i* over a wireless link 152*c*, and with the smartphone 135 over a wireless link 152*d*. All messages or packets are generally received at the WAP 155, which in turn transmits the messages or packets to the intended recipient. For example, a command from the PeX module 31*k* is sent over the wireless link 152*b* to the WAP 155, which in turn routes and sends the command to the TeX module 32*i* over the wireless link 152*c*, forming the virtual messaging link shown as a dashed line 153*a*, as shown in an arrangement 150*c* in FIG. 15*c*. The wireless infrastructure may further be used for remote control such as by the smartphone 135, similar to the arrangement 130 shown in FIG. 13*a* above. In such a case, shown as an arrangement 150*d* in FIG. 15*d*, the smartphone 135 sends the command to the WAP 155 over the wireless link 152*d*, destined to the PeX module 31*k*. The WAP 155 in turn routes and sends the command to the PeX module 31*k* over the wireless link 152*b*, forming the virtual messaging link shown as a dashed line 153*b*. Upon receiving the command, the PeX module 31*k* sends the command to the TeX module 32*i* via the WAP 155 over the virtual messaging link shown as the dashed line 153*a* described above. Alternatively or in addition, as shown in an arrangement 150*e* in FIG. 15*e*, the smartphone 135 sends the command to the WAP 155 over the wireless link 152*d*, destined to the TeX module 32*i*. The WAP 155 in turn routes and sends the command to the TeX module 32*i* over the wireless link 152*c*, forming the virtual messaging link shown as a dashed line 153*c*. In one example, an acknowledgement of the received command is transmitted back from the TeX module 32*i* to the smartphone 135 via the WAP 155. Further, the wireless networking functionality may be used for transmitting messages and notifications from the PeX module 31*k* using the wireless transceiver 131*a* (and the antenna 132*a*). Alternatively or in addition, the wireless networking functionality may be used for transmitting messages and notifications from the TeX module 32*i* using the wireless transceiver 131*b* (and the antenna 132*b*). For example, a sensor output or any other status or measurement in the system may be transmitted over the wireless network to a device external to the system.

The networking or the communication between the wireless-capable PeX module 31*k*, the wireless-capable TeX module 32*i*, and the smartphone 135 described in the arrangements 140-150*e* shown in FIGS. 14*a*-15*e* may be using, may be according to, or may be based on, a Body Area Network (BAN) that may be according to, or based on, IEEE 802.15.6 standard, and each of the wireless transceivers 131*a* and 131*b* may be a BAN modem, and each of the respective antennas 132*a* and 132*b* may be a BAN antenna. Alternatively or in addition, the networking or the communication between the wireless-capable PeX module 31*k*, the wireless-capable TeX module 32*i*, and the smartphone 135 described in the arrangements 140-150*e* shown in FIGS. 14*a*-15*e* may be using, may be according to, or may be based on, Near Field Communication (NFC) using passive or active communication mode, and may use the 13.56 MHz frequency band, and data rate may be 106 Kb/s, 212 Kb/s, or 424 Kb/s, and the modulation may be Amplitude-Shift-Keying (ASK), and may be according to, or based on, ISO/IEC 18092, ECMA-340, ISO/IEC 21481, or ECMA-352. In such a case, each of the wireless transceivers 131*a* and 131*b* may be an NFC transceiver and each of the respective antennas 132*a* and 132*b* may be an NFC antenna.

Alternatively or in addition, the networking or the communication between the wireless-capable PeX module 31*k*, the wireless-capable TeX module 32*i*, and the smartphone 135 described in the arrangements 140-150*e* shown in FIGS. 14*a*-15*e* may be using, may be according to, or may be based on, a Personal Area Network (PAN) that may be according to, or based on, Bluetooth™ or IEEE 802.15.1-2005 standards, and each of the wireless transceivers 131*a* and 131*b* may be a PAN modem, and each of the respective antennas 132*a* and 132*b* may be a PAN antenna. Alternatively or in addition, the networking or the communication between the wireless-capable PeX module 31*k*, the wireless-capable TeX module 32*i*, and the smartphone 135 described in the arrangements 140-150*e* shown in FIGS. 14*a*-15*e* may be using, may be according to, or may be based on, a Wireless Personal Area Network (WPAN) that may be according to, or based on, Bluetooth™ or IEEE 802.15.1-2005 standards, and each of the wireless transceivers 131*a* and 131*b* may be a WPAN modem, and each of the respective antennas 132*a* and 132*b* may be a WPAN antenna. The WPAN may be a wireless control network according to, or based on, Zigbee™ or Z-Wave™ standards, such as IEEE 802.15.4-2003.

Alternatively or in addition, the networking or the communication between the wireless-capable PeX module 31*k*, the wireless-capable TeX module 32*i*, and the smartphone 135 described in the arrangements 140-150*e* shown in FIGS. 14*a*-15*e* may be using, may be according to, or may be based on, a Wireless Local Area Network (WLAN) that may be according to, or based on, IEEE 802.11a, IEEE 802.11b, IEEE 802.11g, IEEE 802.11n, or IEEE 802.11ac standards, and each of the wireless transceivers 131*a* and 131*b* may be a WLAN modem, and each of the respective antennas 132*a* and 132*b* may be a WLAN antenna. Alternatively or in addition, the networking or the communication between the wireless-capable PeX module 31*k*, the wireless-capable TeX module 32*i*, and the smartphone 135 described in the arrangements 140-150*e* shown in FIGS. 14*a*-15*e* may be using, may be according to, or may be based on, a wireless broadband network or a Wireless Wide Area Network (WWAN), and each of the wireless transceivers 131*a* and 131*b* may be a WWAN modem, and each of the respective antennas 132*a* and 132*b* may be a WWAN antenna. The WWAN may be a WiMAX network such as according to, or based on, IEEE 802.16-2009, and each of the wireless transceivers 131*a* and 131*b* may be a WiMAX modem, and each of the respective antennas 132*a* and 132*b* may be a WiMAX antenna. Alternatively or in addition, the WWAN may be a cellular telephone network and each of the wireless transceivers 131*a* and 131*b* may be a cellular modem, and each of the respective antennas 132*a* and 132*b* may be a cellular antenna. The WWAN may be a Third Generation (3G) network and may use UMTS W-CDMA, UMTS HSPA, UMTS TDD, CDMA2000 1xRTT, CDMA2000 EV-DO, or GSM EDGE-Evolution. The cellular telephone network may be a Fourth Generation (4G) network and may use HSPA+, Mobile WiMAX, LTE, LTE-Advanced, MBWA, or may be based on IEEE 802.20-2008. Alternatively or in addition, the WWAN may be a satellite network, and each of the wireless transceivers 131*a* and 131*b* may be a satellite modem, and each of the respective antennas 132*a* and 132*b* may be a satellite antenna.

Alternatively or in addition, the networking or the communication between the wireless-capable PeX module 31$k$, the wireless-capable TeX module 32$i$, and the smartphone 135 described in the arrangements 140-150$e$ shown in FIGS. 14$a$-15$e$ may be using an analog Frequency Modulation (FM) over license-free band such as the LPD433 standard that uses frequencies with the ITU region 1 ISM band of 433.050 MHz to 434.790 MHz, and each of the wireless transceivers 131$a$ and 131$b$ may be a LPD433 modem, and each of the respective antennas 132$a$ and 132$b$ may be a LPD433 antenna.

Alternatively or in addition, the networking or the communication between the wireless-capable PeX module 31$k$, the wireless-capable TeX module 32$i$, and the smartphone 135 described in the arrangements 140-150$e$ shown in FIGS. 14$a$-15$e$ may be using licensed or an unlicensed radio frequency band, such as the Industrial, Scientific and Medical (ISM) radio band. For example, an unlicensed radio frequency band may be used that may be about 60 GHz, may be based on beamforming, and may support a data rate of above 7 Gb/s, such as according to, or based on, WiGig™, IEEE 802.11ad, WirelessHD™ or IEEE 802.15.3c-2009, and may be operative to carry uncompressed video data, and may be according to, or based on, WHDI™. Alternatively or in addition, the wireless network may use a white space spectrum that may be an analog television channel consisting of a 6 MHz, 7 MHz or 8 MHz frequency band, and allocated in the 54-806 MHz band. The wireless network may be operative for channel bonding, and may use two or more analog television channels, and may be based on Wireless Regional Area Network (WRAN) standard using OFDMA modulation. Further, the wireless communication may be based on geographically-based cognitive radio, and may be according to, or based on, IEEE 802.22 or IEEE 802.11af standards.

The wireless functionality was exampled in the arrangements 140-150$e$ shown in FIGS. 14$a$-15$e$ for commanding and controlling the system, and in particular for affecting the load 12 state. Alternatively or in addition, the wireless functionality may be used for sending notification over a wireless network to a user, such as to the smartphone 135 operated, or used by the user. For example, the wireless transceiver 131$a$ in the wireless-capable PeX module 31$j$ or 31$k$ may be used by the controller 45 to send notification to the user over the air via the antenna 132$a$. The notification may be used to provide notice to the user about an event or occurrence, such as acknowledgement notifying the proper receipt of a state command, the commanded load 12 state, or a notification based on the sensing a phenomenon by the sensor 94$a$. For example, the sensor 94$a$ output may be notified on a periodic basis or upon change sensing of the sensor 94$a$ output, such as when the output exceeds a pre-set maximum threshold or is below a pre-set minimum threshold. Alternatively or in addition, the wireless transceiver 131$b$ in the wireless-capable TeX module 32$i$ or 32$i$1 may be used by the controller 93$b$ in the ControlT block 91$b$ to send notification to the user over the air via the antenna 132$b$. The notification may be used to provide notice to the user about an event or occurrence, such as acknowledgement, notifying the proper receipt of a state command, the actual sensed, measured, or commanded load 12 state, or a notification based on the sensing a phenomenon by the sensor 94$b$. For example, the sensor 94$b$ output may be notified on a periodic basis or upon sensing a change in the sensor 94$b$ output, such as when the output exceeds a pre-set maximum threshold, or is below a pre-set minimum threshold.

The notification to the user device may be text based, such as an electronic mail (e-mail), website content, fax, or a Short Message Service (SMS). Alternatively or in addition, the notification or alert to the user device may be voice based, such as a voicemail, a voice message to a telephone device. Alternatively or in addition, the notification or the alert to the user device may activate a vibrator, causing vibrations that are felt by human body touching, or may be based on a Multimedia Message Service (MMS) or Instant Messaging (IM). The messaging, alerting, and notifications may be based on, include part of, or may be according to U.S. Patent Application No. 2009/0024759 to McKibben et al. entitled: "System and Method for Providing Alerting Services", U.S. Pat. No. 7,653,573 to Hayes, Jr. et al. entitled: "Customer Messaging Service", U.S. Pat. No. 6,694,316 to Langseth. et al. entitled: "System and Method for a Subject-Based Channel Distribution of Automatic, Real-Time Delivery of Personalized Informational and Transactional Data", U.S. Pat. No. 7,334,001 to Eichstaedt et al. entitled: "Method and System for Data Collection for Alert Delivery", U.S. Pat. No. 7,136,482 to Wille entitled: "Progressive Alert Indications in a Communication Device", U.S. Patent Application No. 2007/0214095 to Adams et al. entitled: "Monitoring and Notification System and Method", U.S. Patent Application No. 2008/0258913 to Busey entitled: "Electronic Personal Alert System", or U.S. Pat. No. 7,557,689 to Seddigh et al. entitled: "Customer Messaging Service", which are all incorporated in their entirety for all purposes as if fully set forth herein.

While commands received by the system, such as remotely or wirelessly from the smartphone 135 or locally by the mechanical switch SW3 44, were described to affect the load 12 state, such commands may, alternatively or additionally, be used for activating, de-activating, changing states, or changing operational parameters of the actuator 95$a$ in any PeX module 31, or of the actuator 95$b$ in any TeX module 32.

Figure 15:
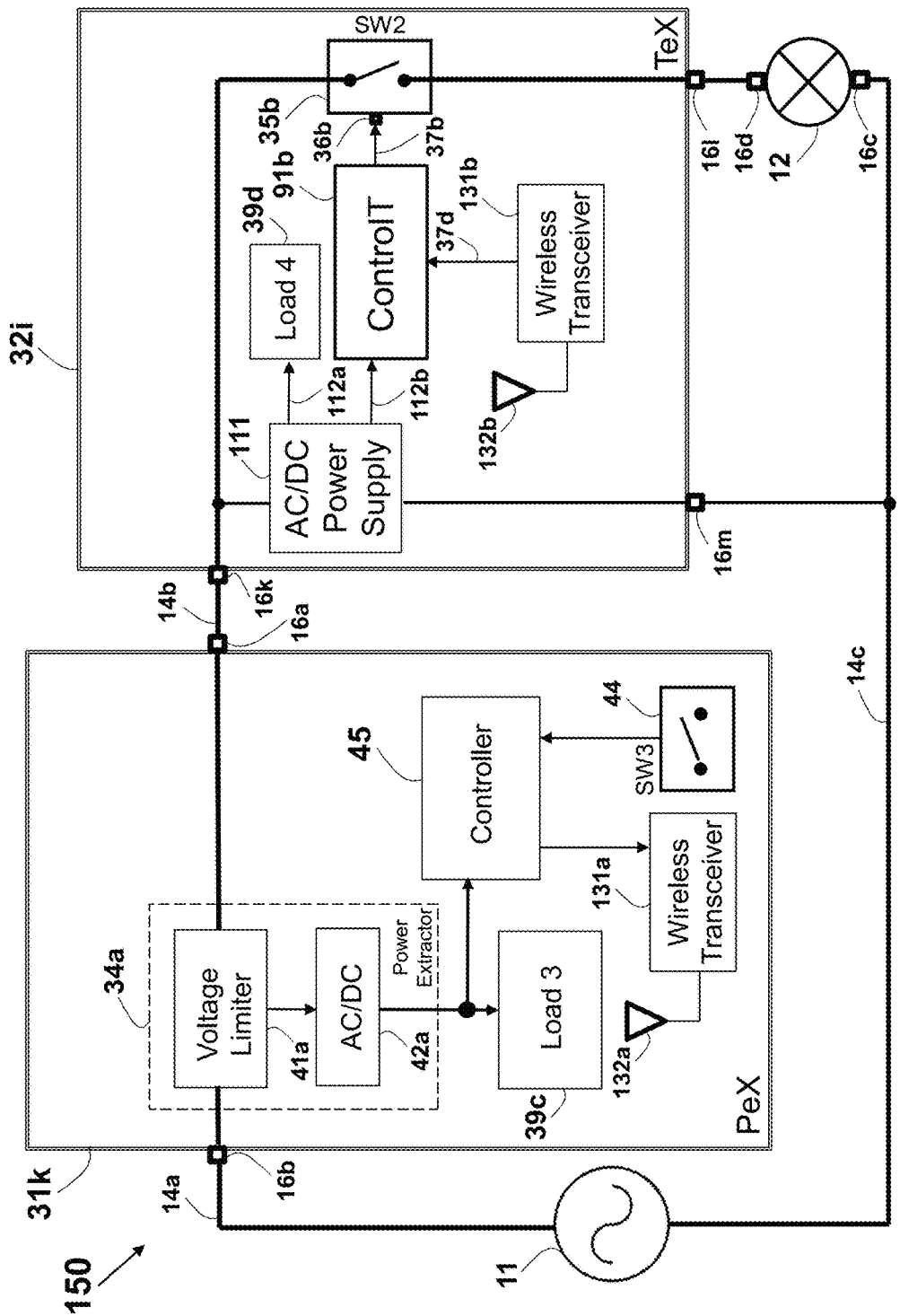
FIG. 15 illustrates an exemplary schematic electrical block diagram of a general power extraction system using wirelessly controlled load-side and switch-side modules.
Figure 15A:
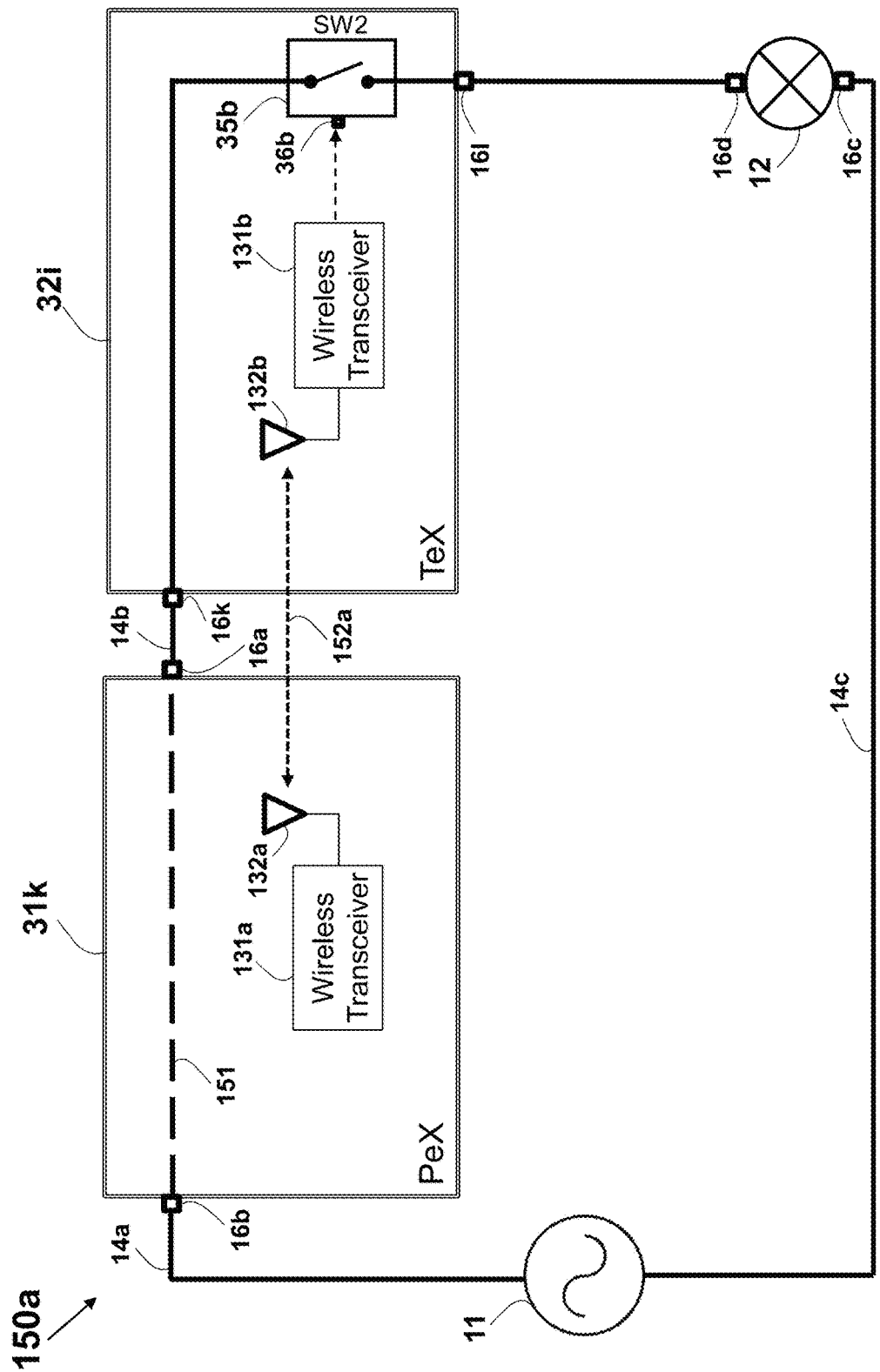
FIG. 15a illustrates an exemplary schematic electrical block diagram of a general power extraction system using wirelessly communicating load-side and switch-side modules.
Figure 15B:
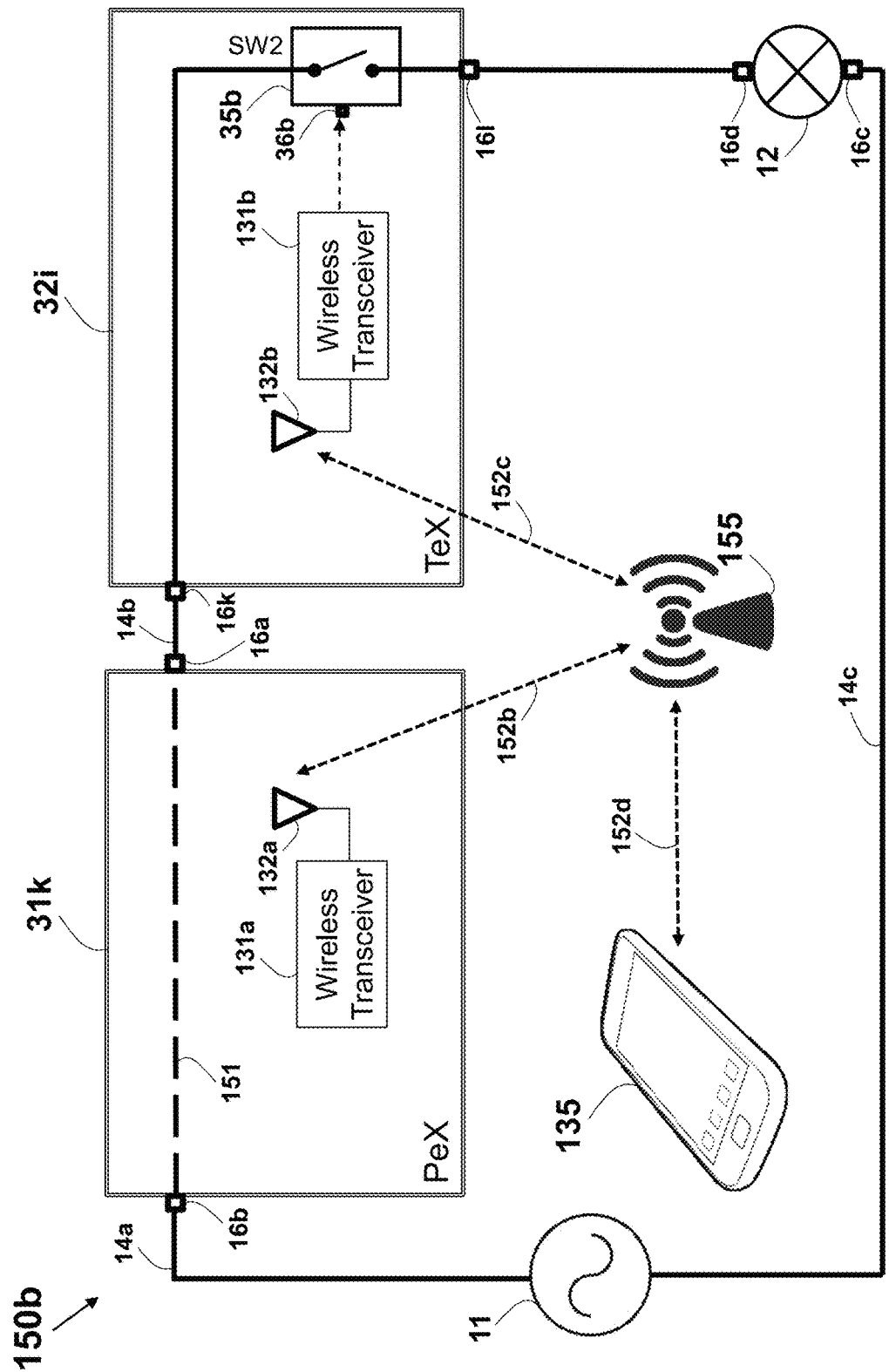
FIG. 15b illustrates an exemplary schematic electrical block diagram of a general power extraction system using wireless load-side and switch-side modules and a smartphone communicating using a WAP.
Figure 15C:
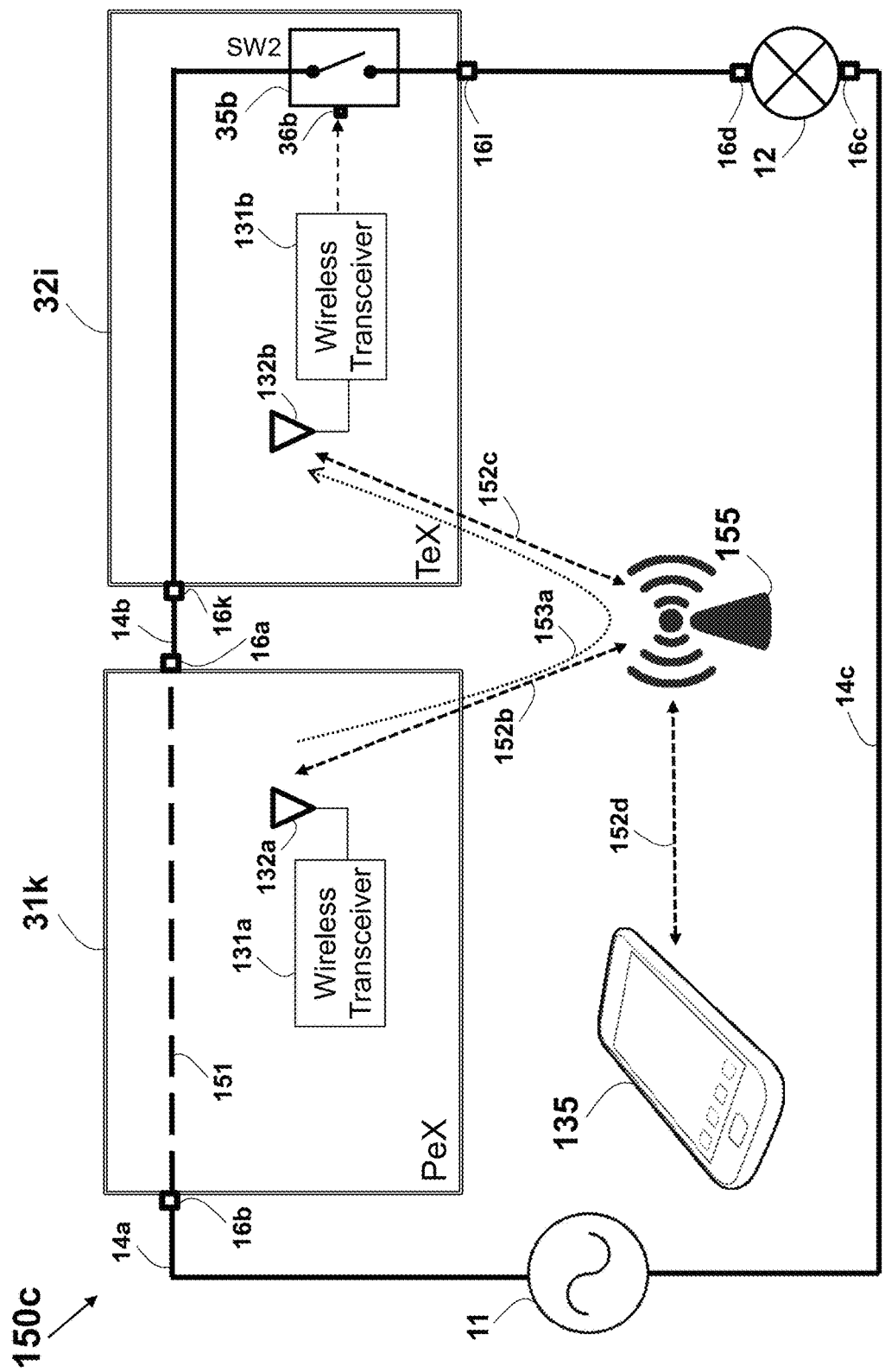
FIG. 15c illustrates an exemplary schematic electrical block diagram of a general power extraction system using wireless load-side and switch-side modules communicating using a WAP.
Figure 15D:
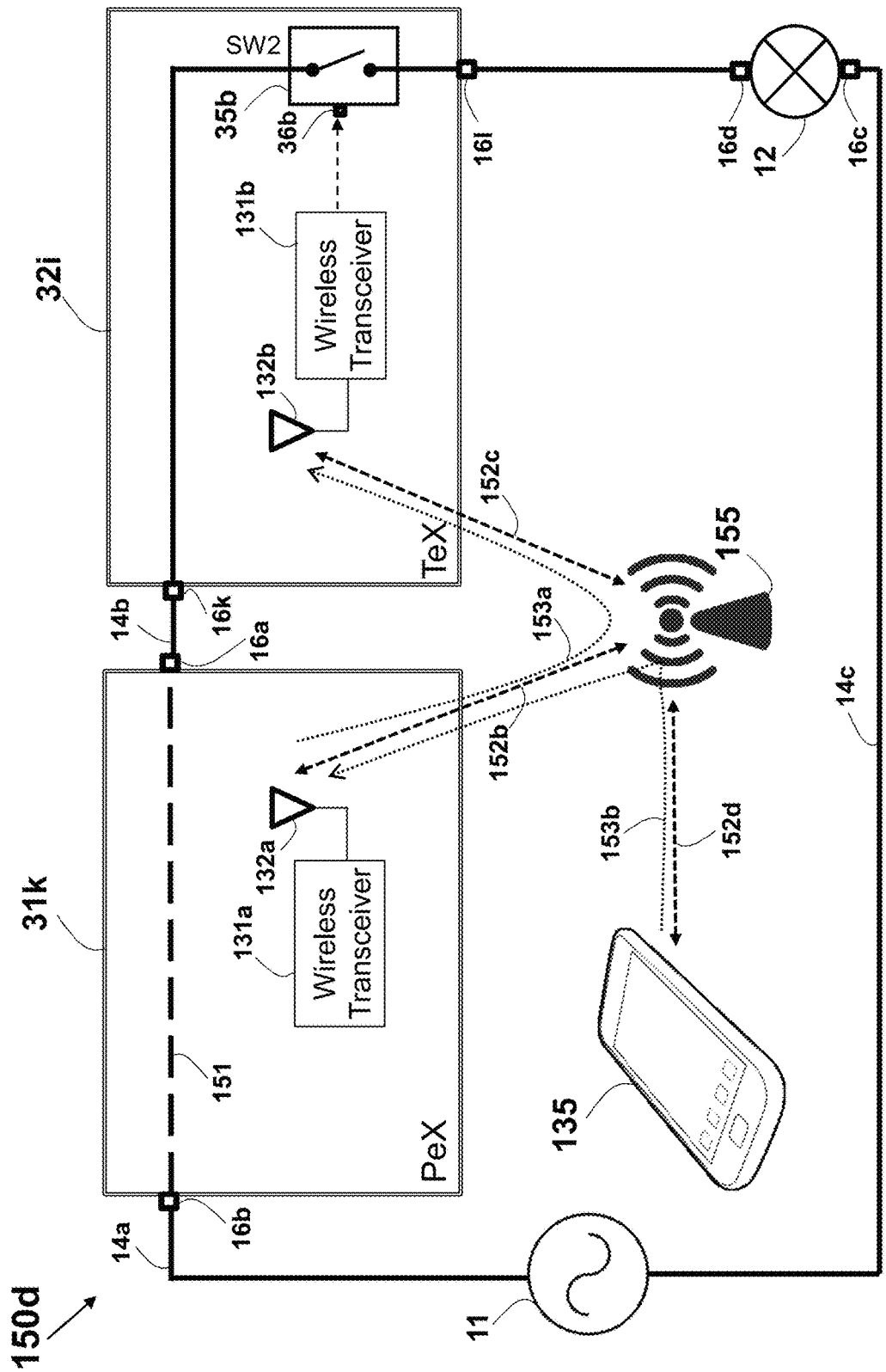
FIG. 15d illustrates an exemplary schematic electrical block diagram of a general power extraction system using a smartphone controlling wireless load-side and switch-side modules using a WAP.

The arrangement 150$b$ in FIG. 15$b$ illustrates a single network, managed and controlled by the WAP 155, and a single networking technology or scheme, used for both communication between the PeX module 31$k$ and the TeX module 32$i$, and for receiving external wireless commands from the smartphone 135. In one example illustrated as an arrangement 160 shown in FIG. 16, two distinct wireless networks are used. A local network 161, preferably employing a short range technology, is used for the communication between the wireless-capable PeX module 31$k$ (over wireless link 152$b$) and the wireless-capable TeX module 32$i$ (over wireless link 152$c$). The local network 161 may employ an ad-hok scheme as exampled in the arrangement 150$a$ in FIG. 15$a$, or may employ a centralized and managed scheme as exampled in the arrangement 150$b$ in FIG. 15$b$. The state control, as well as the notification, may use a remote network 162 over a wireless link 163$a$, which may be ad-hok or centralized based, for receiving commands from the smartphone 135 over a wireless link 163$b$. The PeX module 31$k$ may interface the remote network 162 by using a wireless transceiver 131$c$ connected to an antenna 132$c$, and the received commands may be sent to the wireless controller 131$a$ over a coupling 155 for notifying the TeX module 32$i$ over the local network 161, or otherwise such as by using level or edge changes. The communication with the remote network 162 over the wireless link 163$a$, the wireless transceiver 131$c$, and the antenna 132$c$ may employ or use any wireless technology described herein, such as WPAN, WLAN, or WWAN.

Preferably, the local network 161 is simpler and provides wireless communication functionality over ranges that are shorter than the ranges provided by the technology used for networking over the remote network 162. For example, the local network 161 may be a WPAN network, while the remote network 162 may be a WLAN network. Similarly, the local network 161 may be a WLAN network, while the remote network 162 may be a WWAN network. In one example, the remote network 162 may consist of, may include, or may use the Internet allowing for system control from anywhere. In such a scheme, the PeX module 31k (or the TeX module 32i, or both) may be addressable using an IP address.

Figure 17:
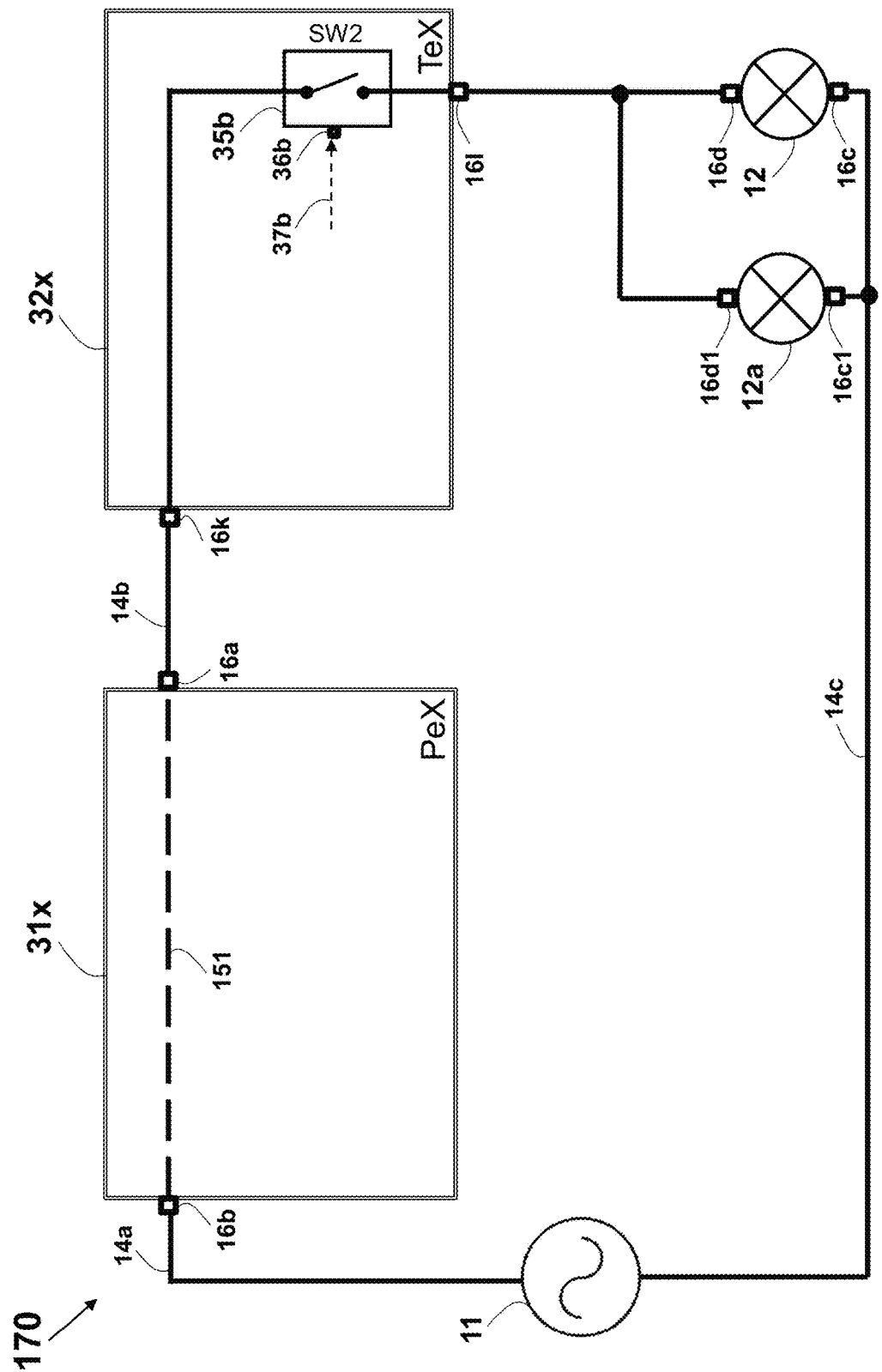
FIG. 17 illustrates an exemplary schematic electrical block diagram of a general power extraction system controlling two parallel-connected loads.

While exampled above regarding control of a single load 12, two or more loads may equally be applied. In an exemplary arrangement 170 shown in FIG. 17, a general PeX module 31x is used, which may be any of the PeX modules described herein, working in cooperation with a general TeX module 32x, which may be any of the PeX modules described herein. A second load 12a is connected, using terminals 16c1 and 16d1, in parallel to the load 12. In such a case, both loads 12 and 12a are in the same state ('ON' or 'OFF'), controlled by the same switch SW2 35b in the TeX module 32x. The loads 12 and 12a may be identical or similar to each other, and may be of the same type (e.g., lamps). Alternatively or in addition, the loads 12 and 12a may be distinct and different from each other—for example, load 12 may be a lamp while load 12a may be a fan.

Figure 17A:
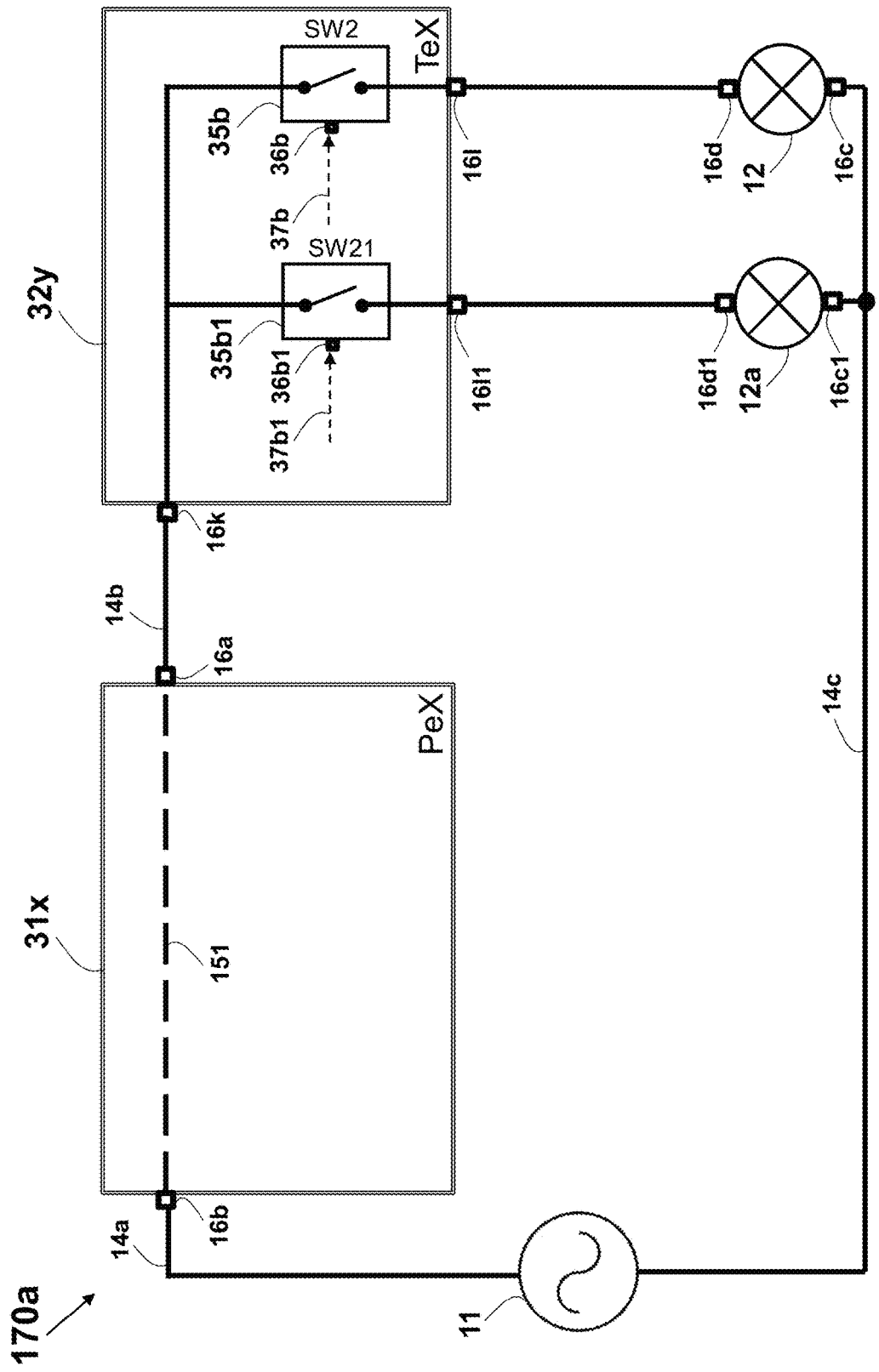
FIG. 17a illustrates an exemplary schematic electrical block diagram of a general power extraction system controlling two loads via two controlled switches.

Alternatively or in addition, the loads 12 and 12a may be controlled by the same TeX module 32y (which may be based on, or include, any TeX module described herein), using two distinct and independently controlled switches, as shown in an arrangement 170a in FIG. 17a. The controlled switch SW2 35b is connected to switch the ACX power to the load 12, while another switch SW21 35b1 is connected to switch AC power to the load 12a via the power connection 16l1. The switch SW21 35b1 is independently controlled via the control port 36b1 connected to a control line 37b1. Hence, each load may be independently controlled via its respective controlled switch via proper signaling to the respective control port. In one example, one of the switches may be controlled using edge or level detection, while the other may be wirelessly controlled. Alternatively or in addition, both loads' states are wirelessly controlled using different command, or different identification for each load.

Figure 17B:
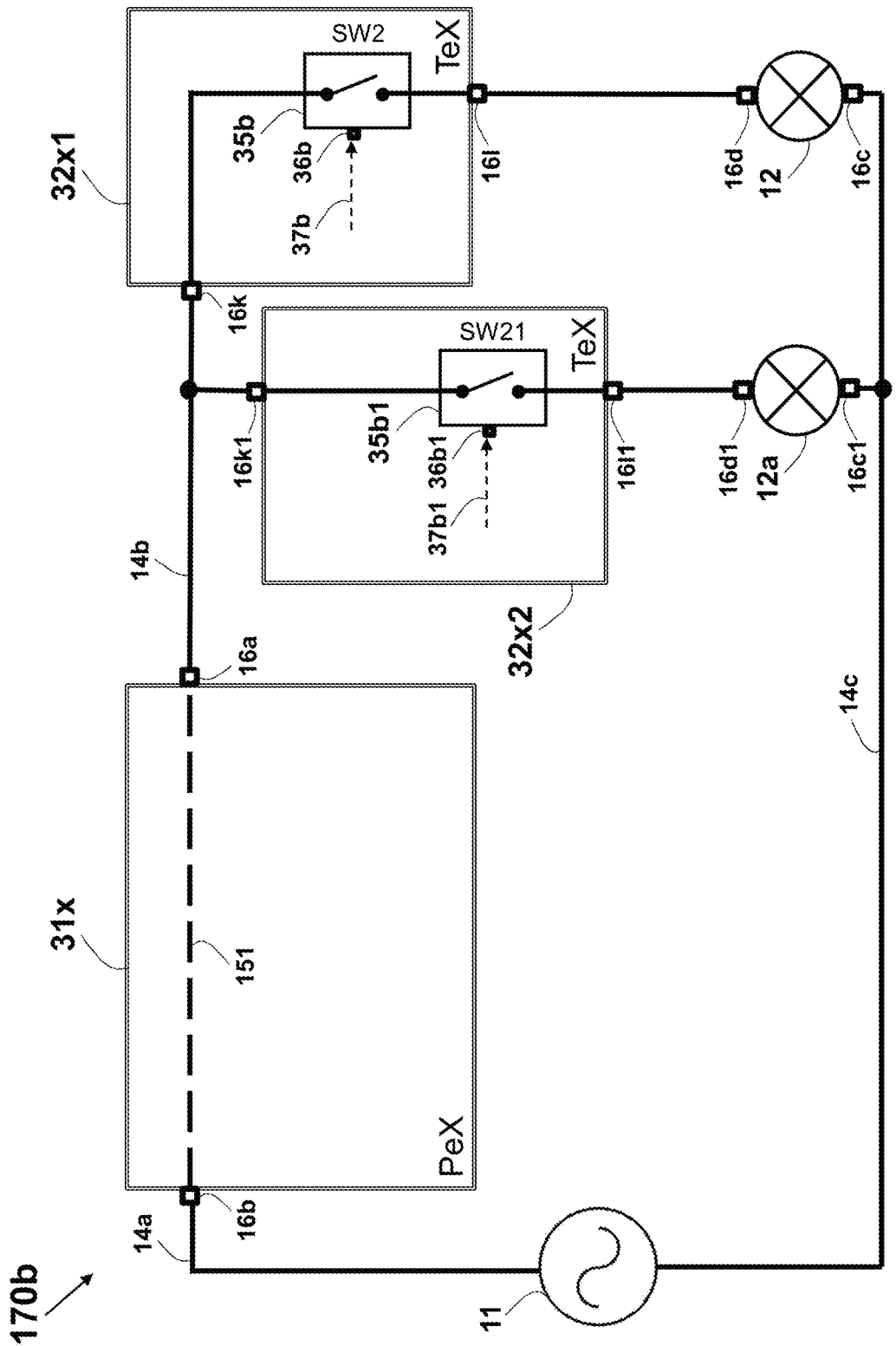
FIG. 17b illustrates an exemplary schematic electrical block diagram of a general power extraction system controlling two loads via two load-side modules.

Alternatively or in addition, the loads 12 and 12a may be controlled by using two distinct and independently controlled TeX modules 32x1 and 32x2 (where each may be based on, or include, any TeX module described herein), as shown in an arrangement 170b in FIG. 17b. The TeX modules 32x1 and 32x2 may be identical or similar to each other, and may be of the same type (e.g., both are wirelessly controlled). Alternatively or in addition, the TeX module 32x1 and 32x2 may be distinct and different from each other. The TeX module 32x2 connects to the AC power wire 14b via a power connection 16k1. Hence, the loads 12 and 12a may be independently controlled via the respective TeX modules 32x1 and 32x2 via proper signaling to the respective TeX module. In one example, one of the TeX modules may be controlled using edge or level detection, while the other may be wirelessly controlled. Alternatively or in addition, both loads states are wirelessly controlled, using different command or different identification for each TeX module.

The sensor 94a in a PeX module (such as the PeX module 31b) or the sensor 94b in a TeX module (such as the TeX module 32c) may be an electrical sensor used to measure electrical quantities. Such an electrical sensor may be conductively connected to measure the electrical parameter, or may be non-conductively coupled to measure an electric-related phenomenon, such as magnetic field or heat. Further, the average or RMS value may be measured. The electrical sensor may be an ampermeter (a.k.a. ammeter) is a current sensor that measures the magnitude of the electric current in a circuit or in a conductor such as a wire. Electric current is commonly measured in Amperes, milliampers, microamperes, or kiloampers. The sensor may be an integrating ammeter (a.k.a. watt-hour meter) where the current is summed over time, providing a current/time product, which is proportional to the energy transferred. The measured electric current may be an Alternating Current (AC) such as a sinewave, a Direct Current (DC), or an arbitrary waveform. A galvanometer is a type of ampermeter for detecting or measuring low current, typically by producing a rotary deflection of a coil in a magnetic field. Some ampermeters use a resistor (shunt), whose voltage is directly proportional to the current flowing through, requiring the current to pass through the meter. A hot-wire ampermeter involves passing the current through a wire which expands as it heats, and the expansion is measured. A non-conductive or non-contact current sensor may be based on 'Hall effect' magnetic field sensor, measuring the magnetic field generated by the current to be measured. Other non-conductive current sensors involve a current clamp or current probe, which has two jaws that open to allow clamping around an electrical conductor, allowing for measuring of the electric current properties (commonly AC), without making a physical contact or disconnecting the circuit. Such current clamp commonly comprises a wire coil wounded around a split ferrite ring, acting as the secondary winding of a current transformer, with the current-carrying conductor acting as the primary winding. Other current sensors and related circuits are described in Zetex Semiconductors PLC application note "*AN39—Current measurement application handbook*" Issue 5, January 2008, which is incorporated in its entirety for all purposes as if fully set forth herein.

The electrical sensor may be a voltmeter, commonly used for measuring the magnitude of the electric potential difference between two points. Electric voltage is commonly measured in volts, millivolts, microvolts, or kilovolts. The measured electric voltage may be an Alternating Current (AC) such as a sinewave, a Direct Current (DC), or an arbitrary waveform. Similarly, an electrometer may be used for measuring electric charge (commonly in Coulomb units—C) or electrical potential difference, with very low leakage current. The voltmeter commonly works by measuring the current through a fixed resistor, which, according to Ohm's Law, is proportional to the voltage across the resistor. A potentiometer-based voltmeter works by balancing the unknown voltage against a known voltage in a bridge circuit. A multimeter (a.k.a. VOM—Volt-Ohm-Milliameter) as well as Digital MultiMeter (DMM), typically includes a voltmeter, an ampermeter and an ohmmeter.

The electrical sensor may be a wattmeter measuring the magnitude of the active power (or the supply rate of electrical energy), commonly using watts (W), milliwatts, kilowatts, or megawatts units. A wattmeter may be based on measuring the voltage and the current, and multiplying to calculate the power $P=VI$. In AC measurement, the true power is $P=VI \cos(\phi)$. The wattmeter may be a bolometer, used for measuring the power of incident electromagnetic radiation via the heating of a material with a temperature-dependent electrical resistance. A sensor may be an electricity meter (or electrical energy meter) that measures the amount of electrical energy consumed by a load. Commonly, an electricity meter is used to measure the energy consumed by a single load, an appliance, a residence, a business, or any electrically powered device, and may provide or be the basis for the electricity cost or billing. The electricity meter may be an AC (single or multi-phase) or DC type, and the common unit of measurement is kilowatt-hour, however any energy related unit may be used such as Joules. Some electricity meters are based on wattmeters, which accumulate or average the readings, or may be based on induction.

The electrical sensor may be an ohmmeter measuring the electrical resistance, commonly measured in ohms ($\Omega$), milliohms, kiloohms or megohms, or conductance measured in Siemens (S) units. Low-resistance measurements commonly use micro-ohmmeter, while megohmmeter (a.k.a. Megger) measures large value of resistance. Common ohmmeter passes a constant known current through the measured unknown resistance (or conductance), while measuring the voltage across the resistance, and deriving the resistance (or conductance) value from Ohm's law (R=V/I). A Wheatstone bridge may also be used as a resistance sensor, by balancing two legs of a bridge circuit, where one leg includes the unknown resistance (or conductance) component. Variations of Wheatstone bridge may be used to measure capacitance, inductance, impedance, and other electrical or non-electrical quantities.

The electrical sensor may be a capacitance meter for measuring capacitance, commonly using units of picofarads, nanofarads, microfarads, and Farads (F). A sensor may be an inductance meter for measuring inductance, commonly using SI units of Henry (H), such as microHenry, milli-Henry, and Henry. Further, a sensor may be an impedance meter for measuring an impedance of a device or a circuit. A sensor may be an LCR meter, used to measure inductance (L), capacitance (C), and resistance (R). A meter may use sourcing an AC voltage, and use the ratio of the measured voltage and current (and their phase difference) through the tested device according to Ohm's law to calculate the impedance. Alternatively or in addition, a meter may use a bridge circuit (Similar to Wheatstone bridge concept), where variable calibrated elements are adjusted to detect a null. The measurement may be in a single frequency, or over a range of frequencies.

The electrical sensor may be a magnetometer for measuring a local H or B magnetic fields. The B-field (a.k.a. magnetic flux density or magnetic induction) is measured in Tesla (T) in SI units and Gauss in cgs units, and magnetic flux is measured in Weber (Wb) units. The H-field (a.k.a. magnetic field intensity or magnetic field strength) is measured in ampere-turn per meter (A/m) in SI units, and in Oersteds (Oe) in cgs units. Many Smartphones contain magnetometers serving as compasses. A magnetometer may be a scalar magnetometer, measuring the total strength, or may be a vector magnetometer, providing both magnitude and direction (relative to the spatial orientation) of the magnetic field. Common magnetometers include Hall effect sensor, magneto-diode, magneto-transistor, AMR magnetometer, GMR magnetometer, magnetic tunnel junction magnetometer, magneto-optical sensor, Lorentz force based MEMS sensor (a.k.a. Nuclear Magnetic Resonance— NMR), Electron Tunneling based MEMS sensor, MEMS compasses, Nuclear precession magnetic field sensor, optically pumped magnetic field sensor, fluxgate magnetometer, search coil magnetic field sensor, and Superconducting Quantum Interference Device (SQUID) magnetometer. 'Hall effect' magnetometers are based on 'Hall probe', which contains an indium compound semiconductor crystal such as indium antimonide, mounted on an aluminum backing plate, and provides a voltage a voltage in response to the measured B-field. A fluxgate magnetometer makes use of the non-linear magnetic characteristics of a probe or sensing element that has a ferromagnetic core. NMR and Proton Precession Magnetometers (PPM) measure the resonance frequency of protons in the magnetic field to be measured. SQUID meters are very sensitive vector magnetometers, based on superconducting loops containing Josephson junctions. The magnetometer may be Lorentz-force-based MEMS sensor, relying on the mechanical motion of the MEMS structure due to the Lorentz force acting on the current-carrying conductor in the magnetic field.

In one example, an AC ampermeter is used in order to measure the AC current 6 (such as shown in the arrangement 30d in FIG. 3c) flowing via the load 12, the AC current 7 consumed by the system when the load 12 is in 'off' state (such as shown in the arrangement 30c in FIG. 3b), both currents, or any other AC current provided by the AC power source 11. For example, the measured AC current may be used for calculating the power consumption, serving as a wattmeter, by multiplying the measured AC current by the AC power source 11 voltage level. Similarly, the energy consumed may be calculated by integrating the power consumption over time. Further, the total energy cost may be calculated by multiplying the consumed energy by the electrical energy cost. The above calculations may be executed by the controller 93a in any variant herein of the PeX module 31, or by the controller 93b in any variant herein of the TeX module 32, or both. The measured AC current, calculated or measured AC electrical power, calculated or measured AC electrical energy, or any combination thereof, may be presented to a user on a display that may be part of the actuator 95a in any variant herein of the PeX module 31, or may be part of the actuator 95b in any variant herein of the TeX module 32. Similarly, an AC voltmeter or AC wattmeter (or any combination thereof) may be used to measure any AC voltage, AC power, or AC electrical energy relating to the AC current flowing in the system and consumed from the AC power source 11. The AC ampermeter, the AC voltmeter, or the AC wattmeter (or any combination thereof) may be part of the sensor 94a in any PeX module variant (such as the PeX module 31b), the sensor 94b in any TeX module variant (such as the TeX module 32c), or both. Alternatively or in addition, the AC ampermeter, the AC voltmeter, or the AC wattmeter (or any combination thereof) is a sensor added to, and distinct from, the sensor 94a in any PeX module variant (such as the PeX module 31b) or the sensor 94b in any TeX module variant (such as the TeX module 32c).

Figure 18:
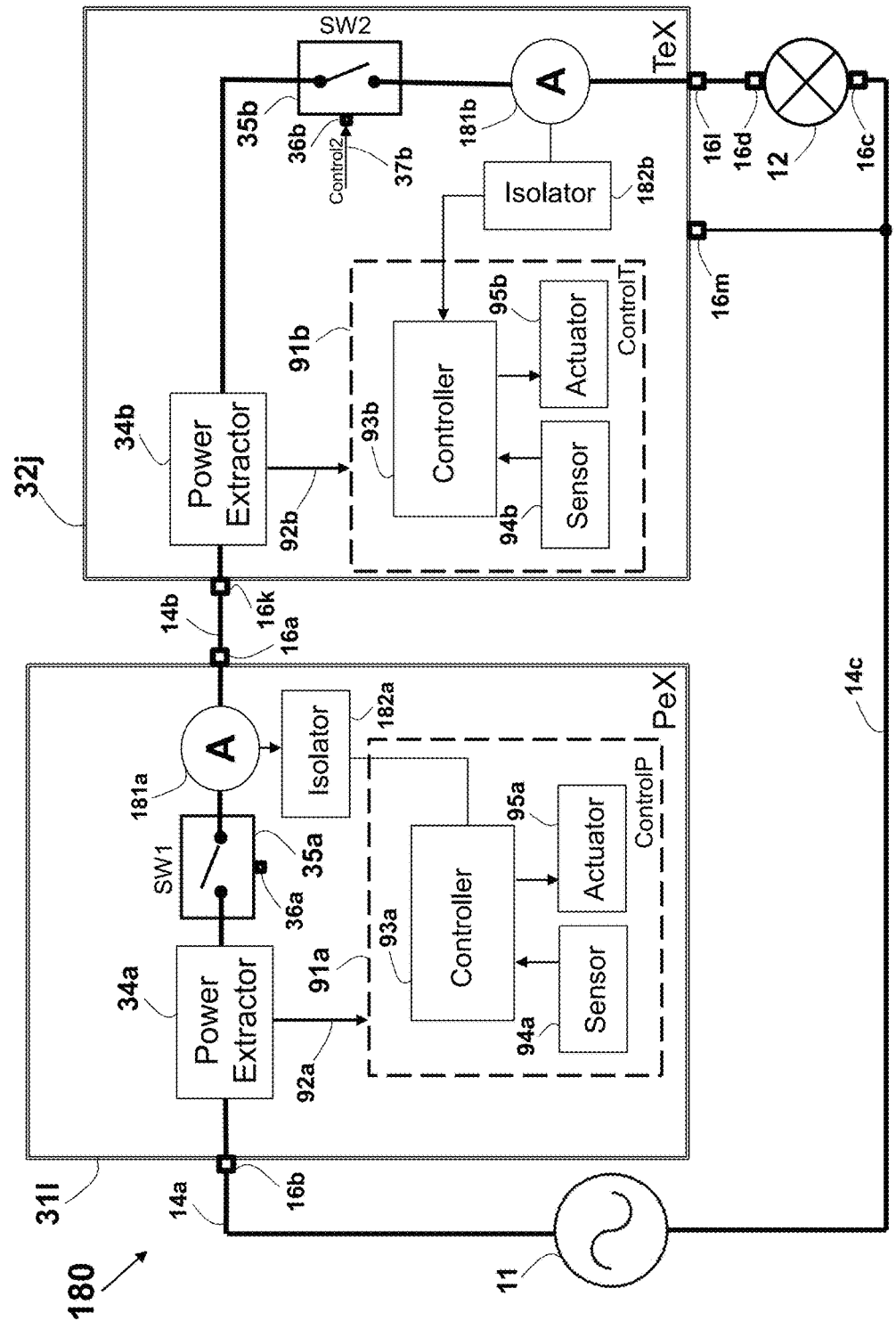
FIG. 18 illustrates an exemplary schematic electrical block diagram of a general power extraction system and AC power measurement.

An exemplary arrangement 180 employing AC current measurement is shown in FIG. 18. The exampled arrangement 180 is based on the arrangement 90 shown in FIG. 9, where a PeX module 32l is based on the PeX module 31b with added AC current measurement functionality, and a TeX module 32j is based on the TeX module 32c with added AC current measurement functionality, the additional AC current measurement may be equally employed or added to any of the PeX module 31 variants herein (such as the PeX module 31b), any of the TeX module 32 variants (such as the TeX module 32c), or both. An AC ampermeter 181a is connected in series to measure the AC current flowing through the PeX module 32l, and may be conductively connected to measure the electrical parameter, or may be non-conductively coupled to measure an electric-related phenomenon, such as magnetic field or heat. The AC ampermeter 181a may be connected between the controlled switch SW1 35*a* and the connector 16*a*, between the power extractor 34*a* and the controlled switch SW1 35*a*, or between the connector 16*b* and the power extractor 34*a* (as shown in the arrangement 180). Preferably, the AC current measured is the AC current that flows via the load 12 in an 'on' state, or the total AC current consumed from the AC power source 11. A value of the AC current measured by the AC ampermeter 181*a* may be coupled or transmitted to the controller 93*a* using a galvanic isolation in a galvanic isolator 182*a*. The isolator 182*a* may use optical (such as an opto-coupler) or magnetic (such as a transformer) coupling for isolating the low DC voltage circuitry fed by the power extractor 34*a*. The measured AC current value may be used by the controller 93*a* for calculating derived values such as AC electrical power, electrical energy, or related energy costs. The measured AC current value, the derived values, or both, may be displayed in a display that is integrated with the PeX module 31*l*, or may be transmitted via the wireless transceiver 131*a* (and the antenna 132*a*) shown as part of the PeX module 31*j* in FIG. 13. Alternatively, a galvanic isolation may not be used or required, and conductive connection may be used. In such a case, the galvanic isolator 182*a* in the Tex Module 32*j*, the galvanic isolator 182*b* in PeX module 31*l*, or both, may not be used.

Alternatively or in addition to the added AC measuring functionality in the PeX module 31*l*, the additional AC current measurement may be equally employed or added to any of the TeX module 32 variants, such as a TeX module 32*j* shown in the arrangement 180 in FIG. 18. An AC ampermeter 181*b* is connected in series to measure the AC current flowing through the TeX module 32*j*, and may be conductively connected to measure the electrical parameter, or may be non-conductively coupled to measure an electric-related phenomenon, such as magnetic field or heat. The AC ampermeter 181*b* may be connected between the controlled switch SW2 35*b* and the connector 16*i*, between the power extractor 34*b* and the controlled switch SW2 35*b*, or between the connector 16*k* and the power extractor 34*b*. Preferably, the AC current measured is the AC current that flows via the load 12 in an 'on' state, or the total AC current consumed from the AC power source 11. A value of the AC current measured by the AC ampermeter 181*b* may be coupled or transmitted to the controller 93*b* using a galvanic isolation in a galvanic isolator 182*b*. The isolator 182*b* may use optical (such as an opto-coupler) or magnetic (such as a transformer) coupling for isolating the low DC voltage circuitry fed by the power extractor 34*b*. The measured AC current value may be used by the controller 93*b* for calculating derived values such as AC electrical power, electrical energy, or related energy costs. The measured AC current value, the derived values, or both, may be displayed in a display that is integrated with the TeX module 32*j*, or may be transmitted via the wireless transceiver 131*b* (and the antenna 132*b*) shown as part of the TeX module 32*i* in FIG. 14.

Figure 18A:
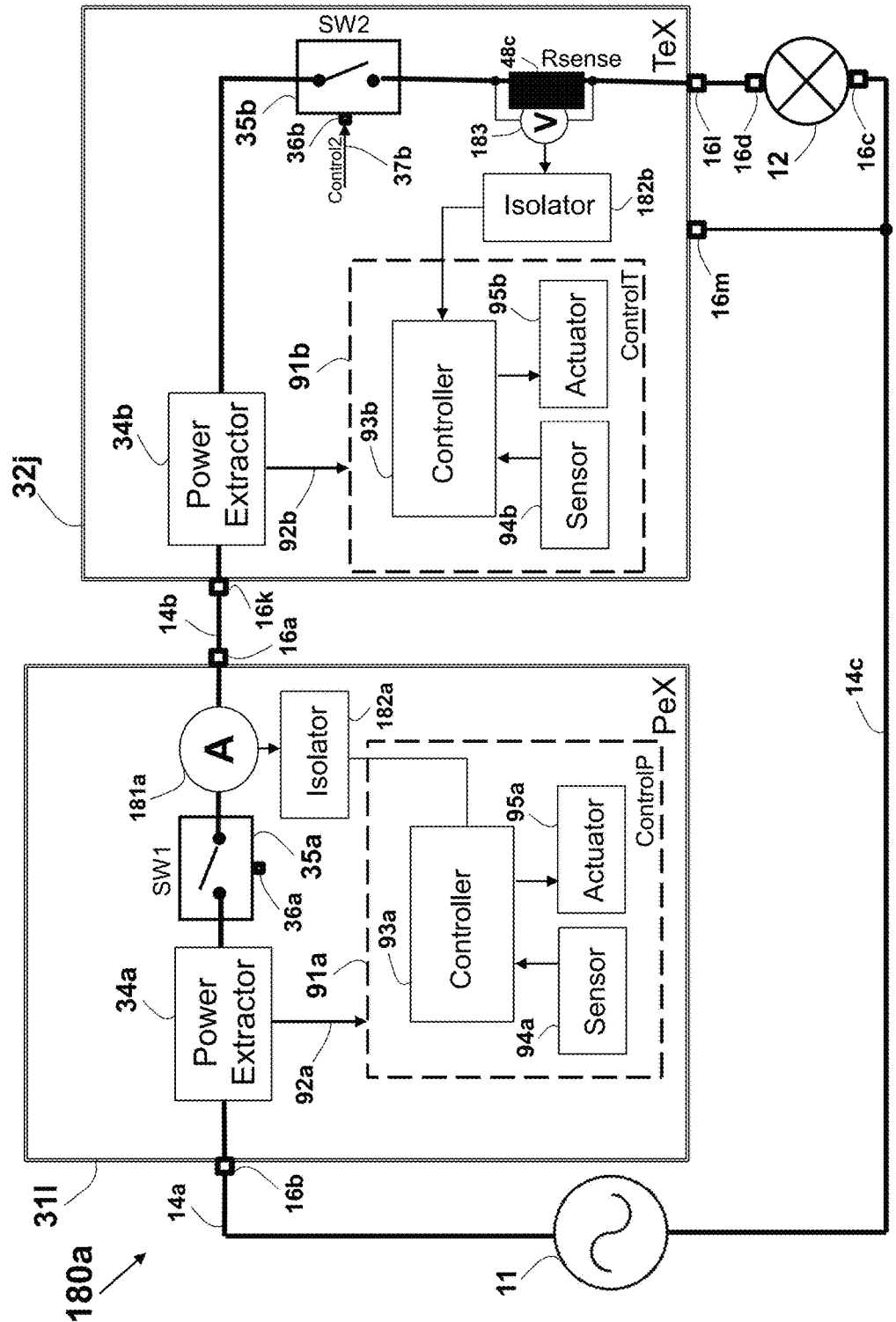
FIG. 18a illustrates an exemplary schematic electrical block diagram of a general power extraction system and AC power measurement using a shunt resistor.

An AC ampermeter may be implemented by measuring the voltage developed over a shunt resistor. Such an example of implementation of the AC ampermeter 181*b* is shown in an arrangement 180*a* in FIG. 18*a*. A shunt resistor Rsense 48*c* is connected in series between the load 12 and the controlled switch SW2 35*b*, and the voltage developed on the Rsense resistor 48*c* is measured by the voltmeter 183, the value of the developed voltage is passed to the controller 93*b* in the ControlT block 91*b* via the isolator component 182*b*.

Any controlling or affecting of the AC current, such as by the controlled switches SW1 35*a* and 35*b*, any power extracting such as by the power extractors 34*a* and 34*b*, or any AC current sensing such as by the ampermeters 181*a* and 181*b*, may use galvanic isolation components (such as isolators 182*a* and 182*b*) that are employing a galvanic barrier, that may use or may be based on capacitance, induction, or electromagnetic waves, or optical means. For example, the isolation components may include, or be based on, isolation transformers or opto-isolators (optocouplers).

In one example, a PeX module 31 (such as the PeX module 31*j*) may communicate using the wireless transceiver 131*a* (and the connected antenna 132*a*) over the Internet (such as by using TCP/IP). For example, the PeX module 31 may employ a client functionality, and may communicate with a server, such as an instant messaging server, over the Internet. Alternatively or in addition, a TeX module 32 (such as the TeX module 32*i*) may communicate using the wireless transceiver 131*b* (and the connected antenna 132*b*) over the Internet (such as by using TCP/IP). For example, the TeX module 32 may employ a client functionality, and may communicate with a server, such as an instant messaging server, over the Internet.

In one example, a PeX module 31 (such as the PeX module 31*j*), a TeX module 32 (such as the TeX module 32*i*), or both, notify their respective status over the wireless network. In such a scheme, the controller 93*a* in a PeX module 31 is using the wireless transceiver 131*a* (and the connected antenna 132*a*) to submit the PeX module (or the system) status information over the Internet (such as by using TCP/IP). Alternatively or in addition, the controller 93*b* in a TeX module 32 is using the wireless transceiver 131*b* (and the connected antenna 132*b*) to submit the TeX module (or the system) status information over the Internet (such as by using TCP/IP). The PeX module 31 or the Tex module 32 (or both) may employ Instant Messaging (IM) client functionality for notifying the module or system status to a user (or a machine), by transmitting the status messaged to an IM server (such as over the Internet by using TCP/IP) as part of an IM service.

The notification message sent may include a sensor output, such as the output of the sensor 94*a* in a general PeX module 31 or the sensor 94*b* in a general TeX module 32 (or both). For example, the message may include the AC current measured by the ampermeter 181*a* in a general PeX module 31 or the ampermeter 181*b* in a general TeX module 32 (or both). Alternatively or in addition, the message may include values derived from, or based on, the respective sensor output, such as the power consumption, energy consumed in a time period, or the associated energy cost. Further, the message may include a switch states, such as the switch SW3 44 or the controlled switch SW1 35*a* in the PeX module 31, or the controlled switch SW2 35*b* in the TeX module 32*a*, serving as acknowledgement for a control signal to the respective switch. Further, the status message may include an actuator-received command, such as the actuator 95*a* in the PeX module 31*b* or the actuator 95*b* in the TeX module 32*c*, and thus may serve as acknowledgement for a received command. In one example, in the case the load 12 is turned on by the system, but no AC current is flowing via the load 12, such as may be sensed by one of the ampermeters or by any other sensor, it may be used in a message suggesting that the load 12 is not connected or faulty.

A message sent may include identification of the sending module or system, such as its IP address, the time of sending the message, and the status. A notifying message may be sent periodically, such as every 1, 2, 5, or 10 seconds, every 1, 2, 5, or 10 minutes, every 1, 2, 5, or 10 hours, or every 1, 2, 5, or 10 days. Alternatively or in addition, the user may be notified by using an event-driven messaging. For example, a message may be transmitted upon a change in one the switches, or upon sensing a change in the status of one of the actuators. Alternatively or in addition, a message may be transmitted upon a sensor output exceeding a set maximum threshold, or upon measuring a sensor output below a set minimum threshold. Further, a message may be sent as a response to a received message, such as for acknowledgement.

The message may be sent using XMPP, SIMPLE, Apple Push Notification Service (APNs), or IMPS. The message may be a text-based message, such as by using SMS, or Twitter services, as well as social marketing service such as Facebook. Alternatively or addition, the message may include an audio or video message, and sent using MMS or Enhanced Messaging Service (EMS). Other services such as e-mail, Viber, or Whatsapp may be used.

A 'nominal' value herein refers to a designed, expected, or target value. In practice, a real or actual value is used, obtained, or exists, which varies within a tolerance from the nominal value, typically without significantly affecting functioning. Common tolerances are 20%, 15%, 10%, 5%, or 1% around the nominal value.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refers to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or a set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein refers (as applicable) to a software integration, a hardware integration, or any combination thereof.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including, without limitation, applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a multi-chip module (MCM) may be used, where multiple integrated circuits (ICs), the semiconductor dies, or other discrete components are packaged onto a unifying substrate, facilitating their use as a single component (as though a larger IC).

The term "computer-readable medium" (or "machine-readable medium") as used herein is an extensible term that refers to any medium or any memory, that participates in providing instructions to a processor, (such as processor 71) for execution, or any mechanism for storing or transmitting information in a form readable by a machine (e.g., a computer). Such a medium may store computer-executable instructions to be executed by a processing element and/or software, and data that is manipulated by a processing element and/or software, and may take many forms, including but not limited to, non-volatile medium, volatile medium, and transmission medium. Transmission media includes coaxial cables, copper wire and fiber optics. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

The term "computer" is used generically herein to describe any number of computers, including, but not limited to personal computers, embedded processing elements and systems, software, ASICs, chips, workstations, mainframes, etc. Any computer herein may consist of, or be part of, a handheld computer, including any portable computer that is small enough to be held and operated while holding in one hand or fit into a pocket. Such a device, also referred to as a mobile device, typically has a display screen with touch input and/or miniature keyboard. Non-limiting examples of such devices include Digital Still Camera (DSC), Digital video Camera (DVC or digital camcorder), Personal Digital Assistant (PDA), and mobile phones and Smartphones. The mobile devices may combine video, audio and advanced communication capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment, including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that perform particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value: the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A system for controlling a powering of a load from an AC power source connected via first and second terminals, for use with a wire connecting third and fourth terminals, the load is configurable to be in at least distinct first and second states in response to respective first and second current levels therethrough, the system comprising:
    a first enclosure housing a first circuit connected between the second and third terminals and comprises a first switch that is manually operated to be in at least first and second states; and
    a second circuit connected to be powered from the fourth and first terminals, the second circuit is connected to the load, and further comprises:
        a second switch connected to power the load; and
        a programmable logic circuit connected to be powered from the AC power source and coupled to control the second switch state, the programmable logic circuit is coupled to control the second switch to pass the first or the second current levels through the load,
    wherein the system is operative to shift the load at least between the first and second load states in response to sensing a change or shift of the first switch states.

2. The system according to claim 1, further comprising a second enclosure that houses the second circuit.

3. The system according to claim 2, wherein the second enclosure further comprises the load.

4. The system according to claim 2, wherein the load is external to the second enclosure.

5. The system according to claim 2, wherein the second enclosure is a ceiling-mounted enclosure.

6. The system according to claim 2, wherein the second enclosure is a wall-mounted enclosure that is constructed to have at least one of the following:
    a form substantially similar to that of a standard outlet;
    wall mounting elements substantially similar to those of a standard wall outlet;
    a shape allowing direct mounting in an outlet opening or cavity; and
    a form to at least in part substitute for a standard outlet.

7. The system according to claim 1, wherein the load is a light source.

8. The system according to claim 7, wherein the light source is an electric light source for converting electrical energy into light, and wherein the first and second load states comprises first and second illumination levels of the light source.

9. The system according to claim 8, wherein the electric light source is configured to emit visible or non-visible light for illumination or indication, the non-visible light is infrared, ultraviolet, X-rays, or gamma rays.

10. The system according to claim 8, wherein the electric light source consists of, or comprises, a lamp, an incandescent lamp, a gas discharge lamp, a fluorescent lamp, a Solid-State Lighting (SSL), a Light Emitting Diode (LED), an Organic LED (OLED), a polymer LED (PLED), or a laser diode.

11. The system according to claim 1, wherein the first switch is an AC power switch.

12. The system according to claim 11, wherein the first switch is a push-button switch.

13. The system according to claim 1, wherein the load is a DC load that is DC powered from the AC power source.

14. The system according to claim 13, wherein the first current is an DC current is provided to the DC load, and wherein the DC current is above 500 mA (milliamper), or wherein the DC load is rated to consume DC power in operation of at least 50 W (Watts).

15. The system according to claim 1, wherein the first or second current level DC current is below 250 mA (milliamper).

16. The system according to claim 1, wherein the first enclosure is a wall-mounted enclosure that is constructed to have at least one of the following:
    a form substantially similar to that of a standard wall AC switch;
    wall-mounting elements substantially similar to those of a standard wall outlet;
    a shape allowing direct mounting in an outlet opening or cavity; and
    a form to at least in part substitute for a standard outlet.

17. The system according to claim 16, wherein the first enclosure is configured to substitute a domestic light switch.

18. The system according to claim 16, wherein the first enclosure is dimensioned and shaped to be installed in a light switch outlet cavity.

19. The system according to claim 1, wherein the first current is zero and the load is non operative in the first state.

20. The system according to claim 1, wherein the programmable logic circuit comprises software and a processor for executing the software, an Application Specific Integrated Circuits (ASIC), or a Field Programmable Gate array (FPGA).

21. The system according to claim 1, wherein the second switch is connected and controlled to pass current via to the load in a close state and to stop current to the load in an open state, so that the load is in the first state when the second switch in the close state and the in the second state when the second switch in the open state.

22. The system according to claim 1, wherein the AC power is a domestic mains, the wire is an AC power wire, the terminals are AC power terminals, and the first switch, the second switch, or both, are AC power switches.

23. The system according to claim 22, wherein the AC power source voltage is nominally 120 VAC or 230 VAC, or wherein the AC power source frequency is nominally 60 Hz or 50 Hz.

24. The system according to claim 1, wherein the load or the system, comprises, or is part of, a water heater, HVAC system, air conditioner, heater, washing machine, clothes dryer, vacuum cleaner, microwave oven, electric mixer, stove, oven, refrigerator, freezer, food processor, dishwasher, food blender, beverage maker, coffeemaker, answering machine, telephone set, home cinema system, HiFi system, CD or DVD player, induction cooker, electric furnace, trash compactor, electric shutter, or dehumidifier.

25. The system according to claim 1, wherein the second circuit further comprising an AC/DC converter connected to the fourth and first terminals for supplying a DC voltage for powering at least the programmable logic circuit.

26. The system according to claim 25, wherein the AC/DC converter consists of, or comprises, a diode bridge.

27. The system according to claim 25, wherein the AC/DC converter supplies regulated and stabilized DC voltage.

28. The system according to claim 27, wherein the DC voltage is nominal 3.3 VDC, 5 VDC, or 12 VDC.

29. The system according to claim 25, wherein the AC/DC converter connected is further connected to DC power at least one of the second switch and the load.

30. The system according to claim 1, wherein the logic circuit further comprising an antenna for receiving signals over the air, and a wireless transceiver coupled to the antenna to receive a remote command from a wireless network, wherein the system is operative to control the state of the second switch in response to the remote command.

31. The system according to claim 30, wherein the wireless network is a Wireless Personal Area Network (WPAN), Wireless Local Area Network (WLAN), Wireless Wide Area Network (WWAN), WiMAX network, or cellular telephone network, the wireless transceiver is respectively a WPAN transceiver, WLAN transceiver, WWAN transceiver, WiMAX transceiver, or cellular modem, and the antenna is respectively a WPAN antenna, WLAN antenna, WWAN antenna, WiMAX antenna, or cellular antenna.

32. The system according to claim 30, for use with an intermediary device configured to communicate a first data with the wireless transceiver, wherein the wireless transceiver is operative to communicate with the intermediary device using an infrastructure scheme.

33. The system according to claim 32, wherein the intermediary device is a Wireless Access Point (WAP), a wireless switch, or a wireless router.

34. The system according to claim 30, further comprising a wireless device operative to wirelessly transmit or receive with the wireless transceiver via the antenna.

35. The system according to claim 34, wherein the wireless device is a hand-held or portable wireless device.

36. The system according to claim 35, wherein the wireless device consists of, or comprises, a Personal Digital Assistant (PDA), a tablet computer, or a smartphone.

37. The system according to claim 30, wherein the second circuit is addressable in the wireless network using a digital address.

38. The system according to claim 37, wherein the wireless network connects to, uses, or comprises, the Internet, wherein the digital address is a MAC layer address that is MAC-48, EUI-48, or EUI-64 address type, or wherein the digital address is a layer 3 address and is static or dynamic IP address that is IPv4 or IPv6 type address.

39. The system according to claim 30, further operative to send a notification message over the wireless network using the wireless transceiver via the antenna.

40. The system according to claim 39, further operative to periodically send multiple notification messages.

41. The system according to claim 39, further comprises a sensor having an output and responsive to a physical phenomenon, and wherein the message is sent in response to the sensor output.

42. The system according to claim 39, wherein the message is sent over the Internet via the wireless network to a client device using a peer-to-peer scheme.

43. The system according to claim 39, wherein the message is sent over the Internet via the wireless network to an Instant Messaging (IM) server for being sent to a client device as part of an IM service.

44. The system according to claim 43, wherein the message or the communication with the IM server is using, or is based on, SMTP (Simple Mail Transfer Protocol), SIP (Session Initiation Protocol), SIMPLE (SIP for Instant Messaging and Presence Leveraging Extensions), APEX (Application Exchange), Prim (Presence and Instance Messaging Protocol), XMPP (Extensible Messaging and Presence Protocol), IMPS (Instant Messaging and Presence Service), RTMP (Real Time Messaging Protocol), STM (Simple TCP/IP Messaging) protocol, Azureus Extended Messaging Protocol, Apple Push Notification Service (APNs), or Hypertext Transfer Protocol (HTTP).

45. The system according to claim 43, wherein the message is a text-based message and the IM service is a text messaging service.

46. The system according to claim 45, wherein the message is according to, or based on, a Short Message Service (SMS) message and the IM service is a SMS service, the message is according to, or based on, an electronic-mail (e-mail) message and the IM service is an e-mail service, the message is according to, or based on, WhatsApp message and the IM service is a WhatsApp service, the message is according to, or based on, an Twitter message and the IM service is a Twitter service, or the message is according to, or based on, a Viber message and the IM service is a Viber service.

47. The system according to claim 45, wherein the message is a Multimedia Messaging Service (MMS) or an Enhanced Messaging Service (EMS) message that includes an audio or video, and the IM service is respectively a NMS or EMS service.

48. The system according to claim 45, wherein the logic circuit comprises a sensor having an output responsive to a physical phenomenon.

49. The system according to claim 48, wherein the state of the second switch is in response to the sensor output.

50. The system according to claim 48, wherein the sensor is an occupancy sensor for detecting occupancy of a space by a human body, the sensor coupled to the logic circuit for shifting between the states in response to detecting a presence of a human by using electric effect, inductive coupling, capacitive coupling, triboelectric effect, piezoelectric effect, fiber optic transmission, or radar intrusion sensing.

51. The system according to claim 50, wherein the occupancy sensor consists of, comprises, or is based on, an acoustic sensor, opacity, geomagnetism, magnetic sensors, magnetometer, reflection of transmitted energy, infrared laser radar, microwave radar, electromagnetic induction, or vibration.

52. The system according to claim 50, wherein the occupancy sensor consists of, comprises of, or is based on, a motion sensor.

53. The system according to claim 52, wherein the motion sensor is a mechanically actuated sensor, passive or active electronic sensor, ultrasonic sensor, microwave sensor, tomographic detector, passive infrared (PIR) sensor, laser optical detector, or acoustical detector.

54. The system according to claim 50, wherein the sensor is a photoelectric sensor that responds to a visible or an invisible light, the invisible light is infrared, ultraviolet, X-rays, or gamma rays, and wherein the photoelectric sensor is based on the photoelectric or photovoltaic effect, and consists of, or comprises, a semiconductor component that consists of, or comprises, a photodiode, or a phototransistor.

55. The system according to claim 54, wherein the photoelectric sensor is based on Charge-Coupled Device (CCD) or a Complementary Metal-Oxide Semiconductor (CMOS) component.

56. The system according to claim 45, wherein the logic circuit comprises an actuator that converts electrical energy to affects a phenomenon, the actuator coupled to affect the phenomenon, and the actuator is coupled to be powered from the AC power source.

57. The system according to claim 56, wherein the logic circuit is further coupled to operate, control, or activate the actuator in response to the state of the first or the second switch.

58. The system according to claim 1, wherein the second switch, is based on, comprises, or consists of, a relay.

59. The system according to claim 58, wherein the relay is a solenoid-based electromagnetic relay or a reed relay.

60. The system according to claim 58, wherein the relay is a solid-state or semiconductor based relay.

61. The system according to claim 60, wherein the relay is an AC Solid State Relay (SSR).

62. The system according to claim 58, wherein the second switch is based on, comprises, or consists of, an electrical circuit that comprises a transistor, an open collector transistor, an open drain transistor, a thyristor, a TRIAC, or an opto-isolator.

63. The system according to claim 62, wherein the transistor is an N-channel or a P-channel Field-Effect power Transistor (power FET), wherein the respective switch is formed between a drain and a source pins, and the control terminal is a gate pin.

* * * * *